United States Patent [19]
Ito et al.

[11] Patent Number: 5,535,119
[45] Date of Patent: Jul. 9, 1996

[54] CHARACTER INPUTTING METHOD ALLOWING INPUT OF A PLURALITY OF DIFFERENT TYPES OF CHARACTER SPECIES, AND INFORMATION PROCESSING EQUIPMENT ADOPTING THE SAME

[75] Inventors: Jun Ito, Yokohama; Yasumasa Matsuda, Tokyo-to; Hiroyuki Kumai, Yokohama; Akira Nakajima, Tokyo-to; Shigeki Taniguchi, Hitachi; Hirobumi Kashiwa, Hitachi; Toyokazu Suzuki, Hitachi; Masaki Kawase, Katsuta; Hiromi Tomita, Hiratsuka, all of Japan

[73] Assignee: Hitachi, Ltd., Tokyo, Japan

[21] Appl. No.: 75,400

[22] Filed: Jun. 11, 1993

Related U.S. Application Data

[63] Continuation-in-part of Ser. No. 901,236, Jun. 19, 1992.

[30] Foreign Application Priority Data

| Jun. 11, 1992 | [JP] | Japan | 4-152426 |
| Jul. 2, 1992 | [JP] | Japan | 4-175769 |
| Jul. 24, 1992 | [JP] | Japan | 4-198586 |

[51] Int. Cl.$^6$ .................................................. G06F 17/28
[52] U.S. Cl. .................... 364/419.03; 364/419.09; 364/419.16; 364/419.11
[58] Field of Search .................. 364/419.02, 419.03, 364/419.07, 419.09, 419.1, 419.11, 419.14, 419.15, 419.16; 400/110; 345/171; 341/23, 28

[56] References Cited

U.S. PATENT DOCUMENTS

| 4,484,305 | 11/1984 | Ho | 364/419.09 |
| 4,531,119 | 7/1985 | Nakayama et al. | 400/110 |
| 4,544,276 | 10/1985 | Horodeck | 400/110 |
| 4,761,761 | 8/1988 | Sekiguchi | 364/419.15 |
| 4,829,580 | 5/1989 | Church | 364/419.2 |
| 5,128,672 | 7/1992 | Kaehler | 341/23 |
| 5,150,294 | 9/1992 | Tateno | 364/419.07 |
| 5,270,927 | 12/1993 | Sproat | 364/419.09 |

FOREIGN PATENT DOCUMENTS

| 61-231624 | 10/1986 | Japan . |
| 61-271564 | 12/1986 | Japan . |
| 62-9465 | 1/1987 | Japan . |
| 62-58358 | 3/1987 | Japan . |
| 63-257864 | 10/1988 | Japan . |
| 63-298517 | 12/1988 | Japan . |
| 2-30223 | 1/1990 | Japan . |

*Primary Examiner*—Robert A. Weinhardt
*Attorney, Agent, or Firm*—Antonelli, Terry, Stout & Kraus

[57] ABSTRACT

An information processing equipment providing easy operations of changing-over character species, and, in which characters can be entered without being conscious of the designation of a character mode. Signals entered from an input device are handled in conformity with all of a romaji (Roman character) input system, a kana (Japanese syllabary) input system and an alphanumeric input system. Results obtained with the respective input systems are all displayed in the predetermined part of a display screen. In the equipment, the character mode intended by a user is estimated as to the entered character string, and is automatically selected. In another aspect of performance, a controller determines whether or not a character mode likelihood decision unit and a character code translation unit are started, in accordance with the results of the comparisons between the key code string and the registered contents of a learning information buffer. The position of the entered key code string as corresponds to the length of the longest one of the key code strings is detected as a boundary position, the entered key code string is translated into character codes with the unit of the translation being a key code string which extends up to the detected boundary position, and the translated character codes are displayed.

30 Claims, 95 Drawing Sheets

INPUT CHARACTER STRING AND CHARACTER MODE HAVE BEEN CHANGED INTO *HIRAGANA*. TO REVERSE THE PROCESS, PRESS ⟨★⟩ AND ⟨NON-COVERT⟩ KEYS TOGETHER.

FIG. 10(b)

IS INPUT MODE CORRECT? CHARACTER MODE OF INPUT CHARACTER STRING MAY BE CHANGED BY PRESSING ⟨★⟩ AND ⟨NON-COVERT⟩ KEYS TOGETHER.

9:27    変換           英数        明朝体    挿入      全角         移動量:大
        (CONVERSION)  (A-N)      (MING    (INSERT) (FULL       (MOVE MAG:LARGE)
                                 TYPE)             SIZE)
```

INPUT CHARACTER STRING AND CHARACTER MODE HAVE BEEN
CHANGED INTO ひらがな. TO REVERSE THE PROCESS,
PRESS <★> AND <NON-CONVERT> KEYS TOGETHER.

9:27  変換   ひらがな   明朝体   挿入   全角   移動量:大
     (CONVERSION)(HIRAGANA)(MING TYPE)(INSERT)(FULL  (MOVE MAG:LARGE)
                                                SIZE)

FIG. 13 (a)

q@ype

9:27
(CONVERSION) 変換 英数 (A-N) 明朝体 挿入 全角 移動量:大
(MING TYPE)(INSERT)(FULL (MOVE MAG:LARGE)
SIZE)

IS INPUT MODE CORRECT? CHARACTER MODE OF INPUT
CHARACTER STRING MAY BE CHANGED BY PRESSING
<★> AND <NON-CONVERT> KEYS TOGETHER.

q@ypesd@)p 10  20  30  40

9:27 変換 英数 明朝体 挿入 全角 移動量：大
(CONVERSION) (A-N) (MING TYPE)(INSERT)(FULL (MOVE MAG:LARGE)
                                   SIZE)

9:27 変換 ひらがな 明朝体 挿入 全角 移動量:大
(CONVERSION)(HIRAGANA)(MING TYPE)(INSERT)(FULL SIZE)(MOVE MAG:LARGE)

| CH MODE | CH CODE |
|---|---|
| ROMAJI-HIRAGANA | 3 |
| KANA-HIRAGANA | あ |
| ROMAJI-KATAKANA | 3 |
| KANA-KATAKANA | ア |
| ALPHANUMERIC | 3 |

FIG. 31 (a)

| G / ) よ / $ う / G / ) よ / $ う / T / E / W / ` |
| きヽ / 9 よ / 4 う / きヽ / 9 よ / 4 う / か / い / て / @・ |

$$V = R \sum_a \log P_a \quad \cdots\cdots (1)$$

$$R \log P_a \quad \cdots\cdots (2)$$

$V_{rh} > \max(V_{rk}, V_{kh}, V_{kk}, V_e) + T$ ········ DSCR#1

$V_{kh} > \max(V_{rh}, V_{rk}, V_{kk}, V_e) + T$ ········ DSCR#2

$V_{rk} > \max(V_{rh}, V_{kh}, V_{kk}, V_e) + T$ ········ DSCR#3

$V_{kk} > \max(V_{rh}, V_{rk}, V_{kh}, V_e) + T$ ········ DSCR#4

$V_e > \max(V_{rh}, V_{rk}, V_{kh}, V_{kk}) + T$ ········ DSCR#5

FIG.33

| MODE<br>KEY CODE | ROMAJI-HIRAGANA | | KANA-HIRAGANA | | ROMAJI-KATAKANA | | KANA-KATAKANA | | ALPHA-NUMERIC | |
|---|---|---|---|---|---|---|---|---|---|---|
| | CH CODE | EVALU-ATIVE VALUE | CH CODE | EVALU-ATIVE VALUE | CH CODE | EVALU-ATIVE VALUE | CH CODE | EVALU-ATIVE VALUE | CH CODE | EVALU-ATIVE VALUE |
| 01 | 1 | 0 | ぬ | 0 | 1 | 0 | ヌ | 3 | 1 | 0 |
| 02 | 2 | 0 | ふ | 30 | 2 | 0 | フ | 53 | 2 | 0 |
| 03 | 3 | 0 | あ | 49 | 3 | 0 | ア | 44 | 3 | 0 |
| 04 | 4 | 0 | う | 78 | 4 | 0 | ウ | 62 | 4 | 0 |
| 05 | 5 | 0 | え | 36 | 5 | 0 | エ | 45 | 5 | 0 |
| 06 | 6 | 0 | お | 46 | 6 | 0 | オ | 42 | 6 | 0 |
| 07 | 7 | 0 | や | 29 | 7 | 0 | ヤ | 34 | 7 | 0 |
| 08 | 8 | 0 | ゆ | 43 | 8 | 0 | ユ | 38 | 8 | 0 |
| 09 | 9 | 0 | よ | 59 | 9 | 0 | ヨ | 30 | 9 | 0 |
| 10 | 0 | 0 | わ | 32 | 0 | 0 | ワ | 41 | 0 | 0 |
| 11 | − | 0 | ほ | 33 | − | 0 | ホ | 64 | − | 0 |
| 12 | ^ | 0 | へ | 14 | ^ | 0 | ヘ | 45 | ^ | 0 |
| 13 | − | 0 | − | 0 | − | 89 | − | 89 | ¥ | 0 |
| 14 | q | 0 | た | 60 | q | 0 | タ | 37 | q | 0 |
| 15 | w | 47 | て | 58 | w | 25 | テ | 65 | w | 50 |
| 16 | e | 78 | い | 80 | e | 80 | イ | 67 | e | 90 |
| 17 | r | 69 | す | 54 | r | 66 | ス | 48 | r | 71 |
| 18 | t | 79 | か | 66 | t | 43 | カ | 73 | t | 91 |
| 19 | y | 65 | ん | 75 | y | 51 | ン | 85 | y | 12 |
| 20 | u | 88 | な | 54 | u | 81 | ナ | 36 | u | 61 |
| 21 | i | 89 | に | 60 | i | 86 | ニ | 38 | i | 82 |
| 22 | o | 90 | ら | 45 | o | 88 | ラ | 55 | o | 83 |
| 23 | p | 25 | せ | 48 | p | 42 | セ | 43 | p | 64 |
| 24 | @ | 0 | ゛ | 65 | @ | 0 | ゛ | 62 | @ | 0 |
| 25 | [ | 0 | ゜ | 25 | [ | 0 | ゜ | 56 | [ | 0 |
| ⋮ | ⋮ | ⋮ | ⋮ | ⋮ | ⋮ | ⋮ | ⋮ | ⋮ | ⋮ | ⋮ |
| 49 | ! | 0 |  | 0 | ! | 0 |  | 0 | ! | 0 |
| 50 | " | 0 |  | 0 | " | 0 |  | 0 | " | 0 |
| 51 | # | 0 | ぁ | 0 | # | 0 | ァ | 8 | # | 0 |
| 52 | $ | 0 | ぅ | 0 | $ | 0 | ゥ | 0 | $ | 0 |
| ⋮ | ⋮ | ⋮ | ⋮ | ⋮ | ⋮ | ⋮ | ⋮ | ⋮ | ⋮ | ⋮ |
| 94 | > | 0 | 。 | 51 | > | 0 | 。 | 37 | > | 0 |
| 95 | ? | 0 | ・ | 0 | ? | 0 | ・ | 0 | ? | 0 |
| 96 | _ | 0 |  | 0 | _ | 0 |  | 0 | _ | 0 |

INPUT CH STRING AND CH MODE HAVE BEEN ALTERED INTO
ひらがな. IN RESTORING THEM, PRESS <★> AND <NON-
CONVERT> KEYS.

変換    ひらがな    明朝体    挿入    全角    移動量:大
(CONVERSION)(HIRAGANA) (MING TYPE)(INSERT) (FULL (MOVE MAG:
                                          SIZE)      LARGE)

9:27  だんせ

MESSAGE #1

INPUT CH STRING AND CH MODE HAVE BEEN ALTERED INTO "HIRAGANA". IN RESTORING THEM, PRESS ★ + <NON-CONVERT> KEYS.

MESSAGE #2

IS CH MODE CORRECT? CH MODE OF INPUT CH STRING CAN BE ALTERED WITH ★ + <NON-CONVERT> KEYS.

FIG.39 (b)

q@ypesd@)p

9:27  変換  英数  明朝体 挿入 全角 移動量:大
     (CONVERSION) (A-N) (MING TYPE)(INSERT)(FULL (MOVE MAG:
                                    SIZE)  LARGE)

変　換　ひらがな
(CONVERSION)(HIRAGANA)

明朝体　挿入　全角　移動量：大
(MING TYPE)(INSERT)(FULL (MOVE MAG:
            SIZE) LARGE)

```
INPUT CH STRING AND CH MODE HAVE BEEN ALTERED INTO
英数 . IN RESTORING THEM , PRESS <★> AND <NON-
CONVERT> KEYS

変換   英数    明朝体  挿入      全角      移動量:大
(CONVERSION) (A-N)  (MING TYPE)(INSERT)(FULL   (MOVE MAG:
                                      SIZE)    LARGE)
```

|10|20|30|40|

9:27  ippo

| 10 | 20 | 30 | 40 |

INPUT CH STRING AND CH MODE HAVE BEEN ALTERED INTO
ひらがな IN RESTORING THEM, PRESS <★> AND <NON-
CONVERT> KEYS

変換　　　明朝体　挿入　全角　移動量：大
(CONVERSION) ひらがな (MING TYPE)(INSERT)(FULL (MOVE MAG:
(HIRAGANA)　　　　　　　　SIZE)　LARGE)

ttyの せっていへんこう

|ひらがな| つっせのていへんこう

INPUT CH STRING AND CH MODE HAVE BEEN ALTERED INTO
<★> IN RESTORING THEM, PRESS <★> AND <NON-
CONVERT> KEYS.

変換　　ひらがな　明朝体　挿入　全角　移動量：大
(CONVERSION) (HIRAGANA) (MING TYPE) (INSERT) (FULL (MOVE MAG:
                                              SIZE) LARGE)

| KIND ~18032 | CHARACTER MODE ~18042 | KEY CODE STRING ~18052 |
|---|---|---|
| SUPPRESSION ~18012 | ROMAJI HIRAGANA | 21, 23, 23, 22 |
| NON-CONVERSION ~18022 | ALPHANUMERIC | 18, 18, 19 |

FIG. 87 (a)

| G | ) | $ | G | ) | $ | T | E | W | ` |
|---|---|---|---|---|---|---|---|---|---|
| き | 9 よ | 4 う | き | 9 よ | 4 う | か | い | て | @ ・ |

FIG. 87 (b)

| I | N | F | O | R | M | A | T | I | O | N |
|---|---|---|---|---|---|---|---|---|---|---|
| に | み | は | ら | す | も | ち | か | に | ら | み |

| 01 | 02 | 03 | 04 | 05 | 06 | 07 | 08 | 09 | 10 | 11 | 12 | 13 |   |
|----|----|----|----|----|----|----|----|----|----|----|----|----|---|
|    | 14 | 15 | 16 | 17 | 18 | 19 | 20 | 21 | 22 | 23 | 24 | 25 |   |
|    | 26 | 27 | 28 | 29 | 30 | 31 | 32 | 33 | 34 | 35 | 36 | 37 |   |
|    |    | 38 | 39 | 40 | 41 | 42 | 43 | 44 | 45 | 46 | 47 | 48 |   |
|    |    |    |    |    | 97 |    |    |    |    |    |    |    |   |

FIG.92(b)

| 49 | 50 | 51 | 52 | 53 | 54 | 55 | 56 | 57 | 58 | 59 | 60 | 61 |   |
|----|----|----|----|----|----|----|----|----|----|----|----|----|---|
|    | 62 | 63 | 64 | 65 | 66 | 67 | 68 | 69 | 70 | 71 | 72 | 73 |   |
|    | 74 | 75 | 76 | 77 | 78 | 79 | 80 | 81 | 82 | 83 | 84 | 85 |   |
|    |    | 86 | 87 | 88 | 89 | 90 | 91 | 92 | 93 | 94 | 95 | 96 |   |
|    |    |    |    |    |    |    |    |    |    |    |    |    |   |

FIG. 95

| NUMBER OF KEY CODES | KEY CODES | ATTRIBUTE NO. | AUXILIARY ATTRIBUTE | SPACE |
|---|---|---|---|---|
| ~6013 | ~6023 | ~6033 | ~6043 | ~6053 |

FIG. 96

⟨ KANA-HIRAGANA MODE DICT ⟩

| WORD | NUMBER OF KEY CODES | KEY CODES | ATTRIBUTE NO. | AUXILIARY ATTRIBUTE | SPACE |
|---|---|---|---|---|---|
| | ≶ | ≶ | ≶ | ≶ | ≶ |
| でんわ | 4 | 15, 24, 19, 10 | | | — |
| かみコップ | 6 | 18, 43, 42, 88, 02, 25 | 7 | 2 | — |
| | ≶ | ≶ | ≶ | ≶ | ≶ |

⟨ ROMAJI-HIRAGANA MODE DICT ⟩

| WORD | NUMBER OF KEY CODES | KEY CODES | ATTRIBUTE NO. | AUXILIARY ATTRIBUTE | SPACE |
|---|---|---|---|---|---|
| | ≶ | ≶ | ≶ | ≶ | ≶ |
| じしょ | 5 | 32, 21, 27, 19, 22 | | | — |
| あんパン | 7 | 26, 43, 43, 23, 26, 43, 43 | 11 | 3 | — |
| | ≶ | ≶ | ≶ | ≶ | ≶ |

⟨ ALPHANUMERIC MODE DICT ⟩

| WORD | NUMBER OF KEY CODES | KEY CODES | ATTRIBUTE NO. | AUXILIARY ATTRIBUTE | SPACE |
|---|---|---|---|---|---|
| | ≶ | ≶ | ≶ | ≶ | ≶ |
| pH | 2 | 23, 79 | 1 | | — |
| mm | 2 | 44, 44 | 2 | | — |
| Tシャツ | 6 | 66, 27, 31, 26, 18, 20 | 6 | 1 | — |
| FAX | 3 | 77, 74, 87 | | | — |
| | ≶ | ≶ | ≶ | ≶ | ≶ |

FIG. 97

⟨ KANA-HIRAGANA INPUTS ENTERED BY A-N MODE ⟩

| INTENDED CH STRING | 2 | m | m | の | な | か | ゛ | さ | に |
|---|---|---|---|---|---|---|---|---|---|
| A-N CH STRING | 2 | m | m | k | u | t | @ | x | i |
| INPUT KEY CODE STRING | 02 | 44 | 44 | 33 | 20 | 18 | 24 | 39 | 21 |
| PROHIBITED KEY CODE | 0 | 0 | 0 | 0 | 0 | 0 | 1 | 0 | 0 |

| KEY CODE STRING | 44 | 44 | 33 | 20 | 18 | 24 | 39 | 21 |

DICT

| NUMBER OF KEY CODES | KEY CODES | ATTRIBUTE NO. | AUXILIARY ATTRIBUTE | SPACE |
|---|---|---|---|---|
| ⋮ | ⋮ | ⋮ | ⋮ | ⋮ |
| 4 | 16, 18, 40, 46 | | | − |
| 1 | 44 | 2 | | − |
| 2 | 44, 44 | 2 | | − |
| 5 | 44, 46, 23, 46, 31 | | | − |
| 4 | 66, 28, 55, 38 | 5 | 1 | − |
| 6 | 66, 27, 31, 26, 18, 20 | 6 | 1 | − |
| ⋮ | ⋮ | ⋮ | ⋮ | ⋮ |

9013 → (row with 1, 44)
9033 → (row with 2, 44, 44)
9023 → (attribute area)

FIG.99

| KEY CODE STRING | 02 | 44 | 44 | 33 | 20 | 18 | 24 | 39 | 21 |

STORE | A-N | 3 |

FIG.100

| KEY CODE STRING | 02 | 44 | 44 | 33 | 20 | 18 | 24 | 39 | 21 |
| DISPLAY | 2 | m | m | の | な | か | ・ | さ | に |

A-N     KANA-HIRAGANA

FIG.102(a)

```
2mmkut@xi                                    — 13053
          — 13063

1 0              2 0              3 0
                                                          — 13023
                       1頁 1/39行   (文字サイズ2, 文字間2, 行間3)
                      (PAGE 1)(LINE 1/39)(CH SIZE 2, PITCH 2,
                                          LINE SPACE 3)

14:49   変 換    英 数      明朝体      挿入     全角       移動量:中
       (CONVERSION)(A-N)  (MING TYPE)(INSERT)(FULL     (MOVE MAG:
                                              SIZE)    MEDIUM)
               — 13043                            — 13033
```

| 10 | 20 | 30 |

14:49 　変　換　ひらがな　　　　　　1頁　1/39所　　　　　(文字サイズ2,文字間2,行間3)　明朝体　挿入　全角　　　移動量：中
　　　(CONVERSION)(HIRAGANA)　(PAGE 1)(LINE 1/39)(CH SIZE 2, PITCH 2, (MING TYPE)(INSERT)(FULL　(MOVE MAG:
　　　　　　　　　　　　　　　　　　　　　　　　　　　　　LINE SPACE 3)　　　　　　　　SIZE)　　MEDIUM)

| 14013 | 14023 | 14033 |
|---|---|---|
| : | : | : |
| 3, 5 1 | 1, 1 | ああ |
| 3, 2 4 | 1, 1 | あ ゛|
| 4, 5 1 | 1, 1 | うぁ |
| : | : | : |
| 2 4 | 1 | ゛|
| 2 5 | 1 | ゜|
| : | : | : |
| 4 9 | 2 | |
| 5 0 | 2 | |
| 5 1 | 1 | あ |
| 5 2 | 1 | う |
| 5 3 | 1 | え |
| : | : | : |
| 5 8, 5 8 | 1, 0 | をを |
| 5 8, 1 9 | 1, 1 | をん |
| : | : | : |
| 9 3, 9 3 | 1, 0 | 、、 |
| 9 3, 9 4 | 1, 0 | 、。 |
| 9 4, 9 3 | 1, 0 | 。、 |
| 9 4, 9 4 | 1, 0 | 。。 |
| 9 5 | 2 | |

FIG.104

| : | : | : |
|---|---|---|
| 1 4 , 1 4 | 1 , 0 | q q |
| 1 4 , 1 7 | 1 , 0 | q r |
| 1 4 , 1 8 | 1 , 0 | q t |
| : | : | : |
| 4 4 , 4 2 | 1 , 0 | m b |
| 4 4 , 4 3 | 1 , 0 | m n |
| : | : | : |
| 4 8 | 2 | |
| : | : | : |
| 15, 22, 15, 22 | 1 , 0 , 0 , 0 | w o w o |
| 15, 22, 43, 43 | 1 , 0 , 1 , 0 | w o n n |
| : | : | : |
| 4 5 , 4 5 | 1 , 0 | 、 、 |
| 4 5 , 4 6 | 1 , 0 | 、 。 |
| 4 6 , 4 5 | 1 , 0 | 。 、 |
| 4 6 , 4 6 | 1 , 0 | 。 。 |
| : | : | : |

FIG.105(a)

T shatuwokau
16013

10　　　　　20　　　　　30

14:49　変換　英 数　　項 1/39行　（文字サイズ2,対間2,行間3）　明朝体　挿入　全角　　移動量：中
　　　(CONVERSION) (A-N)　(PAGE 1)(LINE 1/39)(CH SIZE 2, PITCH 2,　(MING TYPE)(INSERT)(FULL　(MOVE MAG:
　　　　　　　　　　　　　　　　　　　　　　　　　　LINE SPACE 3)　　　　　　　　　SIZE)　　MEDIUM)

1頁 1/39行 (文字サイズ2, 対間2, 行間3)
(PAGE 1)(LINE 1/39)(CH SIZE 2, PITCH 2, LINE SPACE 3)

14:49  変換 ひらがな ローマ字[ ] 明朝体 挿入 全角 移動量：中
(CONVERSION) (HIRAGANA ROMAJI) (MING TYPE)(INSERT)(FULL SIZE) (MOVE MAG: MEDIUM)

FIG. 106

| CH MODE | CH CODE |
|---|---|
| ROMAJI-HIRAGANA | 3 |
| KANA-HIRAGANA | あ |
| ROMAJI-KATAKANA | 3 |
| KANA-KATAKANA | ア |
| ALPHANUMERIC | 3 |

FIG. 107

| ATTRIBUTE #1 | WORD IS SUCCEEDED BY NUMERAL. |
|---|---|
| ATTRIBUTE #2 | WORD IS PRECEDED BY NUMERAL. |
| ATTRIBUTE #3 | FORE PART OF WORD IS IN A-N MODE, WHEREAS REAR PART IS IN KANA-HIRAGANA MODE. |
| ATTRIBUTE #4 | FORE PART OF WORD IS IN A-N MODE, WHEREAS REAR PART IS IN KANA-KATAKANA MODE. |
| ATTRIBUTE #5 | FORE PART OF WORD IS IN A-N MODE, WHEREAS REAR PART IS IN ROMAJI-HIRAGANA MODE. |
| ATTRIBUTE #6 | FORE PART OF WORD IS IN A-N MODE, WHEREAS REAR PART IS IN ROMAJI-KATAKANA MODE. |
| ATTRIBUTE #7 | FORE PART OF WORD IS IN KANA-HIRAGANA MODE, WHEREAS REAR PART IS IN ROMAJI-KATAKANA MODE. |
| ATTRIBUTE #8 | FORE PART OF WORD IS IN KANA-HIRAGANA MODE, WHEREAS REAR PART IS IN A-N MODE. |
| ATTRIBUTE #9 | FORE PART OF WORD IS IN KANA-KATAKANA MODE, WHEREAS REAR PART IS IN KANA-HIRAGANA MODE. |
| ATTRIBUTE #10 | FORE PART OF WORD IS IN KANA-KATAKANA MODE, WHEREAS REAR PART IS IN A-N MODE. |
| ATTRIBUTE #11 | FORE PART OF WORD IS IN ROMAJI-HIRAGANA MODE, WHEREAS REAR PART IS IN ROMAJI-KATAKANA MODE. |
| ATTRIBUTE #12 | FORE PART OF WORD IS IN ROMAJI-HIRAGANA MODE, WHEREAS REAR PART IS IN A-N MODE. |
| ATTRIBUTE #13 | FORE PART OF WORD IS IN ROMAJI-KATAKANA MODE, WHEREAS REAR PART IS IN ROMAJI-HIRAGANA MODE. |
| ATTRIBUTE #14 | FORE PART OF WORD IS IN ROMAJI-KATAKANA MODE, WHEREAS REAR PART IS IN A-N MODE. |

FIG.111

| HIRAGANA | ROMAJI | HIRAGANA | ROMAJI | HIRAGANA | ROMAJI | HIRAGANA | ROMAJI | HIRAGANA | ROMAJI | HIRAGANA | ROMAJI |
|---|---|---|---|---|---|---|---|---|---|---|---|
| あ | A | な | NA | ら | RA | が | GA | ぱ | PA | ぎゃ | GYA |
| い | I | に | NI | り | RI | ぎ | GI | ぴ | PI | ぎゅ | GYU |
| う | U | ぬ | NU | る | RU | ぐ | GU | ぷ | PU | ぎょ | GYO |
| え | E | ね | NE | れ | RE | げ | GE | ぺ | PE | じゃ | ZYA |
| お | O | の | NO | ろ | RO | ご | GO | ぽ | PO | じゅ | ZYU |
| か | KA | は | HA | わ | WA | ざ | ZA | きゃ | KYA | じょ | ZYO |
| き | KI | ひ | HI | ゐ | WI | じ | ZI | きゅ | KYU | ぢゃ | DYA |
| く | KU | ふ | HU | | | ず | ZU | きょ | KYO | ぢゅ | DYU |
| け | KE | へ | HE | ゑ | WE | ぜ | ZE | しゃ | SYA | ぢょ | DYO |
| こ | KO | ほ | HO | を | WO | ぞ | ZO | しゅ | SYU | びゃ | BYA |
| さ | SA | ま | MA | ん | NN | だ | DA | しょ | SYO | びゅ | BYU |
| し | SI | み | MI | | | ぢ | DI | ちゃ | TYA | びょ | BYO |
| す | SU | む | MU | | | づ | DU | ちゅ | TYU | ぴゃ | PYA |
| せ | SE | め | ME | | | で | DE | ちょ | TYO | ぴゅ | PYU |
| そ | SO | も | MO | | | ど | DO | にゃ | NYA | ぴょ | PYO |
| た | TA | や | YA | | | ば | BA | にゅ | NYU | | |
| ち | TI | | | | | び | BI | にょ | NYO | | |
| つ | TU | ゆ | YU | | | ぶ | BU | ひゃ | HYA | | |
| て | TE | | | | | べ | BE | ひゅ | HYU | | |
| と | TO | よ | YO | | | ぼ | BO | ひょ | HYO | | |

CHARACTER INPUTTING METHOD ALLOWING INPUT OF A PLURALITY OF DIFFERENT TYPES OF CHARACTER SPECIES, AND INFORMATION PROCESSING EQUIPMENT ADOPTING THE SAME

The present application is a continuation-in-part application of Ser. No. 07/901,236 filed Jun. 19, 1992, entitled "METHOD AND APPARATUS FOR CHARACTER DETERMINATION" which is currently pending.

BACKGROUND OF THE INVENTION

1. Field of the Invention

The present invention relates to a character inputting method for entering characters on the basis of a plurality of character species and a plurality of input systems, and a character inputting device and an information processing equipment which adopt the method. More particularly, it relates to a character inputting method which eliminates the setting errors of character species and languages, etc. or dispenses with the settings thereof, and a character inputting device and an information processing equipment which adopt the method.

2. Description of the Prior Art

As the input devices of electronic information equipment, for example, personal computers, there have heretofore been extensively employed keyboards which are similar to ones used in mechanical typewriters. In a common keyboard employed in the U.S.A., for example, the keyboard "101 Keyboard" of a personal computer "IBM-PC", two different characters are carved on the top of some of the keys so that characters including the capital and small letters of the alphabet, numerals, and symbols such as '$' and '%' can be input in a total number larger than the number of keys on the keyboard. Which of the two available characters is to be input, can be determined depending upon whether or not a shift key is simultaneously pressed.

Meanwhile, the number of characters in ordinary use is much larger in each of Japanese, Korean, Chinese etc. than in English. The Japanese language, for example, uses about 7000 characters which include, not only the alphabet, but also "hiraganas" and "katakanas" which are phonetic characters, and "kanjis" which are ideographic characters. Such a large number of characters could not be handled by computer systems in the initial stages of development, but they have come to be processed comparatively easily with respect to display, printing etc. owing to the recent technological innovation. In the input portion, however, a large number of problems concerning a user interface remain unsolved. One of the problems is how to separately enter as many as 7000 different characters.

In order to cope with this problem, keyboards adapted to enter the "hiraganas" and "katakanas" in addition to the alphabet have been devised in Japan by extending the keyboard employed in the U.S.A. An example of the devised keyboards is illustrated in FIG. 27. As exemplified by a character key 3232, a hiragana character is added to the normal input contents of the key of the keyboard in the U.S.A. Herein, keys called "mode setting keys" indicated at reference numerals 3062, 3092 and 3052 are used for determining which of the input contents is to be entered by pressing the character key 3232. More specifically, when the key 3062 is pressed before key input operations, an input mode "hiragana" is established, and hiragana characters carved on the tops of pressed character keys are entered by the succeeding key input operations. Further, when the key 3092 is pressed, an input mode "katakana" is established, and katakana characters which correspond to hiragana characters carved on the tops of pressed character keys are entered by the succeeding key input operations (the relations between hiraganas and katakanas resemble those between the capital and small letters of the alphabet). Still further, when the key 3052 is pressed, an input mode "alphanumeric" is established, and the same character input results as in the case of the keyboard employed in the U.S.A. are obtained thenceforth. In this manner, the functions of the keyboard are switched by pressing the mode setting keys beforehand, whereby the larger number of characters can be input.

Another mode for entering the hiraganas and katakanas is a "romaji" (Roman character) input system. As tabulated in FIG. 111, all the hiraganas in the Japanese language can be transliterated into alphabetic characters. By utilizing this property, the romaji input system automatically converts at least one keyed alphabetic character into a hiragana (or katakana) character corresponding thereto. With this input system, when characters 'wa' (character keys 'w' and 'a') are pressed by way of example, they are converted into 'わ'. Regarding the romaji-kana conversion, in a case where a mode setting key 3042 shown in FIG. 27 has been pressed beforehand, the romaji-kana conversion is performed. On the other hand, in the case where the mode setting key 3052 has been pressed beforehand, the input mode 'alphanumeric' is established, and the same character input results as in the case of the keyboard employed in the U.S.A. are obtained thenceforth without performing the romaji-kana conversion.

Both the romaji input system and the method (kana input system) for entering hiraganas carved on key tops, which are respectively established by the mode settings as stated above, are extensively employed for the input operations of the Japanese language with the keyboards. The kana input system has the merit that the number of touches with keys is smaller, while the romaji input system has the merit that only the alphabetic key layout may be memorized. Which of the input systems is to be applied, depends greatly upon the taste of a user. In many cases, therefore, the input processing programs of both the input systems are prepared in a computer system, and the user is allowed to switch them. By way of example, the romaji input system is established by pressing the key 3042 in FIG. 27 once, and it is switched to the kana input system by pressing the key 3042 again.

In this specification, the state in which a character is entered by the romaji input system will sometimes be called the "romaji mode", etc. Besides, the state in which a character is entered by the kana input system will sometimes be called the "kana input mode", "kana-hiragana mode", etc. In addition, the state in which an alphanumeric character can be entered will sometimes be called the "alphanumeric mode".

Further, in this specification, both the input system and the character species will sometimes be expressed as the "character species" or "character mode", etc. collectively and simply.

In the appended claims, the expression "character species" or "character mode" shall indicate a concept which covers both the species of a character (for example, hiragana character or alphanumeric character) and the input system (for example, romaji input system or kana input system). Accordingly, the "character species" differs between the state in which the kana character is entered by the kana input system and the state in which the kana character is entered by the romaji input system.

Language translating machines addressing a plurality of languages have a language selecting key. This key allows the user to designate the language into which the input, or to be input, character string is translated.

On language translating machines for translating a first language (e.g., German, French or Italian) into a second language (e.g., Japanese), the user typically designates the first language before translation can take place. For example, after inputting a character string "Auf Wiedersehen", the user designates "German." This allows the character string to be translated into its Japanese equivalent "さようなら". Likewise, with an English sentence "How do you do?" input, designating the language type "English" translates the sentence into its Japanese equivalent "はじめまして".

The use of keyboards almost inevitably entails another problem: typographical errors. The most widespread keyboard arrangement is one comprising about 50 keys that are operated with both hands. Keyboards of this type typically have four tiers of keys, each tier containing from 12 to 14 keys. When the user types in "blind touch" fashion on the keyboard while copying a manuscript, typographical errors are more or less inevitable. One way to minimize such errors is to equip the keyboard with specific keys (e.g., home position keys) marked with depressions or bumps for tactile verification of the correct key positions. Another way to address typographical errors is to run a dictionary-based spelling check on the input words whereby the user finds and corrects wrong spellings.

Some machines when interconnected are faced with the problem of how to handle different character code systems that may exist therebetween. In stand-alone situations, the machines may use whatever character code system that are unique to them. When interconnected, these machines may have difficulty in communicating with one another using different character codes. For example, a character string transmitted from one machine may appear as a meaningless collection of symbols on the receiving machine that uses a different character code system from that of the transmitting machine. One way to solve this problem is to establish common communication protocols between the machines involved so that a mutually agreed-on character code system is utilized throughout the transmission and reception therebetween As mentioned, the major problem with the machines for translating a plurality of languages is that the user is required not only to perform steps to designate the first (i.e., source) language, but also to know beforehand the character species of that first language. Such requirements turn out to be a considerable burden on the user's part.

As mentioned, the prior art solution to typographical errors is generally the tactile verification of the home position keys. This solution requires the user to remain vigilant at all times during key input. Once the home position keys are missed, the user may continuously type incorrect character strings until he views the screen for confirmation. Another solution, the dictionary-based spelling check, puts a heavy burden on the processor. If carried out during character input, the spelling check will considerably reduce the operability of the machine because the spelling-check processing takes time and affects other operations. For this reason, the spelling check is typically carried out in a single pass on a certain batch of word processing completed. But this way of checking typographical errors afterwards leaves unsolved the problem of how to deal with typographical errors as they occur in real time.

The problem of incompatibility in character code systems between different machines is addressed conventionally by use of standard protocols. Although physical standard protocols are now widely accepted and employed, the protocols for designating character code systems have not yet received standardized widespread acceptance. As a result, no communication is possible unless a user who wants to transmit signals knows the receiver's protocol.

As stated above, with any of the information processing equipment which is presently in use, the character species switching key needs to be pressed each time the character species to be input changes. Somewhat inconveniently, therefore, the user interrupts the essential character inputting operation to switch the character species and thereafter restarts the inputting operation, each time the character species to be input changes. In particular, it the user is a beginner, who is not skilled in such a character entering operation, the switching of the character species is often overlooked. This poses the problem that the user totally unintentionally enters a character string of unclear meaning.

Moreover, it is sometimes the case that the beginner cannot use the equipment unless they know the procedure for altering the input systems.

Examples of prior-art techniques intended to solve the above problem are as follows:

(1) An equipment wherein an entered character string is displayed in all character species beforehand, the character species of the character string is thereafter determined by letting a user select any of "kanji", "hiragana(s)", "katakana(s)" and "alphanumeric character(s)", and the character string in the determined species is inserted into a sentence (Official Gazette of Japanese Patent Application Laid-open No. 271564/1986).

(2) A system wherein a "convert" key is pressed again and again, whereby an entered character string is successively converted into a "kanji", "hiragana(s)", "katakana(s)" and "alphanumeric character(s)", which are successively displayed (Official Gazette of Japanese Patent Application Laid-open No. 9465/1987).

(3) A method wherein a character already entered by a user is corrected by giving the instruction of character mode conversion (Official Gazette of Japanese Patent Application Laid-open No. 231624/1986).

(4) A method wherein a specified character mode is set as a default mode, and wherein a user is alerted when the count value of the number of entered characters has reached a predetermined value in any set character mode different from the specified character mode (Official Gazette of Japanese Patent Application Laid-open No. 58358/1987).

(5) A method wherein the input contents of keys pressed by a user are converted into the two systems of an alphanumeric character string and a "kana" character string, the converted words in the respective systems are collated with corresponding dictionaries so as to decide the presence of either of the words, and the user selects the significant one of the character modes (Official Gazette of Japanese Patent Application Laid-open No. 30223/1990).

The prior-art techniques (1) and (2), however, are problematic as stated below.

With the prior-art technique (1), the desired character(s) is/are selected from among the displayed character species or kanji candidates after the character string has been entered. According to this method, any of the character species or kanji candidates needs to be always designated at the end or break of each input character species (at the boundary of the plurality of species), resulting in the problem that the user must enter characters while being conscious of the end of each input character species.

With the prior-art technique (2), an information processing equipment wherein a plurality of character species are input adopts a method in which the character species are successively altered and displayed by pressing the "convert" key and a "non-convert" key. According to this method, keys for selecting the character species can be removed from a keyboard. Since, however, a user must press the "convert" key and the "non-convert" key a plurality of times till the selection of the species "katakanas", his/her operation is troublesome.

Furthermore, with either of the two techniques (1) and (2), eventually the user needs to designate all the character species.

Also, the methods (3), (4) and (5) are problematic as stated below.

In a case where the setting of a character mode is erroneous, the method (3) cannot correct the entered characters unless the user verifies the presence of the error and unless he/she knows the procedure for the character mode conversion.

The method (4) is so constructed that the user is alerted on the basis of the mere counted number of the input characters. Therefore, the alarm is given when the predetermined value has been reached, irrespective of whether or not the user's inputs are correct. This poses the problem that meaningless alarms are also sounded. Moreover, even when the given alarm is the proper one representative of the setting error of the character mode, the user cannot switch the erroneous input mode into a correct one unless he/she knows a character mode designating method.

With the method (5), the decision of the presence of the word is rendered within a keyboard device, and the character string is not delivered till the settlement of the decided result. This poses the problem that the user cannot know if the characters have been entered, till then.

Another problem is that, since the whole character string being a subject for the character mode designation is handled as one of the same character species, it is translated in the same character species.

By way of example, let's consider a case where a character string "2mmのながさに" is to be entered. It is assumed that, as shown by a screen display in FIG. 102(*a*), a string part "2mm" has been accepted by setting the alphanumeric mode. Subsequently, the user enters a string part "のながさに" while still in the alphanumeric mode, but thinking that the input mode is the kana-hiragana mode. Then, a display "kut@xi" is presented on the screen of a display unit because of the selected alphanumeric mode. In FIG. 102(*a*), a character mode 13043 currently set is displayed in a system area 13033. A character string 13063 not intended by the user is displayed in an edit area 13013 as the result of the input operation stated above. That is, a character string "2mmkut@xi" has been entered in the alphanumeric mode. In the case of correcting the entered character string into the character string intended by the user, where the alphanumeric mode terminates and where the kana-hiragana mode initiates cannot be discriminated with the prior-art technique unless the user explicitly indicates the change-over position of the character species.

In this manner, even when the signals in the plurality of character species have been entered, they are translated in the single character species, and the character string intended by the user is not obtained. That is, since the position of the boundary of the characters to be translated is not considered, all these characters are handled as ones of the identical character species in spite of the intended coexistence of the plurality of character species. Moreover, since the boundary of the character species after the translation is also unclear, the user's correction into the intended character string is very troublesome.

Furthermore, special character strings (for example, inputs peculiar to the user) are not considered in any of the above methods. Especially, the aforementioned method (5) has the problem that erroneous decisions are repeatedly rendered on the input of a word which is not yet contained in the dictionary.

SUMMARY OF THE INVENTION

It is therefore an object of the present invention to provide a method and an apparatus for judging the character mode likelihood of a string of characters keyed in by the user, automatically detecting a mode setting error based on the judgment, setting the correct mode accordingly, changing the already input character string into characters of the correct mode, and issuing a relevant message at the same time. In this manner, the invention provides the user with a method and an apparatus for alleviating some of the burdens of character input.

It is another object of the invention to provide a method and an apparatus for judging the language type of an input character string without user intervention, the judging being based on the likelihood value of the input character string obtained for each of a plurality of character or language types, whereby the intended result of translation is acquired.

It is a further object of the invention to provide a method and an apparatus for inputting characters in a way that relieves the burden that the user has conventionally shouldered in addressing typographical errors, the method and the apparatus being capable of judging the likelihood value of a user-input character string, of automatically detecting an inadvertent fingertip shift from the home position, of changing the already input character string to a correct character string applicable to the error pattern detected, and of displaying a relevant message at the same time.

It is yet another object of the invention to provide a method and an apparatus for processing characters, the method and the apparatus being capable of judging the likelihood value of a character string of received codes for each of a plurality of character code systems, of automatically judging the transmitting party's character code system based on the likelihood values obtained, and of automatically converting the character string to the receiving party's character code system for display if the latter system is different from the transmitting party's system.

It is still another object of the present invention to provide an information processing equipment which permits a user to enter characters without being conscious of the boundary of a plurality of character species.

Yet another object of the present invention is to provide an information processing equipment in which selectable character species are all displayed on a display screen, so that a user can select any of the character strings while watching the character strings displayed in the plurality of character species.

A further object of the present invention is to provide an information processing equipment in which the likelihoods of a plurality of character species are decided on an entered character string so as to automatically set one of the character species, whereby the operation of changing-over the character species is dispensed with.

Yet a further object of the present invention is to provide a character inputting method and a character inputting device which automatically sense the erroneous setting of a character mode and set the correct mode, so that the burden of a user on the correction of the erroneous character mode can be relieved.

Still a further object of the present invention is to provide a character inputting method and a character inputting device which sense a boundary in an entered signal string having a plurality of coexistent character species, and which translate the signal string into the optimum character string.

In the first aspect of performance of the present invention for accomplishing the objects, there is provided an information processing equipment wherein character codes of a plurality of character species are held in correspondence with one key code; comprising input means for entering the key code; translation means for translating said key code entered from said input means, into all the character codes corresponding to said key code, and for delivering the translated character codes; display means including a first display area in which characters are displayed separately in the respective character species, for displaying in said first display area all the characters corresponding to said character codes delivered from said translation means; and designation means for designating a desired character string part within character strings displayed in said first display area; said display means including a second display area into which a display position of said character string part designated by said designation means is altered.

In this case, it is preferable that decision means is further comprised for computing likelihoods of said respective character species in accordance with predetermined conditions as to said character strings displayed in said first display area, and for deciding one of said character species in accordance with said likelihoods; and that said display means has a function of altering at least one of a display position and a display aspect in said first display area as to the characters of the character species decided by said decision means.

It is also preferable to further comprise memory means for storing said key code entered from said input means and said character codes delivered for said key code by said translation means, in correspondence with said respective character species therein; and character string translocation means for giving an instruction of translocating a desired character string part within the characters displayed in said second display area, into said first display area; said display means translocating said character string part designated by said character string translocation means, into said first display area, and displaying character strings of the other character species corresponding to the translocated character string part, in said first display area with reference to said memory means.

It is also preferable that decision means is further comprised for computing likelihoods of said respective character species in accordance with predetermined conditions as to said character strings displayed in said first display area, and for deciding one of said character species in accordance with said likelihoods, each time the character is translocated from said second display area into said first display area by said display means; and that said display means has a function of altering at least one of a display position and a display aspect in said first display area as to the character species decided by said decision means.

In the second aspect of performance of the present invention, there is provided an information processing equipment wherein character codes of a plurality of character species are held in correspondence with one key code; comprising input means for entering the key code; translation means for translating said key code entered from said input means, into all the character codes corresponding to said key code, and for delivering the translated character codes; and display means including a first display area in which characters are displayed separately in the respective character species, for displaying in said first display area all the characters corresponding to said character codes delivered from said translation means; said translation means having a function of delivering a character code of a predetermined specific character along with one character code in a case where said one character code is obtained using a plurality of key codes in the translation.

In this case, it is preferable that a sum between the number of the character codes of said specific character and that of the character codes of the first-mentioned characters is equal to the number of the key codes used for delivering the first-mentioned character codes.

In the above, said case where said one character code is obtained using said plurality of key codes may well be a case where said translation means handles the entered key codes in conformity with a romaji (Roman character) input system.

In addition, it is preferable that said display means displays said specific character in only said first display area. It is also preferable that said display means does not display said specific character at a foremost position of said first display area.

Besides, it is preferable to further comprise memory means for storing said key code entered from said input means and said character codes delivered for said key code by said translation means, in correspondence with said respective character species therein; and character string translocation means for giving an instruction of translocating a desired character string part within the characters displayed in said second display area, into said first display area; said display means having a function of translocating said character string part designated by said character string translocation means, into said first display area; and a function of displaying a character which corresponds to said key codes stored for said specific character in said memory means, instead of said specific character in a case where said specific character exists at a foremost position of the character string displayed in said first display area, after the translocation thereof.

It is also preferable that designation means is further comprised for designating a desired character string part within said characters displayed in said first display area; and that said display means includes a second display area, having a function of altering a display position of said character string part designated by said designation means, into said second display area; and a function of deleting said specific character and the characters of the other character species displayed in correspondence with said specific character, in a case where said specific character is brought to a foremost position of the character string displayed in said first display area, by the alteration of said display position.

Now, operations in the first and second aspects of performance will be explained collectively.

The translation means translates the key code entered from the input means such as a keyboard, into the corresponding character codes of all the character species, and it delivers all the translated character codes. Herein, in the case of the romaji input system, one character code is sometimes delivered using two key codes. On this occasion, the key code of the specific character (for example, "∇") is delivered along with the character code in order to bring the numbers of the key codes and the character codes into agreement.

The memory means stores the entered key codes and the character codes delivered from the translation means, in corresponding relations therein. In this case, the character code of the specific character is similarly held in correspondence with the key codes. By way of example, in a case where the entered key codes are "H" and "A", the character codes of the hiragana (cursive form of the Japanese syllabary) character species are stored with "は" corresponding to "H" and the specific character (for example, "∇") corresponding to "A".

The display means displays the characters corresponding to the delivered character codes, separately in the respective character species in the first display area. In this case, the display means is adapted to alter the display position and/or the display aspect as to the characters of the character species decided by the decision means.

When the desired character string part within the characters displayed in the first display area is designated by the designation means, it is translocated into the second display area. In this case, the specific character is not displayed in the second display area. Besides, in the case where the translocation of the characters brings the specific character to the foremost or head position of the character string displayed in the first display area, the specific character and the characters of the other character species displayed in correspondence with the specific character are deleted.

To the contrary, when the desired character string part within the characters displayed in the second display area is designated by the character string translocation means, it is returned into the first display area. Herein, in the case where the specific character comes to the foremost position or head of the character string displayed in the first display area, the character which corresponds only to the key code stored for the specific character in the memory means is displayed instead of the specific character. By way of example, in the case where the specific character "∇" is stored in correspondence with "A", "A" is displayed instead of "∇".

Incidentally, the first and second aspects of performance thus far stated correspond to Embodiment 1 which will be described later.

Next, the third and fourth aspects of performance of the present invention will be explained.

In the third aspect of performance, there is provided a character inputting method wherein a character is entered by employing a key code which corresponds to character codes of a plurality of character species, and by selecting any of the plurality of character species; comprising the first step of generating key codes, and holding a string of the generated key codes (herein below, termed "input key code string"); the second step of allowing a user of said method to designate any of said plurality of character species; the third step of calculating likelihoods of the respective character species in accordance with predetermined conditions as to said input key code string, and selecting any of said character species in accordance with the calculated likelihoods; the fourth step of translating said input key code string into character codes of the character species selected at said third step; and the fifth step of invalidating the selection of said character species carried out at said third step, and simultaneously restoring the input key codes to character codes of the character species having been selected before execution of said fourth step, said fifth step being executed as required; wherein at least one combination of the input key code string and the character species is stored, said combination being selected from the group which consists of a combination of said input key code string being a subject for the execution of said fifth step (herein below, termed "suppression learning key code string") and said character species restored at said fifth step (herein below, termed "suppression learning character species"), and a combination of said input key code string at a time when said second step has been executed (herein below, termed "non-conversion learning key code string") and said character species at the time (herein below, termed "non-conversion learning character species"); and wherein thenceforth, said third step is not executed for said input key code string generated at said first step, in either of a case where the generated input key code string agrees with said suppression learning key code string and where the character species selected then agrees with said suppression learning character species, and a case where said generated input key code string agrees with said non-conversion learning key code string and where the character species selected then agrees with said non-conversion learning character species.

In the fourth aspect of performance, there is provided a character inputting device wherein character codes of a plurality of character species are held in correspondence with one key code; comprising key code generation means for generating key codes; character code translation means for translating said key codes into character codes of one of said character species as designated beforehand (herein below, termed "designated character species"); likelihood computation means for calculating likelihoods of the respective character species in accordance with predetermined conditions as to a string of said key codes generated by said key code generation means (herein below, termed "input key code string"); character mode alteration means for selecting any of said character species in accordance with said likelihoods calculated by said likelihood computation means, and for altering the designation of the character species so as to set the selected character species at said designated character species; learning information memory means for previously storing key code strings (herein below, termed "learning key code strings") in correspondence with the character species thereof (herein below, termed "learning character species") therein; and comparison means for comparing said input key code string with said learning key code strings, and said designated character species with said learning character species; wherein said likelihood computation means does not calculate said likelihoods in a case where the comparisons by said comparison means have shown that said designated character species agrees with any of said learning character species and that said input key code string agrees with any of the learning key code strings of said designated character species.

In the fourth aspect of performance, said character inputting device may well further comprise correction means for accepting a correction instruction given by a user of said device, and for executing a correction process in which the alteration of said designated character species based on said likelihoods as has been done by said character mode alteration means is invalidated to restore said designated character species to the original character species before having been altered; and registration means for storing said original character species and said input key code string which is a subject for the likelihood calculations as has formed a cause of the invalidated character species alteration, as the learning character species and the learning key code string in said learning information memory means, respectively, in a case where the correction by said correction means has been made.

Alternatively, said character inputting device may well further comprise character species designation means for accepting a character species designation given by a user of said device, and for altering said designated character species to the character species of the given designation; and registration means for storing said designated character species before the alteration and said input key code string having been generated under said designated character species before said alteration, as the learning character species and the learning key code string in said learning information memory means, respectively, in a case where said alteration of said designated character species by said character species designation means has been made.

In addition, said character inputting device may further comprise load means for loading document data from external memory means storing therein documents which have already been created; and registration means for translating into key codes some of character codes which are contained in said document data loaded by said load means, for storing the resulting key code string as said learning key code string in said learning information memory means, and for also storing the alphanumeric character species for said learning key code string caused by the alphanumeric character codes and the set character species at a time of the load for said learning key code string caused by the kana (Japanese syllabary) character codes, as the respective learning character species of said learning key code string in said learning information memory means.

Besides, said character inputting device may well be so constructed that, in a case where said comparisons by said comparison means have shown that said designated character species and any of said learning character species are in agreement and that said input key code string and any of the learning key code strings of said designated character species are partially in agreement, said likelihood computation means calculates said likelihoods in relation to only a key code string part which is other than the agreeing key code string part.

Now, operations in the third and fourth aspects of performance will be explained collectively.

When the key code generation means generates the key codes, the likelihood computation means calculates the likelihoods of the respective character species in accordance with the predetermined conditions as to the string of the key codes (the "input key code string").

Herein, before the calculations of the likelihoods, the comparison means compares the input key code string with the learning key code strings, and the designated character species with the learning character species. Besides, the likelihood computation means does not calculate the likelihoods in the case where the comparisons by the comparison means have shown that the designated character species agrees with any of the learning character species and that the input key code string agrees with any of the learning key code strings of the designated character species.

The character mode alteration means decides one of the character species in accordance with the calculated likelihoods, and it alters the designation of the character species so as to set the decided character species at the designated character species.

The character code translation means translates the key codes into the character codes of the character species designated beforehand (the "designated character species").

When instructed to alter the character species by the correction means or the character species designation means, the registration means registers the key code string and the character species being subjects for the instruction, as the learning key code string and the learning character species, respectively, in the learning information memory means.

Incidentally, the third and fourth aspects of performance of the present invention correspond to Embodiment 2 which will be described later.

Next, the fifth thru seventh aspects of performance of the present invention will be explained.

The fifth aspect of performance of the present invention consists in a character inputting device wherein character codes in a plurality of character species are allocated to one key input; comprising input means for allocating one key code in response to one key input; word dictionary memory means for storing therein key code strings which correspond to a plurality of words, respectively; boundary position decision process means for deciding if a key code string entered from said input means agrees with said key code strings stored in said word dictionary memory means, as to all the stored key code strings, and for detecting as a boundary position that position of the entered key code string which corresponds to a length of a longest one of the key code strings decided to agree; translation means for translating said entered key code string into character codes with a unit of the translation being a key code string which extends up to said boundary position detected by said boundary position decision process means; and display means for displaying characters which correspond to said character codes translated by said translation means.

Said boundary position decision process means detects boundary positions successively by the decisions as to a key code string which succeeds the detected boundary position; decision means is further comprised for successively deciding the respective character species of key code strings which extend up to said boundary positions successively detected by said boundary position decision process means; and said translation means translates said key code strings which extend up to said boundary positions detected by said boundary position decision process means, into character code strings of said character species decided by said decision means.

In addition, said character inputting device further comprises decision means for deciding the character species of the key input entered from said input means; said input means accepting also an instruction for selecting one of said character species for said key input; said word dictionary memory means including word dictionary memories of the respective character species; said boundary position decision process means detecting said boundary position with reference to the key code strings stored in the word dictionary memory of the character species of the selection instruction in said input means; said translation means translating said key code string which extends up to said boundary position detected by said boundary position decision process means, into a character code string of said character species of said selection instruction in said input means, and translating a key code string which succeeds said boundary position, into a character code string of said character species decided by said decision means.

Besides, said character inputting device may well be so constructed as to further comprise decision means for deciding the character species of the key input entered from said input means; said input means accepting also an instruction for selecting one of said character species for said key input; said word dictionary memory means including word dictionary memories of the respective character species; said boundary position decision process means detecting said boundary position with reference to the key code strings stored in the word dictionary memory of said character species decided by said decision means; said translation means translating said key code string which extends up to said boundary position detected by said boundary position decision process means, into a character code string of said character species decided by said decision means, and translating a key code string which succeeds said boundary position, into a character code string of said character species of said selection instruction in said input means.

It is also allowed to further comprise decision means for deciding the character species of said input accepted by said input means; said decision means rendering the decision on that part of said key code string accepted by said input means which succeeds said boundary position detected by said boundary position decision process means.

Moreover, it is possible to further comprise means for accepting an instruction for appointing either of said word dictionary memory of said character species decided by said decision means and said word dictionary memory of said character species designated beforehand, as said word dictionary memory which is referred to by said boundary position decision process means.

It is also possible to further comprise prohibited key code detection means for detecting a key code which cannot become either of initial and final boundary positions, as to said key code string; said boundary position decision process means refraining from deciding said boundary position even when said key code string entered from said input means has agreed with the key code string stored in said word dictionary memory means, in a case where said prohibited key code detection means has detected said key code which cannot become said boundary position. Herein, said character inputting device can be so constructed that said prohibited key code detection means includes a prohibited pattern table in which key code strings not forming the boundary positions are stored beforehand, and that it detects said key code not becoming said boundary position, with reference to said prohibited pattern table.

It is also possible that said word dictionary memory means further stores therein attributes indicating the character species of key code strings which ought to exist in front of and behind the respective stored key code strings; and that said boundary position decision process means refers to the attribute to decide if said attribute is met, in a case where said key code string entered from said input means and any of said key code strings stored in said word dictionary memory means have agreed in the detection of said boundary position, and it refrains from deciding said boundary position even when said key code string entered from said input means has agreed with the key code string stored in said word dictionary memory means, in a case where said attribute is not met.

It is also allowed that said word dictionary memory means further stores therein key code strings of words in which the plurality of character species coexist, and to which auxiliary attributes indicating said character species are affixed; and said translation means refers to the auxiliary attribute, and translates said key code string into said character codes of said character species conforming to said auxiliary attribute.

Further, said character inputting device can be so constructed that said translation means further includes a function of translating said key code string into a kanji (Chinese character used in Japanese writing); that said boundary position decision process means refrains from deciding said boundary position even when said key code string has agreed with the key code string stored in said word dictionary memory means, in said case where said prohibited key code detection means has detected said key code which does not become said initial boundary position; and that said translation means translates said key code string into said kanji at said boundary position detected by said boundary position decision process means.

The sixth aspect of performance of the present invention consists in a character translation method for a character inputting device wherein character codes in a plurality of character species are allocated to one key input; comprising storing key code strings which correspond to a plurality of words, respectively, in a word dictionary beforehand; allocating one key code in response to one key input; deciding if an entered key code string agrees with said key code strings stored in said word dictionary, as to all the stored key code strings, and detecting as a boundary position that position of said entered key code string which corresponds to a length of a longest one of the key code strings decided to agree; and translating said entered key code string into character codes with a unit of the translation being a key code string which extends up to said boundary position.

In the seventh aspect of performance of the present invention, a word dictionary for said character inputting device can store therein key code strings which correspond to a plurality of words, respectively. Herein, said word dictionary can further store therein attributes indicating the character species of key code strings which ought to exist in front of and behind the respective stored key code strings.

Now, operations in the fifth thru seventh aspects of performance of the present invention will be explained collectively.

In the character inputting device according to the present invention, the character codes in the plurality of character species are allocated to one key input. The character species include hiraganas (the cursive form of the Japanese syllabary), katakanas (the square form of the Japanese syllabary), alphanumeric characters, symbols, etc.

The input means allocates one key code in response to one key input. Predetermined signals may well be generated as the key codes. The key code strings corresponding respectively to the plurality of words are stored in the word dictionary memory means beforehand. In this regard, the word dictionary memories may well be prepared for the respective character species. The boundary position decision process means decides whether or not the key code string entered from the input means agrees with the key code strings stored in the word dictionary memory means, as to all the stored key code strings. It detects as the boundary position that position of the entered key code string which corresponds to the length of the longest one of the key code strings having decided to agree. The translation means translates the entered key code string into the character codes with the unit of the translation being the key code string which extends up to the boundary position detected by the boundary position decision process means. The display means displays the characters which correspond to the character codes translated by the translation means. Thus, the key code string of the key inputs can have the break or boundary position set by the longest agreeing key code string among the key code strings stored in the word dictionary memory means, and it can be translated on the basis of the break position.

The boundary position decision process means detects the boundary positions successively by the decisions as to the key code string which succeeds the detected boundary position. In the case where the decision means is further comprised, it successively decides the respective character species of the key code strings which extend up to the boundary positions successively detected by the boundary position decision process means. In this case, the translation means translates the key code strings which extend up to the boundary positions detected by the boundary position decision process means, into the character code strings of the character species decided by the decision means.

Moreover, in the case where the decision means for deciding the character species of the key input entered from the input means is further comprised, the input means accepts also the instruction for selecting one of the character species for the key input, for a current mode. The word dictionary memory means includes the word dictionary memories of the respective character species, and the boundary position decision process means detects the boundary position with reference to the key code strings stored in the word dictionary memory of the character species of the selection instruction given in the input means. The translation means translates the key code string which extends up to the boundary position detected by the boundary position decision process means, into the character code string of the character species of the selection instruction given in the input means, and it translates the key code string which succeeds the boundary position, into the character code string of the character species decided by the decision means. Alternatively, the translation means may contrariwise function to translate the key code string which extends up to the boundary position detected by the boundary position decision process means, into the character code string of the character species decided by the decision means, and to translate the key code string which succeeds the boundary position, into the character code string of the character species of the selection instruction given in the input means.

The decision means may well render the decision on that part of the key code string accepted by the input means which succeeds the boundary position detected by the boundary position decision process means.

Also, the prohibited key code detection means detects the key code which cannot become the initial or final boundary position, as to the key code string. The boundary position decision process means refrains from deciding the boundary position even when the key code string entered from the input means has agreed with the key code string stored in the word dictionary memory means, in the case where the prohibited key code detection means has detected the key code which cannot become the boundary position.

Moreover, the word dictionary memory means further stores therein the attributes indicating the character species of the key code strings which ought to exist in front of and behind the respective stored key code strings. Thus, the boundary position decision process means detects the position of the longest agreeing key code string by referring to the attribute to decide whether or not the attribute is met, in the case where the key code string entered from the input means and any of the key code strings stored in the word dictionary memory means have agreed in the detection of the boundary position, and by refraining from deciding the boundary position even when the key code string entered from the input means has agreed with the key code string stored in the word dictionary memory means, in the case where the attribute is not met.

Also, in the case where the word dictionary memory means further stores therein the key code strings of the words in which the plurality of character species coexist, the auxiliary attributes indicating the character species are affixed to the key code strings in which the plurality of character species coexist. The translation means refers to the auxiliary attribute, and translates the key code string into the character codes of the character species conforming to the auxiliary attribute.

In this manner, even when the user has entered the character string containing the plurality of character species, without changing-over the character modes, the boundary position can be detected.

BRIEF DESCRIPTION OF THE DRAWINGS

FIG. 3 is a view of a keyboard for use with the apparatus of FIG. 2;

FIGS. 10(a) and 10(b) show typical output messages provided in accordance with the present invention;

FIGS. 12(a) and 12(b) show other screen display examples in accordance with the present invention;

FIGS. 13(a)–13(c) show further screen display examples in accordance with the present invention;

FIGS. 21(a) and 21(b) show character keyboard arrangements and corresponding key codes therefor, respectively, for another embodiment of the present invention;

FIGS. 25 thru 43(b) concern the second embodiment of the present invention, wherein:

FIG. 25 is a block diagram showing a character inputting device in this embodiment;

FIG. 26 is an exterior view showing an example of an information processing equipment in which the character inputting device is assembled;

FIG. 27 is a plan view showing the key layout of key blocks (2212, 2222 and 2232) in FIG. 26;

FIG. 28 is a view showing an example of the display of a display unit (122) in FIG. 25;

FIG. 29 is a diagram showing the relationships between character modes and character codes;

FIG. 30 is a flow chart showing a character inputting method in this embodiment;

FIGS. 31(a) and 31(b) are explanatory diagrams each showing an example of key inputs;

FIG. 32 is a diagram indicating formulae for a character mode likelihood decision process (6052) in FIG. 30;

FIG. 33 is a diagram showing a practicable example of a character mode likelihood table (72) in FIG. 25;

FIG. 34 is a flow chart showing the details of the character mode likelihood decision process (6052) in FIG. 30;

FIGS. 35(a) and 35(b) are views each showing an example of a screen display in the process illustrated in FIG. 34;

FIG. 36 is a flow chart showing the details of an alarm process (6072) in FIG. 30;

FIG. 37 is a diagram showing examples of messages which are displayed by the process illustrated in FIG. 36;

FIG. 38 is a flow chart showing the details of the process of each function key (6102) in FIG. 30;

FIGS. 39(a), 39(b) and 39(c) are views each showing an example of a screen display which is presented by the process in FIG. 38 in a case where a user notifies the conversion of a character code;

FIGS. 40(a), 40(b) and 40(c) are views each showing an example of a screen display which is presented by a learning process in FIG. 38;

FIGS. 41(a) and 41(b) are views each showing an example of a screen display which is presented by the learning process in FIG. 38 in a case where a different character mode is involved in part of an input character string;

FIG. 42 is a diagram showing an example of the content of information which is registered in a learning information buffer (142) in FIG. 25 by the learning process in FIG. 38; and FIGS. 43(a) and 43(b) are circuit block diagrams for explaining the fundamental operations of this embodiment, respectively.

FIGS. 44 thru 89 concern the first embodiment of the present invention, wherein:

FIG. 44 is a fundamental block diagram of the first embodiment;

FIG. 45 is an exterior view of an information processing equipment in this embodiment;

FIG. 46 is an explanatory plan view showing designation means (1011) in this embodiment;

FIG. 47 is an explanatory plan view showing input means (1021) in this embodiment;

FIG. 48 is a schematic view for explaining the format of a translation table in this embodiment;

FIG. 49 is an explanatory diagram showing the organization of data which are stored in memory means (1061) in this embodiment;

FIG. 50 is an explanatory view showing an example of a screen display;

FIG. 51 is an explanatory diagram showing an example of key inputs;

FIGS. 52 thru 66 are explanatory views each showing an example of a screen display;

FIG. 67 is an explanatory diagram showing an example of key inputs;

FIGS. 68 thru 73 are explanatory views each showing an example of a screen display;

FIG. 74 is a flow chart showing the process of translation means (1041) in this embodiment;

FIG. 75 is a flow chart showing the process of a controller (1051);

FIG. 76 is a flow chart showing a character inputting process;

FIG. 77 is a flow chart showing an up/down key process;

FIG. 78 is a flow chart showing a right key process;

FIG. 79 is a flow chart showing a left key process;

FIG. 80 is a flow chart showing a "validate" key process;

FIGS. 81 thru 86 are explanatory views each showing an example of a screen display;

FIGS. 87(a) and 87(b) are explanatory plan views showing an example of key inputs of kana (Japanese syllabary) characters based on a kana input system and an example of key inputs of alphanumeric characters, respectively;

FIG. 88 is a flow chart showing the process of decision means (1081) in this embodiment; and FIG. 89 is an explanatory view showing an example of a screen display.

FIGS. 90 thru 110 concern the third embodiment of the present invention, wherein:

FIG. 90 is a flow chart of the general processing in this embodiment;

FIG. 91 is an explanatory plan view of a keyboard which is used in this embodiment;

FIGS. 92(a) and 92(b) are explanatory diagrams each showing key codes which are used in this embodiment;

FIG. 93 is a flow chart of a prohibited key code process for individual decided input modes (102) in FIG. 90;

FIG. 94 is a flow chart of a boundary position decision process (107) in FIG. 90;

FIG. 95 is a diagram showing the format of the records of word dictionaries;

FIG. 96 is an explanatory diagram showing examples of the records of the word dictionaries;

FIG. 97 is an explanatory diagram showing an example of the content of an input key code buffer;

FIG. 98 is a diagram for explaining the retrieval of the word dictionary;

FIG. 99 is an explanatory diagram showing an example of a method of holding the string of key codes which have agreed;

FIG. 100 is a diagram for explaining the translation of an input key code string into character codes;

FIG. 101 is a block diagram of a character inputting device in this embodiment;

FIGS. 102(*a*) and 102(*b*) are views each showing an example of a screen display in this embodiment;

FIG. 103 is a prohibited pattern table for a kana (Japanese syllabary)-hiragana (cursive form of kana character) mode;

FIG. 104 is a prohibited pattern table for a romaji (Roman character)-hiragana mode;

FIGS. 105(*a*) and 105(*b*) are views each showing an example of a screen display in this embodiment;

FIG. 106 is an explanatory diagram showing the relationships between character modes and character codes;

FIG. 107 is an explanatory diagram showing attributes which are contained in the word dictionary;

FIG. 108 is a partial flow chart for explaining a consistency decision process for individual attribute Nos.;

FIG. 109 is a diagram showing an example of the content of a dictionary key code register; and FIG. 110 is a flow chart of a process for a succeeding numeral.

FIG. 111 is a table showing the corresponding relations between hiraganas and romajis.

PREFERRED EMBODIMENTS OF THE INVENTION

Figure 1A:
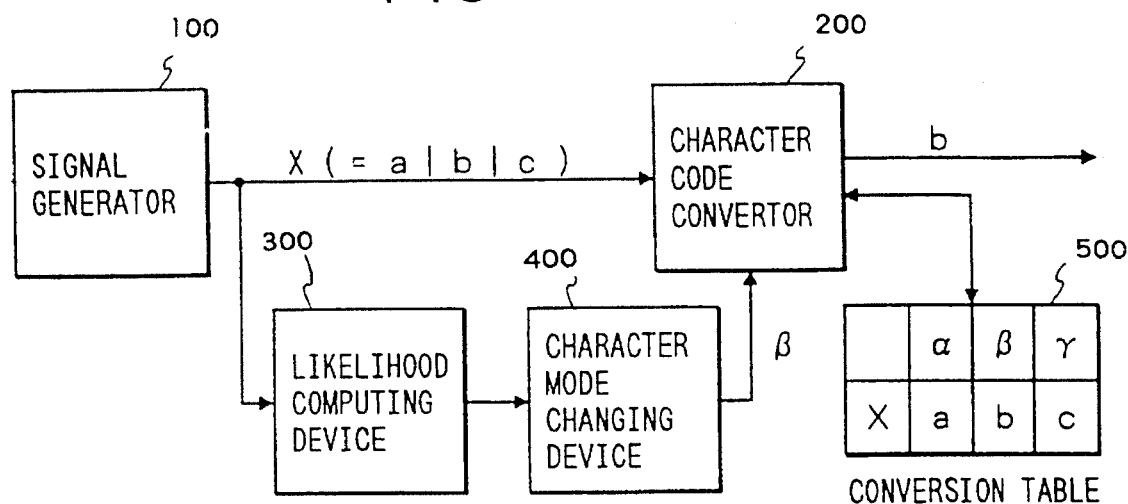
FIGS. 1(a) and 1(b) are illustrating the block diagrams arrangement of the present invention.

Now, four embodiments according to the present invention will be described in conjunction with the accompanying drawings.

Referring now to the drawings, there is described a first embodiment of the invention for performing likelihood judgements as to a key code string or a character string to thereby automatically set various operation conditions such as operation modes or the like. The present embodiment includes the following four examples.

A first example is directed to a method and apparatus for automatically judging and correcting a mode setting error wherein the likelihood judging device will be referred to as character mode likelihood judging device and the signal storage device as a key code storage device.

Figure 1B:
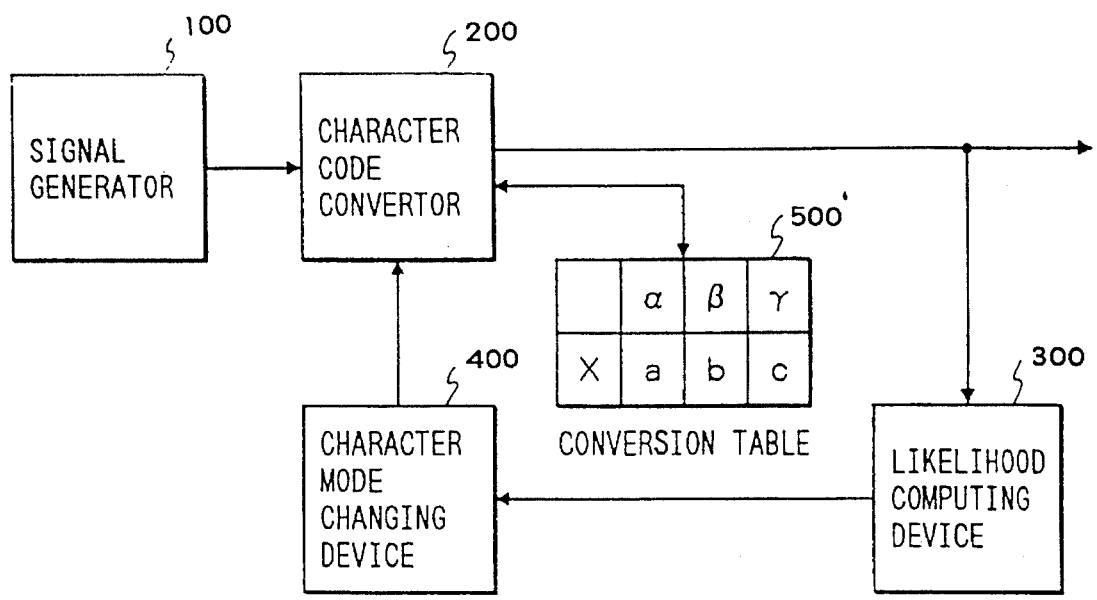

FIG. 1 is a block diagram of the present invention including a signal generator 100 which first generates signals X representing character codes (a, b, c) for a plurality of character or language types ($\alpha$, $\beta$, $\gamma$). The signals X are input to a character code convertor 200 and likelihood computing device 300. Given the signals X and a character (of a character mode), the character code convertor 200 references a conversion table 500 to output a unique character code therefrom. The likelihood computing device 300 computes the likelihood corresponding to the input signals X by use of a likelihood table, not shown. The result of the computation is sent to character mode changing device 400. Upon receipt of the computed likelihood, the character mode changing device 400 changes the character (character modes) and reports the newly established character (character code) to the character code convertor 200. In operation, for example, the character mode changing device 400 sends the character (character code) $\beta$ to the character code convertor 200. In turn, the character code convertor 200 references the conversion table 500. This causes the signals X to be converted to a character code $\beta$ for output.

FIG. 1(*b*) is a block diagram of an alternative embodiment wherein the likelihood of the character code converted by character code convertor is computed and the character mode is changed accordingly. The embodiment of FIG. 1(*a*) has an advantage of gaining enhanced reliability of the likelihood computed by the likelihood computing device because the signal data is evaluated as received. On the other hand, the embodiment offers a wider range of applications because it judges already input characters for their likelihood.

Figure 2:
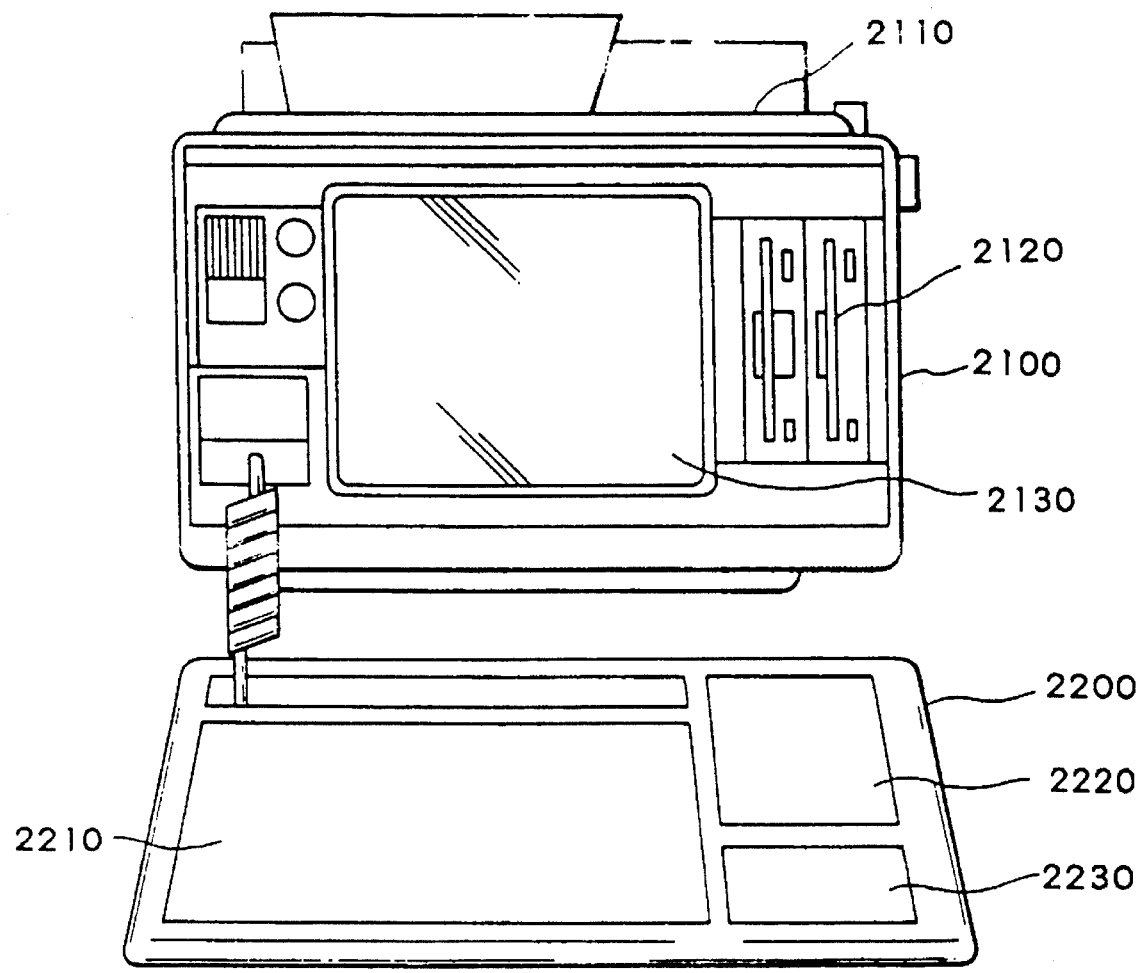
FIG. 2 is a perspective view of a character inputting apparatus in accordance with the present invention.

FIG. 2 is a perspective view of a character inputting apparatus embodying the invention in accordance with FIG. 1(*a*) and incorporated illustratively in a word processor. The apparatus of FIG. 2 contains basic functions of word processing, and comprises a body 2100 made up of electronic circuits and other associated components and an input device 2200 from which characters and instructions are input. A display unit 2130 displays entered character strings and messages for the user. Although not indispensable, there may also be provided a printer 2110 for outputting entered and/or edited character strings onto paper and an auxiliary storage unit 2120 that stores the input and/or edited character strings onto a storage medium such as a floppy disk. The input device 2220 comprises character keys for inputting characters, mode designating keys for designating an input character font, function keys for issuing editing instructions regarding character strings, and position designating keys for designating the target character string to be edited. For ease of operation, these keys are divided into a plurality of key blocks such as those numbered 2210, 2220 and 2230.

FIG. 3 shows a typical arrangement of the key block 2210 on the input device 2200 of FIG. 2. Keys 3010, 3020, 3030, 3040, 3050, 3060, 3070, 3080, 3090, 3100, 3110, 3120, 3130 and 3140 in FIG. 3 are the function keys and character mode designating keys used to designate a character or language type and to perform such editing functions as line feed and character deletion. Other keys 3210, 3220, 3230, etc. are the character keys for inputting characters. The key 3100 is a function shift key used in combination with other function keys. With this embodiment, pressing simultaneously the keys 3100 and 3080 inputs a user-initiated character code conversion instruction, to be described later.

Figure 4:
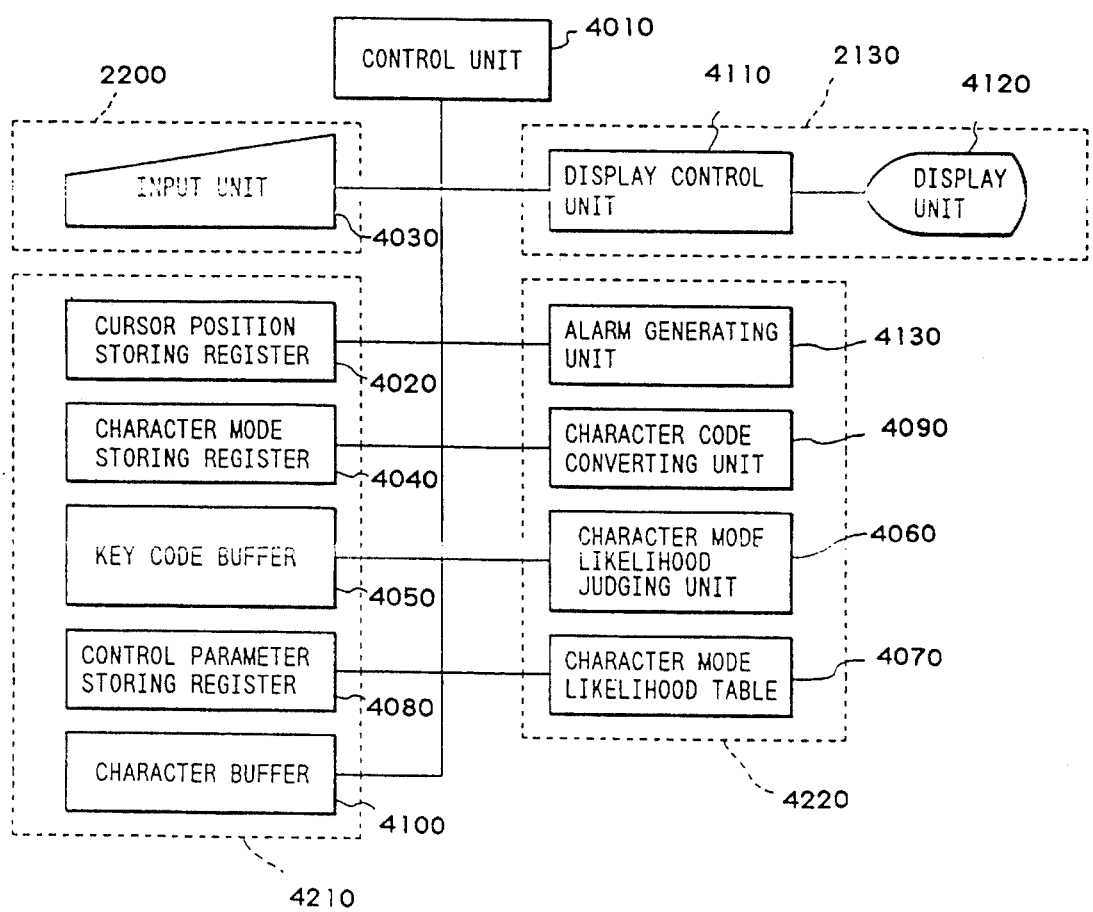
FIG. 4 is a more detailed block diagram of the arrangement of FIG. 1(A)
Figure 11:
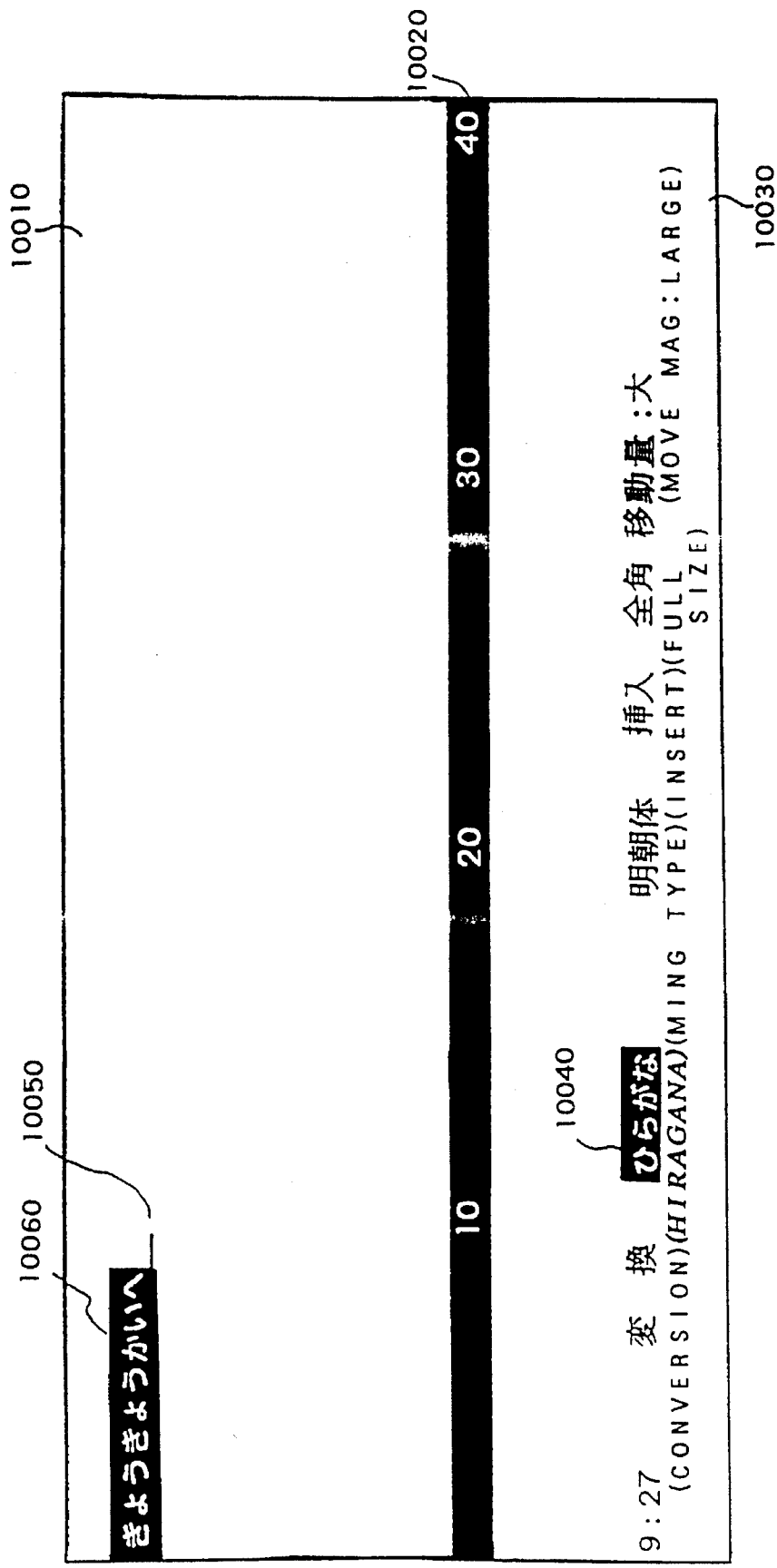
FIG. 11 shows a screen display example in accordance with the present invention.

FIG. 4 is a more detailed block diagram of the embodiment of the invention of FIG. 1(*a*). In FIG. 4, a control unit 4010 such as a microprocessor controls the entire operation of the apparatus. A cursor position storing register 4020 stores the position of a target character string to be replaced during character editing or under the character inputting method according to the invention. An input unit 4030 corresponding to the signal generator 100 permits the input of character keys and function keys for editing instruction. The input unit 4030 generates key codes (to be described later) as the signals X. A character mode storing register 4040 stores the character mode for determining which character code (to be described later) the key codes of the character keys entered from the input unit 4030 should be converted into. In conjunction with the control unit 4010, the character mode storing register 4040 constitutes the character mode changing device 400. A key code buffer 4050 temporarily stores a key code string of character keys on a time series basis. A character mode likelihood judging unit 4060 judges the likeliest character mode according to the key code string held in the key code buffer 4050 and by referring to a character mode likelihood table 4070. The character mode likelihood table 4070 contains the likelihood value, for each character mode, of each key code referenced by the character mode likelihood judging unit 4060. The character mode likelihood judging unit 4060 and the character mode likelihood table 4070 combine to correspond to the likelihood computing device 300. A control parameter storing register 4080 stores control parameters for determining the entire flow of processing. A character code converting unit 4090, corresponding to the character code converting means 200, converts key codes into character codes as per the currently designated character mode. A character buffer 4100 is connected to a display control unit 4110 that displays the contents of the buffer on a display unit 4120. The display unit 4120 is, for example, a CRT or an LCD that presents the user with the result of character input and editing as well as with messages. An alarm generating unit 4130 generates an alarm message and alters parameters in the control parameter storing register 4080 when the control unit 4010 decides to give the user an alarm based on the judgment by the character mode likelihood judging unit 4060. With this embodiment, the alarm generating unit 4130 performs in the form of alarm generation processing a series of operations necessitated as a result of the judgment by the character mode likelihood judging unit 4060. When configured as hardware, the block-by-block arrangement of the invention will have the block 4210 implemented as a storage unit to and from which to write and read data, and the block 4220 as a storage unit from which at least data may be read. The control unit 4010 may be implemented as a general purpose processor. FIG. 11 shows an example of a screen as presented by the display unit 4120. In FIG. 11, a text area 10010 displays character strings held in the character buffer 4100. A column indicator 10020 indicates the column positions for the characters displayed. A guidance area 10030 furnishes the user with messages and the status of the apparatus. A guidance indication 10040 indicates the currently designated character mode, to be described later. A cursor indication 10050 indicates the character input position. An already input character string 10060 shown on the screen is held in the character buffer 4100.

The relation of character keys to the designated character mode will now be described with respect to FIG. 3 and Table 1. In FIG. 3, the character key 3230 has four characters engraved thereon: 3, #, あ, and ぁ. These characters respectively represent alphanumeric characters, alphabetic symbols, kana characters, and kana symbols. The character mode designating keys 3050, 3060 and 3070 are used to designate which character or language type the key input should comply with. On the character inputting apparatus embodying the invention, the hiragana mode designating key 3060, the katakana mode designating key 3090 and the alphanumeric mode designating key 3050 operate in a mutually exclusive manner. Once depressed, each of the three keys causes character codes to be generated according to the corresponding character mode unless and until another character mode designating key is operated. The shift keys 3140 and 3130 are each pushed simultaneously with a character key. When the alphabetic mode is in effect, the shift key operated in the above manner causes the character code of the alphabetic symbol of the simultaneously pressed character key to be generated; when the hiragana or katakana mode is in effect, the shift key permits generation of the character code of the kana symbol of the simultaneously pressed character key. For example, after the hiragana mode designating key 3060 is pressed, typing the character key 3230 alone generates the character code representing the character 3. If pressed simultaneously with the shift key, the character key 3230 causes the character code of the character # to be generated. This status remains effective until the katakana mode designating key 3090 or the alphanumeric mode designating key 3050 is pressed. Table 1 lists the character codes that are generated when the character key 3230 is pressed in various character modes.

| Character Mode | Character Code |
| --- | --- |
| Roman character-to-hiragana | 3 |
| Kana-to-hiragana | あ |
| Roman character-to-katakana | 3 |
| Kana-to-katakana | ア |
| Alphanumeric | 3 |

The operation of the Roman character mode designating key 3040 will now be described. This key is used to designate the way in which to input hiragana and katakana characters. Repeatedly pressing the key 3040 designates alternately one of two methods; Roman character input method or kana input method. The Roman character input method is a known character converting method that converts the Romanized Japanese spelling entered through an alphanumeric keyboard into kana characters. For example, if Roman characters "kyo" are typed, the apparatus internally converts the spelling into "きょ". The kana input method, on the other hand, allows katakana or hiragana characters to be input exactly as they are typed on a kana keyboard. Conversion of Roman character spelling into kana characters is carried out by the character code converting unit 4090. Hereafter, the hiragana character mode under the Roman character input method is referred to as the Roman character-to-hiragana mode; the katakana character mode under the Roman character input method, as the Roman character-to-katakana mode; the hiragana character mode under the kana input method, as the kana-to-hiragana mode; and the katakana character mode under the kana input method, as the kana-to-katakana mode.

The invention is not limited to the above-described apparatus, but is applicable to any apparatus that permits character input through the use of keys. Although the key block arrangement of FIG. 3 complies with JIS X6002, the invention may be practiced with any other keyboard arrangement.

During character inputting, it may be the case that in a word processing session, the user may erroneously operate or fail to operate any mode designating key and may type keys in the wrong mode (e.g., the user fails to push the alphanumeric mode designating key 3050 and inputs English words while the hiragana character mode is still in effect). In such a case, the method according to the invention automatically judges the correct mode and warns the user of the error committed.

Figure 5:
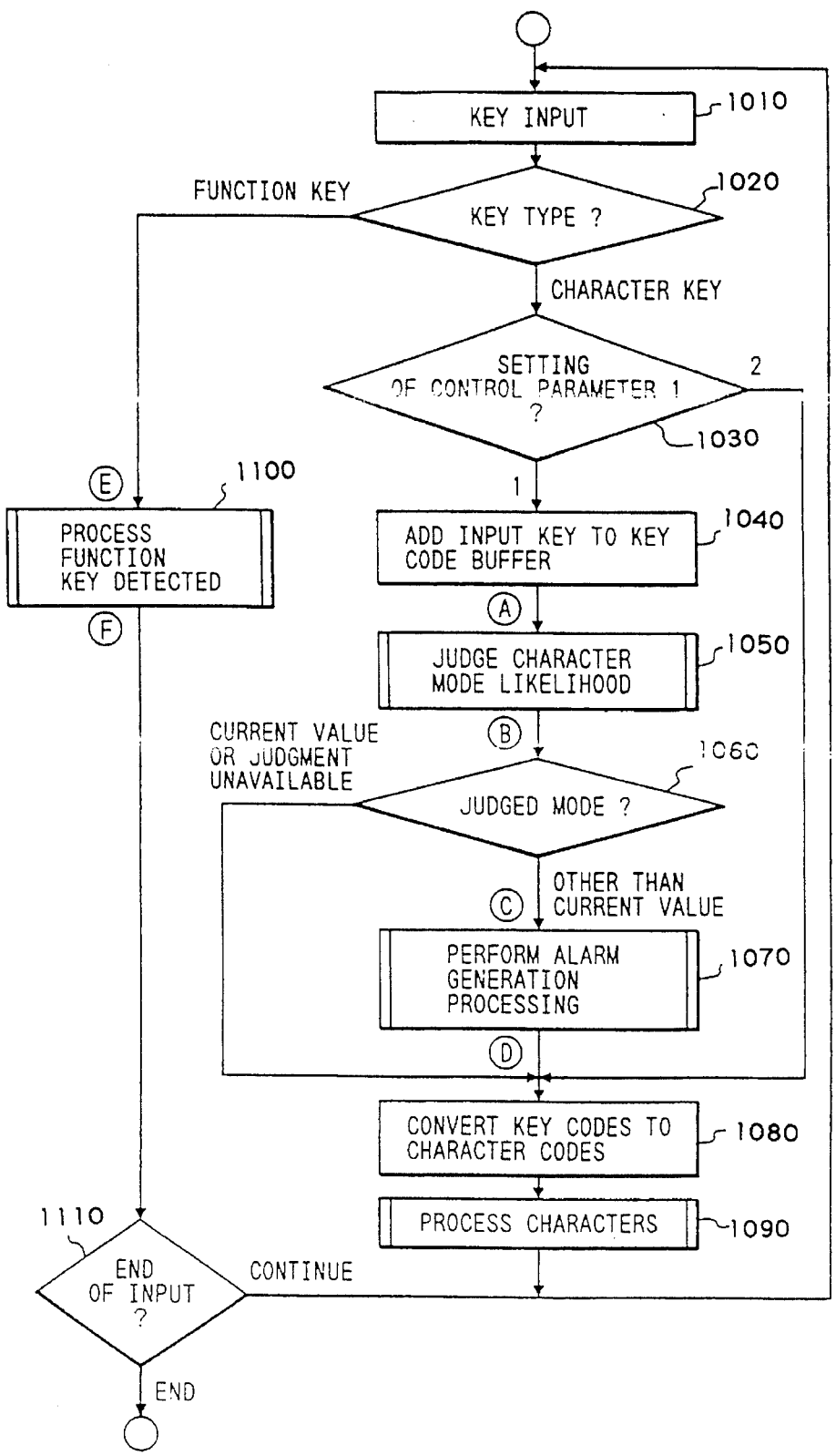
FIG. 5 is a flowchart depicting the operation of the method of the present invention.

Referring to the flowchart of FIG. 5, the operation is such that the apparatus enters a key input wait state when started. In step 1010, the user operates a key. In step 1020, the type of key operated is checked and determined. If the input key is a character key, step 1030 is reached; if the input key is a function key or a mode designating key, step 1100 is reached, the operation of which will be described later.

In step 1030, a control parameter 1 is referenced. The control parameter 1 is a parameter that determines whether or not character mode likelihood judgment and alarm generation are to be carried out. If the control parameter 1 contains "2", neither character mode likelihood judgment nor alarm generation are performed, and step 1080 is reached. In step 1080, character input processing alone is carried out. If the control parameter contains "1", step 1040 is reached in which character mode likelihood judgment and alarm generation are effected. The control parameter 1 will be described later in more detail.

In step 1040, the key codes of input keys are turned into a string of key codes for storage into the key code buffer 4050. In step 1050, character mode likelihood judgment (to be described later) is carried out with reference to the key code string held in the key code buffer 4050. In step 1060, a check is made to see if the judged character mode is the same as the currently established character mode. If the judged character mode is the same as the current character mode or if the judgment is impossible to make, step 1080 is reached. If the judged character mode differs from the currently established character mode, step 1070 is reached in which alarm processing is carried out. Details of the alarm processing will be described later. Step 1070 is followed by step 1080. In step 1080, the input key codes are converted to character codes according to the established character mode. In step 1090, the converted character codes are stored into the character buffer 4100. After step 1090, step 1010 for key input processing is again reached. The process above is repeated until the user operates a function key for terminating the character input processing or document editing. Operating that function key terminates the process as step 1110 is reached.

Figure 6:
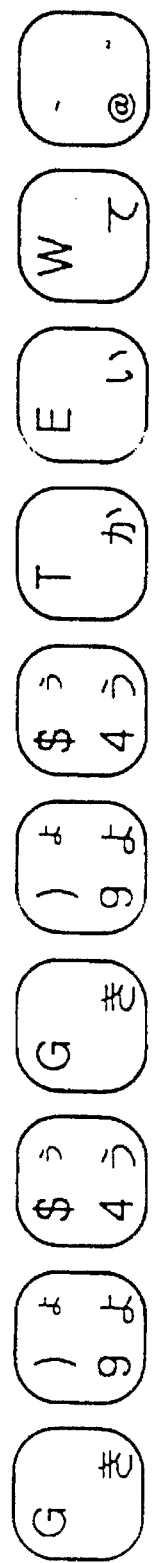
FIGS. 6(a) and 6(b) show different key input examples.
Figure 6:
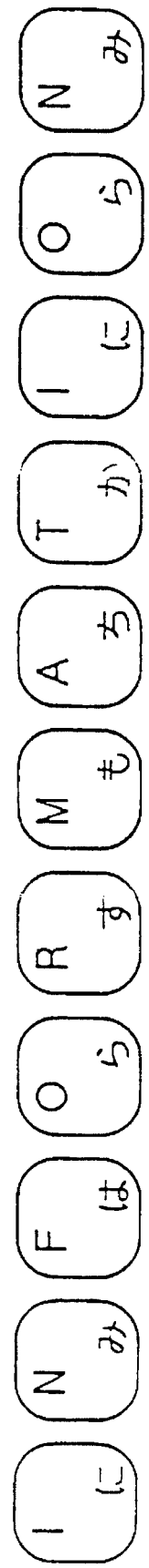

For the character mode likelihood judgment processing, reference is made to the keyboard of FIG. 3. On the keyboard of FIG. 3, keys are typed in the order depicted in FIG. 6(*a*) so as to input a Japanese character string, "きょうきょうかいで". If the kana-to-hiragana character mode is currently in effect, the desired character string "きょうきょうかいで" is made available. However, if the user fails to designate the appropriate character mode and proceeds to operate the keys of FIG. 6(*a*) while the alphanumeric character mode is still in effect, the result is an unintelligible character string "g)4g)4tew@." In another example, if the user operates keys in the order shown in FIG. 6(*b* ) to input an English word "information" but fails to leave the current kana-to-hiragana character mode, the result is a meaningless Japanese character string "にみはらすもちにらみ" The frequency of each alphabetic character appearing in English documents and the frequency of each kana character in Japanese documents are found to be statistically constant, with only minor variations experienced from document to document. There are a number of methods for obtaining such frequencies. one such method verifies the number of times each character occurs in documents. Another method involves acquiring the number of combinations of adjacent characters occurring in documents. With this embodiment, the likeliest mode of a given character string is judged primarily on the basis of the number of times each character occurs in documents. The likelihood value of a given character string is obtained as follows:

The frequency of occurrence Pa of each character "a" is acquired beforehand for each character mode. The likelihood value V of the character string in question is computed by inserting illustratively into the following formula the frequency Pa of each character contained in that character string:

$$V = R \sum_a \log Pa \qquad (1)$$

where, R is a value which is specific to each character mode and which is used to normalize the likelihood values V for comparison therebetween in absolute terms. Comparing the values V between them makes it possible to compare character strings to see which character string is more likely to occur. For example, the above-mentioned character string "きょうきょうかいで" is compared with the character string "g)4g)4tew@" for likelihood. The likelihood value of the character string in question is obtained for each of the different character modes. A check is then made to determine if the currently established character mode is correct for the character string. This is where the character mode likelihood judgment processing comes in. This processing will now be described below. First, the character mode likelihood table 407 for use in the character mode likelihood judgment processing will be explained.

Table 2-a

| Mode / Key Code | Roman character to hiragana - Character Code | Roman character to hiragana - Evaluated value | Kana to hiragana - Character Code | Kana to hiragana - Evaluated value | Roman character to katakana - Character Code | Roman character to katakana - Evaluated value | Kana to katakana - Character Code | Kana to katakana - Evaluated value | English and numerals - Character Code | English and numerals - Evaluated value |
|---|---|---|---|---|---|---|---|---|---|---|
| 01 | 1 | 0 | ぬ | 0 | 1 | 0 | ヌ | 3 | 1 | 0 |
| 02 | 2 | 0 | ふ | 30 | 2 | 0 | フ | 53 | 2 | 0 |
| 03 | 3 | 0 | あ | 49 | 3 | 0 | ア | 44 | 3 | 0 |
| 04 | 4 | 0 | う | 78 | 4 | 0 | ウ | 62 | 4 | 0 |
| 05 | 5 | 0 | え | 36 | 5 | 0 | エ | 45 | 5 | 0 |
| 06 | 6 | 0 | お | 46 | 6 | 0 | オ | 42 | 6 | 0 |
| 07 | 7 | 0 | や | 29 | 7 | 0 | ヤ | 34 | 7 | 0 |
| 08 | 8 | 0 | ゆ | 48 | 8 | 0 | ユ | 38 | 8 | 0 |
| 09 | 9 | 0 | よ | 59 | 9 | 0 | ヨ | 30 | 9 | 0 |
| 10 | 0 | 0 | わ | 32 | 0 | 0 | ワ | 41 | 0 | 0 |
| 11 | - | 0 | ほ | 33 | - | 0 | ホ | 64 | - | 0 |
| 12 | ^ | 0 | へ | 14 | ^ | 0 | ヘ | 45 | ^ | 0 |
| 13 | - | 0 | - | 0 | - | 89 | - | 89 | ¥ | 0 |
| 14 | q | 0 | た | 60 | q | 0 | タ | 37 | q | 0 |
| 15 | w | 47 | て | 58 | w | 25 | テ | 65 | w | 50 |
| 16 | e | 78 | い | 80 | e | 80 | イ | 67 | e | 90 |
| 17 | r | 69 | す | 54 | r | 66 | ス | 48 | r | 71 |
| 18 | t | 79 | か | 66 | t | 43 | カ | 73 | t | 91 |
| 19 | y | 65 | ん | 75 | y | 51 | ン | 85 | y | 12 |
| 20 | u | 88 | な | 54 | u | 81 | ナ | 36 | u | 61 |
| 21 | i | 89 | に | 60 | i | 86 | ニ | 38 | i | 82 |
| 22 | o | 90 | ら | 45 | o | 88 | ラ | 55 | o | 83 |
| 23 | p | 25 | せ | 48 | p | 42 | セ | 43 | p | 84 |
| 24 | @ | 0 | ゛ | 65 | @ | 0 | ゛ | 62 | @ | 0 |
| 25 | [ | 0 | ゜ | 25 | [ | 0 | ゜ | 56 | [ | 0 |
| 26 | a | 90 | ち | 43 | a | 88 | チ | 32 | a | 84 |
| 27 | s | 77 | と | 64 | s | 54 | ト | 33 | s | 77 |
| 28 | d | 57 | し | 71 | d | 68 | シ | 76 | d | 72 |
| 29 | f | 0 | は | 57 | f | 0 | ハ | 66 | f | 59 |
| 30 | g | 58 | き | 60 | g | 59 | キ | 61 | g | 54 |
| 31 | h | 62 | く | 63 | h | 49 | ク | 64 | h | 72 |
| 32 | j | 0 | ま | 51 | j | 0 | マ | 49 | j | 19 |
| 33 | k | 81 | の | 67 | k | 76 | ノ | 32 | k | 26 |
| 34 | l | 0 | り | 52 | l | 0 | リ | 54 | l | 68 |
| 35 | ; | 0 | れ | 46 | ; | 0 | レ | 61 | ; | 0 |
| 36 | : | 0 | け | 46 | : | 0 | ケ | 42 | : | 0 |
| 37 | ] | 0 | む | 21 | ] | 0 | ム | 30 | ] | 0 |
| 38 | z | 52 | つ | 52 | z | 44 | ツ | 21 | z | 47 |
| 39 | x | 0 | さ | 47 | x | 0 | サ | 44 | x | 13 |
| 40 | c | 0 | そ | 41 | c | 0 | ソ | 38 | c | 68 |
| 41 | v | 0 | ひ | 36 | v | 0 | ヒ | 71 | v | 42 |
| 42 | b | 41 | こ | 59 | b | 41 | コ | 79 | b | 50 |
| 43 | n | 89 | み | 31 | n | 95 | ミ | 21 | n | 82 |
| 44 | m | 61 | も | 48 | m | 54 | モ | 42 | m | 67 |
| 45 | , | 63 | ね | 25 | , | 40 | ネ | 33 | , | 0 |
| 46 | . | 51 | る | 58 | . | 37 | ル | 66 | . | 0 |
| 47 | / | 0 | め | 34 | / | 0 | メ | 26 | / | 0 |
| 48 | ★ | 0 | ろ | 29 | ★ | 0 | ロ | 41 | ★ | 0 |

Note: The '★' represents no character assignment.

Table 2-a'

| Mode<br>Key Code | Roman character to hiragana | | Kana to hiragana | | Roman character to katakana | | Kana to katakana | | English and numerals | |
|---|---|---|---|---|---|---|---|---|---|---|
| | Character Code | Evaluated value | Character Code | Evaluated value | Character Code | Evaluated value | Character Code | Evaluated value | Character Code | Evaluated value |
| 4 9 | ! | 0 | ★ | 0 | ! | 0 | ★ | 0 | ! | 0 |
| 5 0 | " | 0 | ★ | 0 | " | 0 | ★ | 0 | " | 0 |
| 5 1 | # | 0 | あ | 0 | # | 0 | ア | 8 | # | 0 |
| 5 2 | $ | 0 | う | 0 | $ | 0 | ウ | 0 | $ | 0 |
| 5 3 | % | 0 | え | 0 | % | 0 | エ | 6 | % | 0 |
| 5 4 | & | 0 | お | 0 | & | 0 | オ | 0 | & | 0 |
| 5 5 | ' | 0 | や | 2 9 | ' | 0 | ヤ | 4 1 | ' | 0 |
| 5 6 | ( | 0 | ゆ | 4 8 | ( | 0 | ユ | 5 3 | ( | 0 |
| 5 7 | ) | 0 | よ | 5 9 | ) | 0 | ヨ | 5 9 | ) | 0 |
| 5 8 | ★ | 0 | を | 5 1 | ★ | 0 | ヲ | 0 | ★ | 0 |
| 5 9 | = | 0 | ★ | 0 | = | 0 | ★ | 0 | = | 0 |
| 6 0 | ― | 0 | ★ | 0 | ― | 0 | ★ | 0 | ― | 0 |
| 6 1 | ― | 0 | ★ | 0 | ― | 8 9 | ★ | 0 | | | 0 |
| 6 2 | Q | 0 | ★ | 0 | Q | 0 | ★ | 0 | Q | 0 |
| 6 3 | W | 0 | ★ | 0 | W | 0 | ★ | 0 | W | 5 0 |
| 6 4 | E | 0 | い | 0 | E | 0 | イ | 0 | E | 9 0 |
| 6 5 | R | 0 | ★ | 0 | R | 0 | ★ | 0 | R | 7 1 |
| 6 6 | T | 0 | ★ | 0 | T | 0 | ★ | 0 | T | 9 1 |
| 6 7 | Y | 0 | ★ | 0 | Y | 0 | ★ | 0 | Y | 1 2 |
| 6 8 | U | 0 | ★ | 0 | U | 0 | ★ | 0 | U | 6 1 |
| 6 9 | I | 0 | ★ | 0 | I | 0 | ★ | 0 | I | 8 2 |
| 7 0 | O | 0 | ★ | 0 | O | 0 | ★ | 0 | O | 8 3 |
| 7 1 | P | 0 | ★ | 0 | P | 0 | ★ | 0 | P | 6 4 |
| 7 2 | ˝ | 0 | ★ | 0 | ˝ | 0 | ★ | 0 | ˝ | 0 |
| 7 3 | [ | 0 | [ | 0 | [ | 0 | [ | 0 | [ | 0 |
| 7 4 | A | 0 | ★ | 0 | A | 0 | ★ | 0 | A | 8 4 |
| 7 5 | S | 0 | ★ | 0 | S | 0 | ★ | 0 | S | 7 7 |
| 7 6 | D | 0 | ★ | 0 | D | 0 | ★ | 0 | D | 7 2 |
| 7 7 | F | 0 | ★ | 0 | F | 0 | ★ | 0 | F | 5 9 |
| 7 8 | G | 0 | ★ | 0 | G | 0 | ★ | 0 | G | 5 4 |
| 7 9 | H | 0 | ★ | 0 | H | 0 | ★ | 0 | H | 7 2 |
| 8 0 | J | 0 | ★ | 0 | J | 0 | ★ | 0 | J | 2 1 |
| 8 1 | K | 0 | ★ | 0 | K | 0 | ★ | 0 | K | 2 6 |
| 8 2 | L | 0 | ★ | 0 | L | 0 | ★ | 0 | L | 6 8 |
| 8 3 | + | 0 | ★ | 0 | + | 0 | ★ | 0 | + | 0 |
| 8 4 | * | 0 | ★ | 0 | * | 0 | ★ | 0 | * | 0 |
| 8 5 | ] | 0 | ] | 0 | ] | 0 | ] | 0 | ] | 0 |
| 8 6 | Z | 0 | っ | 4 9 | Z | 0 | ッ | 7 5 | Z | 4 7 |
| 8 7 | X | 0 | ★ | 0 | X | 0 | ★ | 0 | X | 1 3 |
| 8 8 | C | 0 | ★ | 0 | C | 0 | ★ | 0 | C | 6 8 |
| 8 9 | V | 0 | ★ | 0 | V | 0 | ★ | 0 | V | 4 2 |
| 9 0 | B | 0 | ★ | 0 | B | 0 | ★ | 0 | B | 5 0 |
| 9 1 | N | 0 | ★ | 0 | N | 0 | ★ | 0 | N | 8 2 |
| 9 2 | M | 0 | ★ | 0 | M | 0 | ★ | 0 | M | 6 7 |
| 9 3 | < | 0 | 、 | 6 3 | < | 0 | 、 | 4 1 | < | 0 |
| 9 4 | > | 0 | 。 | 5 1 | > | 0 | 。 | 3 7 | > | 0 |
| 9 5 | ? | 0 | ・ | 0 | ? | 0 | ・ | 0 | ? | 0 |
| 9 6 | _ | 0 | ★ | 0 | _ | 0 | ★ | 0 | _ | 0 |

Note : The '★' represents no character assignment.

Table 2-b

| Mode\Key Code | Roman character to hiragana | | Kana to hiragana | | English and numerals | |
|---|---|---|---|---|---|---|
| | Character | Evaluated value | Character | Evaluated value | Character | Evaluated value |
| 01 | 1 | 35 | ぬ | 0 | 1 | 35 |
| 02 | 2 | 35 | ふ | 29 | 2 | 35 |
| 03 | 3 | 35 | あ | 49 | 3 | 35 |
| 04 | 4 | 35 | う | 78 | 4 | 35 |
| 05 | 5 | 35 | え | 36 | 5 | 35 |
| 06 | 6 | 35 | お | 46 | 6 | 35 |
| 07 | 7 | 35 | や | 28 | 7 | 35 |
| 08 | 8 | 35 | ゆ | 14 | 8 | 35 |
| 09 | 9 | 35 | よ | 43 | 9 | 35 |
| 10 | 0 | 35 | わ | 32 | 0 | 35 |
| 11 | - | 0 | ほ | 33 | - | 0 |
| 12 | ^ | 0 | へ | 14 | ^ | 0 |
| 13 | - | 36 | - | 36 | ¥ | 0 |
| 14 | q | 0 | た | 60 | q | 0 |
| 15 | w | 47 | て | 58 | w | 50 |
| 16 | e | 78 | い | 80 | e | 91 |
| 17 | r | 69 | す | 54 | r | 81 |
| 18 | t | 79 | か | 66 | t | 86 |
| 19 | y | 65 | ん | 75 | y | 56 |
| 20 | u | 88 | な | 54 | u | 61 |
| 21 | i | 89 | に | 60 | i | 80 |
| 22 | o | 90 | ら | 45 | o | 82 |
| 23 | p | 25 | せ | 48 | p | 63 |
| 24 | @ | -52 | ゛ | 0 | @ | -52 |
| 25 | [ | 10 | ゜ | 0 | [ | 0 |
| 26 | a | 90 | ち | 43 | a | 84 |
| 27 | s | 77 | と | 64 | s | 77 |
| 28 | d | 57 | し | 71 | d | 72 |
| 29 | f | 0 | は | 57 | f | 59 |
| 30 | g | 58 | き | 60 | g | 54 |
| 31 | h | 62 | く | 63 | h | 72 |
| 32 | j | 0 | ま | 51 | j | 21 |
| 33 | k | 81 | の | 67 | k | 26 |
| 34 | l | 0 | り | 52 | l | 68 |
| 35 | ; | 0 | れ | 46 | ; | 0 |
| 36 | : | 0 | け | 46 | : | 0 |
| 37 | ] | 10 | む | 21 | ] | 0 |
| 38 | z | 52 | つ | 52 | z | 47 |
| 39 | x | 0 | さ | 47 | x | 13 |
| 40 | c | 21 | そ | 41 | c | 68 |
| 41 | v | 0 | ひ | 36 | v | 42 |
| 42 | b | 41 | こ | 59 | b | 50 |
| 43 | n | 89 | み | 31 | n | 81 |
| 44 | m | 61 | も | 48 | m | 67 |
| 45 | , | 63 | ね | 25 | , | 0 |
| 46 | . | 51 | る | 58 | . | 0 |
| 47 | / | 0 | め | 34 | / | 0 |
| 48 | ★ | 0 | ろ | 29 | ★ | 0 |

Note: The '★' represents no character assignment.

Table 2-b'

| Mode Key Code | Roman character to hiragana Character | Roman character to hiragana Evaluated value | Kana to hiragana Character | Kana to hiragana Evaluated value | English and numerals Character | English and numerals Evaluated value |
|---|---|---|---|---|---|---|
| 4 9 | ! | 0 | ★ | 0 | ! | 0 |
| 5 0 | " | 0 | ★ | 0 | " | 0 |
| 5 1 | # | 0 | あ | 0 | ⇌ | 0 |
| 5 2 | $ | 0 | う | 0 | $ | 0 |
| 5 3 | % | 0 | え | 0 | % | 0 |
| 5 4 | & | 0 | お | 0 | & | 0 |
| 5 5 | ' | 0 | や | 2 9 | ' | 0 |
| 5 6 | ( | 0 | ゆ | 4 8 | ( | 0 |
| 5 7 | ) | 0 | よ | 5 9 | ) | 0 |
| 5 8 | ★ | 0 | を | 5 1 | ★ | 0 |
| 5 9 | = | 0 | ★ | 0 | = | 0 |
| 6 0 | ＝ | 0 | ★ | 0 | ＝ | 0 |
| 6 1 | ― | 3 6 | ★ | 0 | | | 0 |
| 6 2 | Q | 0 | ★ | 0 | Q | 0 |
| 6 3 | W | 0 | ★ | 0 | W | 5 0 |
| 6 4 | E | 0 | い | 0 | E | 9 1 |
| 6 5 | R | 0 | ★ | 0 | R | 8 1 |
| 6 6 | T | 0 | ★ | 0 | T | 8 6 |
| 6 7 | Y | 0 | ★ | 0 | Y | 5 6 |
| 6 8 | U | 0 | ★ | 0 | U | 6 1 |
| 6 9 | I | 0 | ★ | 0 | I | 8 0 |
| 7 0 | O | 0 | ★ | 0 | O | 8 2 |
| 7 1 | P | 0 | ★ | 0 | P | 6 3 |
| 7 2 | ` | 0 | ★ | 0 | ` | 0 |
| 7 3 | 「 | 0 | 「 | 1 0 | 「 | 0 |
| 7 4 | A | 0 | ★ | 0 | A | 8 4 |
| 7 5 | S | 0 | ★ | 0 | S | 7 7 |
| 7 6 | D | 0 | ★ | 0 | D | 7 2 |
| 7 7 | F | 0 | ★ | 0 | F | 5 9 |
| 7 8 | G | 0 | ★ | 0 | G | 5 4 |
| 7 9 | H | 0 | ★ | 0 | H | 7 2 |
| 8 0 | J | 0 | ★ | 0 | J | 2 1 |
| 8 1 | K | 0 | ★ | 0 | K | 2 6 |
| 8 2 | L | 0 | ★ | 0 | L | 6 8 |
| 8 3 | + | 0 | ★ | 0 | + | 0 |
| 8 4 | * | 0 | ★ | 0 | * | 0 |
| 8 5 | 」 | 0 | 」 | 1 0 | 」 | 0 |
| 8 6 | Z | 0 | っ | 4 9 | Z | 4 7 |
| 8 7 | X | 0 | ★ | 0 | X | 1 3 |
| 8 8 | C | 0 | ★ | 0 | C | 6 8 |
| 8 9 | V | 0 | ★ | 0 | V | 4 2 |
| 9 0 | B | 0 | ★ | 0 | B | 5 0 |
| 9 1 | N | 0 | ★ | 0 | N | 8 1 |
| 9 2 | M | 0 | ★ | 0 | M | 6 7 |
| 9 3 | < | 0 | 、 | 6 3 | < | 0 |
| 9 4 | > | 0 | 。 | 5 1 | > | 0 |
| 9 5 | ? | 0 | ・ | 1 6 | ? | 0 |
| 9 6 | _ | 0 | ★ | 0 | _ | 0 |

Note : The '★' represents no character assignment.

Tables 2-a and 2-b show different typical character mode likelihood tables for use with the present invention. The tables are constituted by the likelihood values, in each character mode, of the key codes representing the keys shown in FIG. 3, and by the character codes paired with these key codes. The key codes are the values assigned to each of the character keys on the keyboard of FIG. 3. For example, the key 3210 corresponds to a key code 01, the key 3220 to a key code 02, and the key 3230 to a key code 03. The key codes 01 through 48 correspond to 48 keys extending from the top left key to the bottom right key excluding the space key. Pushing the shift key 3130 or 3140 simultaneously with a character key inputs one of the key codes 49 through 96, which correspond to the character keys in the same manner as above. Referring to the box where a key code and a character mode intersect provides the likelihood value of the corresponding character code in that character mode. With this embodiment, the boxes in the likelihood column contain values that may be directly added, i.e., values computed illustratively by use of the following formula:

$$R \log Pa \qquad (2)$$

The character mode likelihood table for use with this embodiment is constructed to double as a character code conversion table. For example, suppose that the alphanumeric character mode is currently in effect and that the key 3230 is depressed. In that case, a reference to the character code in the box where the key code 03 and the alphanumeric character mode intersect provides conversion to a character code 3. If the key 3230 is pressed simultaneously with the shift key, referring to the box where the key code 51 and the alphanumeric character mode intersect effects conversion to a character code #. Furthermore, a key code may be obtained in reverse from a character mode and a character code. The space key has no shift code that applies thereto and has a likelihood value that is common to all modes. When the space key is operated, the key code thereof is converted directly to the character code representing a space. The key code of the space key is set to 00.

Figure 7:
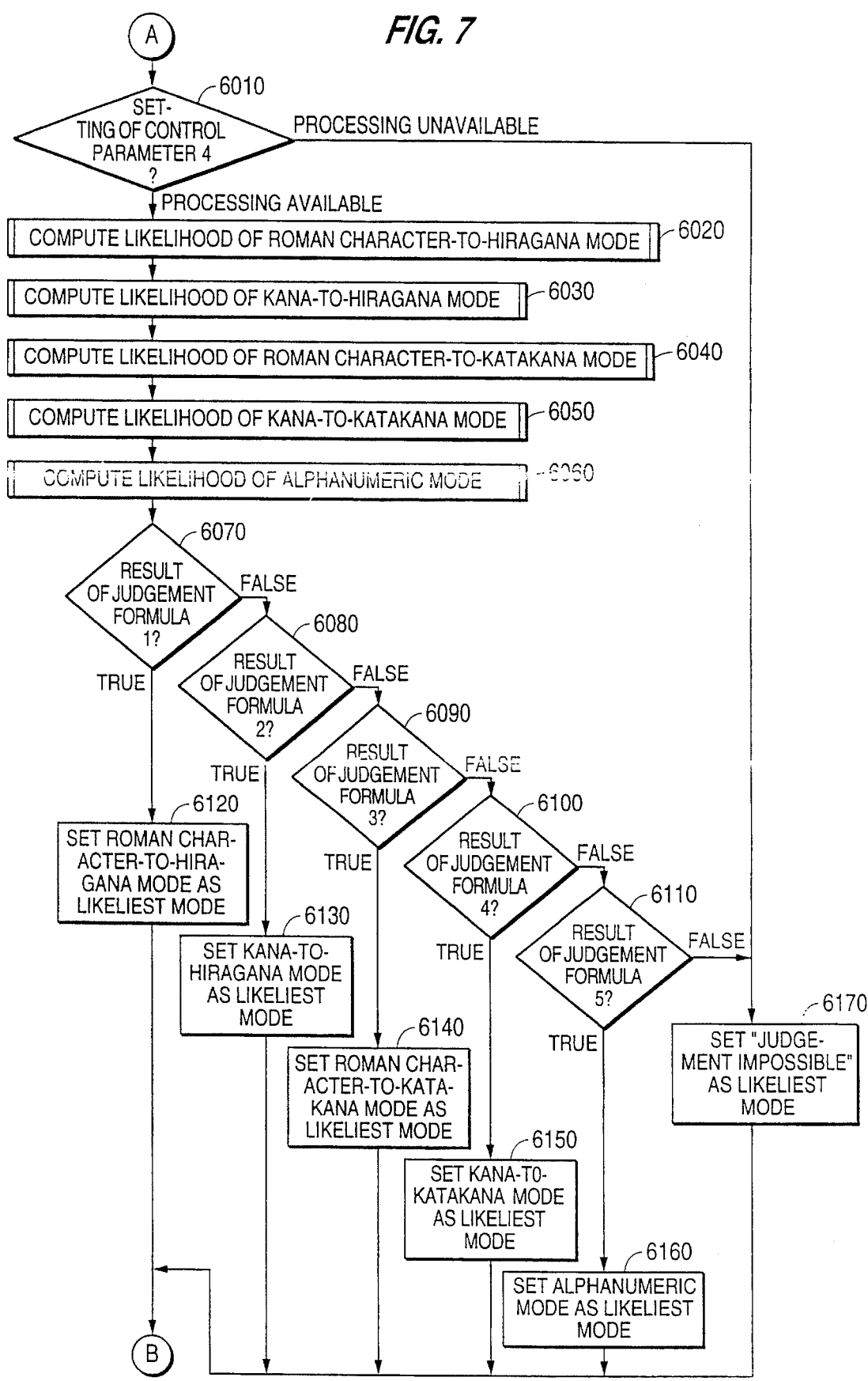
FIG. 7 is a flowchart of the steps for determining the likeliest character mode.

Referring now to FIG. 7, there is shown a flow chart for the character mode likelihood judgment processing. Suppose that the alphanumeric character mode is currently established and that the key codes 14, 24, 19 and 23 are input. In that case, the character code string "q@yp" is held in the character buffer 4100. The screen displays what is shown in FIG. 12(A).

In step 6010 of FIG. 7, a control parameter 4 is referenced. With its setting varied as designated, the control parameter 4 switches character inputting methods. Details of this parameter will be described later. If the the control parameter 4 is found to contain a value designating the availability of processing, step 6020 is reached. Step 6020 computes the likelihood Vrh in effect when the key codes held in the key code buffer 4050 are regarded as applicable to the Roman character-to-hiragana mode. The computation involves adding the likelihood values of the characters in question in the character mode likelihood table. If a key code of 16, in accordance with Table 2-a, is entered anew from the keyboard in the above example, the key code string held in the key code buffer 4050 becomes: 14, 24, 19, 23, 16. This means that Vrh=0+0+65+25+78=168. Likewise, step 6030 computes the likelihood Vkh in effect when the key codes held in the key code buffer 4050 are regarded as applicable to the kana-to-hiragana mode; step 6040 computes the likelihood Vrk in effect when the key codes in question are regarded as applicable to the Roman character-to-katakana mode; step 6050 computes the likelihood Vkk in effect when the key codes are regarded as applicable to the kana-to-katakana mode; and step 6060 computes the likelihood Ve in effect when the key codes are regarded as applicable to the alphanumeric mode. In the above example, the results of the computed likelihood for the different character modes are: Vkh=328, Vrk=173, Vkk=294, and Ve=166. Then the likeliest mode is judged in steps 6070, 6080, 6090, 6100 and 611. The judgment above is made by use of the judgment formulas given below.

$Vrh \sim \max(Vrk, Vkh, Vkk, Ve) + T \ldots$ judgment formula 1 \qquad (3)

$Vkh > \max(Vrh, Vrk, Vkk, Ve) + T \ldots$ judgment formula 2

$Vrk > \max(Vrh, Vkh, Vkk, Ve) + T \ldots$ judgment formula 3

$Vkk > \max(Vrh, Vrk, Vkh, Ve) + T \ldots$ judgment formula 4

$Ve > \max(Vrh, Vkk, Vkh, Vkk) + T \ldots$ judgment formula 5 where, T is a control parameter representing a constant threshold value. The control unit 4010 sets an appropriate threshold value and places it in the control parameter storing register 4080. When one of the judgment formulas 1 through 5 is found to be true, step 6120, 6130, 6140, 6150 or 6160 is reached, respectively. The step reached establishes the value representing the likeliest character mode. If all judgment formulas turn out to be false, or if the control parameter 4 contains a value designating the unavailability of processing, a "judgment-unavailable" value is set as the likeliest mode in step 6170. If T=30, then judgment formula 2 becomes true. This causes step 6130 to be reached. Step 6130 sets the kana-to-hiragana mode as the likeliest mode. This completes the character mode likelihood judgment processing, which is followed by step 1060 of FIG. 5. Step 1060 compares the current character mode with the mode found to be the likeliest in the preceding processing.

If the current character mode is the alphanumeric mode (i.e., likeliest mode being different from the current character mode), step 1070 is reached for alarm generation processing as will be described with reference to FIG. 8. In step 7010, a control parameter 2 is referenced. The control parameter 2 (to be described later) is a parameter that controls the way in which an alarm is generated. Here, the control parameter 2 is assumed to contain a value "1". Step 7010 is followed by step 7020. Step 7020 references the character code column in the character mode likelihood table in accordance with the key codes in the key code buffer 4050 as well as with the likeliest mode previously established, and replaces accordingly the already input character string in the character buffer 4100. In step 7030, the current character mode is replaced in value by the likeliest mode. In step 7040, a message 1 shown in FIG. 10(a) is displayed to inform the user that the character string and the character mode have been changed and that there is a way to reverse the process. Finally in step 7050, the key code buffer 4050 is cleared to make way for judging the character mode likelihood of the next input key code string. In the above example, the key code string "q@yp" is converted to a Japanese phrase "だんせ" and the character mode is changed from the alphanumeric mode to the kana-to-hiragana mode. The screen in effect at this point is shown in FIG. 12(b).

It may happen that with the Roman character mode being the likeliest mode, the result of character code conversion remains incomplete halfway through the corresponding Romanized spelling. In that case, some prior art character inputting methods fail to display the Roman characters halfway through conversion, or display the incomplete Romanized spelling in the guidance area. By contrast, a variation of the method according to the present invention puts alarm generation on hold until the Roman characters halfway through conversion are fully converted to the corresponding kana phrase. This prevents the user from making a key input error in reaction to premature alarm generation.

Figure 8:
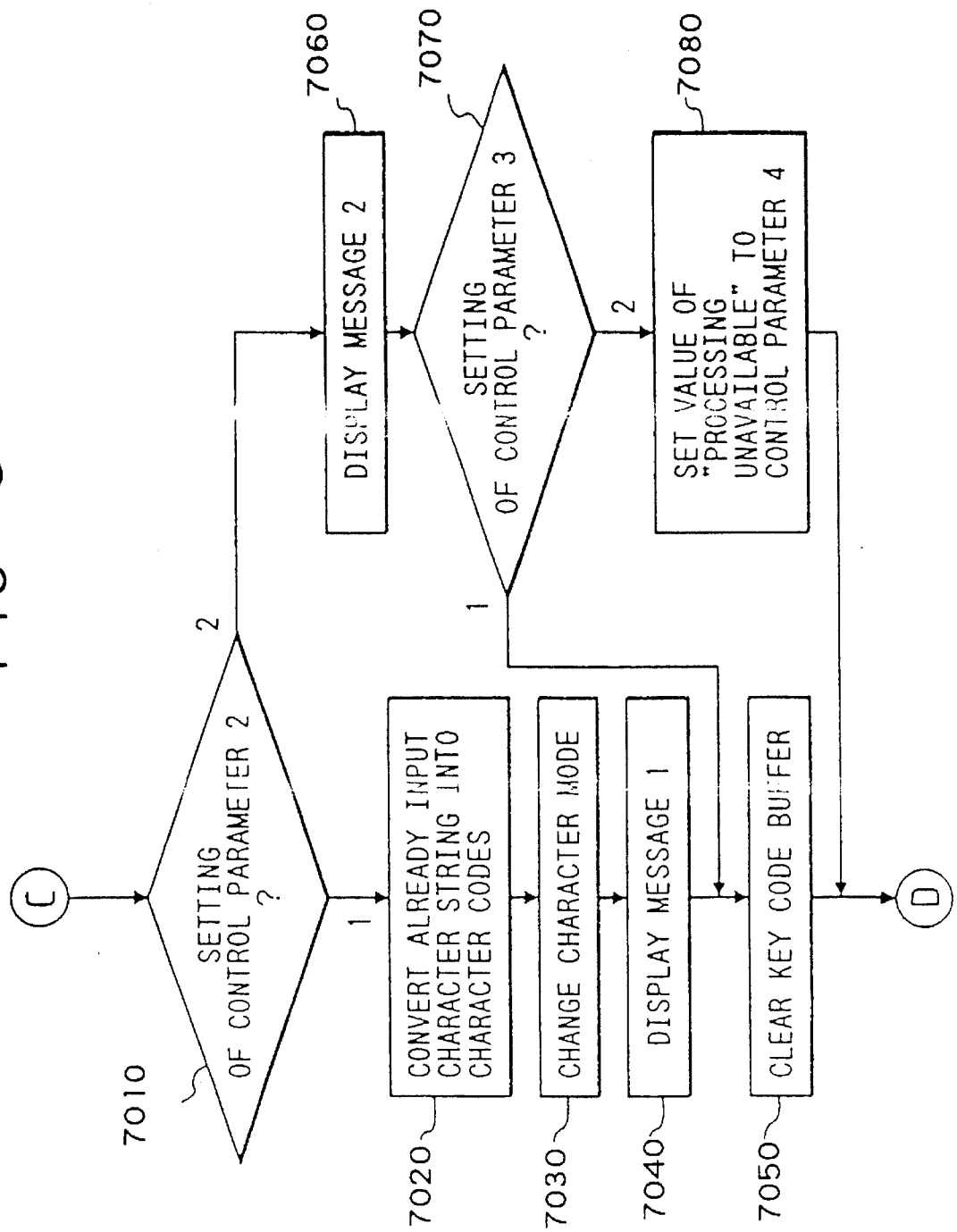
FIG. 8 is a flowchart of the steps for alarm output processing.

Suppose that the control parameter 2 is found to be set to "2" in step 7010 of FIG. 8. In that case, neither the already input character string is replaced, nor the character mode is changed. In step 7060, the message 2 of FIG. 10(b) is displayed. The user is asked to confirm if the character mode is correct, and is guided as to how to change the character mode of the input character string where necessary. In step 7070, a control parameter 3 is referenced. The control parameter 3 is a parameter that controls the way in which to input characters. If the control parameter 3 is found to contain "1", step 7050 is reached for another character mode likelihood judgment processing. Step 7050 clears the key code buffer 4050 as described above. If the control parameter 3 is found to contain "2" in step 7070, a character inputting method comes into effect whereby the character mode likelihood judgment processing is suppressed until the current character mode designation is changed. In step 7080, the value designating the unavailability of processing is set to the control parameter 4. This inhibits the output of distracting messages so that the user may keep on inputting characters in the current character mode. This completes the alarm generation processing, which is followed by step 1080 of FIG. 5. In step 1080, a newly input character key is processed. In the above example, the key code entered anew is 16 and the character mode is changed for the kana-to-hiragana mode. Thus the character code "い" is added to the character buffer 4100 and the corresponding screen appears on the display unit.

Thereafter, step 1010 is reached again. The subsequent steps are repeated until the end of character input is designated by operation of function keys.

Figure 9:
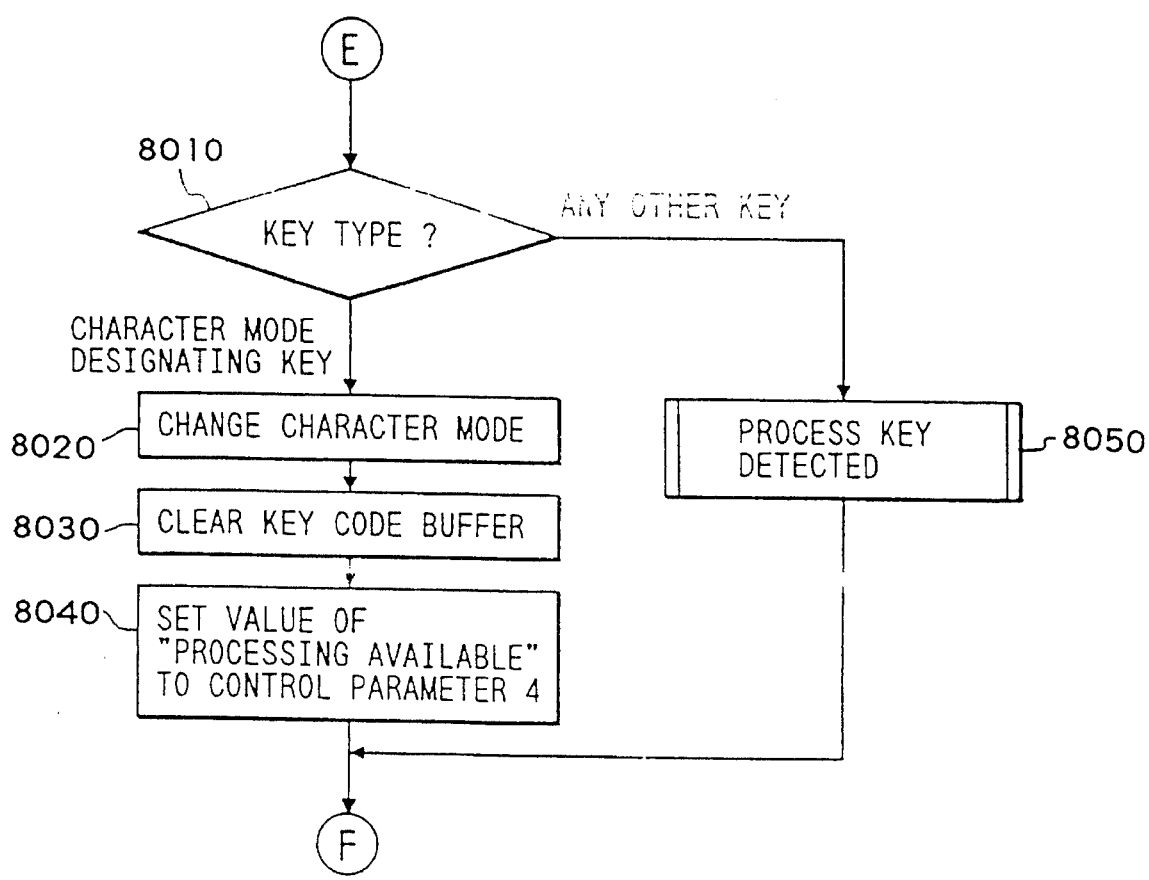
FIG. 9 is a flowchart of the steps for processing character mode designating keys.

For the processing performed when a character mode designating key is operated, it is assumed that a character mode designating key is pressed in step 1010 of FIG. 5. In that case, step 1010 is followed by step 1020 and 1100, in that order. The details of step 1100 are depicted in FIG. 9 wherein in step 8010, a check is made to see if the key is a character mode designating key. If the key is something other than a character mode designating key, step 8050 is reached for appropriate processing regarding the key detected. Description of this processing is omitted here. If a character mode designating key is detected in step 8010, step 8020 is reached in which the character mode is changed as described above. For example, with the alphanumeric mode in effect, pressing the katakana mode designating key 3090 establishes the katakana mode as the new character mode. In step 8030, the key code buffer 4050 is cleared. With the key code buffer 4050 cleared, the likelihood of the new character mode to be obtained will not be affected by inadvertent use of the remaining old key code data. Finally in step 8040, the control parameter 4 is set to the value designating the availability of processing. This resumes the character mode likelihood judgment processing that was suppressed when the control parameter 3 was found to contain "2".

The control parameters will now be described in detail. The control parameter 1, set by the user operating function keys, determines whether or not to utilize the character inputting method according to the invention If the control parameter 1 is set to "1", the inventive character inputting method is employed; if the parameter is set to "2", the method embodying the invention is not used.

The control parameter 2 is used to select one of the variations of the inventive character inputting method. If the control parameter 2 is set to "1", messages are displayed upon alarm generation; the already entered character string is converted to character codes; and character modes are changed as needed If the control parameter 2 is set to "2", only messages are displayed. As with the control parameter 1, the control parameter 2 is set by the user. The control parameter 2 may also be set by the control unit 4010 in accordance with the number of key codes in the key code buffer 4050.

For example, suppose that "1" is set to the control parameter 2 for a key code count of fewer than 10, and "2" for a key code count of 10 or more. These settings result in that both conversion of the already input character string into character codes and character mode changeover are provided upon alarm generation with fewer than 10 input key codes; and that where 10 or more key codes are input, only message display is available. This is a reasonable method to follow in view of the fact that until the number of key inputs exceeds a certain count, the user most often confirms both the character mode and the already input character string visually on the screen.

The control unit 4010 may vary the setting of the control parameter 2 depending on the threshold value T mentioned above. Where the threshold value T is relatively small, the control parameter 2 is set to "2" to provide message display alone, since the likelihood of the judged mode is low. Where the threshold value T is relatively large, the control parameter 2 is set to "1" to provide both conversion of the already input character string into character codes and character mode changeover, since the user-designated character mode is highly likely to be erroneous. This is another feature that highlights the usefulness of the invention. Furthermore, the key code count and the threshold value T may be controlled in combination. For example, up to a predetermined key code count N, a large value T1 may be set as the threshold value T and the value "1" placed in the control parameter 2; where the key code count N is reached, a small value T2 may be set as the threshold value T and the value "2" placed in the control parameter 2. This makes it possible to provide, with high levels of likelihood up to the key code count N, both conversion of the already input character string into character codes and character mode conversion. Beyond the key code count N, message display is effected for even a small discrepancy between the likelihood values detected.

It may happen that where the control parameter 2 is set to "2", the user continues key input without changing character mode designation following a message display. In such a case, the control parameter 3 is used to determine whether or not to carry out character mode likelihood judgment processing for the continued key input When the control parameter 3 is set to "1", a character mode likelihood judgment is made anew on the continued key input. This feature is useful where the user is likely to make frequent character mode designation errors. When the control parameter 3 is set to "2", the character mode likelihood judgment is inhibited until character modes are changed by operation of character mode designating keys. What takes place illustratively with the control parameter 3 in use is shown in FIGS. 6(a) and 16(b). This feature is useful as it prevents erroneous judgments from distracting the experienced user who is skilled in character input and who makes few character mode designation errors. As with the control parameter 1, the control parameter 3 is set by the user.

The control parameter 4 is used to determine whether or not to make a character mode likelihood judgment following the entry of key codes into the key code buffer 4050. The control unit 4010 may change the parameter setting in accordance with the key code count. For example, the control parameter 4 may be set to specify that the judgment is to be unavailable until the key code count N (i.e., number of input characters) is reached. Conversely, the control parameter 4 may be set to specify the judgment is to be unavailable after the key code count N is reached.

Another parameter may be alternatively used to effect character mode changeover alone or only the conversion of the already input character string into character codes. Although details are omitted herein, such a character inputting method is readily implemented by inserting decision steps between steps 7020 and 7030 and between steps 7030 and 7040 in FIG. 8.

The method and apparatus according to the invention may also be used in combination with a Japanese kana-to-kanji converting apparatus. If the so-called sequential conversion is adopted by the kana-to-kanji converting method in such a setup, the character mode changeover according to the invention and the kana-to-kanji conversion may occur simultaneously. Such occurrences, with sequential conversion in effect, may be dealt with by setting the control parameter 2 to "2". Arrangements may be made so that the user will have a choice as to whether or not to resort to this parameter setting.

An alternative character inputting apparatus embodying the invention operates, for example, in the following manner. Where the user designates character code conversion as described, the apparatus converts the target character string (e.g., the character string preceding the cursor) back to the key code string. Using its character mode likelihood judging device, the apparatus determines the likeliest character mode and converts the character codes according to that mode. Where the user changes character codes repeatedly, the apparatus converts the character codes consecutively in different character modes. If its alarm generating means detects a character mode error, the apparatus asks the user to verify the character mode and outputs a message indicating available character code conversion. This allows the user to find and correct the error with ease. When the user, given the status as shown in the screen of FIG. 13(*a*), presses the keys 3100 and 3080 simultaneously to designate character code conversion, this results in the screen of FIG. 13(*c*).

The designation of character code conversion is also used where, with the parameter 1 set to "1", the changed character string and input mode are to be converted back to what they replaced earlier. When the user, given the status of the screen of FIG. 12(*b*), presses the keys 3100 and 2080 simultaneously, the initial status of FIG. 12(*a*) is restored. This measure is employed so as to avoid the possibility that the likelihood judgment may result in an error depending on the input of special keys. Illustratively, when character modes are switched in step 7030, the old character mode is retained even as the new character mode is put into effect. The old character mode is set aside as the target mode to return to upon first designation of character mode conversion. This setup allows the old character mode to be restored whenever character code conversion is designated once. That is, when the message 1 of FIG. 10(*a*) is displayed in response to the initial designation of character code conversion, the old mode is restored; when the message 2 of FIG. 10(*b*) is displayed on like occasion, the likeliest character mode is put into effect, as described. Where character code conversion is designated consecutively, one of different character modes is alternately selected in the manner discussed earlier. As described, the character inputting apparatus according to the invention relieves the user of such chores as operating particular keys for conversion to desired character codes or looking up and carrying out specific steps to designate character code conversion. The apparatus also significantly reduces the number of times the user operates the keys for designating character code conversion.

Although the above embodiments have been described in conjunction with a keyboard having character mode designating keys, another keyboard without those keys may alternatively be used. That is, with the likeliest character mode selected by the described method and apparatus based on the keys typed, these character mode designating keys become redundant.

Although a Japanese language keyboard is used with the above-described embodiments, this type of keyboard is in no way intended to limit of the present invention. That is, the present invention applies to many other character inputting apparatuses for inputting diverse combinations of characters and languages: e.g., English and Russian, English and Chinese, Greek and Chinese, and so on. For example, there may be used in connection with the invention a multilingual keyboard that permits entry of German, French and English words and sentences. While the basic alphabet is common to the three languages, a few characters are specific to German (e.g., umlaut and special character "β") and to French (character with acute accent symbol, etc.). These special symbols and characters for German and French may be assigned the same keys, which may also stand for special symbols for use in English. Given this type of multilingual keyboard, three modes (German, French and English) may be provided and one of them may be activated at any one time for selective language input. Then the value of how likely each of the keys is operated in English, French and German is calculated, and the results are set in the character mode likelihood table. With these settings in place, the invention prevents, for example, a character unique to German, from appearing in French spellings or a special symbol specific to English from slipping into German words. Needless to say, Japanese may also be added to the above language mix if it is possible additionally to assign Japanese characters to the keys. What the present invention offers remains the same in terms of distinguishing language-specific symbols and characters among the languages.

Although in the above embodiment messages are output on a display unit, this is not intended to limit the invention. The invention may utilize many other forms of message output such as those of voice and print output.

Now there is described a second example in the first embodiment which is directed to the method and apparatus of the present invention for inputting characters whereby input character strings are judged for the likelihood of each of different language types, where the signals representing characters will be referred to as codes for distinguishing from the control signals, and the signal storing device will be referred to as a code storing device.

Figure 14:
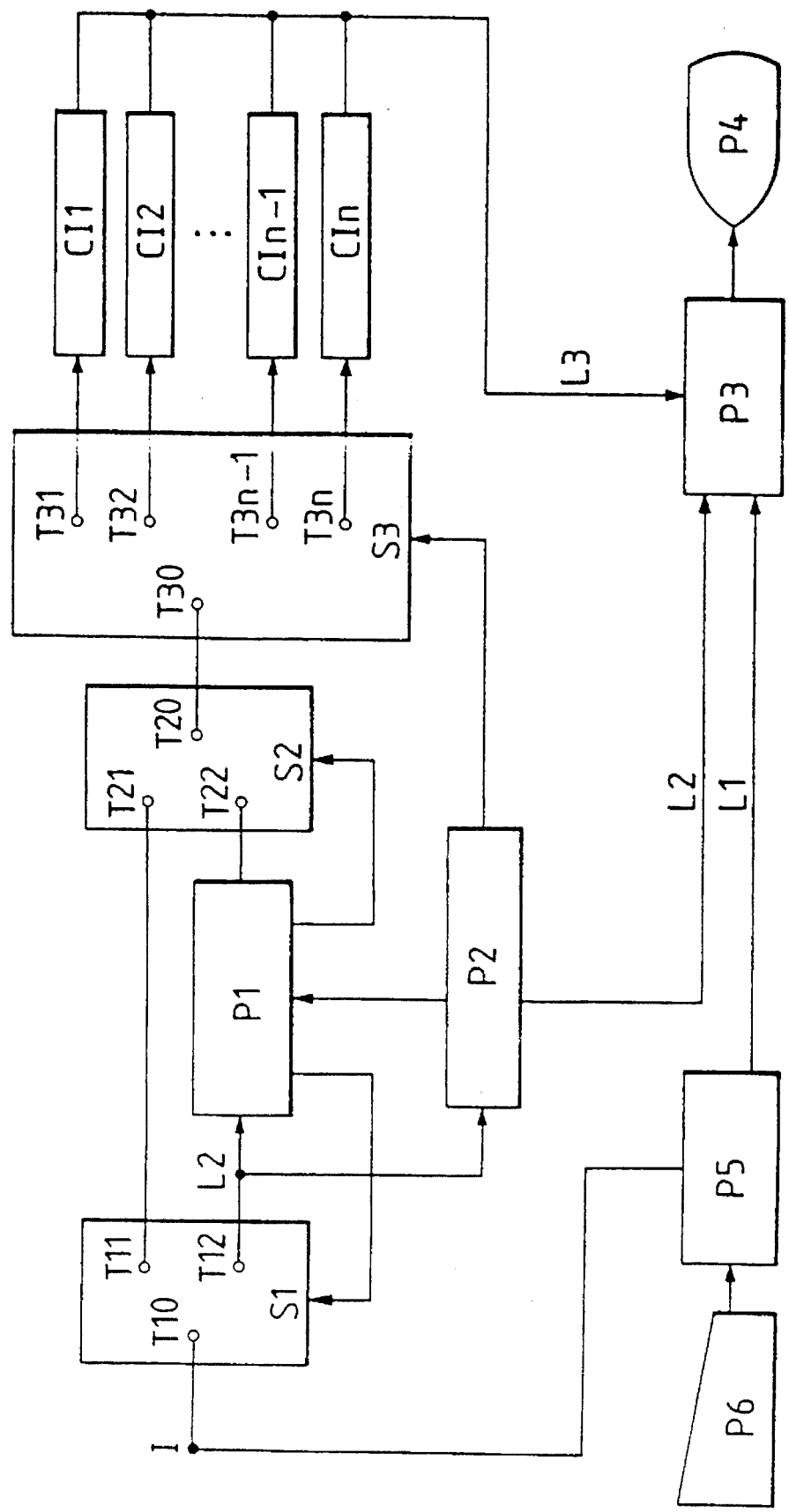
FIG. 14 is a block diagram of another embodiment of the present invention.

FIG. 14 is a block diagram of this example wherein P1 is the code storing device for sequentially storing the codes that are input through an input terminal I. In storing the codes, the code storing device controls the number of the input codes. P2 is the likelihood judging device for simultaneously receiving the codes stored in the code storing device P1 and judges the likeliest language type for the codes received. The code storing device P1 and the likelihood judging device P2 are capable of outputting control instructions to other devices in accordance with the internal status currently in effect. S1, S2 and S3 are switches for controlling the flow of codes that are input from the input terminal I. The switch S1 has terminals T10, T11 and T12; the switch S2 has terminals T20, T21 and T22; and the switch S3 likewise has terminals T30, T31, T32, ..., T3n–1 and T3n. The switches S1 and S2 connect and disconnect terminals under the direction of the code storing device P1. The switch S3 connects and disconnects terminals under the direction of the likelihood judging device P2. CI1, CI2, ..., CIn–1 and CIn are translating devices for translating the codes that are input from the input terminal I. (The translating devices CI1 through CIn are collectively referred to as CI). P3 is a display controlling device for controlling the display of output information from the translating devices CI and from other devices. P4 is a display device for displaying to the user the input information from the display controller device P3. P6 an is input device through which the user inputs desired characters. P5 is an input controller for generating predetermined codes illustratively in response to key input operations. In this arrangement, the input terminal I accepts the output information from the input controller P5. All the devices and the switches receive reset signals, not shown, which cause them to be reset to their respective initial states.

The display device P4 may be an electronic display device such as a CRT or LCD, or a plotter printer. The input device P6 may be a keyboard, a touch panel, a handwriting recognition device or a voice recognition device. Any apparatus capable of distinguishing user-input characters and outputting the codes representing these characters may be used as the input device P6. The code storing device P1, likelihood judging device P2, display controller P3, input controller P4, translating devices CI, and switches S1, S2 and S3 may be constituted either by hardware electronic circuits or by software arrangements that function under a CPU or like controller.

The display controller P3 receives output information from the input controller P5, likelihood judging device P2 and translating devices CI through signal lines L1, L2 and L3, respectively. Based on the information received, the display controller P3 computes the appropriate positions of relevant items and the contents thereof for display on the display device P4. The computed results are output to the display device P4.

Figure 17:
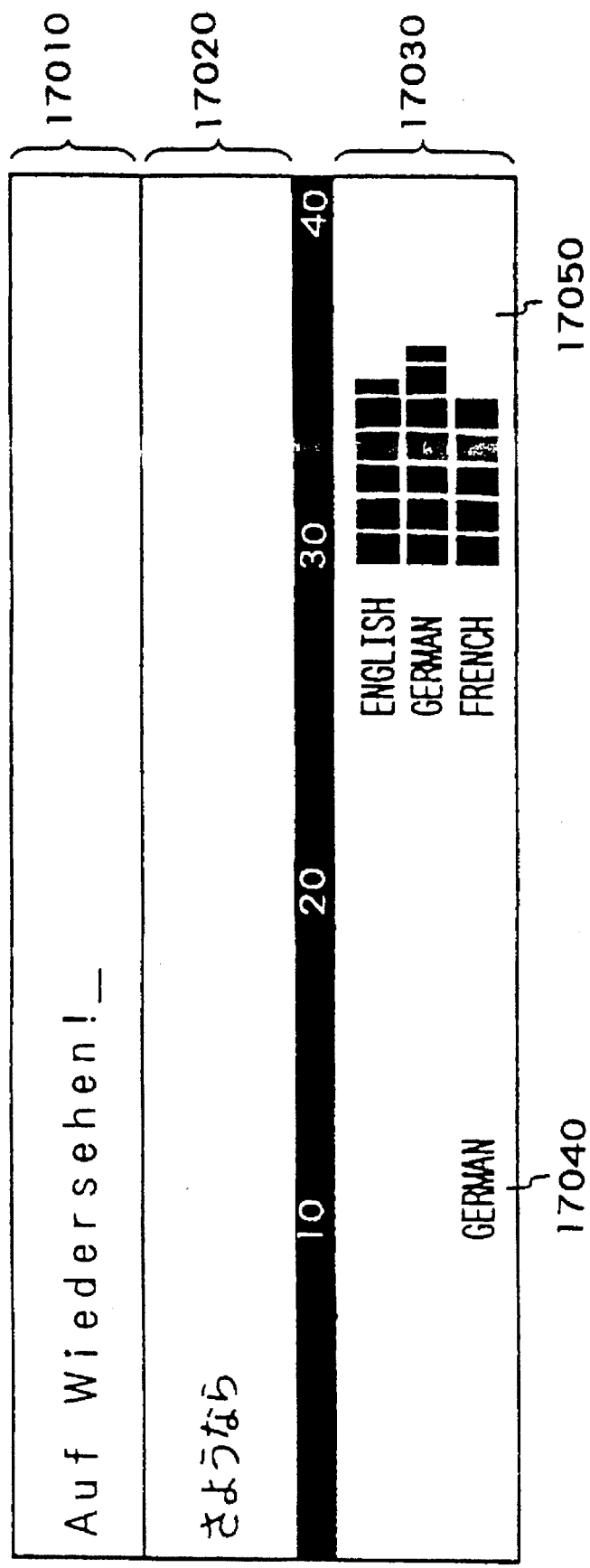
FIG. 17 shows a screen display example in accordance with FIG. 14.

FIG. 17 is a view showing a typical screen of the display device P4 wherein reference numeral 17010 is an area for displaying the character string that is input by the user from the inputting device P6 via the signal line L1. An area 17020 shows the result of translation done by the translating device CI and input via the signal line L3. An area 17030 indicates messages and other indications output by the likelihood judging device P2 via the signal line L2. The area 17030 contains an area 17040 for displaying the judged language type, and an area 17050 for showing the likelihood information on each of different language types. This likelihood information varies with the ongoing user input. The area 17050 in the example of FIG. 17 is an area that shows likelihood information in bar chart form.

Figure 15:
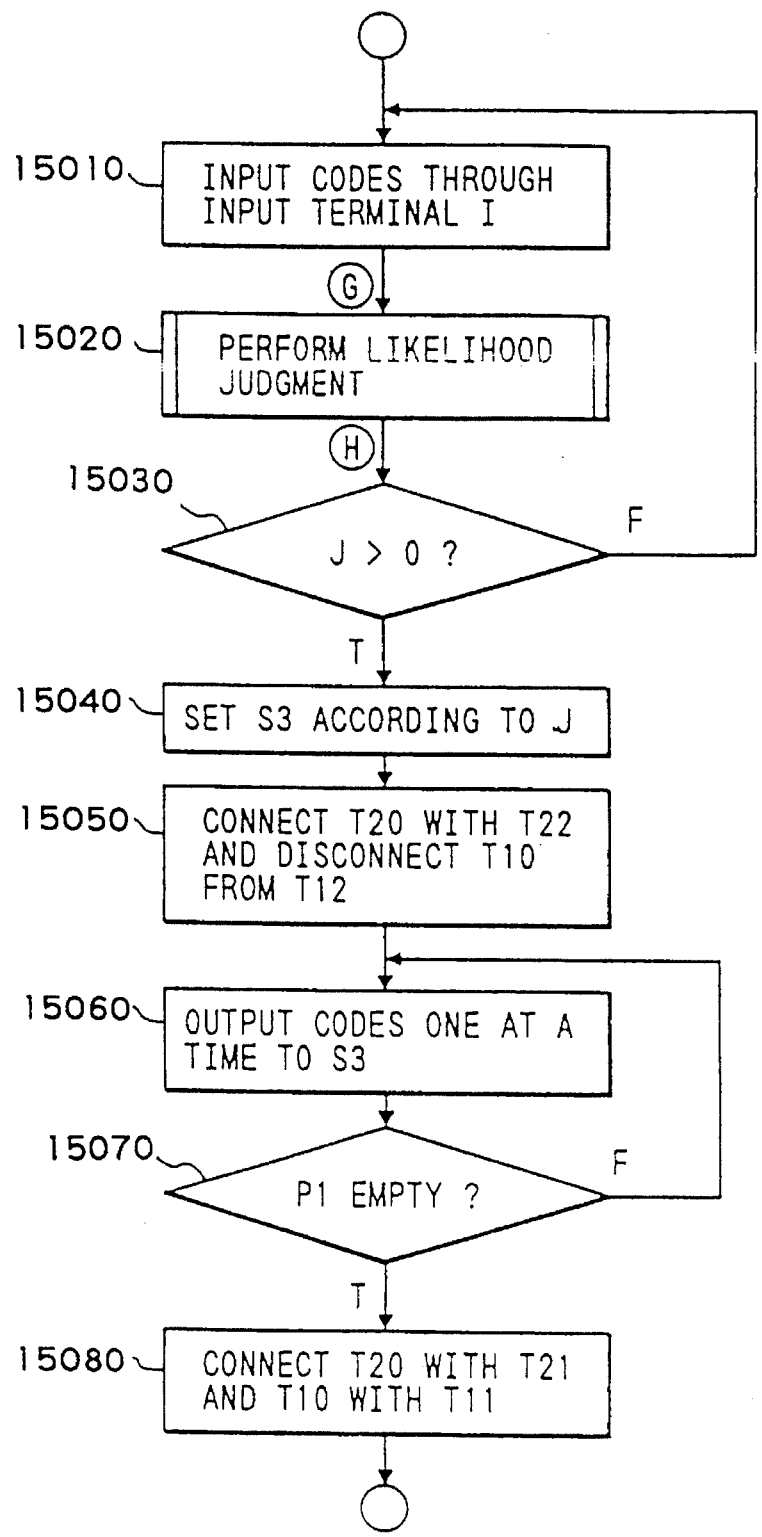
FIG. 15 is a flowchart of the steps for switching to an appropriate output destination depending on the result of likelihood judgment in accordance with the embodiment of FIG. 14.

FIG. 15 is a flowchart for indicating the operation of the code storing device P1 and likelihood judging device P2. A reset signal first initializes the switches S1, S2 and S3 so that the switch S1 connects T10 with T12 while the switches S2 and S3 leave their terminals disconnected. In step 15010, codes that are input from the input terminal I are stored sequentially by the code storing device P1, and the number of the input codes is counted and stored by the same device. The input codes are input concurrently to the likelihood judging device P2. In step 15020, the likelihood judging device P2 carries out likelihood judging processing to be described later. In step 15030, a check is made to see if the result of likelihood judgment has identified the language type. If the language type is successfully judged (J>0), the next step 15040 is attained; if the language type is not judged (J=0), step 15010 is reached again in which next codes are input.

Figure 16:
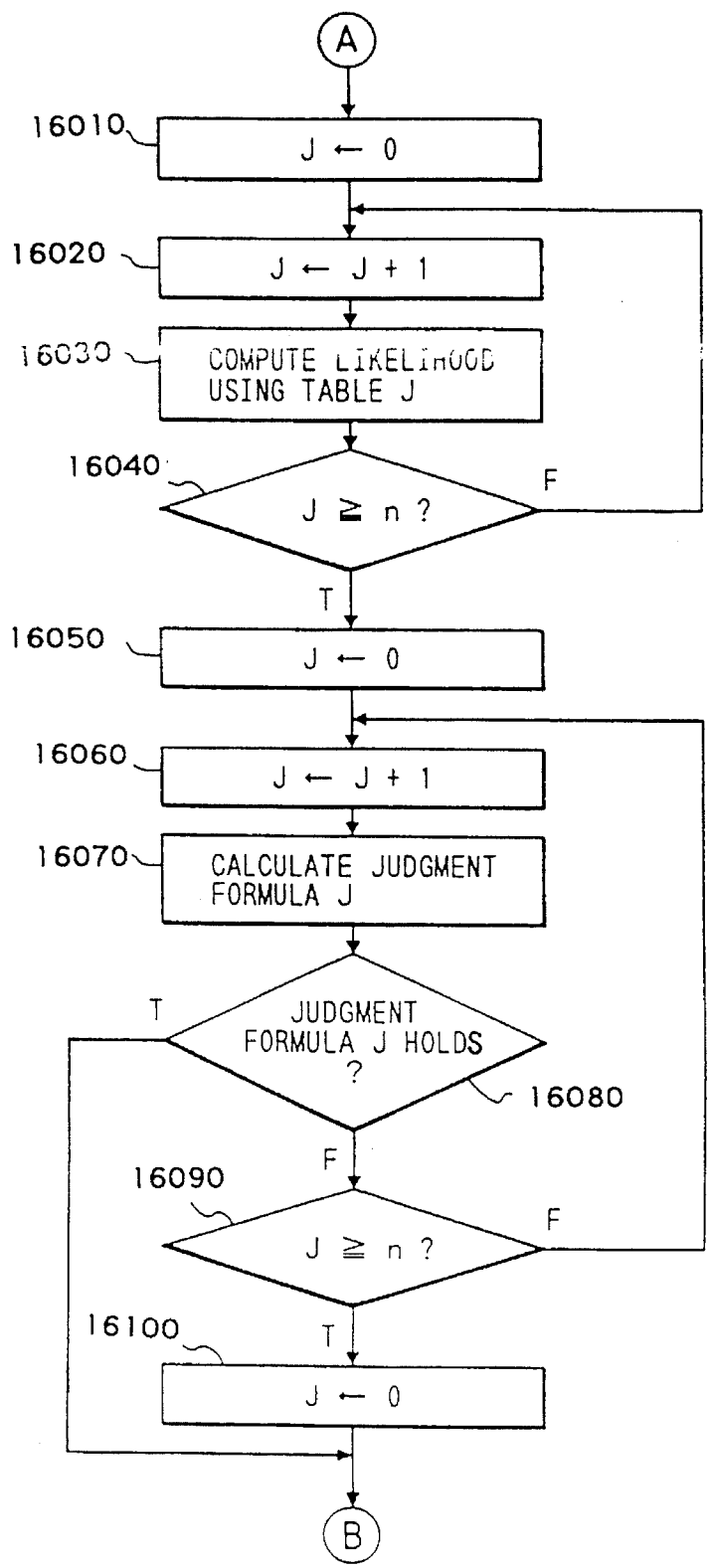
FIG. 16 is a flowchart of the steps for likelihood judgment processing in accordance with FIG. 14.

FIG. 16 is a flowchart for indicating the operation of likelihood judging processing which is basically the same as the character mode likelihood judging processing described earlier. Where there are n types of language types that may be judged, the input code string is judged for each of the different language types as follows. In step 16010 of FIG. 16, a control variable J is initialized to 0. In step 16020, the control variable J is incremented by 1. Each of the alphabetic characters appears at a substantially constant statistic frequency in each European language, apart from some variations that occur depending on the context. This embodiment relies basically on the statistical consistency of such character appearance frequencies in each language. Specifically, the likelihood of an input character string is obtained by the embodiment as follows. An appearance frequency Pa of a given character a in each language is acquired beforehand. After the frequency Pa is obtained for each of the characters constituting a character string, the values are inserted in Formula 1 ($V=R \log Pa$; described earlier) to compute the likelihood value of that character string. In Formula 1, the value R is unique to each of the different languages so that the likelihood values V will be normalized for absolute comparison between the languages. Comparing the values V determines how likely the character string applies to each of different languages.

In step 16030, the likelihood values V are obtained. Specifically, a likelihood table is used to compute the likelihood of the input code string with respect to each of the different languages as shown in Table 3 below. The likelihood table is a language-wise character likelihood table which contains the likelihood value of the code representing each character in each of the different language types (represented by J) and which is used to acquire the likelihood value of each character (code) in each language.

TABLE 3

Language-wise Character Likelihood Table

| | | J | | |
|---|---|---|---|---|
| | | 1 | 2 | 3 |
| Code | Character | English Likelihood | German Likelihood | French Likelihood |
| 01 | a | 86 | 73 | 82 |
| 02 | b | 49 | 56 | 42 |
| 03 | c | 71 | 65 | 68 |
| 04 | d | 72 | 76 | 73 |
| 05 | e | 91 | 99 | 98 |
| 06 | f | 59 | 51 | 49 |
| 07 | g | 55 | 65 | 37 |
| 08 | h | 72 | 72 | 31 |
| 09 | i | 80 | 81 | 81 |
| 10 | j | 22 | 34 | 21 |
| 11 | k | 25 | 49 | 0 |
| 12 | l | 68 | 69 | 74 |
| 13 | m | 67 | 57 | 65 |
| 14 | n | 81 | 86 | 84 |
| 15 | o | 82 | 61 | 80 |
| 16 | p | 66 | 37 | 63 |
| 17 | q | 0 | 0 | 37 |
| 18 | r | 81 | 82 | 81 |
| 19 | s | 77 | 79 | 81 |
| 20 | t | 86 | 80 | 80 |
| 21 | u | 61 | 75 | 80 |
| 22 | v | 41 | 44 | 55 |
| 23 | w | 50 | 53 | 0 |
| 24 | x | 10 | 0 | 31 |

TABLE 3-continued

Language-wise Character Likelihood Table

|      |           | J                     |                      |                      |
|------|-----------|-----------------------|----------------------|----------------------|
|      |           | 1                     | 2                    | 3                    |
| Code | Character | English Likelihood    | German Likelihood    | French Likelihood    |
| 25   | y         | 47                    | 0                    | 21                   |
| 26   | z         | 0                     | 60                   | 21                   |
| 27   | β         | 0                     | 32                   | 0                    |
| :    | :         | :                     | :                    | :                    |
| 41   | A         | 86                    | 73                   | 82                   |
| 42   | B         | 49                    | 56                   | 42                   |
| 43   | C         | 71                    | 65                   | 68                   |
| :    | :         | :                     | :                    | :                    |

As with the preceding embodiment, the likelihood table above comprises the values that are calculated beforehand by use of Formula 2 (R log Pa). These values are tabulated so as to facilitate the processing involved.

In step 16030, every time a code is input, the likelihood table is referenced to accumulate the likelihood value of that code Vn for each of the different languages. In step 16040, a check made to see if J has reached n, i.e., if the likelihood computation is carried out as many times as the number of language types. If the result of the check in step 16040 is affirmative, step 16050 is reached in which the control variable J is initialized to 0. In step 16060, the variable J is incremented by 1. In step 16070, likelihood judgment is performed using the judgment formulas below.

$$V1 > \max(V2, \ldots, Vn-1, Vn) + T \ldots \text{judgment formula 1} \quad (4)$$

$$V2 > \max(V1, \ldots, Vn-1, Vn) + T \ldots \text{judgment formula 2}$$

$$\vdots$$

$$Vn-1 > \max(V1, V2, \ldots, Vn) + T \ldots \text{judgment formula } n-1$$

$$V > \max(V1, V2, \ldots, Vn-1) + T \ldots \text{judgment formula } n$$

where, T is a control parameter representing a predetermined threshold value specific to a given system. These formulas are used to check if the discrepancy between the likeliest language type and the next likeliest exceeds the threshold value T, i.e., if the likelihood of the language type J is sufficiently higher than that of any other language type. When a judgement formula J is found to hold in step 16080, the likelihood judgment processing is terminated, and the control variable J is output. Steps 16060, 16070, 16080 and 16090 are repeated as many times as the number of language types involved. If none of the judgement formulas hold, step 16100 id reached. In step 16100, the control variable J is set to 0, and the likelihood judgment processing comes to an end.

For example, assume that with n=3, a character string is judged for the language type of English (n=1), German (n=2) or French (n=3) and that T=30. Also assume that CI1 is an English-to Japanese translating device, CI2 is a German-to-Japanese translating device, and CI3 is a French-to-Japanese translating device. When the user inputs "Auf Wiedersehen" (goodbye in German) one character at a time, the accumulated likelihood value for the 13th character "e" is 921 (=V1) for English, 956 (=V2) for German, and 869 (=V3) for French. Of the preceding judgement formulas, the judgement formula 2 holds since 956>max(921,869)+30.

Figure 18:
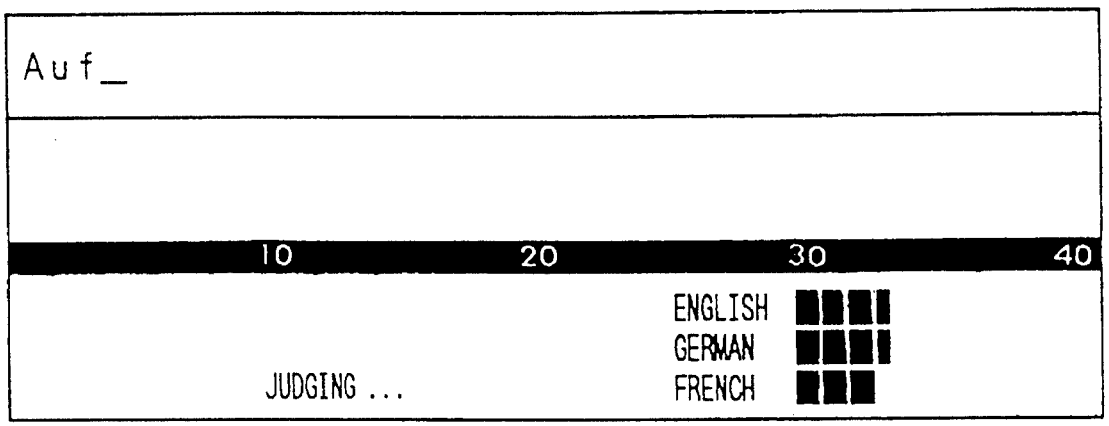
FIGS. 18(a) and 18(b) are a set of views depicting other screen display examples of the embodiment of FIG. 14.
Figure 18:
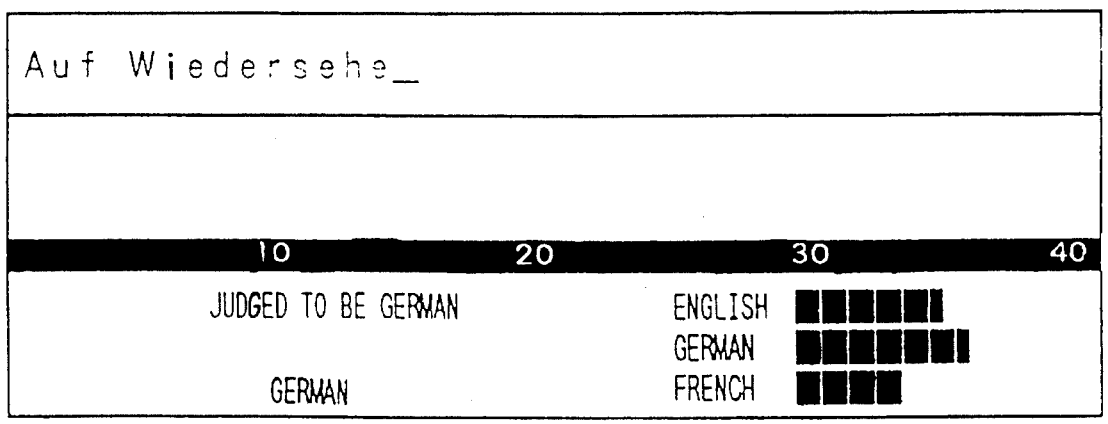

The likelihood value for for a space is 0. Thus a value "2" is set to J, and the likelihood judgement processing is terminated. How the screen typically appears at this time is shown in FIGS. 18(a) and 18(b).

The likelihood judgment described above is carried out by the likelihood judging device P2. The result of judgment is sent from the likelihood judging device P2 to the display controller P3. The display device P4 may display a message "Judged to be German" as depicted in FIG. 18(b) so that the user will have a clear understanding of the result.

In step 15030 of FIG. 15, a check is made to see if J is greater than 0. If the result of the check is affirmative, step 15040 is reached. In step 15040, the likelihood judging device P2 supplies the switch S3 with the value J corresponding to the control variable thereof. The switch S3 connects terminals T30 and T31. Because J=2 in the above example, the terminal T30 is connected to the terminal T32. Furthermore, the likelihood judging device P2 supplies the code storing device P1 with a control signal indicating the end of judgment. In step 15050, the code storing device P1 disconnects the switch S1 and connects the terminals T20 and T22 of the switch S2.

In step 15060, the codes stored in the code storing device P1 are output one by one to the translating device CI in the order in which these codes were input. Appropriate terminals of the switch 53 are already connected by the likelihood judging device P2. With the terminals T30 and T32 connected in the example above, the codes are transmitted to the translating device CI2 (i.e., German-to-Japanese translating device).

Step 15060 is followed by step 15070 that checks to see if there exists no more code stored in the code storing device P1. Steps 15060 and 15070 are repeated until all codes are output from the code storing device P1. When the code storing device P1 is emptied, step 15080 is reached. In step 15080, the code storing device P1 outputs a control signal to the switches S1 and S2 so as to connect terminals T20 with T21 and T10 with T11. The code storing device P1 and likelihood judging device P2 then terminate their processing. Thereafter, all codes that are input through the input terminal I are sent direct to the translating devices CI. That is, the codes needed to judge the character are followed by the codes that are input direct to the translating devices CI.

The translating devices CI may select any one of various known levels and types of translation. For example, the translating devices CI may be designed to start its translation processing upon input of a sentence delimiting character "." or "!", or upon a carriage return. This enhances operability by eliminating the need for the user to designate explicitly the start of each translation pass. A typical screen that appears during the above processing is shown in FIG. 17.

Where the invention is utilized as described, the user need only input the spelling of a word or a sentence without knowing the language type thereof. Simply inputting the spelling results in the translation desired.

One conventional way to do away with the designation of language types is to omit the likelihood judging device and to effect look up in all dictionaries provided for translation. This method requires complex linguistic analyses that often consume time and other resources. According to the present invention, the likelihood judging device first allows an applicable translating device to be selected so that translation will proceed rapidly.

If the input character string is unique, the likelihood judging device may not discern the language type thereof or may make an erroneous judgment. This possibility is circumvented by enabling the input controller P5 to effect generation of two signals as needed. For example, one signal is output by the likelihood judging device P2 to the code storing device P1, and the other signal is a control signal that sets the switch S3 appropriately. In such a case, the user may look up the status of likelihood judgment in the area 17050 as shown in FIG. 17. The area 17050 displays the ongoing status in effect as the user inputs characters.

A system is now described that omits the translating devices CI. Although a number of translating methods have been proposed and practiced, there is yet to be implemented a system capable of translating one language to another as well as that achieved by human interpreters. Most prior art translating systems require pre-editing and post-editing of the target wording by human operators, and these systems take considerable time in carrying out their tasks. In the current state of the art, users still have difficulty in communicating via translating machines with people who speak foreign languages. Meanwhile, recent progress in communication facilities and the increasing globalization of national communities are highlighting the need for high-speed translation and communication means at all levels of human interchange. Considerable dependence on human interpreters in this respect will probably continue for some years to come.

Today, attention is drawn to the growing numbers of personal computers communicating with one another over communication lines. This is a viable means of communication that replaces some of the traditional telephone and facsimile machines. During computer-based communication, people who speak different languages may communicate with one another in real time (so-called chattering) through the intervention of a human interpreter. In such a case, the likelihood judging device according to the invention offers advantages that facilitate these communications. How the invention applied to this type of system will now be described with reference to the accompanying drawings.

Figure 19:
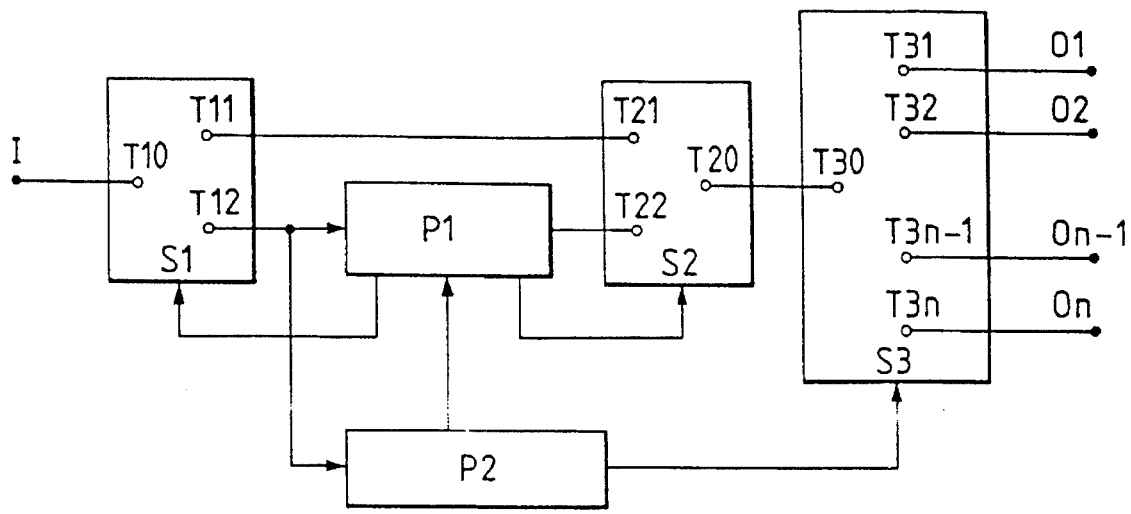
FIG. 19 is a block diagram of the language type judging unit contained in the embodiment of FIG. 14.

FIG. 19 is a block diagram of a language type judging unit. This independent unit is made of those components in FIG. 14 which address the judging of language types. The operation of the language type judging unit has already been described. That is, the language type is judged based on the codes that are input through the input terminal I. The switch S3 is set according to the language type thus determined so that the codes will be output to one of output terminals 01, 02, . . . , On.

Figure 20:
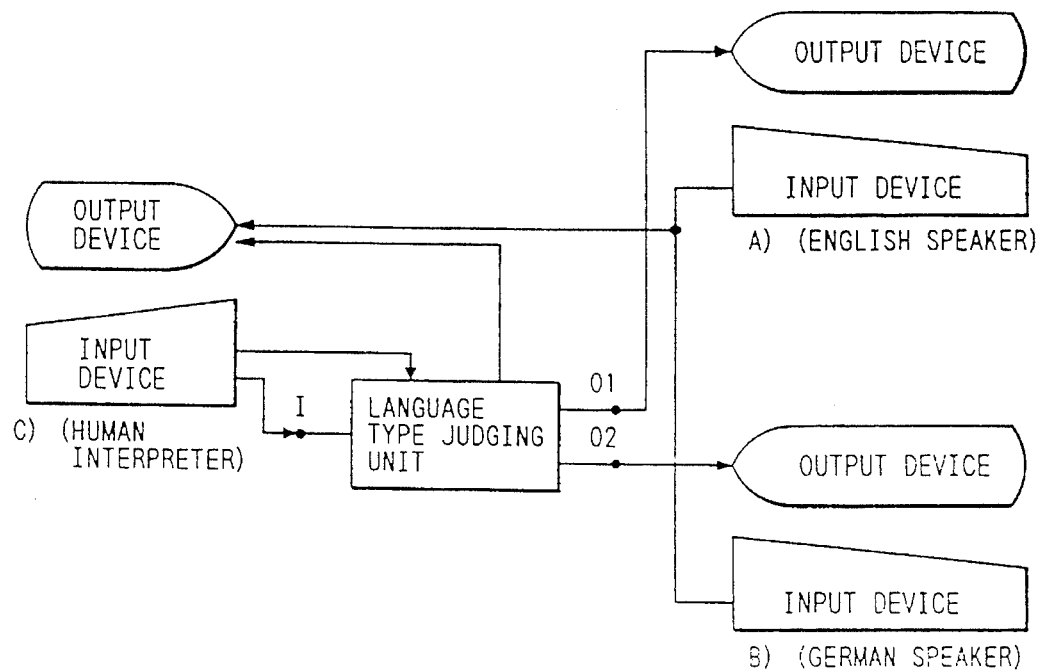
FIG. 20 shows a typical personal computer communication system.

FIG. 20 is an illustration of a typical personal computer communication system that utilizes the language type judging unit of the present invention. In FIG. 20, user A's native language is English and that of a user B is German. The users A and B are to communicate with each other through an interpreter C. In this case, the interpreter C is required conventionally to work in one of two computer configurations. In one configuration, the interpreter C sits at two personal computers connected separately to terminals of the users A and B. During a translating session, the interpreter translates the character string displayed on the screen of one computer (e.g., of user A) and inputs the translated result into the screen of the other computer (e.g., of user B). The process is alternately repeated during the session. In the other computer configuration, the interpreter C sits at a computer connected to two computers of the users A and B. The interpreter's screen displays transmissions from both users. The interpreter C switches the destination of the translated result depending on the user. In any case, the interpreter C's switching operation is vital in sparing both users from confronting meaningless messages appearing on their screens along with the wording to be translated. Each user has no need for a distracting translation of his message being displayed on his screen.

According to the present invention, as illustrated in FIG. 20, the interpreter C's transmission is sent to the language type judging unit that automatically determines the destination to which to send the translated result. In the example above, an English word or sentence from the interpreter C is automatically directed to the user A, and a German wording to the user B. Thus, the interpreter C need not become aware of the switching of the interpreter's transmissions and is able to concentrate solely on translating the input character strings.

As described, the invention allows the language type of the input character string to be determined automatically and the destination thereof to be judged automatically. In addition to the above embodiment, this aspect of the invention may be practiced in many other ways.

In the preceding example, the characters correspond to the codes on a one-to-one basis. But in some cases, as discussed in connection with the determination of character modes, one code may represent different characters for different language types. This is particularly the case where the inputting device is a keyboard having key codes assigned to characters. In that case, a device for converting keystrokes to character codes may be provided upstream of the translating devices CI. In the arrangement of FIG. 19, the output from the output terminal On passes through the character code converting device and further through the translating device where necessary before being sent to the outside.

There is described a third example in the first embodiment which is directed to a method and apparatus of the present invention for judging the error pattern of typographical errors where the signal storing device will be referred to as the code storing device.

FIG. 21(*a*) shows a keyboard having the most commonly used key arrangement. On this kind of keyboard, an operator operating keys at high speeds keeps returning his or her fingertips to the so-called home positions in order to ensure the correct correspondence between the keys and the fingers. During the so-called "blind touch" key input, the operator watches only the manuscript while the operator's fingers run on the keyboard. It often happens in such cases that the home positions of the fingers are erroneously shifted one key rightward or leftward. On the keyboard of FIG. 21(*a*), the home positions of the right hand index finger, middle finger and third finger are on the keys "J," "K" and "L," respectively. Each key in the key rows above and below the J-K-L key row is assigned to a specific finger for operation with respect to the home positions. In this setup, shifting the right hand one key leftward causes the right hand index finger, middle finger and third finger to type "H, " "J" and "K," respectively. Illustratively, the blind keystrokes that were supposed to input a word "information" actually enter a meaningless character string "ubfirnatuib."

The inputting method of this embodiment automatically detects such oft-encountered typographical errors, determines the type of the error committed, and corrects the erroneously input character string. The basic construction of this embodiment is the same as that shown in FIG. 14, except that the likelihood table of the likelihood judging device P2 is replaced with a typographical error likelihood table given as Table 4 below. Table 4 contains, for each error pattern J, the frequency of each key which appears in English and which is represented by a key code. These appearance frequencies are computed using Formula 2 (R log Pa) discussed earlier.

TABLE 4

Typographical Error Likelihood Table

| | | J | | |
|---|---|---|---|---|
| | | 1 Normal pattern Evaluation value | 2 Error pattern A Evaluation value | 3 Error pattern B Evaluation value |
| Key Code | Character | | | |
| 01 | ' | 0 | 0 | 0 |
| 02 | 1 | 0 | 0 | 0 |
| 03 | 2 | 0 | 0 | 0 |
| 04 | 3 | 0 | 0 | 0 |
| 05 | 4 | 0 | 0 | 0 |
| ⋮ | ⋮ | ⋮ | ⋮ | ⋮ |
| 13 | = | 0 | 0 | 0 |
| 14 | \ | 0 | 0 | 0 |
| 15 | q | 0 | 0 | 0 |
| 16 | w | 50 | 0 | 50 |
| 17 | e | 91 | 50 | 91 |
| 18 | r | 81 | 91 | 81 |
| 19 | t | 86 | 81 | 89 |
| 20 | y | 47 | 86 | 61 |
| 21 | u | 61 | 47 | 80 |
| 22 | i | 80 | 61 | 82 |
| 23 | o | 82 | 80 | 66 |
| 24 | p | 66 | 82 | 0 |
| 25 | [ | 0 | 66 | 0 |
| 26 | ] | 0 | 0 | 0 |
| 27 | a | 84 | 0 | 84 |
| 28 | s | 77 | 84 | 77 |
| 29 | d | 72 | 77 | 72 |
| 30 | f | 59 | 72 | 59 |
| 31 | g | 55 | 59 | 78 |
| ⋮ | ⋮ | ⋮ | ⋮ | ⋮ |
| 43 | n | 81 | 50 | 67 |
| 44 | m | 67 | 81 | 0 |
| 45 | , | 0 | 67 | 0 |
| 46 | . | 0 | 0 | 0 |
| 47 | / | 0 | 0 | 0 |
| 48 | ~ | 0 | 0 | 0 |
| 49 | ! | 0 | 0 | 0 |
| ⋮ | ⋮ | ⋮ | ⋮ | ⋮ |
| 92 | < | 0 | 51 | 0 |
| 93 | > | 0 | 0 | 0 |
| 94 | ? | 0 | 0 | 0 |

Each key code is a numerical definition of a key pressed on the keyboard. The key codes of the operated keys are input to the likelihood judging device P2. With the top leftmost key " ' " used as a reference "1" on the keyboard, the keys to the right in the same row are assigned key codes 2, 3, ..., 13. In the second key row and on, the keys are continuously assigned their respective key codes, until finally the "/" key is assigned a key code of 47. The shift key case of the key " ' " is assigned 48, and those of the remaining keys are likewise assigned key codes up to 94. The shift key case "?" of the last key "/" is assigned the code 94. FIG. 21(b) illustrates how the keys correspond to their respective key codes. Table 4 also contains the likelihood values of input characters constituting the normal pattern pursuant to the home positions (J=1). The normal pattern is used for checks on whether keys have been typed normally. The error type B in Table 4 involves the right hand home positions being shifted one key leftward. Illustratively, in Table 4, the likelihood value of the key "u" in the normal pattern is moved to the key "y," and the likelihood value of the key "i" is moved to the key "u." The error pattern A involves both hands' home positions being shifted one key rightward.

In this embodiment, CI in FIG. 14 represents devices for correcting typographical errors rather than language-to-language translating devices. The typographical error correcting device will be described later in more detail. The display controller P4 overwrites the output from the typographical error correcting devices CI onto the already input character string from the input controller PS. Although the typographical error likelihood table of this embodiment contains the frequencies of characters for their appearance in English, the language type is not limited to English. With appropriate modifications, the table may also apply to French or German. This is also the case with the Japanese language kana keyboard mentioned earlier. Given the Japanese keyboard, the appearance frequencies of the kana or Roman characters expressing the Japanese wording are computed and tabulated. In that case, typographical error likelihood tables are switched to comply with the alphanumeric mode, kana mode or Roman character mode being selected. Any selected table is used in the same manner described above.

Figure 22:
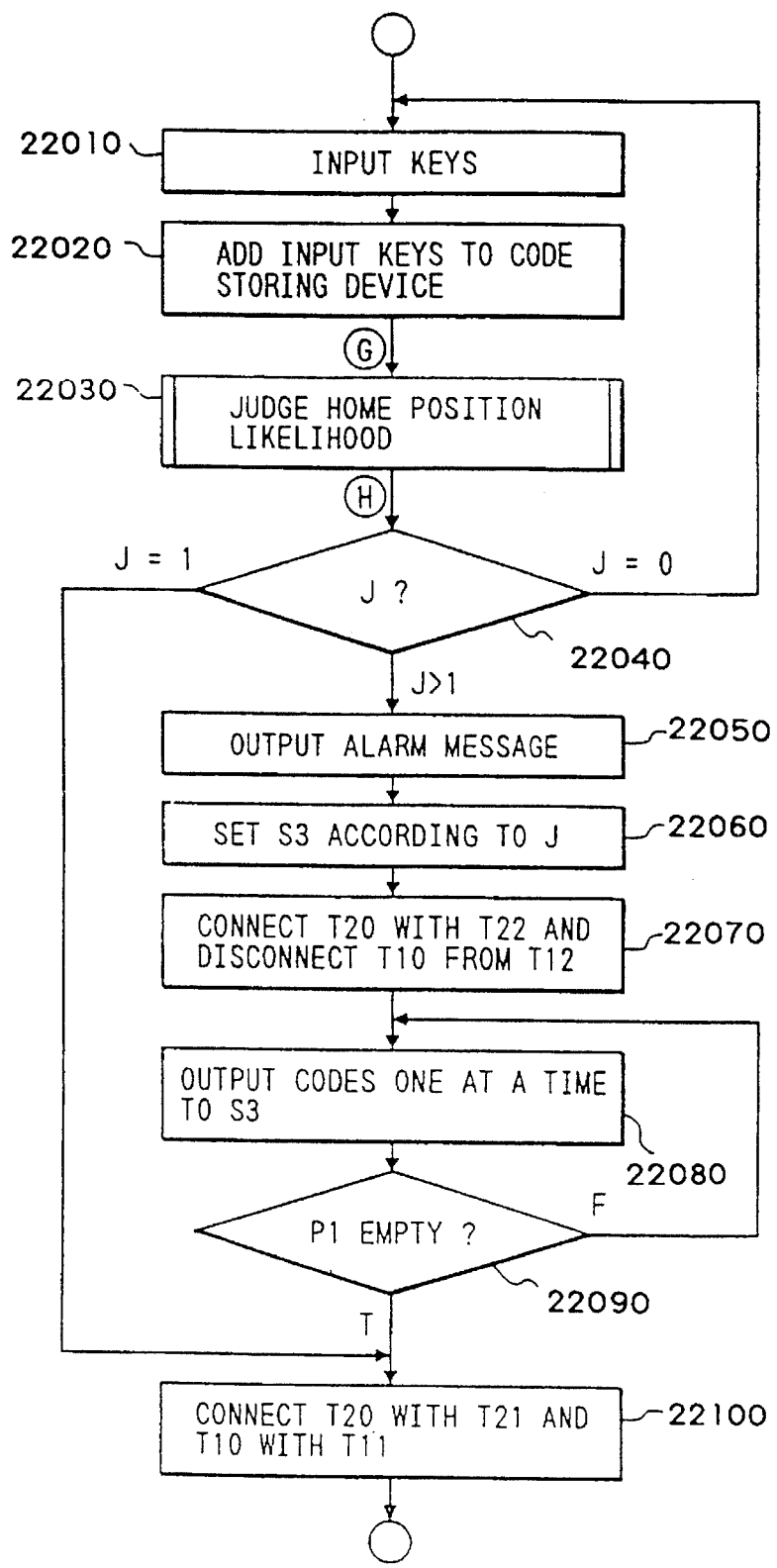
FIG. 22 is a flowchart of the steps for typographical error judgment processing according to the present invention.

The operation of this embodiment is now described with reference to the flow chart of FIG. 22. In step 22010, keys are operated. In step 22020, the key codes from the typed keys are stored sequentially in the code storing device P1 and are displayed concurrently on the display device P4. In step 22030, typographical error likelihood judgment is carried out. What the likelihood judging device P2 does at this point has already been described and the description will not be repeated. In step 22040, a check is made to pick one of three possibilities as a result of the judgment: the result is an error pattern (J>1), the result is the normal pattern (J=1), or the judgment is unavailable (J=0). In the case of the error pattern, step 22050 is reached in which alarm generation is initiated. If the normal pattern is detected, step 22100 is reached in which the switches S1 and S2 are set before the processing is terminated. If the judgment is unavailable, step 2201 is again reached in which the next key input is accepted.

In the alarm generation processing, the user is presented with an alarm message, and the already input character string is replaced by a character string corrected by the typographical error correcting devices CI. The alarm message is output from the likelihood judging devices P2 to the display controller P3. Given the error pattern identified by J, the typographical error correcting means CI replaces the erroneously input codes with the correct key codes by referring to a typographical error correction table. This table has the correct key codes corresponding to the erroneously input codes. After correction, the codes are output to the display controller P3. An example of the typographical error correction table is shown as Table 5 below.

TABLE 5

Typographical Error Correction Table

| | J | |
|---|---|---|
| Key Code | 2 Error pattern A | 3 Error pattern B |
| 01 | 01 | 01 |
| 02 | 01 | 02 |
| 03 | 02 | 03 |
| 04 | 03 | 04 |
| 05 | 04 | 05 |
| ⋮ | ⋮ | ⋮ |
| 13 | 12 | 14 |
| 14 | 13 | (BS) |
| 15 | (TAB) | 15 |
| 16 | 15 | 16 |
| 17 | 16 | 17 |
| 18 | 17 | 18 |
| 19 | 18 | 19 |
| 20 | 19 | 21 |

TABLE 5-continued

Typographical Error Correction Table

| | J | |
|---|---|---|
| Key Code | 2<br>Error pattern A | 3<br>Error pattern B |
| 21 | 20 | 22 |
| 22 | 21 | 23 |
| 23 | 22 | 24 |
| 24 | 23 | 25 |
| 25 | 24 | 26 |
| 26 | 25 | (Enter) |
| 27 | (Cntrl) | 27 |
| 28 | 27 | 28 |
| 29 | 28 | 29 |
| 30 | 29 | 30 |
| 31 | 30 | 32 |
| : | : | : |
| 43 | 42 | 44 |
| 44 | 43 | 45 |
| 45 | 44 | 46 |
| 46 | 45 | 47 |
| 47 | 46 | (Shift) |
| 48 | 48 | 48 |
| 49 | 48 | 49 |
| : | : | : |
| 92 | 91 | 93 |
| 93 | 92 | 94 |
| 94 | 93 | (Shift) |

Figure 23A:
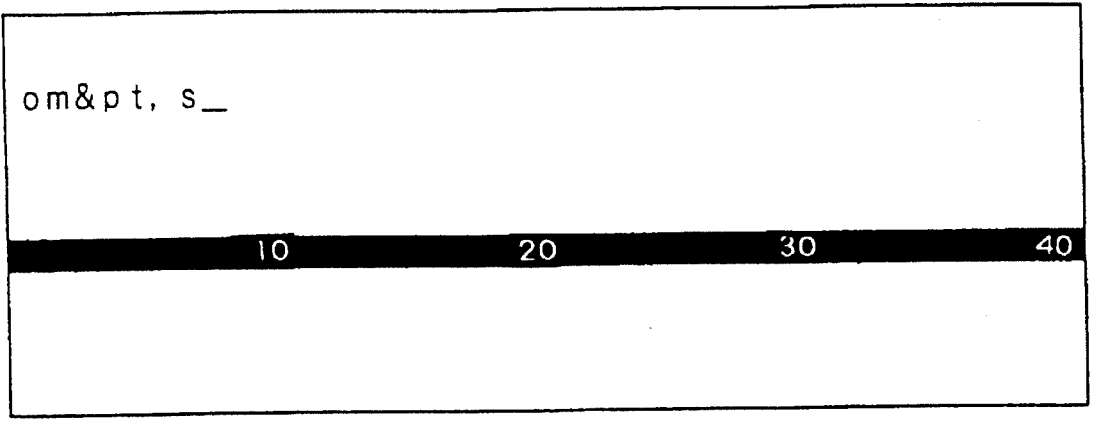
FIGS. 23(a)-23(C) show depicting screen display examples of the present invention for typographical error judgment processing.
Figure 23B:
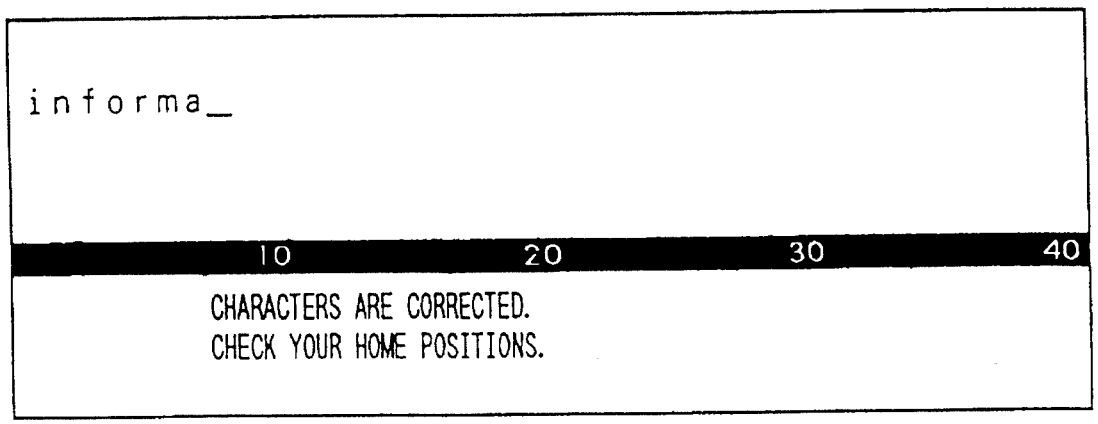

Suppose that T=300 when n=3 in Tables 4 and 5. Also suppose that when the user tries to enter a character string "information," the home positions of both his hands are shifted one key rightward without the user noticing it. In that case, the actually input character string is "omgpt,syopm." This character string is represented by key codes "23, 44, 31, 24, 19, 45, 28, 20, 23, 24, 44." From the typographical error correction table, it is then possible to obtain a likelihood value V1 (=429) for the normal pattern, a likelihood value V2 (=534) for the error pattern A and a likelihood value V3 (=307) for the error pattern B. Since 534>max(429, 307)+ 100 the error pattern A is most likely to be applicable, and J is set to 2. The screen displays a message indication directed to the user. The codes stored in the code storing device P1 are output to the typographical error correcting device CI2. Referencing the column "J=2" in Table 5 (typographical error correction table), the typographical error correcting device CI2 replaces the code string "23, 44, 31, 24, 19, 45, 28" with a new code string "22, 43, 30, 23, 18, 44, 27," the latter being output to the display controller P3. The display controller P3 converts the input code string into a character string that replaces the already input character string. Typical screens that appear at this point are shown in FIGS. 23(a)–23(c).

As described, the present invention automatically detects input errors caused by the erroneous shift of the users' home positions on the keyboard and replaces such errors with correct character strings. In view of the nature of typographical errors, the code storing device P1, the likelihood judging device P2, and the switches S1, S2 and S3 should preferably be reinitialized when the user's fingertips leave the surfaces of the character keys (i.e., home positions). That is, the timing of the reinitialization should be upon a carriage return or upon operation of a cursor key or editing key.

Figure 23C:
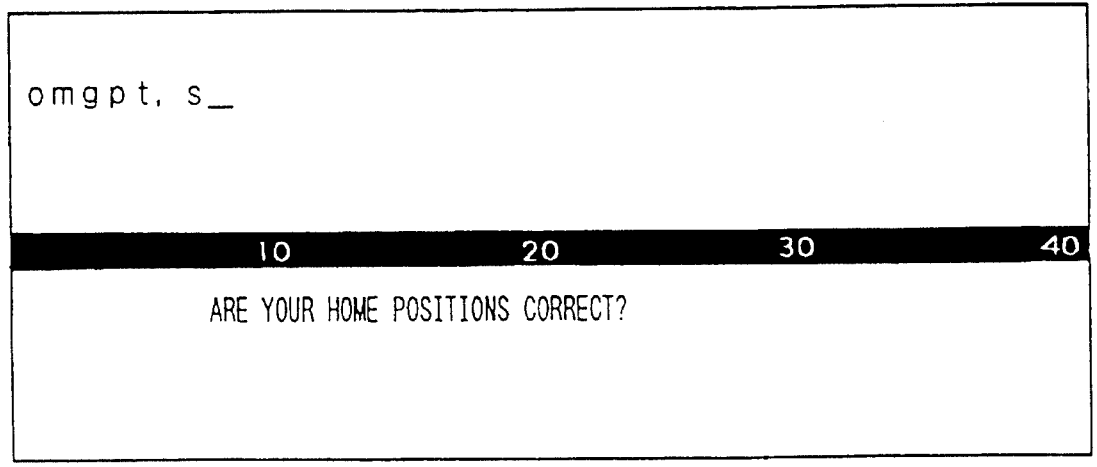

Although the above embodiment was shown to replace the already input character string with a correct character string, an alternative embodiment may limit itself to generating only an alarm signal, as depicted in FIG. 23(c). With this alternative, there is no need to furnish the code storing device P1, the switches S1 through S3 and the typographical error correcting device CI. Furthermore, there is no need to specify an error type. All that is needed is to check if the discrepancy between the likelihood value V1 of the normal pattern and the highest likelihood value (V2, ..., Vn) of the likeliest error pattern exceeds a threshold value T. This judgment is carried out using the following formula:

$$\max(V2, \ldots, Vn-1, Vn) > V1 + T \tag{5}$$

The typographical error correcting device CI1 is basically not needed to deal with the normal pattern.

Although the above embodiment has dealt with the inadvertent shift of the home positions to the right or left, this is not limitative of the invention. With appropriate modifications added, the typographical error likelihood table and the typographical error correction table may address other erroneous home position shifts in upward or downward directions or combinations of shifts in diverse directions.

The invention may also address shift lock setting errors. Many keyboards have shift lock keys that are used to distinguish upper-case letters from lower-case letters. An erroneous operation of the shift lock key may result in inputting "KING" instead of "King." This type of error is addressed by supplementing the typographical error likelihood table with an error pattern having the likelihood values of the normal pattern switched between shift case and unshifted case. Referencing the supplemented typographical error likelihood table allows shift lock setting errors to be detected. Likewise, the typographical error likelihood table may be modified to address shift setting errors involving the "caps lock" key (for alphabetic characters only).

Now, there is described a fourth example in the first embodiment which is directed to a method of the present invention and apparatus for automatically determining and selecting a character code system for use in computer-based communication. The apparatus as embodied hereunder allows computers operating on different character code systems to communicate with each other using a common code system. When a user at one computer does not know the character code system of the other computer, the inventive apparatus prevents unintelligible character strings from appearing on either party's screen during communication. In the following description, the signal storing device will be called the code storing device.

Figure 24:
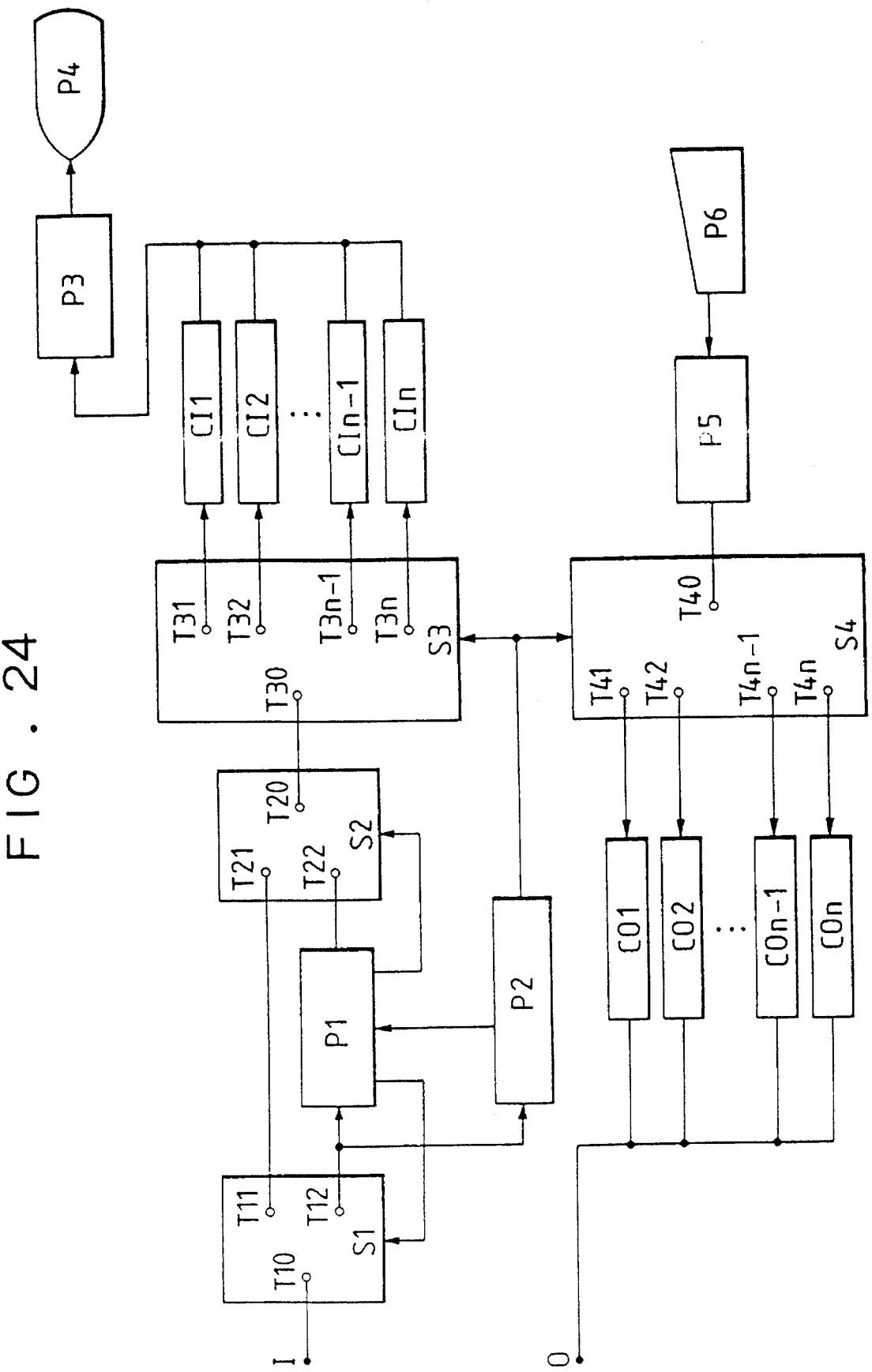
FIG. 24 is a block diagram of another embodiment of the present invention

FIG. 24 is a block diagram of this embodiment and differs from that of FIG. 14 in that the input terminal I is connected to an external apparatus; that a control signal from the likelihood judging device P2 controls a newly provided switch S4; that the output from the input controller P5 passes through character code system backward converting devices CO1, CO2, COn–1 or COn (collectively referred to as CO) selected by the switch S4 and is forwarded to the terminal O; and that the terminal O is connected to another external apparatus. In FIG. 24, character code system converting devices CI convert input codes to codes of a predetermined character code system in accordance with the selected character code system.

Character code systems will now be discussed in connection with computer-based communication. Character code systems differ from manufacturer to manufacturer and from device type to device type. Illustratively, a device type 1 has a character code system 1 in Table 6 below. A code string "59, 76, 76, 72, 65 (hexadecimal)" in Table 6 representing "apple" on a device type 1 turns into "Yvvre" on a device type 2 whose character code system 2 is shown in Table 7 below. on the other hand, a code string "4B, 69, 6E, 67"

representing ~King~ on the device 2 turns into "i>g" on the device type 1. In other words, when users communicate with each other using computers having different character code systems, establishing physical interface arrangements is not sufficient to exchange meaningful character strings between the users.

TABLE 6

Character Code System 1

| Low order | High order | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | | | | | (SP) | & | — | j | s | | w | y | { | } | $ | 0 |
| 1 | | | | | | | / | k | | | | z | A | J | | 1 |
| 2 | | | | | | | b | l | | | | | B | K | S | 2 |
| 3 | | | | | | | c | m | | | | | C | L | T | 3 |
| 4 | | | | | | | d | n | | | | | D | M | U | 4 |
| 5 | | | | | | | e | o | | | | | E | N | V | 5 |
| 6 | | | | | | | f | p | | | | | F | O | W | 6 |
| 7 | | | | | | | g | q | | | | | G | P | X | 7 |
| 8 | | | | | | | h | r | | | | | H | Q | Y | 8 |
| 9 | | | | | | a | i | ' | | | | | I | R | Z | 9 |
| A | | | | | [ | } | \| | : | t | u | x | | | | | |
| B | | | | | . | ¥ | , | # | | | | | | | | |
| C | | | | | < | * | % | @ | | | | | | | | |
| D | | | | | ( | ) | _ | ' | | | | | | | | |
| E | | | | | + | ; | > | = | | | | | | | | |
| F | | | | | ! | +e,cir<br>+ee | ? | " | | | | | | | | |

TABLE 7

Character Code System 2

| Low order | High order | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | | | (SP) | 0 | @ | P | ' | p | | | | | | | | |
| 1 | | | ! | 1 | A | Q | a | q | | | | | | | | |
| 2 | | | " | 2 | B | R | b | r | | | | | | | | |
| 3 | | | # | 3 | C | S | c | s | | | | | | | | |
| 4 | | | $ | 4 | D | T | d | t | | | | | | | | |
| 5 | | | % | 5 | E | U | e | u | | | | | | | | |
| 6 | | | & | 6 | F | V | f | v | | | | | | | | |
| 7 | | | ' | 7 | G | W | g | w | | | | | | | | |
| 8 | | | ( | 8 | H | X | h | x | | | | | | | | |
| 9 | | | ) | 9 | I | Y | i | y | | | | | | | | |
| A | | | * | : | J | Z | j | z | | | | | | | | |
| B | | | + | ; | K | [ | k | { | | | | | | | | |
| C | | | , | < | L | ¥ | l | \| | | | | | | | | |
| D | | | — | = | M | ] | m | } | | | | | | | | |
| E | | | . | > | N | +e,cir<br>+ee | n+e,ovs<br>+ee | | | | | | | | | |
| F | | | / | ? | O | _ | o | | | | | | | | | |

The code storing device P1 and the likelihood judging device P2 operate as described earlier. In this embodiment, the control signal sent from the likelihood judging device P2 to the switch S3 is also forwarded to the switch S4. Operating the backward converting devices CO appropriately allows the switch S4 to output the codes coming from the inputting device P6 to the output terminal O in accordance with the character code system of the other party. The likelihood table for use in judging a character code system is a character code system likelihood table as shown in Table 8 below. This table comprises the likelihood values representing the appearance frequencies of the codes of a given character code system J, the values having been computed with Formula 2 (R log Pa).

TABLE 8

Character Code System Likelihood Table

| | J | | | |
|---|---|---|---|---|
| | 1 | | 2 | |
| Code | Character code | Evaluation value | Character code | Evaluation value |
| 20 | | −99 | (SP) | 60 |
| 21 | | −99 | ! | 30 |
| 22 | | −99 | " | 49 |

TABLE 8-continued

Character Code System Likelihood Table

| | | J | | |
|---|---|---|---|---|
| | 1 | | 2 | |
| Code | Character code | Evaluation value | Character code | Evaluation value |
| ⋮ | ⋮ | ⋮ | ⋮ | ⋮ |
| 59 | a | 90 | Y | 23 |
| ⋮ | ⋮ | ⋮ | ⋮ | ⋮ |
| 65 | e | 91 | e | 91 |
| 66 | f | 60 | f | 60 |
| 67 | g | 55 | g | 55 |
| 68 | h | 70 | h | 70 |
| 69 | i | 80 | i | 80 |
| 6A | l | 1 | j | 21 |
| 6B | . | 8 | k | 26 |
| 6C | % | 2 | l | 60 |
| 6D | _ | 1 | m | 58 |
| 6E | > | 2 | n | 80 |
| ⋮ | ⋮ | ⋮ | ⋮ | ⋮ |
| 72 | 1 | 60 | r | 81 |
| 73 | m | 58 | s | 77 |
| 74 | n | 80 | t | 85 |
| 75 | o | 81 | u | 63 |
| 76 | p | 63 | v | 40 |
| 77 | q | 01 | w | 50 |
| ⋮ | ⋮ | ⋮ | ⋮ | ⋮ |
| FF | | −99 | | −99 |

For example, the code string "4B, 69, 6E, 67" representing "King" in the character code system 2 has a total likelihood value V2 of 285. The same code string has a total likelihood value V1 of 130 in the character code system 1. When T=50, the character code system is judged to be 2 (=J) by use of the character mode judgment formulas discussed earlier.

In FIG. 15, when likelihood judgment is carried out (J>O) in step 15030, step 15040 is reached. In step 15040, the likelihood judging device P2 supplies not only the switch S3 but also the switch S4 with a value J representing the control variable. This connects terminals T40 and T42. That is, since J=2 in the previous embodiment, the terminal T40 is connected with the terminal T42.

The character code system converting device CI convert codes of a given character code system to the codes representing the same characters in another character code system. For example, if the predetermined character code system is the one shown in Table 6, the character code converting device looks up both Table 6 and Table 9 (character code conversion table) as shown below for character conversion.

TABLE 9

Character Code Conversion Table

| Predetermined code | | J | |
|---|---|---|---|
| Character | Code | 1 | 2 |
| ⋮ | ⋮ | ⋮ | ⋮ |
| a | 59 | 59 | 61 |
| ] | 5A | 5A | 5B |
| | 5B | 5B | 5C |
| * | 5C | 5C | 2A |
| ) | 5D | 5D | 29 |
| ; | 5E | 5E | 3B |
| +e,cir +ee | 5F | 5F | 5E |
| − | 60 | 60 | 2D |

TABLE 9-continued

Character Code Conversion Table

| Predetermined code | | J | |
|---|---|---|---|
| Character | Code | 1 | 2 |
| / | 61 | 61 | 2F |
| b | 62 | 62 | 62 |
| c | 63 | 63 | 63 |
| d | 64 | 64 | 64 |
| e | 65 | 65 | 65 |
| f | 66 | 66 | 66 |
| ⋮ | ⋮ | ⋮ | ⋮ |

Since CI2 is currently selected, the previously indicated code string "6B, 69, 6E, 67" is compared with the codes under the heading "J=2" in Table 9. The codes making up the string are matched sideways with, and converted to, the corresponding predetermined codes found on their side. Thus the string "6B, 69, 6E, 67" is converted to a string "71, 69, 74, 67." CI converts the codes one at a time and outputs the converted codes to the display controller P3. In turn, the display controller P3 converts the codes it received into characters by looking up Table 6, the characters being sent to the display device P4 for display. As a result, the display device P4 displays the initially transmitted character string "King" as intended.

At this point, the switch S4 is being set under the direction of the likelihood judging device P2. If the user inputs characters using the inputting device P6, the resulting signals output by the inputting device P6 are converted by the input controller P5 into codes of the character code system shown in Table 6. The converted codes are output to the devices CO via the switch S4. The devices CO provides conversion in the backward direction of what is offered by the devices CI. That is, the codes received from the input controller P5 are used as keys by which to look up the predetermined code column in Table 9. Each matched code is converted to the code found on the same row and in the column designated by "J". After conversion, each code is output to the output terminal 0.

In the embodiment above, the switch S4 has its terminals T40 and T42 connected. Thus the codes passing through the switch S4 are sent to the character code system backward converting device CO2. If the user inputs "jack" through the inputting device P6, the input controller P5 outputs a code string "70, 59, 63, 71." The code string is converted by the character code system backward converting device CO2 into a code string "6A, 61, 63, 6B" for output through the output terminal 0. In this manner, the character code system interface is established automatically at the time the user receives a first message. This allows the user to concentrate subsequently on the user's input without becoming aware of the character code system of the other party's computer.

In the above examples, the code input source has been assumed to be the originator of communication. Alternatively, it may be desired that the result of communication be downloaded temporarily into a file device before display. In that case, the file device is regarded as the input source. That is, the invention may be used correctly to read those files to which the logic file format is common but of which the character code systems are different. Thus it is not mandatory for two communicating computers to be physically connected to each other.

As described and according to the invention, the user is able to input characters without becoming aware of the character mode currently in effect. This boosts the efficiency of character input. In particular, novice users are required to operate fewer keys, which contributes significantly to alleviating the operative burdens on these relatively unskilled users during their character input sessions. In addition, the guidance display assists the user in mastering key operations more quickly than usual.

Also according to the invention, the user need not know in advance the language type of character strings to be translated. This provides for quicker acquisition of translated results. If the home positions of the user's fingers are erroneously shifted on the keyboard during input, the error is automatically detected and corrected. This further contributes to reducing the stress and frustration some users experience during their typing sessions. Furthermore, the invention allows a user at one computer running on one character code system to communicate with another user at another computer using a different character code system. Neither of the users needs to know the other party's code system beforehand.

Now, the second embodiment of the present invention will be described.

The second embodiment is the same as the first embodiment in that the likelihood judgement is performed as to the character strings (or key code strings) to automatically decide and set the character species or the like. In addition to the above, the second embodiment is further characterized by employing a learning capacity so as to decrease errors of the automatic settings or the like.

First, the fundamental operations of this embodiment will be explained with reference to FIGS. 43(a) and 43(b).

Figure 43:
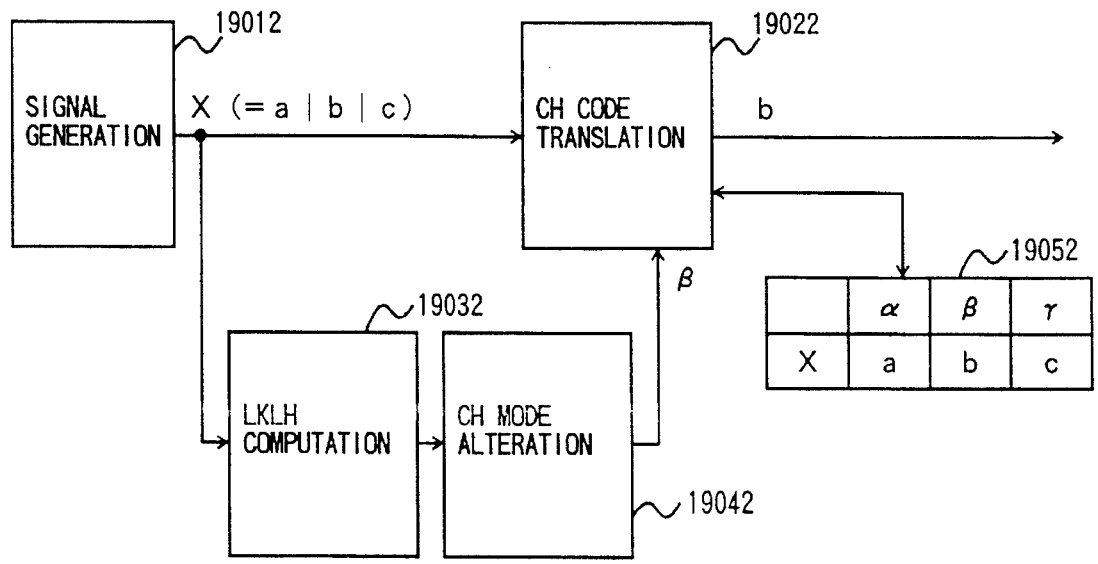
Figure 43:
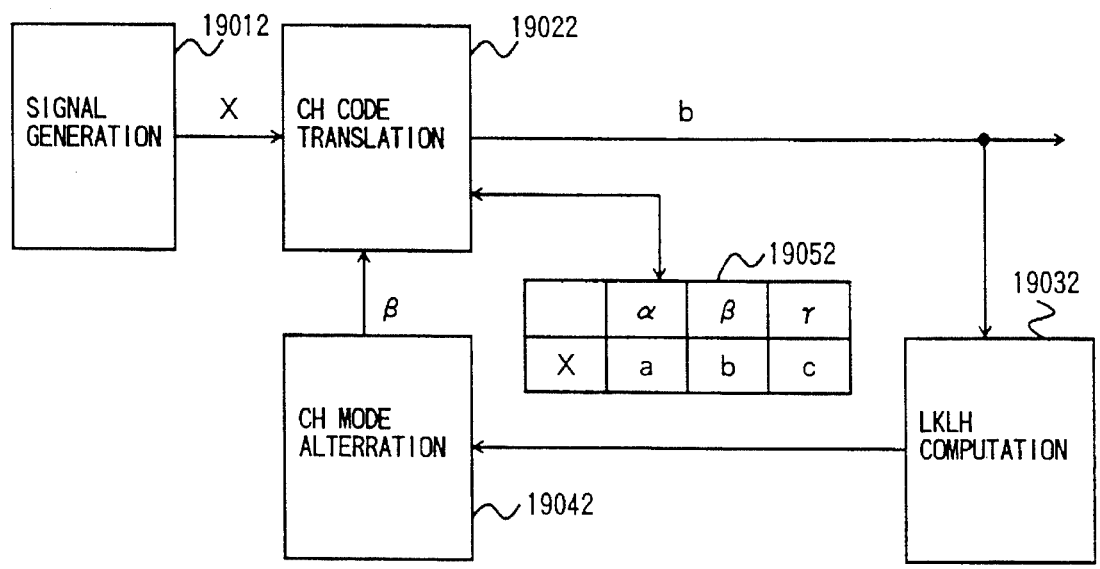

In FIG. 43(a), a signal "X" which represents character codes (a, b, c) in a plurality of character species ($\alpha$, $\beta$, $\gamma$) as produced from signal generation means 19012 is supplied to character code translation means 19022 and likelihood computation means 19032. The character code translation means 19022 delivers only one character code "b" by referring to a translation table 19052 on the basis of the supplied signal "X" and the character species (character modes). On the other hand, the likelihood computation means 19032 computes likelihoods corresponding to the supplied signal "X", by the use of a likelihood table not shown, and it notifies the computed results to character mode alteration means 19042. The character mode alteration means 19042 is adapted to alter the character species (character mode) on the basis of the notified likelihoods and to notify the character species (character mode) to the character code translation means 19022. Here, the character species (character mode) "$\beta$" is notified from the character mode alteration means 19042 to the character code translation means 19022. The character code translation means 19022 refers to the translation table 19052 on the basis of the character species (character mode) "$\beta$", and translates the signal "X" into the character code "b" which is delivered.

In FIG. 43(b), the character code "b" into which the signal "X" from the signal generation means 19012 has been translated by the character code translation means 19022 is supplied to the likelihood computation means 19032, in which likelihoods for the character code "b" are computed. The character mode alteration means 19042 is adapted to alter the character species (character mode) on the basis of the likelihoods and to notify the character species (character mode) "$\beta$" to the character code translation means 19022. The character code translation means 19022 refers to the translation table 19052 on the basis of the character species (character mode) "$\beta$", and translates the signal "X" from the signal generation means 19012 into the character code "b".

With the block arrangement shown in FIG. 43(a), the likelihood computation means 19032 estimates the signal data "X" itself, so that the accuracy of the likelihoods computed by the likelihood computation means 19032 heightens advantageously. On the other hand, with the block arrangement shown in FIG. 43(b), the likelihoods can be decided on the character already entered, so that the range of applications widens.

In the ensuing description of this embodiment, the fundamental construction thereof shall be assumed as shown in FIG. 43(a).

There will be explained an equipment, for example, a word processor in which the character inputting device according to the present invention is built.

Figure 26:
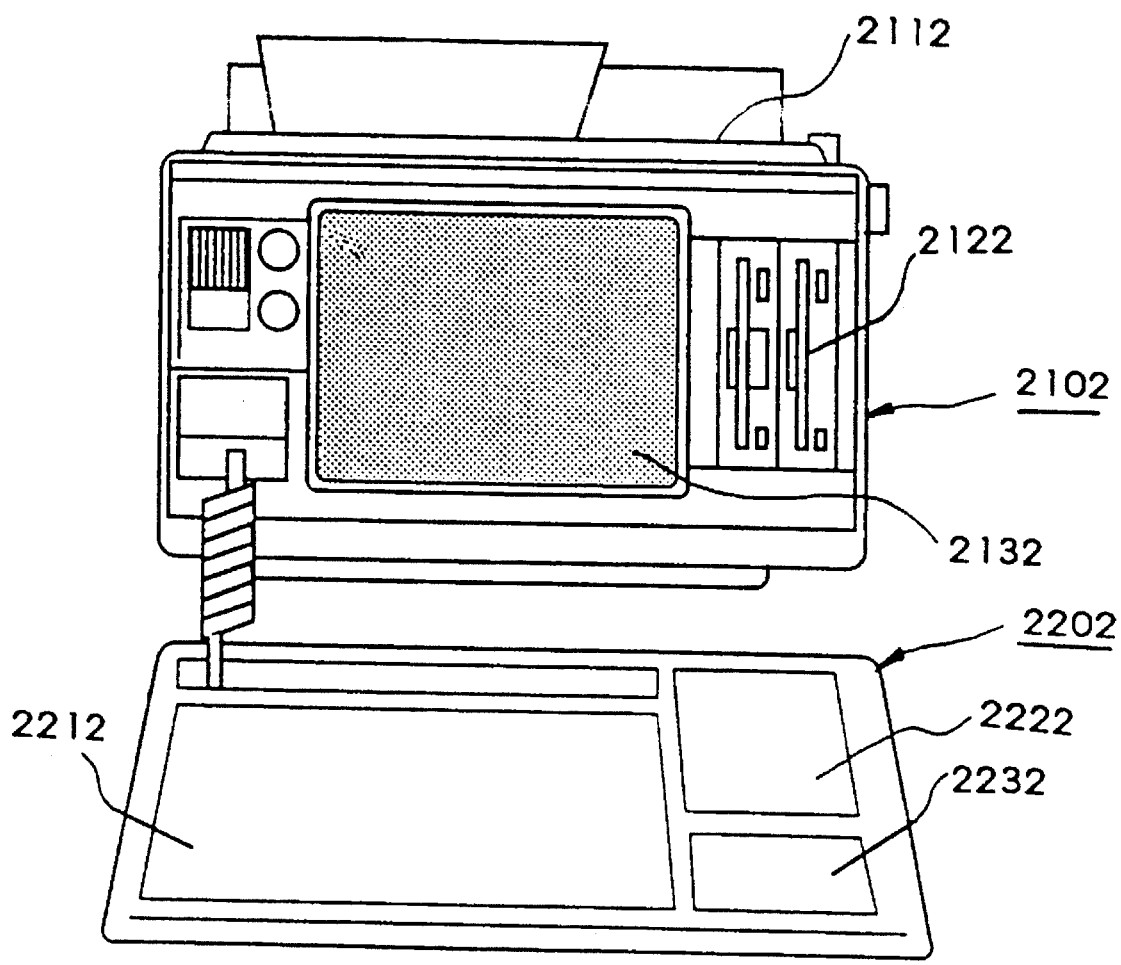

FIG. 26 is an exterior view of the equipment which is furnished with the fundamental functions of the exemplified word processor. The equipment comprises the equipment proper or the body of the equipment, 2102, a printer 2112, an auxiliary memory device 2122, a display unit 2132, and an input device 2202 which includes key blocks 2212, 2222 and 2232.

As illustrated in the figure, the equipment is constructed of the equipment proper 2102 which includes a controller configured of electronic circuits etc., and the input device 2202 through which characters and instructions are entered. The display unit 2132 displays entered character strings, messages to the user of the equipment, etc. on its screen. In addition, the equipment may well be provided with the printer 2112 for printing out the entered and edited character strings on sheets of paper, the auxiliary memory device 2122 for storing the entered and edited character strings in storage media such as floppy disks, though they are not always indispensable to the present invention.

The input device 2202 includes character keys for entering characters, mode designation keys for designating the individual input character species, function keys for giving instructions for editing character strings, position designation keys for designating the character string to-be-edited, and so forth. These keys are laid out separately in the form of the plurality of key blocks 2212, 2222 and 2232 so as to be easily operated.

Figure 27:
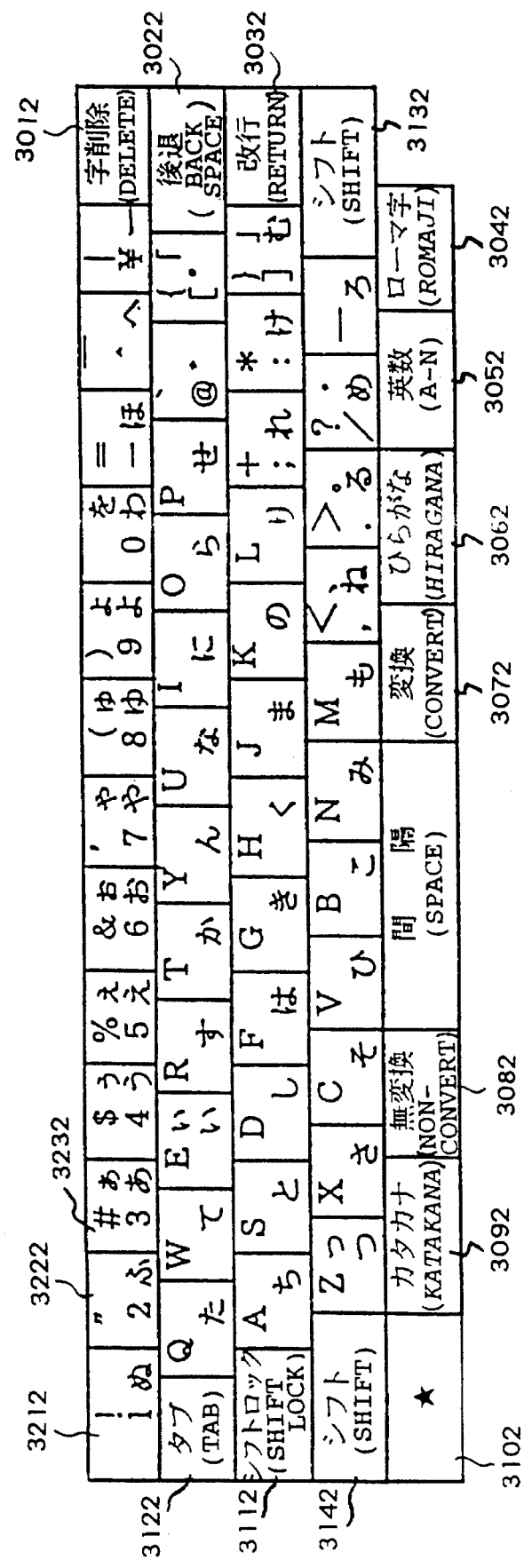

FIG. 27 is a plan view showing a practicable example of the key block 2212 of the input device 2202 depicted in FIG. 26. Numerals 3012, 3022, 3032, 3042, 3052, 3062, 3072, 3082, 3092, 3102, 3112, 3122, 3132 and 3142 indicate the keys for such editing functions as "return" and "delete" and the character mode designation keys for designating the character species, respectively. The other keys indicated at numerals 3212, 3222, 3232, etc. are the character keys for entering characters. Among the various keys mentioned above, the key 3102 is a function shift key which is used in combination with the other function keys. In this embodiment, as will be stated later, the user can enter the notification of a character code conversion by pressing the function shift key 3102 simultaneously with the "non-convert" key 3082.

Next, this embodiment will be described in more detail with reference to the drawings.

Figure 25:
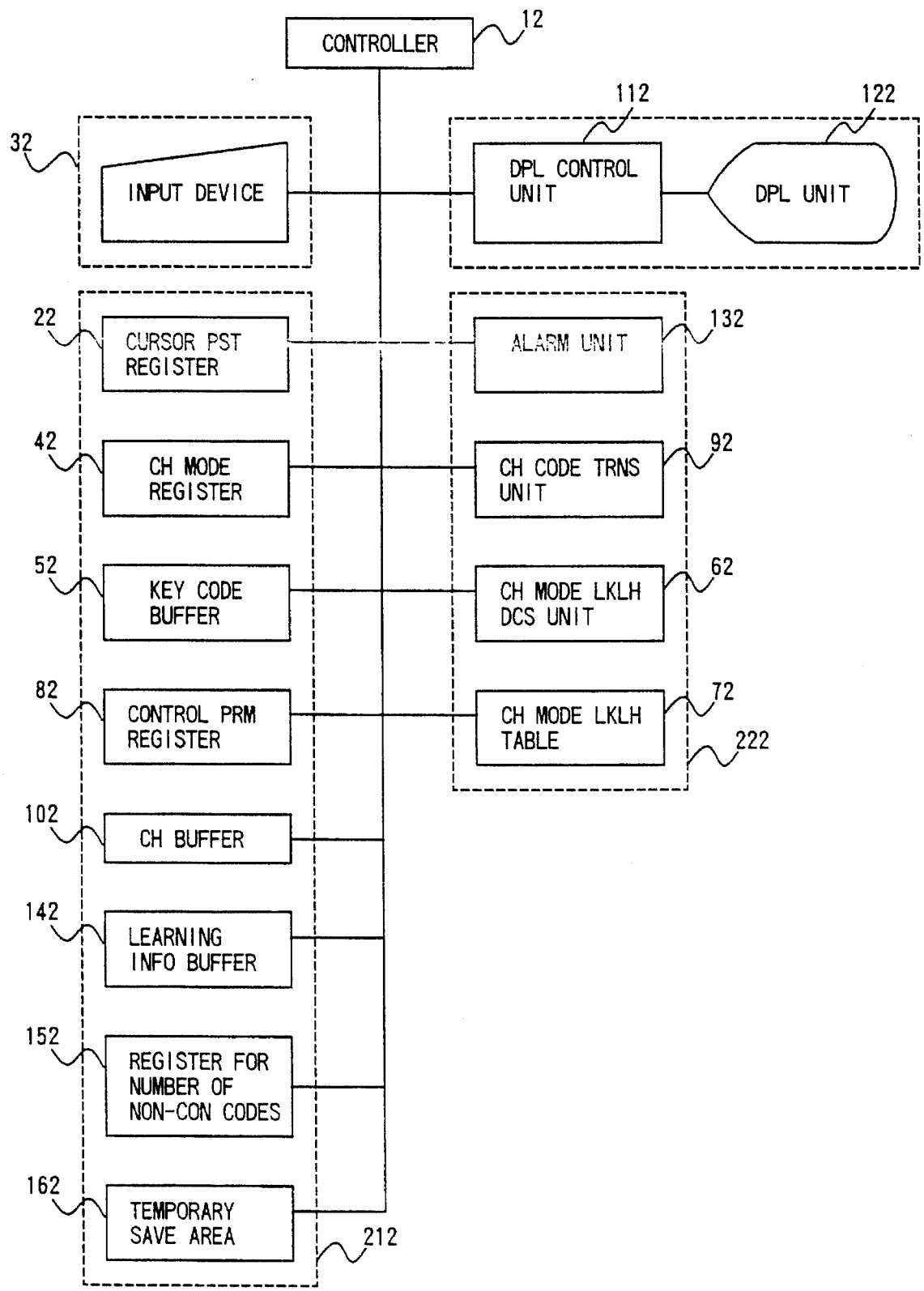

FIG. 25 is a block diagram showing the embodiment of the the character inputting method and device according to the present invention. This embodiment comprises a controller 12, a cursor position storing register 22, an input device 32, a character mode storing register 42, a key code buffer 52, a character mode likelihood decision unit 62, a character mode likelihood table 72, a control parameter storing register 82, a character code translation unit 92, a character buffer 102, a display control unit 112, a display unit 122, an alarm unit 132, a learning information buffer 142, a register 152 for storing the number of non-conversion codes, and a temporary save area 162 for the key code buffer 52.

The embodiment shown in FIG. 25 will now be explained in comparison with the fundamental arrangement shown in FIG. 43(a).

The controller 12 in FIG. 25 controls the operations of the whole inputting device, and it is constructed of a microprocessor by way of example.

The cursor position storing register 22 stores therein the positions of characters to-be-edited, and the positions of a character string which is a subject for substitution in the character inputting method of this embodiment. The input device 32 corresponds to the signal generation means 19012 in FIG. 43(a). When the user has pressed any of the character keys and the function keys in the input device 32 in order to enter the corresponding characters and the editing instructions etc., this device 32 generates the key code to be stated later, as the signal "X". The character mode storing register 42 stores therein the character modes for determining which of the character codes to be stated later, the key code of the character key entered from the input device 32 is translated into. This register 42 constitutes the character mode alteration means 19042 in FIG. 43(a), together with the controller 12. In the character mode storing register 42, at least the character mode having been set immediately before is stored besides the current character mode. The key code buffer 52 temporarily stores the string of the key codes of the character keys in time series therein. The character mode likelihood decision unit 62 decides the character mode of the highest possibility (the maximum likelihood character mode) by the use of the character mode likelihood table 72 and the key code string stored in the key code buffer 52. In addition, the character mode likelihood table 72 stores therein those likelihoods of the individual key codes in the respective modes which the character mode likelihood decision unit 62 refers to. The character mode likelihood decision unit 62 and the character mode likelihood table 72 constitute the likelihood computation means 19032 in FIG. 43(a). Further, the control parameter storing register 82 stores therein control parameters #1~#4 which determine the flow of the processing of the whole device. The significances etc. of the control parameters #1~#4 will be collectively explained later. The character code translation unit 92 translates the key code into the character code in conformity with the designated character mode, and corresponds to the character code translation means 19022 in FIG. 43(a). The character buffer 102 stores the translated character code therein. The display control unit 112 performs a display control for displaying the content of the character buffer 102 on the screen of the display unit 122. This display unit 122 is constructed of, for example, a CRT (cathode-ray tube) or LCD (liquid-crystal display) which presents inputs or an edited result to the user and which displays messages. The alarm unit 132 creates an alarm message and alters the parameters of the control parameter storing register 82 in a case where the controller 12 alerts the user on the basis of the decided result of the character mode likelihood decision unit 62. By the way, in this embodiment, the alarm unit 132 performs as alarm processing a series of processes which are executed in accordance with the decided result of the character mode likelihood decision unit 62.

Figure 64:
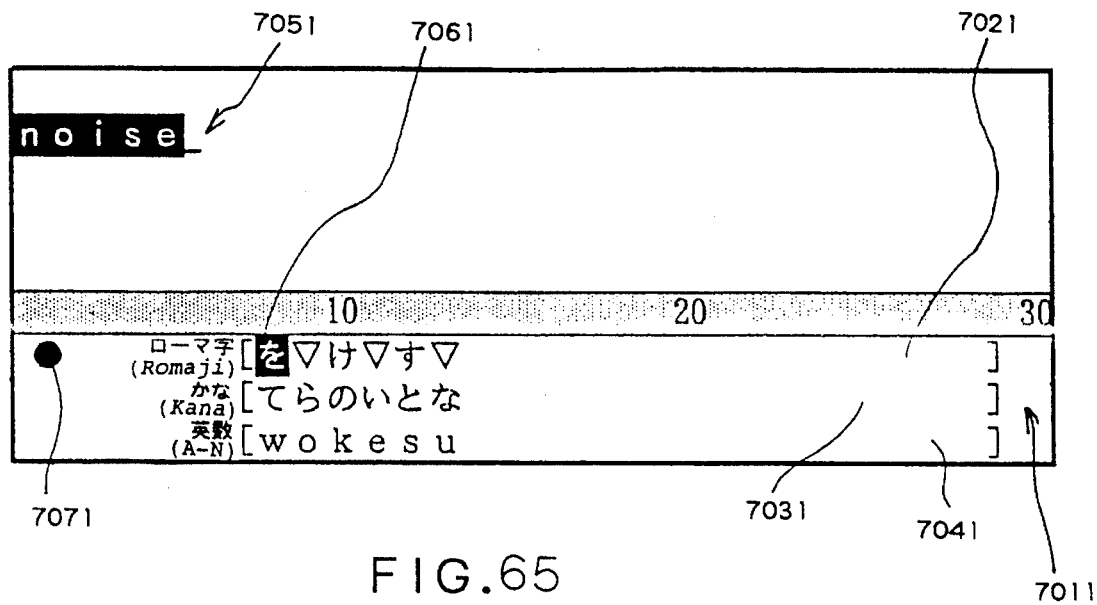

The learning information buffer 142 stores therein special key code strings which cannot be satisfactorily coped with by the ordinary character code translation process, and information items which designate the handling of the special key code strings. The character code translation unit 92 is permitted to perform more accurate translations by utilizing the contents of the learning information buffer 142. A concrete example of the learning information buffer 142 is illustrated in FIG. 64. More specifically, when any of the character mode designation keys 3042, 3052, 3062 and 3092 in FIG. 49 has been pressed, the character mode before being altered as stored in the character mode storing register 42 and the key code string stored in the key code buffer 52 are responsively registered in the learning information buffer 142. Besides, when the character mode conversion has been notified, the character mode having been set immediately before and the key code string stored in the temporary save area 162 for the key code buffer 52 are registered in the learning information buffer 142.

The register 152 for storing the number of the non-conversion codes is used when the key code which is a subject for the likelihood computations and the character code translation is to be determined in accordance with the contents registered in the learning information buffer 142.

When such a construction of this embodiment is expressed in terms of hardware devices, a block 212 enclosed with a broken line can be realized by a storage device capable of reading data therefrom and writing data thereinto, while a block 222 enclosed with a broken line can be realized by a storage device capable of, at least, reading data therefrom. In this case, a general-purpose processor can be employed as the controller 12.

By the way, regarding the second embodiment, an expression "key code generation means" in the appended claims corresponds chiefly to the input device 32. "Character code translation means" corresponds to the character code translation unit 92. "Likelihood computation means" corresponds to the character mode likelihood decision unit 62 and the character mode likelihood table 72. "Character mode alteration means" is realized by the controller 12, character code translation unit 92 and character mode storing register 42. "Learning information memory means" corresponds to the learning information buffer 142. "Comparison means" is realized by the controller 12, learning information buffer 142 and key code buffer 52. "Correction means" is realized by the controller 12, the input device 32, and the temporary save area 162 for the key code buffer 52. "Registration means" is realized by the controller 12, etc. "Character species designation means" is realized by the controller 12, input device 32, etc. "Load means" is realized by the controller 12, auxiliary memory device 2122, etc. It is to be understood, however, that the various components mentioned above operate in close association with one another and that the corresponding relations are not strict.

Figure 28:
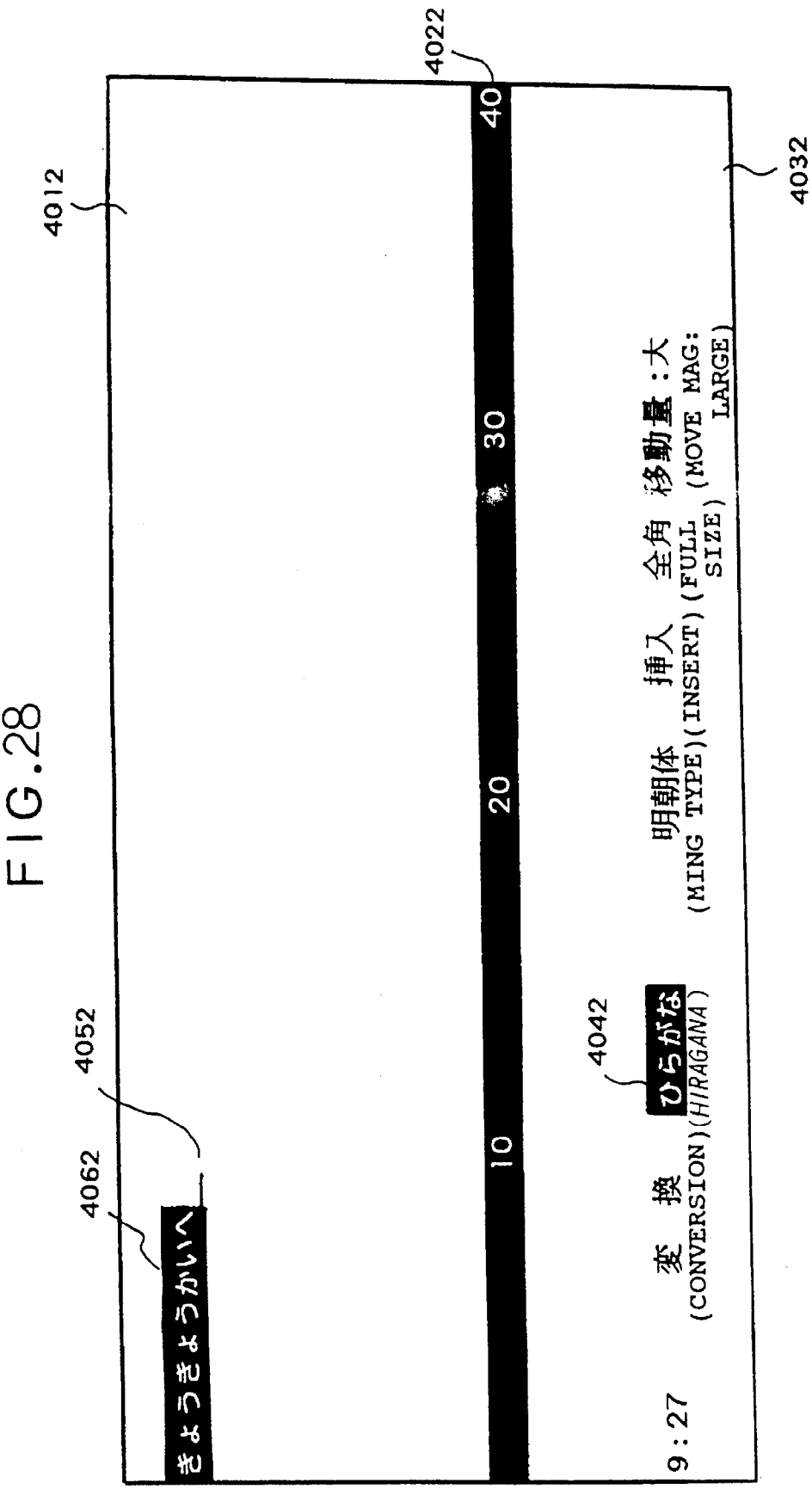

A concrete example of the screen display contents of the display unit 122 is illustrated in FIG. 28. A text area 4012 serves to display a character string stored in the character buffer 102. A column indicator 4022 indicates the column position of a character, while a guidance area 4032 indicates a message to the user or the state of the inputting device. Numeral 4042 denotes a guidance display which indicates the current character mode designation to be stated later, numeral 4052 denotes a cursor display which indicates the input position of a character, and numeral 4062 denotes the display of an already entered character string stored in the character buffer 102.

Next, the relationship between the character key and the character mode designation will be explained.

Referring to FIG. 27, there are four different characters carved on the key top of the character key 3232, for example, "3", "#", "あ" and "ぁ", which are respectively called "alphanumeric", "English symbol", "kana (Japanese syllabary)" and "kana symbol" species. The character mode designation keys 3052, 3062 and 3092 are used for designating which of the characters of such species the key input is caused to correspond to. According to the input device 32 in this embodiment, the hiragana (cursive form of "kana") mode designation key 3062, the katakana (square form of "kana") mode designation key 3092 and the alphanumeric mode designation key 3052 operate mutually exclusively. Once any of the designation keys 3052, 3062 and 3092 has been pressed, character codes conforming to the same designated mode are generated until another of these designation keys is subsequently pressed. The shift keys 3142 and 3132 are operation keys of the simultaneous press type. When either of these shift keys is pressed simultaneously with the character key, the character code of the English symbol species is generated for the alphanumeric mode designated, and that of the kana symbol species is generated for the hiragana or katakana mode designated. By way of example, after the <hiragana> key 3062 has been pressed, the character code of hiragana "あ" is generated by pressing the character key 3232, and that of kana symbol "あ" is generated by pressing the character key 3232 simultaneously with the shift key 3142 or 3132. This state continues until the <katakana> key 3092 or the <alphanumeric> key 3052 is subsequently pressed. FIG. 29 exemplifies characters which are generated when the character key 3232 is pressed in the respective character modes.

Next, the romaji (Roman character) mode designation key 3042 will be explained.

The romaji key 3042 is a key for designating the input system of hiragana or katakana characters. Each time this key 3042 is pressed, it changes over the romaji input system and the kana input system alternately. A known method is employed for the romaji conversion system or input system, by which romaji spelling entered with the character key layout regarded as the alphanumeric one is converted into a kana character (hiragana or katakana). Assuming by way of example that romaji spelling "kyo" has been entered with the character keys, it is converted into "きょ" within the inputting device. On the other hand, the kana input system is a system by which a kana character (hiragana or katakana) is entered in conformity with the kana key layout. The conversion from the romaji spelling into the kana character is effected by the character code translation unit 92.

In the ensuing description of this embodiment, the hiragana character mode of the romaji input system shall be termed the "romaji-hiragana mode", the katakana character mode of the romaji input system the "romaji-katakana mode", the hiragana character mode of the kana input system the "kana-hiragana mode", and the katakana character mode of the kana input system the "kana-katakana mode".

Incidentally, the present invention is not restricted to the inputting device as stated above, but it is applicable to general devices which enter signals by the use of keys. Moreover, although the keyboard layout of the key block shown in FIG. 27 conforms to JIS (Japanese Industrial Standard) "X6002", the present invention can be performed without any problem even with any other keyboard layout.

Figure 30:
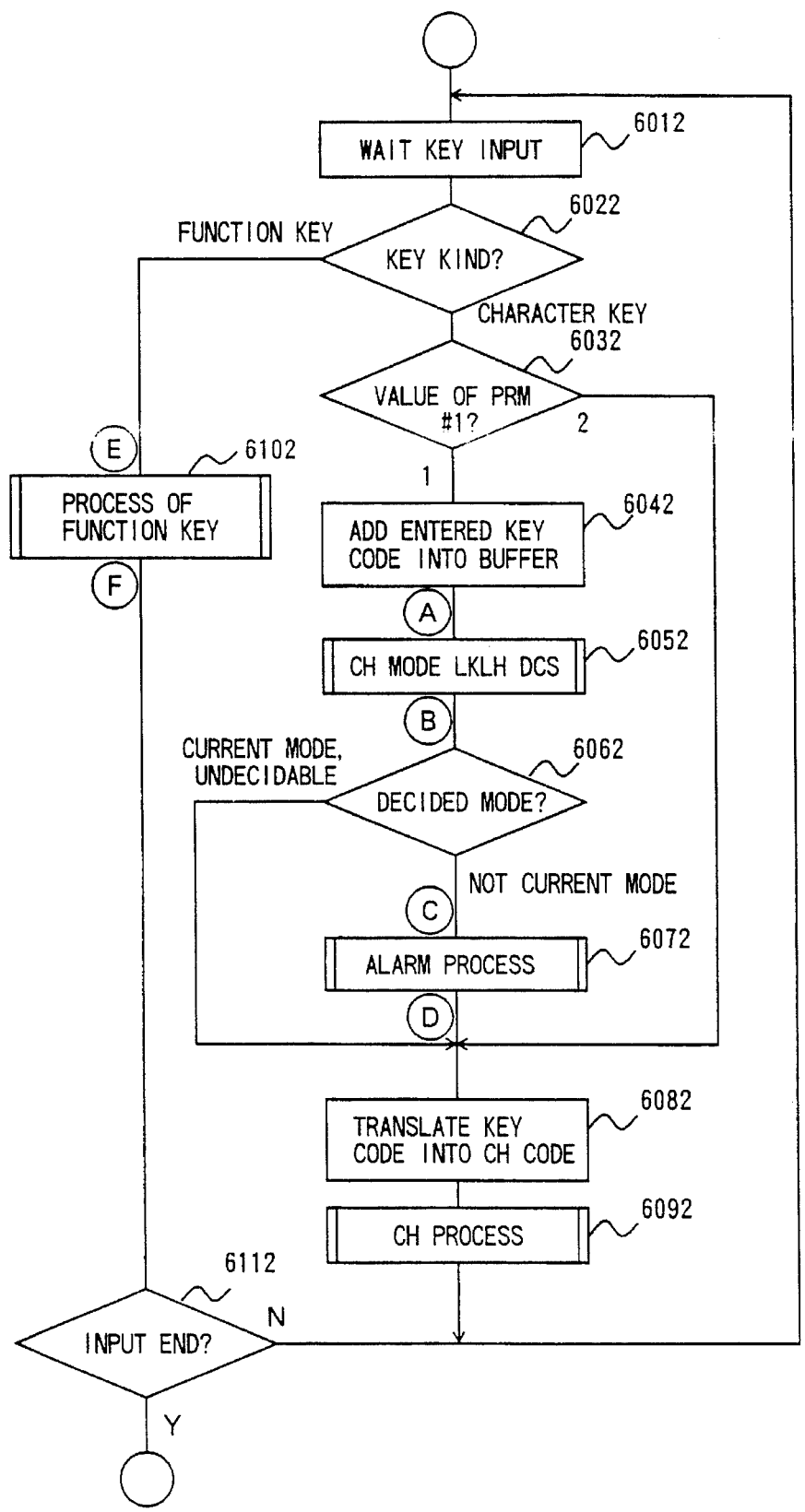

Now, the character inputting method in the character inputting device in this embodiment will be outlined with reference to FIG. 30.

This embodiment can automatically decide a correct mode and perform a suitable process such as alarming the user, even in a case where the user has erroneously pressed the mode designation key, for example, a case where in spite of intending to enter English characters, he/she has forgotten to press the <alphanumeric> key 3052 and has pressed character keys in the hiragana character mode left intact.

When the character inputting device is started, it falls into the state in which it waits a key input (step 6012). When the user enters the key input by operating the input device 2202 under this state, the kind of a pressed key is decided (step 6022). The routine proceeds to a step 6032 on condition that the pressed key has been decided any character key, whereas it proceeds to a step 6102 on condition that the pressed key has been decided any function key or any mode designation key unlike any character key.

At the step 6032, the control parameter #1 stored in the control parameter storing register 82 is referred to. The control parameter #1 is a parameter for selecting and determining whether or not the character mode likelihood decision and the issue of an alarm are to be made. In a case where the control parameter #1 is set to "2", neither the character mode likelihood decision nor the issue of an alarm is made, and the routine proceeds to a step 6082 at which only the character input process is performed. On the other hand, in a case where the control parameter #1 is set to "1", the routine proceeds to a step 6042 in order to perform the character mode likelihood decision and the issue of an alarm. The control parameter #1 will be explained in detail later.

In the case where "1" is set as the control parameter #1, a key code generated by the pressed key is added into the key code buffer 52, and such key codes are time-serially stored as a key code string in this buffer (step 6042). The character mode likelihood decision unit 62 performs the character mode likelihood decision process on the basis of the key code string stored in the key code buffer 52, thereby to decide the character mode of the highest possibility or the maximum likelihood (step 6052). The character mode likelihood decision process will be detailed with reference to FIGS. 31(*a*)–34, etc. later. The next step 6062 decides whether or not the character mode decided at the step 6052 is the same as the currently set one. In a case where the decided character mode is the same as the current one, or where the decision at this step 6062 is impossible, the routine proceeds to the step 6082 without any processing. On the other hand, in a case where the decided character mode differs from the current one, the alarm unit 132 performs the alarm I process at a step 6072, which is followed by the step 6082. The alarm process at the step 6072 will be detailed with reference to FIG. 36, etc. later.

At the step 6082, the character code translation unit 92 translates the entered key code into a character code in conformity with the set character mode. The translated character code is stored in the character buffer 102 as the character process (step 6092). Thereafter, the routine returns to the key input process of the step 6012 again.

The above series of processes are iterated until the process of a step 6112 becomes an end in such a way that the user presses a function key indicative of the end of a character input process or a document creation process.

Next, the character mode likelihood decision process which is executed at the step 6052 will be outlined.

Here, the key layout in the keyboard is as shown in FIG. 27. Assuming now that the user has pressed character keys in a sequence shown in FIG. 31(*a*) in order to enter a character string "きょうきょうかいで" through the key operations of this keyboard, the desired character string is properly obtained in a case where the set character mode is the kana-hiragana mode.

However, in a case where key inputs have been entered in the same sequence as shown in FIG. 31(*a*) with the set character mode left in the alphanumeric mode due to the user's error of the designation of the character mode, an obtained character string becomes "g)4g)4tew@". To the contrary, in a case where key inputs have been entered in a sequence shown in FIG. 31(b) in order to enter a character string "information", a result "にみはらすもちかにらみ" is obtained on condition that the set character mode is the kana-hiragana mode.

Meanwhile, frequency in appearance of an alphabetic character in English writing or a kana character in Japanese writing exhibits a substantially constant value statistically though it somewhat differs depending upon sentences. The frequency in appearance can be evaluated by any of several methods such as a method utilizing the number of times of appearance of each character and a method utilizing the number of times of appearance of each combination of adjacent characters. In the character mode decision unit 62, the likelihood of every character string (the degree at which the character string is probable) is obtained by fundamentally using a value based on the number of times of appearance of each character, as stated below.

First, the frequency of appearance Pa of a certain character a in every character mode is evaluated beforehand. Subsequently, the likelihood V of every character string is obtained by computing Formula (1) indicated in FIG. 32, with the frequencies of appearance Pa of the individual characters contained in the pertinent character string.

In Formula (1), letter R denotes a value which is peculiar to every character mode and which is used in case of normalizing the values of the likelihoods V and making absolute comparisons. The frequencies of appearance of the individual character strings can be compared by comparing the likelihoods V. In other words, which of the character strings "きょうきょうかいで" and "g)4g)4tew@" is more likely or probable can be known by comparing the likelihoods V.

The likelihoods V of the character strings as stated above are evaluated for the respective character modes so as to decide whether or not the character mode currently set is correct. The likelihood decision process will be described in more detail below.

First, the character mode likelihood table 72 for use in the character mode likelihood decision process will be explained.

FIG. 33 illustrates an example of the character mode likelihood table 72, which is formed of the key codes of the various keys shown in FIG. 27 and the character codes and likelihoods thereof in the respective character modes. The key codes are values which are given to the character keys in FIG. 27. More specifically, the key codes "01" thru "48" correspond respectively to 48 keys from the uppermost left-hand key toward the lowermost right-hand key of the keyboard layout, except the "space" key, in such a manner that the keys 3212, 3222 and 3232, for example, are respectively endowed with the key codes "01", "02" and "03". In addition, the key codes in the case of pressing the "shift" key 3132 or 3142 and character keys of the simultaneous press type are "49" thru "96", which correspond to the respective character keys similarly. When the crossing column of each key code and any of the character modes is referred to, the likelihood of the corresponding character code in the pertinent character mode can be found. By the way, in this embodiment, values which can be directly added as indicated by Formula (2) in FIG. 32 are stored in the columns of the likelihoods.

Besides, in this embodiment, the character mode likelihood table 72 is constructed so as to be also usable for the character code conversion. By way of example, in case of pressing the key 3232 when the current set character mode is the alphanumeric mode, a character code "3" can be established as seen by referring to the character code contained in the crossing column between the key code "03" and the alphanumeric mode, and in case of pressing the key 3232 simultaneously with the "shift" key 3242, a character code "#" can be established as seen by referring to the content of the crossing column between the key code "51" and the alphanumeric mode. Further, it is possible to obtain a key code from a character mode and a character code contrariwise.

Besides, the "space" key has no shift code and has common likelihoods in all the character modes. The key code of the "space" key is directly translated into the character code of "space", and is set at "00".

Next, a procedure which the character mode likelihood decision unit 62 executes actually in the character mode likelihood decision process (step 6052 in FIG. 30) will be explained with reference to FIG. 34.

By way of example, here will be explained a case where the set character mode is the alphanumeric mode and where a key code string "14, 24, 19, 23" has been entered (refer to FIG. 33).

Figure 35:
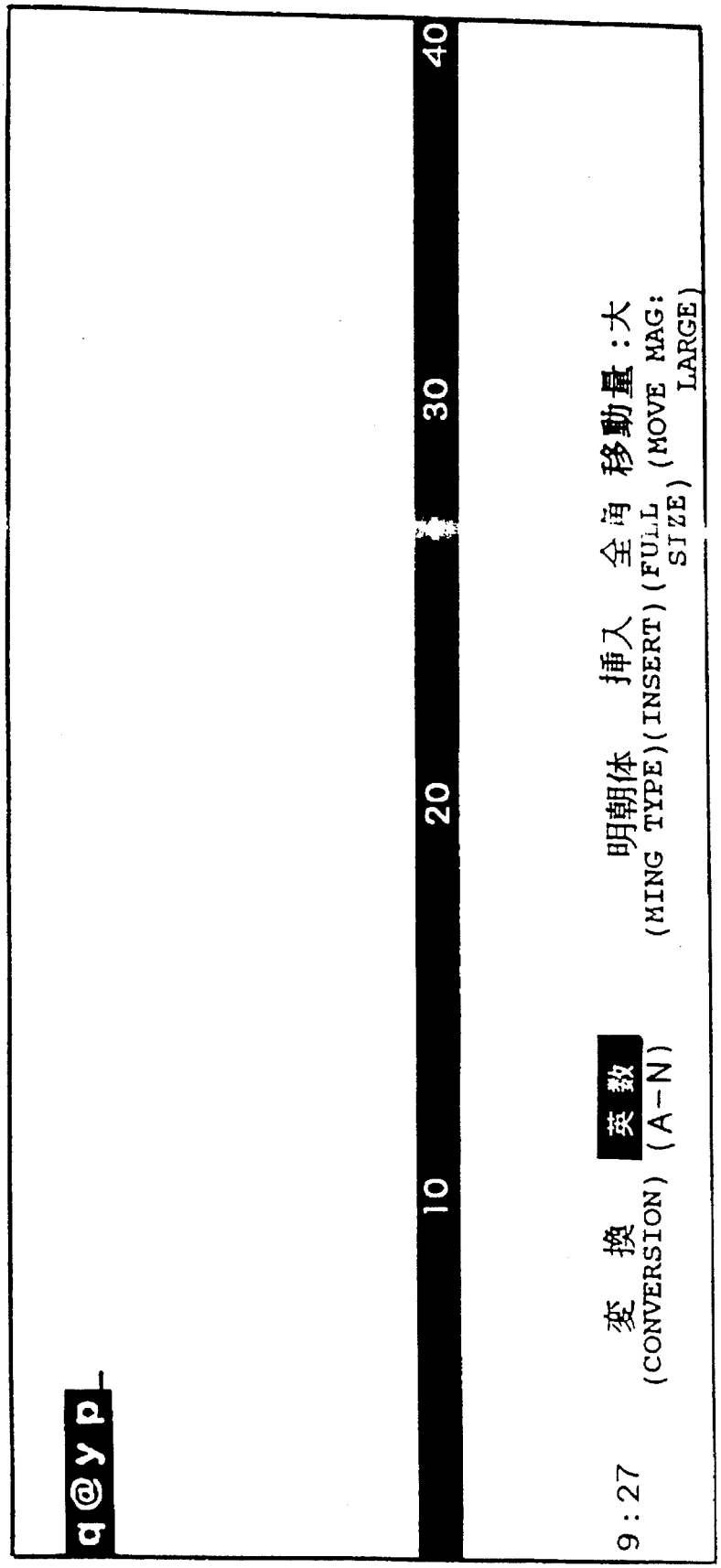

A character code string "q@yp" corresponding to the input key code string "14, 24, 19, 23" as seen from FIG. 33 is stored in the character buffer 102, and a picture as shown in FIG. 35(a) is displayed on the screen of the display unit 122.

Under such a state, the character mode likelihood decision unit 62 refers to the control parameter #4 (step 10012). The control parameter #4 serves to designate the character input system concerning, e.g., whether or not the character mode likelihood decision process is to be executed. It is now assumed that a value representative of feasibility is stored as the control parameter #4.

At steps 10022, 10032, 10042 and 10052, a key code string part which is a subject for likelihood computations (steps 10062–10172 to be stated below) is determined using the contents of the learning information buffer 142 and the register 152 for the number of non-conversion codes. Incidentally, the details of the steps 10022–10052 will be separately explained. It is assumed here that any learning information being the subject for such processing is not registered, and that the number of non-conversion codes is set at "0".

Subsequently, the routine proceeds to the step 10062 at which the likelihoods of the respective modes are computed. In the case where the number of non-conversion codes is "0" as premised here, the likelihoods are computed for all the key codes stored in the key code buffer 52.

First, the decision unit 62 computes the likelihood Vrh with the key codes regarded as conforming to the romaji-hiragana mode. The computation is done by totaling the likelihoods of the individual characters listed in the character mode likelihood table shown in FIG. 33. In a case where a key code "16" has been entered anew in the aforementioned example, the key code string stored in the key code buffer 52 becomes "14, 24, 19, 23, 16", and the likelihood in the romaji-hiragana mode supposed becomes Vrh=0+0+65+25+78=168. Likewise, the decision unit 62 computes the likelihood Vkh in the kana-hiragana mode supposed, the likelihood Vrk in the romaji-katakana mode supposed, the likelihood Vkk in the kana-katakana mode supposed, and the likelihood Ve in the alphanumeric mode supposed. In the aforementioned example, the likelihoods become Vkh=328, Vrk=173, Vkk=294, and Ve=166.

Subsequently, the character mode of the maximum likelihood is decided using discriminants #1~#5 indicated in FIG. 32, at steps 10072, 10082, 10092, 10102 and 10112.

In each of the discriminants #1–#5, letter T denotes a control parameter which indicates a predetermined threshold value, and as which a suitable value is set and stored in the control parameter storing register 82 by the controller 12. In cases where the discriminants #1, #2, #3, #4 and #5 hold true, the routine proceeds respectively to the corresponding steps 10122, 10132, 10142, 10152 and 10162, at which values indicative of the character modes are set as the most likely or probable modes. In a case where all the discriminants #1–#5 have become false, or a case where a value representative of unfeasibility is stored as the control parameter #4, a value indicative of undecidability is set as the most likely or probable mode. Assuming now that the control parameter is set at T=30 in the discriminants #1–#5, the following is obtained:

max(Vrk, Vkh, Vkk, Ve)+30=358
max(Vrh, Vrk, Vkk, Ve)+30=324
max(Vrh, Vkh, Vkk, Ve)+30=358
max(Vrh, Vkh, Vrk, Ve)+30=358
max(Vrh, Vkh, Vrk, Vkk)+30=358

Figure 52:
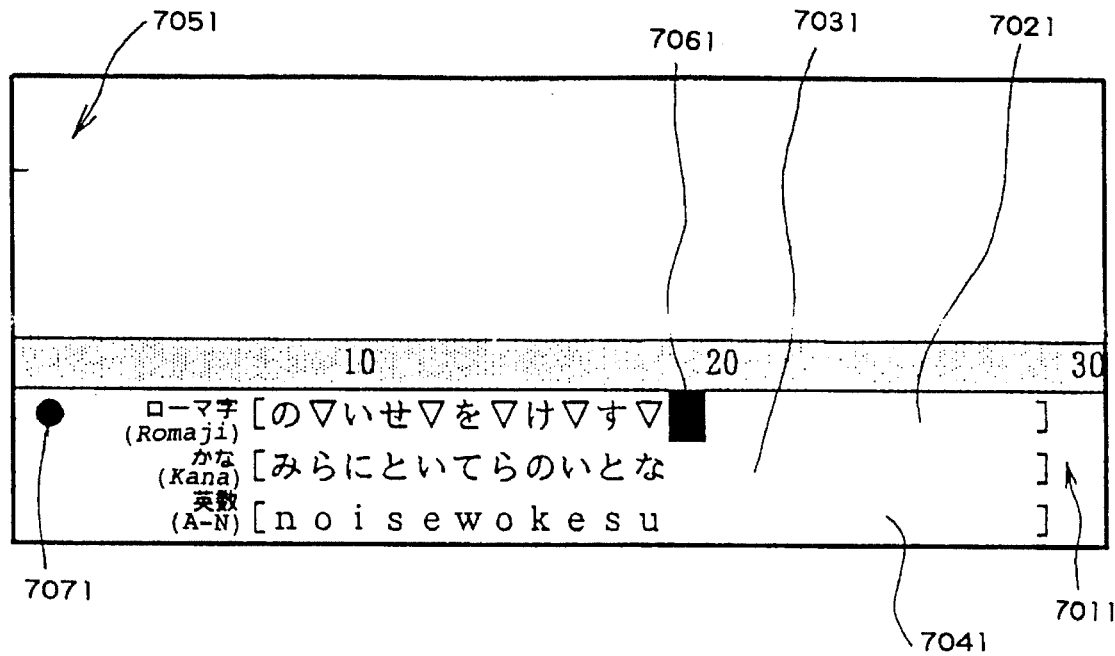

Therefore, only the discriminant #2 holds true, and the routine proceeds to the step 10132, at which the value which indicates the kana-hiragana mode is set as the character mode of the maximum likelihood. Then, the character mode likelihood decision process 6052 in FIG. 52 is ended and is followed by the step 6062.

At the step 6062, the maximum likelihood mode obtained in the above way and the current character mode are compared as already stated. Since, in the aforementioned example, the current character mode is the alphanumeric mode, the maximum likelihood mode ≠ the current character mode holds, and the step 6062 is followed by the alarm process (step 6072).

Next, the alarm process (step 6072) in FIG. 30 will be explained with reference to FIG. 36.

Figures 37, 38:
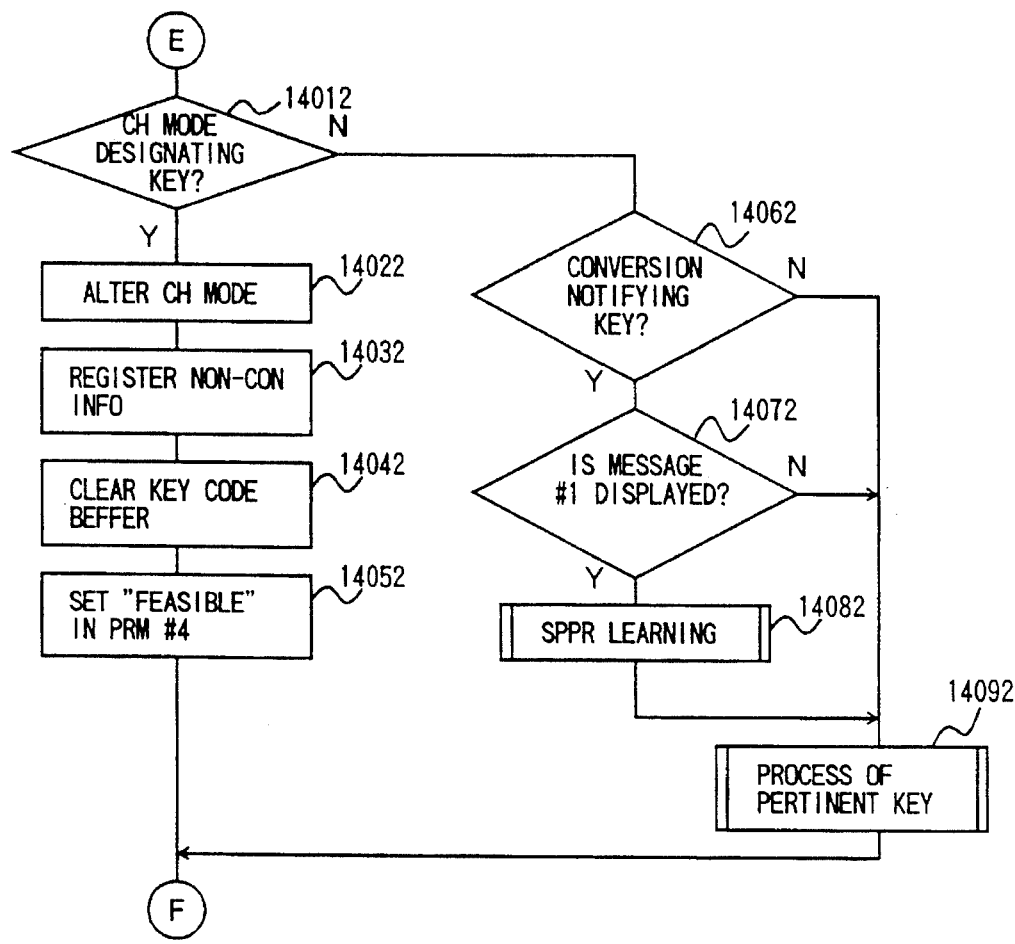

First, the control parameter #2 stored in the control parameter storing register 82 (FIG. 25) is referred to (step 12012). As will be stated later, the control parameter #2 serves to control an alarming system. It is assumed here that "1" is set as the control parameter #2. Then, the character code columns of the character mode likelihood table 72 (FIGS. 25 and 33) are referred to using the key codes stored in the key code buffer 52 and the value of the maximum likelihood mode set before, and the already entered character string in the character buffer 102 is substituted by a character string in the new mode (step 12022). Further, the value of the current character mode is altered to the value of the maximum likelihood mode (step 12032). Besides, a message #1 as indicated in FIG. 37 is displayed on the Screen of the display unit 122 (FIG. 25), thereby to guide the alteration of the character string as well as the character mode and how to resume the original character mode to the user (step 12042). Subsequently, the content of the key code buffer 52 is temporarily saved in the key-code-buffer temporary save area 162 in order to be used in the learning registration (step 12052). In addition, the key code buffer 52 is cleared in preparation for the decisions of the character mode likelihoods of a key code string which is subsequently entered (step 12062).

Owing to such processing operations, in the foregoing example, the character string "q@yp" is substituted by a character string "だんせ", and the character mode is altered from the alphanumeric mode to the kana-hiragana mode. Accordingly, a picture shown in FIG. 35(*b*), in which the character string "だんせ" and the message #1 in FIG. 37 are respectively presented in the text area 4012 and the guidance area 4032, is displayed on the screen of the the display unit 122.

By the way, in a case where the result of the character code translation lies halfway of romaji spelling in the romaji mode decided the maximum likelihood mode, some of devices avoid the display of the romaji character in the course of the conversion, and others display it in a guidance column. In this embodiment, on condition that the input mode before or after the alteration is the romaji mode, in the case where the alarm is to be issued in the course of the romaji-kana conversion, the alarm process is reserved until the romaji character in the course of the conversion is completely converted into a kana character. This can prevent the user from erring in his/her key input operation after the issue of the alarm.

Referring back to FIG. 36, in a case where the step 12012 has decided that the control parameter #2 is set to "2", a character inputting system is taken which performs neither the substitution of the already entered character string nor the alteration of the character mode.

More specifically, a message #2 indicated in FIG. 37 is displayed in the guidance area 4032 of the screen of the display unit 122 (step 12072), thereby to request the user to confirm if the character mode is correct, and to guide a method for altering the character mode of the input character string. Subsequently, the control parameter #3 stored in the control parameter storing register 82 is referred to (step 12082). The control parameter #3 is a parameter for controlling the character inputting method. In a case where "1" is stored as the control parameter #3, the routine proceeds to the steps 12052 and 12062, at which the key code buffer 52 has its content saved temporarily and is cleared as stated before. Thus, even in a case where the next key input operation has been performed, the character mode likelihood decision process (step 6052 in FIG. 30) can be executed. On the other hand, in a case where "2" is stored as the control parameter #3, a character inputting system is taken which suppresses or restrains the character mode likelihood decision process (step 6052) for an appropriate time period, for example, until the character mode designation is subsequently altered, and the value representative of "unfeasibility" is set as the control parameter #4 (step 12092). Thus, in a case where the user continues to enter inputs in the current character mode, any superfluous message is output.

The alarm process (step 6072) in FIG. 30 is ended as thus far described, and it is followed by the steps 6082 and 6092, at which the key code of a character key pressed anew is handled. In the foregoing example, the key code is "16", and the character mode has been altered to the kana-hiragana mode, so that a character code "い" is added into the character buffer 102 and is displayed on the screen of the display unit 122. Thereafter, the routine in FIG. 52 returns to the step 6012, and the above processes are iterated until the end of the character input operation is instructed with the function key.

The above explanation corresponds to the case where the key input at the step 6012 in FIG. 30 is of any character key. Next, there will be explained processing in the case where this key input is of any character mode designation key.

When any character mode designation-key has been pressed (step 6012), it is decided at the step 6022, which is followed by the step 6102. The process of the step 6102 will be explained with reference to FIG. 38 below.

First, whether or not the input key is any character mode designation key is decided (step 14012).

In the case where the input key is of the kind of character mode designation keys, the setting of the character mode is altered as stated before (step 14022). By way of example, when the <katakana> key 3092 (FIG. 27) is pressed with the character mode set at the alphanumeric mode, the character mode is set at the katakana mode anew. On this occasion, the katakana mode and the alphanumeric mode are respectively stored as the current input mode and the last input mode in the character mode storing register 42 (FIG. 27). Subsequently, the content of the key code buffer 52 is registered as non-conversion learning information (which corresponds to setting a kind at "non-conversion" in FIG. 42) in the learning information buffer 142 as will be stated later (step 14032), and the key code buffer 52 is cleared (step 14042). The steps 14032 and 14042 serve to prevent an erroneous result from developing due to the use of previous key code data when the likelihood of the new character mode is evaluated. Lastly, the control parameter #4 is set at the value representative of "feasibility" (step 14052). This setting is done in order to restart the character mode likelihood decision process which has been suppressed in the foregoing case of the value "2" of the control parameter #3.

By the way, the non-conversion learning which is executed at the step 14032 will be separately detailed as a non-conversion learning process.

On the other hand, in a case where the input key is not of the kind of character mode designation keys at the step 14012, whether or not the input is the notification of a character code conversion is subsequently decided (step 14062). On condition that the decided result is the notification of the character code conversion, whether or not the message #1 is under display is decided (step 14072), and suppression to the character code conversion is learnt (step 14082), whereupon the routine proceeds to a step 14092. Herein, the steps 14072 and 14082 constitute a process in which the user's input content or correction content is learnt so as to suppress the execution of the likelihood decision process, thereby intending to prevent the character mode decision from erring. These steps 14072 and 14082 will be separately detailed as a suppression learning process. On condition that the key input is not the notification of the character code conversion at the step 14012, the routine proceeds to the step 14092 directly.

At the step 14092, the corresponding process of each key input is executed. In response to the notification of the character code conversion, for example, the character code and the input mode are altered to ones corresponding to the value of the control parameter #2, etc. at that time. This alteration process will also be detailed as the function of the character code conversion notification later. The concrete contents of processes which are executed in response to the other key inputs shall be omitted from description.

Next, the control parameters #1~#4 mentioned before will be elucidated.

The control parameter #1 serves to select if the character inputting method of this embodiment is to be used, and it can be set by the user's operation of predetermined function keys. In this case, the character inputting method of this embodiment is used when "1" is set as the control parameter #1, and it is not used when "2" is set.

The control parameter #2 serves to select any of several character inputting systems in this embodiment. When "1" is set as the control parameter #2, a message is displayed as an alarming expedient, a character string already entered is translated into character codes, and a current character mode is altered. On the other hand, when "2" is set, only the message display is performed. Likewise to the control parameter #1, the control parameter #2 can be set by the user. Moreover, the setting of the control parameter #2 can be altered in accordance with the number of key codes in the key code buffer 52 by the controller 12.

By way of example, when the number of key codes is smaller than 10, "1" is set as the control parameter #2, and when the number is at least 10, "2" is set Thus, the character inputting device can be so controlled that the character code translation of the already entered character string and the alteration of the character mode are carried out in case of executing the alarm process (shown in FIG. 58 and corresponding to the step 6072 in FIG. 30) when the number of key inputs is less than 10, and that only the message display is carried out when the number has reached 10. This expedient is reasonable and favorable considering the fact that the user often confirms the character mode and the already entered character string on the screen before the number of key inputs exceeds a certain number.

It is also possible for the controller 12 to change the set value of the control parameter #2 in accordance with the threshold value T mentioned before. By way of example, while the threshold value T is set low, the accuracy of the likelihoods is low, so that the set value of the control parameter #2 is held at "2" for carrying out only the message display. In contrast, in a case where the threshold value T is set high, the accuracy of the likelihoods is high, that is, the error of the user's character mode designation is highly possible, so that the set value is made "1" so as to carry out the character code translation of the already entered character string and the alteration of the character mode. Thus, the effect of the present invention can be intensified.

Further, it is possible to set the control parameter #2 by combining the number of key codes and the threshold value T. By way of example, before the number of key codes reaches a predetermined number N, a large value T1 and the value "1" are respectively set as the threshold value T and the control parameter #2. In contrast, when the number N has been reached, a small value T2 and the value "2" are respectively set as the threshold value T and the control parameter #2. Thus, below the number N of key codes, the character code translation of the already entered character string and the alteration of the character mode are carried out owing to the high accuracy, and at or above the number N of key codes, the message display is carried out even for the small difference of the likelihoods.

The control parameter #3 is a parameter which is used in a case where the control parameter #2 is set to "2" and where the user has continued a key input operation without performing the alteration of the character mode designation, or the like, after the message display, and which controls if the character mode likelihood decision is to be rendered for the continuous key input. In a case where "1" is set as the control parameter #3, the character mode likelihood decision is rendered anew for the continuous key input. This is effective in a situation where the user is liable to erring in the character mode designation. On the other hand, in a case where "2" is set as the control parameter #3, the execution of the character mode likelihood decision is suppressed or restrained until the character mode is subsequently altered with any of the character mode designation keys. This is effective when an erroneous decision is to be prevented from hampering an input operation in a situation where the user is skilled and hardly errs in the character mode designation. The user can set the control parameter #3 likewise to the control parameter #1.

The control parameter #4 is a parameter for controlling if the character mode likelihood decision process (step 6052 in FIG. 30) is to be executed after the key code has been registered in the key code buffer 52 (step 6042). The set value of the control parameter #4 can be altered in accordance with, e.g., the number of key codes by the controller 12. By way of example, the control parameter #4 is set at a value indicative of the unfeasibility of the character mode decision below a predetermined number N in terms of the number of key codes, thereby making it possible to avoid the decision before the predetermined number N of characters is reached. It is also possible to avoid the character mode likelihood decision at or above the predetermined number N of characters contrariwise.

Figure 36:
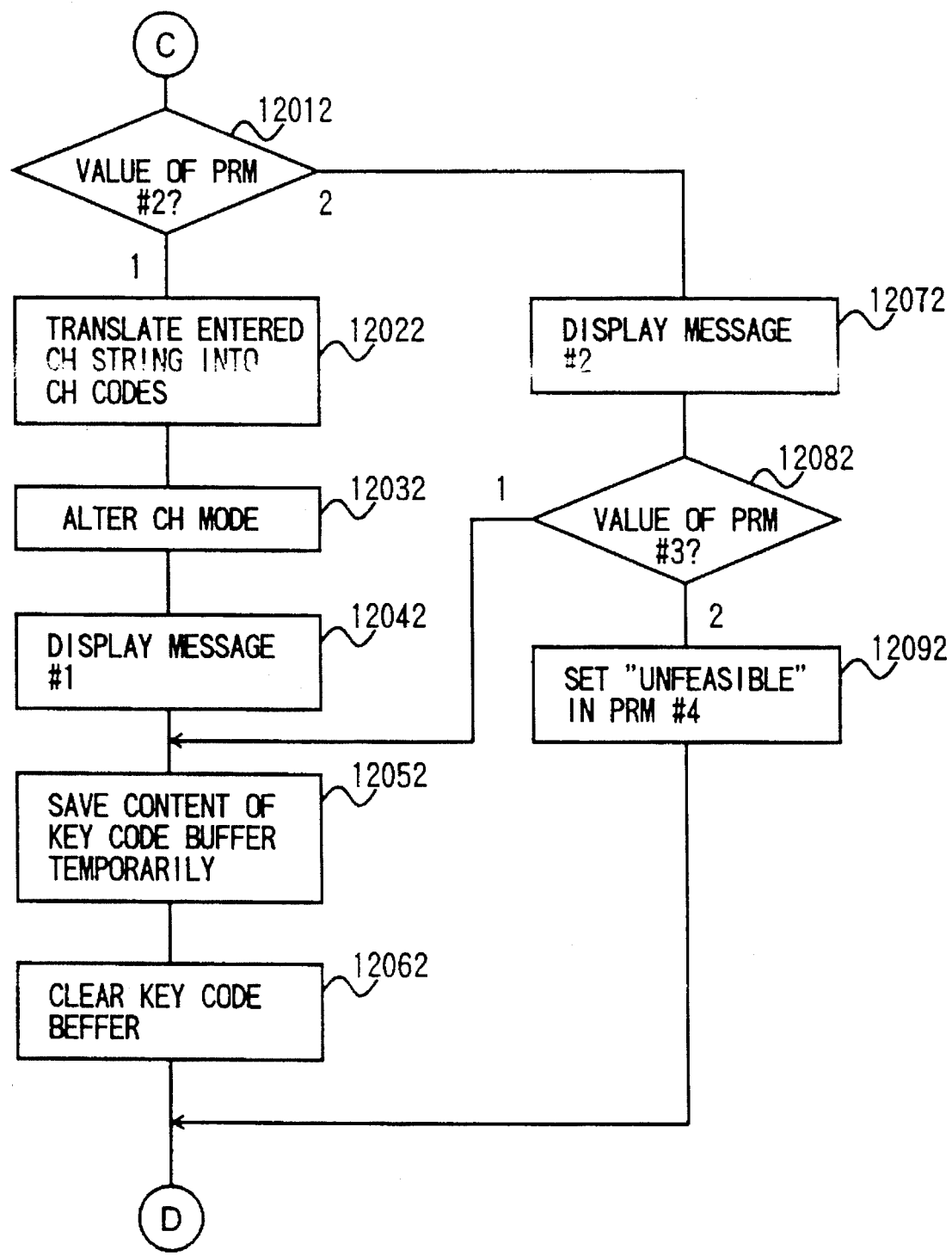

Although omitted from detailed description, such a character inputting system as performing only the alteration of the character mode or only the character code translation of the already entered character string can be easily realized by providing a parameter separately and adding a decision process for this parameter between the steps 12022 and 12032 in FIG. 36.

Besides, the character inputting method and device of this embodiment can be adopted in combination with a kana-kanji conversion device (where kana is the Japanese syllabary, and kanji is a Chinese character used in Japanese writing). Herein, in a case where so-called "sequential conversion" is employed as a kana-kanji conversion system, the kana-kanji conversion can take place simultaneously with the alteration of the character mode in this embodiment. For the purpose of coping with such a situation, it is permitted to change the setting of the control parameter #1 to "2" when the sequential conversion is designated. Also, the user is permitted to designate if the setting is to be made.

The notification of the character code conversion serves to give the instruction of inversely translating a character string to-be-translated (for example, a character string displayed on the front or left side of a cursor) into a key code string and translating the key code string into character codes in another character mode anew. The reason why such an operation is provided, is that the result of the likelihood decision might become erroneous for some key inputs. In this embodiment, the "other character mode" after the character mode alteration differs in accordance with the values of the control parameter #2, etc.

In a case where the character code conversion notification has been entered or given in the state in which the message #1 is displayed (this situation corresponds to the case where the set value of the control parameter #2 is "1"), the character string translated at the step 12022 and the character mode altered at the step 12032 in the last cycle (refer to FIG. 36) are resumed into the original ones. The resumption can be realized in such a way that the character mode immediately before the alteration as held in the character mode storing register 42 is handled as the aforementioned "other character mode". By way of example, the keys 3102 and 3082 (FIG. 27) are simultaneously pressed under the state shown in FIG. 35(b), whereby the original state shown in FIG. 35(a) can be resumed.

Figure 39:
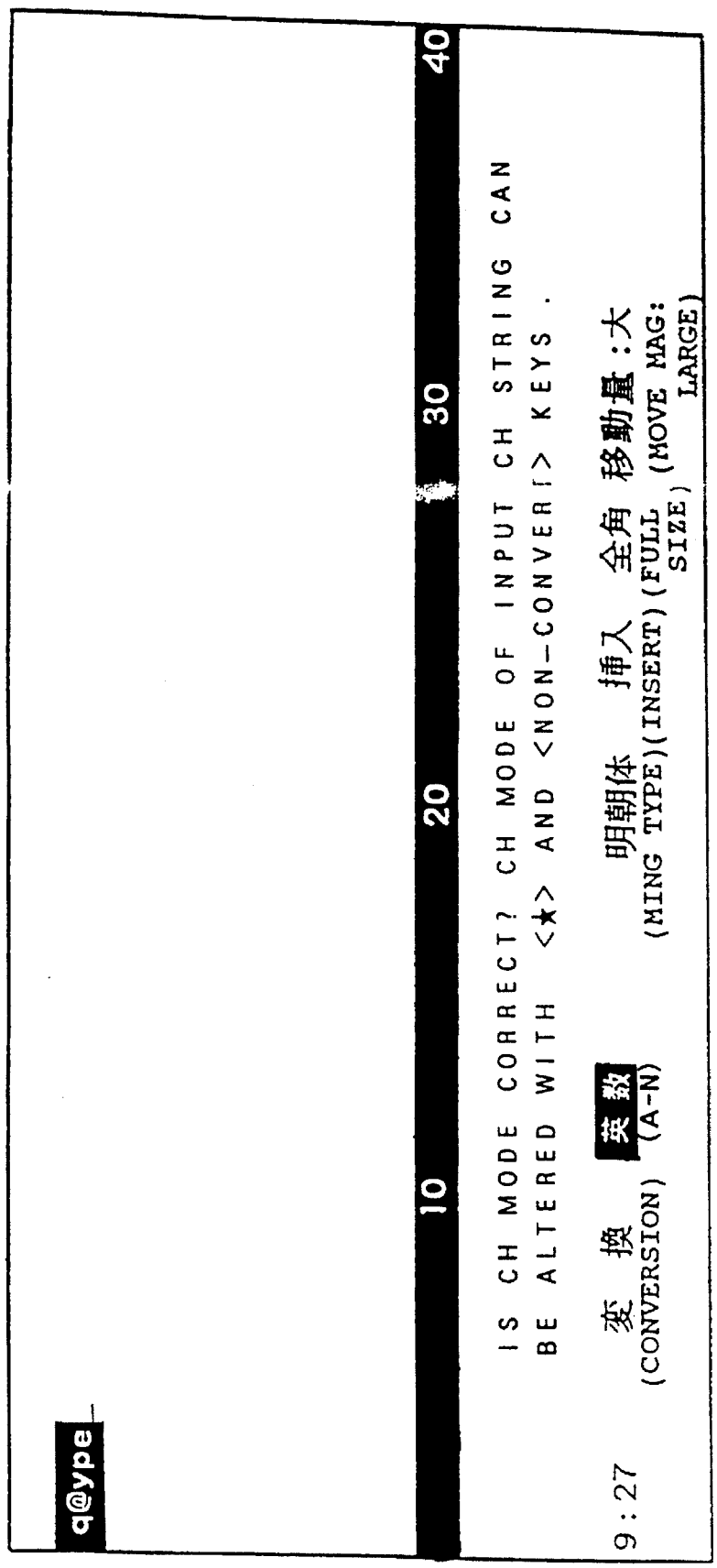

In a case where the character code conversion notification has been entered in the state in which the message #2 is displayed (this situation corresponds to the case where the set value of the control parameter #2 is "2"), the character mode likelihood decision is rendered anew for the character string to-be-translated, and the key code string is translated into character codes in the character mode of the maximum likelihood. By way of example, when the character code conversion notification is entered (that is, when the keys 3102 and 3082 are simultaneously pressed) under a state shown in FIG. 39(a), a state shown in FIG. 39(c) is established.

In a case where the character code conversion notifications have been entered successively and iteratively, the character mode is altered to the different modes in succession.

Incidentally, the processes, such as the inverse translation and the acknowledgement of the set value of the control parameter #2, which are executed in response to the input of the character code conversion notification proceed at the step 14092 in FIG. 38.

The above processing based on the character code conversion notification is chiefly intended to correct the erroneous result of the likelihood decision. This embodiment is further endowed with the learning function for the purpose of making the error itself of the likelihood decision less prone to develop as a stage preceding the correction. The learning function includes the two kinds of non-conversion learning and suppression learning, which shall be individually explained.

First, the suppression learning will be elucidated.

As stated before, in the case where the character mode is decided by the character mode likelihood decision unit 62, etc., erroneous decisions can occur for the inputs of specified keys. By way of example, let's consider a case where a character string "ippo" (一歩) is entered in conformity with the romaji-hiragana mode. At the time when the third key input has been afforded, the likelihoods of the respective character modes are computed as Vrh=139, Vkh=156, Vrk=170, Vkk=124 and Ve=210. Assuming here that T=30 is set, the discriminant #5 in FIG. 32 holds true, and the alphanumeric mode is decided as the maximum likelihood character mode. Also at the time of the fourth key input, the alphanumeric mode is decided. Therefore, on condition that the control parameter #2 is set at "1", the character mode and the already entered character string are altered to alphanumeric ones as shown in FIG. 40(a).

Meanwhile, by way of example, let's consider a case where the user has entered "tty" in the alphanumeric mode and where he/she has subsequently entered "kpzwe^yb4" without altering the alphanumeric character mode and with the intention of entering "のせっていへんこう" in the kana-hiragana mode. In this case, with the foregoing method, the kana-hiragana mode might be decided in the course of the input operation by the character mode likelihood decision unit 62, and even the character string part "tty" which ought to be in the alphanumeric mode might be altered into the kana-hiragana mode. Thus, a partially erroneous result might be obtained as shown in FIG. 41 (a).

This embodiment can also cope with the error as stated above, in such a way that the user's input content and correction content are learnt by providing the steps 14062, 14072 and 14082 shown in FIG. 38, whereupon the character mode conversion is suppressed. The suppression learning will now be explained in more detail.

The erroneous decision by the character mode likelihood decision unit 62 is suppressed as stated below. In the case where the screen display of the display unit 122 has become as shown in FIG. 40(a), the user resumes the character mode and the already entered character string through the notification of the character mode conversion. The screen display of the display unit 122 at this time is shown in FIG. 40(b). On this occasion, the series of processes at the steps 14012, 14062, 14072 and 14082 in FIG. 38 are executed, and the original character mode and the key code string stored in the key-code-buffer temporary save area 162 are registered in the learning information buffer 142 with the kind set as "suppression" (step 14092). An example of the content of the learning information buffer 142 is shown at numeral 18012 in FIG. 42. In the example 18012, a key code string "21, 23, 23, 22" corresponds to "ippo". Incidentally, when the decision by the character mode likelihood decision unit 62 has been rendered, the key code string stored in the key code buffer 52 as used in the decision is copied in the key-code-buffer temporary save area 162 at the step 12052 shown in FIG. 36.

Figure 34:
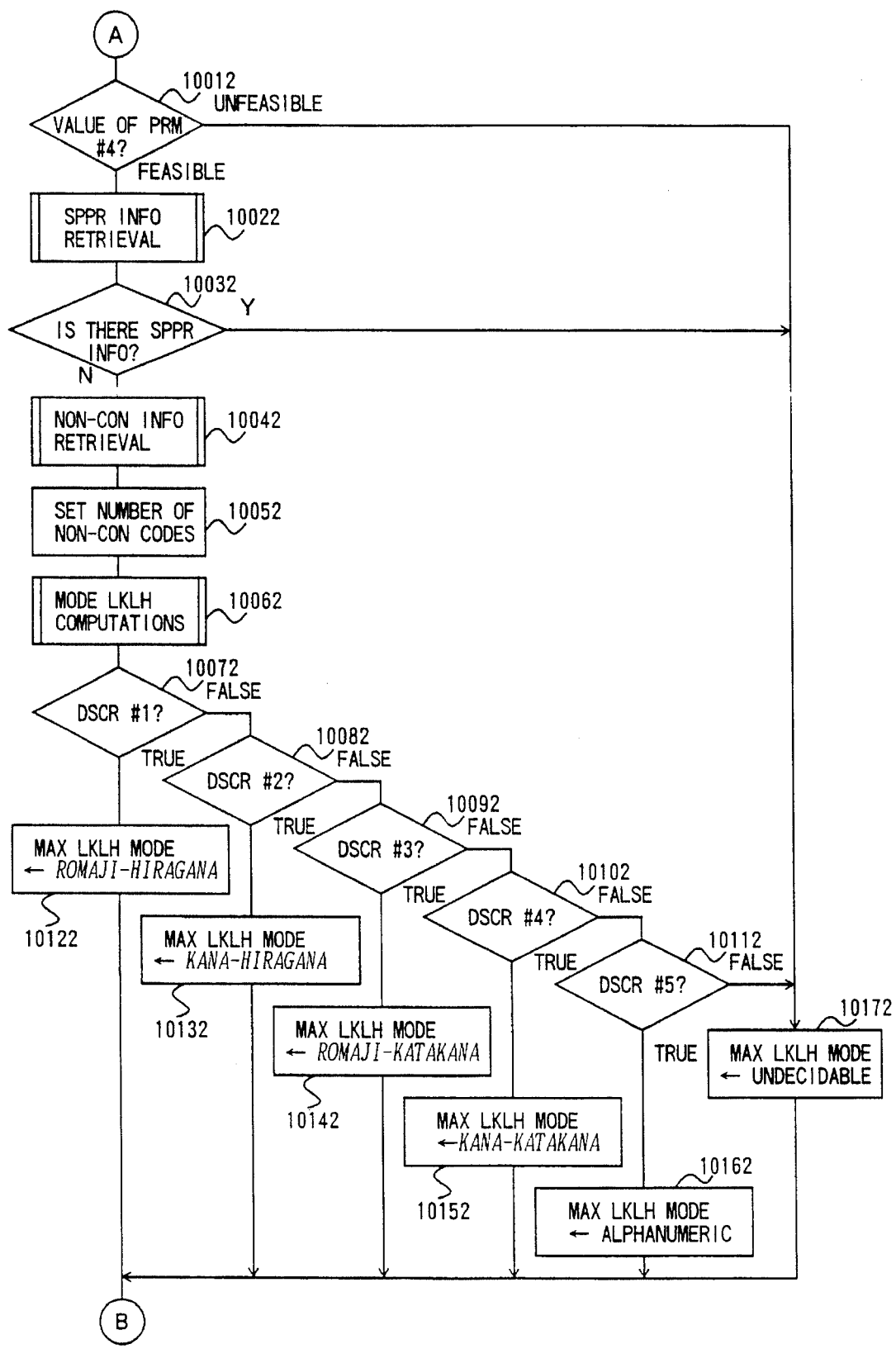
Figure 40:
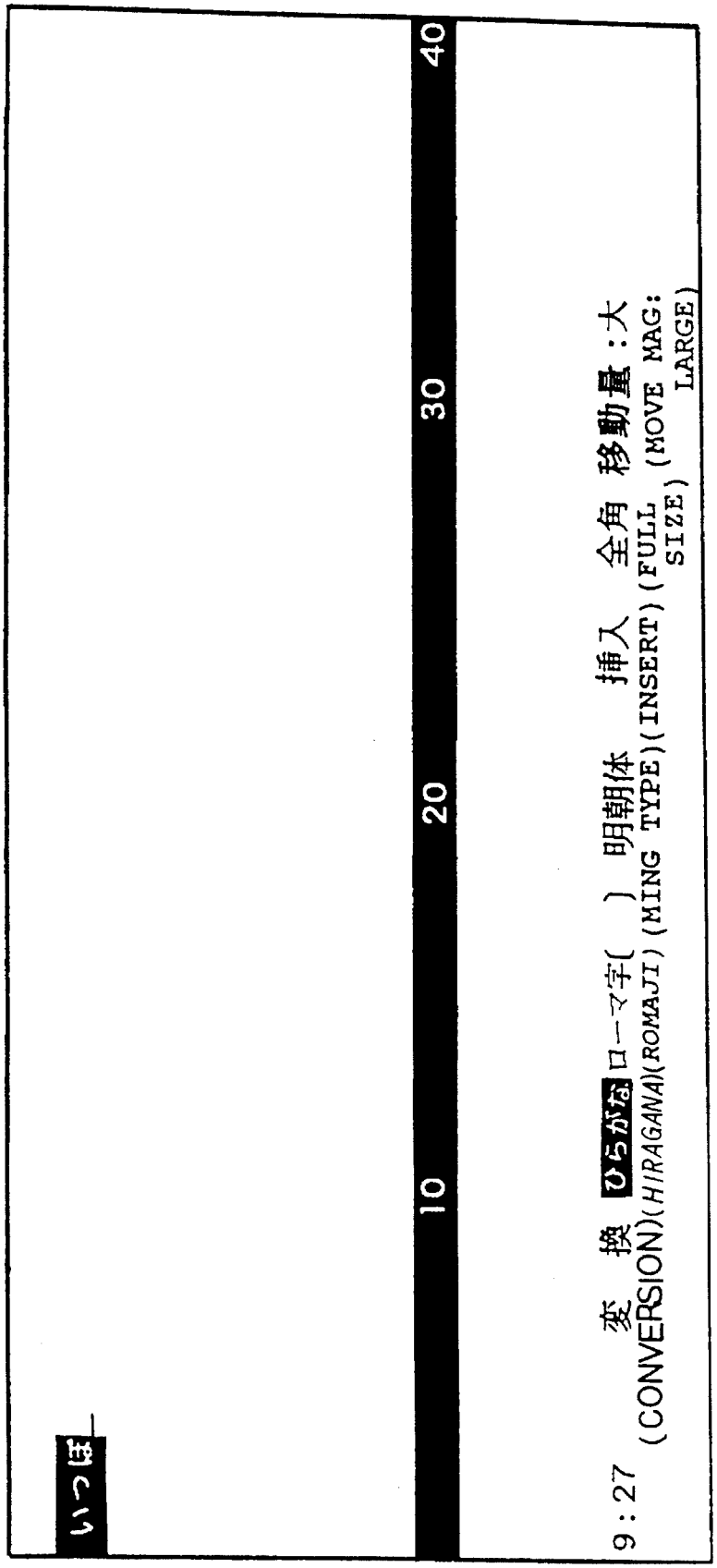
Figure 40:
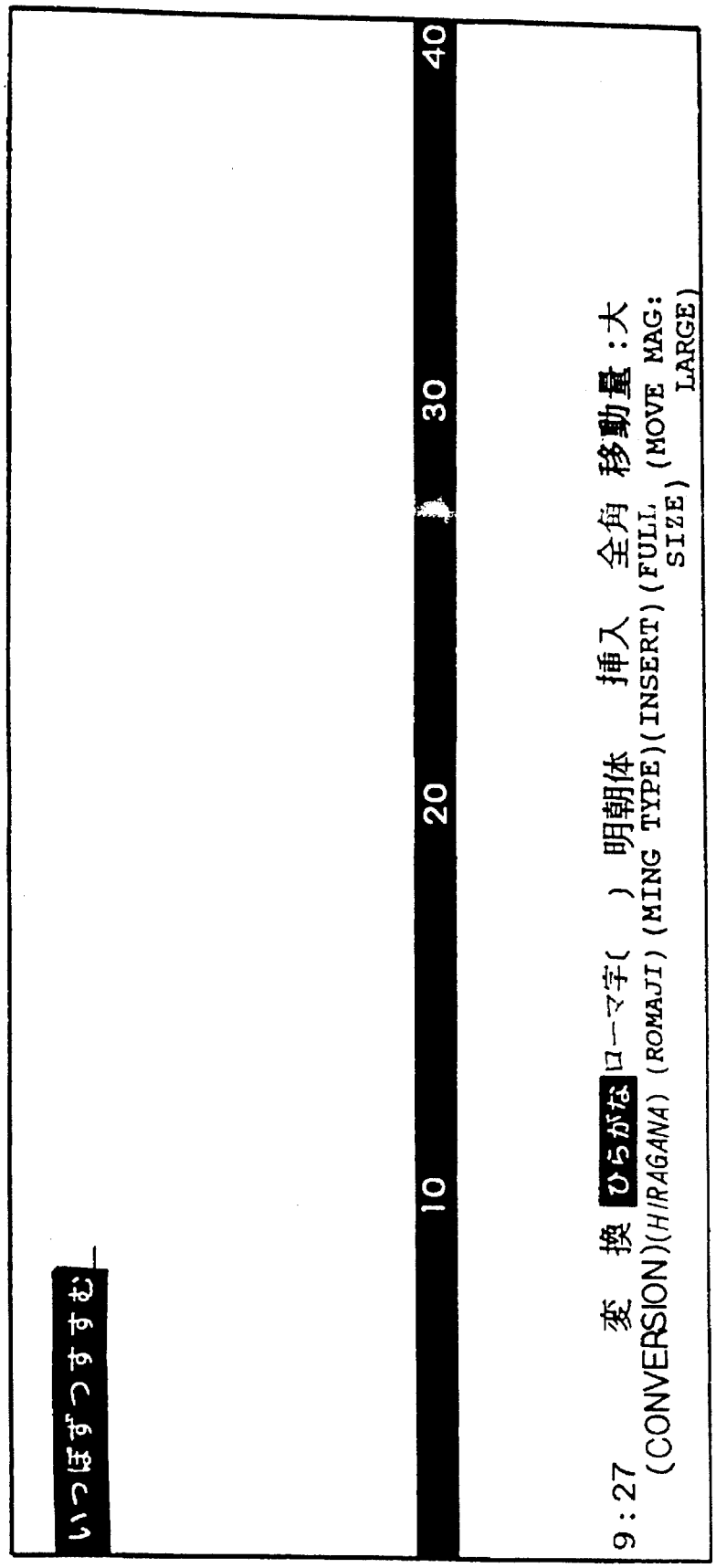

In a case where the same inputs have been entered as illustrated in FIG. 40(*b*) again after the above learning, the step 10022 in FIG. 34 is executed before the likelihood computations, to compare the content of the key code buffer 52 with the contents of the learning information buffer 142 and to retrieve learning information items the kinds 18032 of which in the learning information buffer 142 are "suppression" and the character modes 18042 of which agree with the character mode currently set. Further, each of the learning information items found out by the retrieval is judged as to whether or not the key code string 18052 thereof satisfies any of the following requisites ①, ② and ③ (step 10032):

① The key code string 18052 agrees with the head part of the corresponding key code string stored in the key code buffer 52.

② The key code string 18052 contains the entirety of the corresponding key code string stored in the key code buffer 52.

③ The key code string 18052 agrees completely with the corresponding key code string stored in the key code buffer 52.

By way of example, let's consider a case where a key code string "11, 12, 13, 14" is stored in the key code buffer 52. Then, if the key code string 18052 of the learning information is "11, 12, 13" the requisite ① is met. In addition, if the key code string 18052 is "11, 12, 13, 14, 15, 16", the requisite ② is met. Besides, if the key code string 18052 is "11, 12, 13, 14", the requisite ③ is met.

In a case where the presence of the suppression information has been judged at the step 10032, the likelihood decision is not performed (step 10172). Thus, the erroneous decision is restrained, and the user can continue his/her intended input operation without any special manipulation as illustrated in FIG. 40(*c*).

In this embodiment, the condition "Is message #1 displayed?" at the step 14072 in FIG. 38 is set as the timing of the learning registration. This condition is set for the user's better operability of the character inputting device, and is not always required.

Next, the non-conversion learning will be elucidated.

The non-conversion learning is intended to eliminate any erroneous translation concerning a character string which contains a different character mode partially.

That is, the non-conversion learning is intended to cope with a problem involved in a case where a basic character mode exists and where character string parts of different character modes sometimes appear. An example is a case where alphanumeric characters such as "10km" appear at a part of a character string in an input operation conforming to the kana-hiragana mode. In such a case, there are the features that many of alphanumeric characters appearing in one sentence denote proper nouns such as trade names, and that identical alphanumeric characters appear frequently. In this situation, the user is usually conscious of a change-over to the character mode which is not the basic one, but he/she often forgets to recover the basic character mode.

According to this embodiment, in such a case, a content which has been correctly entered by the user is subjected to learning. Thus, at the next entering operation, a part agreeing with the learning information is not converted in the case of that character code conversion of the already entered character string which results from the likelihood decision process, whereby the character string which is entirely correct is obtained. This will be concretely explained below.

Referring to FIG. 38, when the user has pressed any of the character mode designation keys 3042, 3052, 3062 and 3092 (FIG. 27), the key code string stored in the key code buffer 52 (FIG. 25) as entered by the user till then and the character mode before the alteration as held in the character mode storing register 42 are registered as the kind "non-conversion" (FIG. 42) in the learning information buffer 142 (step 14032). By way of example, when the user presses the <hiragana> key 3062 after having entered "tty" in the alphanumeric mode (based on the <alphanumeric> key 3052), the character mode is altered to the kana-hiragana mode, and learning information shown at numeral 18022 in FIG. 42 is registered in the learning information area 142. In the information 18022, a key code string "18, 18, 19" corresponds to "tty".

In a case where, after such non-conversion learning, the user has entered characters containing the learnt information, the step 10042 in FIG. 34 is executed to compare the content of the key code buffer 52 with the contents of the learning information buffer 142 and to retrieve learning information items the kinds 18032 of which in the learning information buffer 142 are "non-conversion" and the character modes 18042 of which agree with the character mode currently set. Further, each of the learning information items found out by the retrieval is judged as to whether or not the key code string 18052 thereof satisfies any of the following requisites ④ and ⑤:

⑤ The key code string 18052 contains the entirety of the corresponding key code string stored in the key code buffer 52.

⑤ The key code string 18052 agrees completely with the corresponding key code string stored in the key code buffer 52.

By way of example, let's consider a case where a key code string "11, 12, 13, 14" is stored in the key code buffer 52. Then, if the key code string 18052 of the learning information is "11, 12, 13, 14, 15, 16", the requisite ④ is met. In addition, if the key code string 18052 is "11, 12, 13, 14", the requisite ⑤ is met.

In the presence of the key code string satisfying the requisite at the step 10042, the number of key codes of the key code string 18052 of the pertinent learning information is set in the register 152 for storing the number of non-conversion codes (step 10052 in FIG. 34).

It is assumed here that the register 152 for storing the number of non-conversion codes is initialized to a non-conversion code number of "0" before the non-conversion learning information retrieval process. In the next individual-mode likelihood computation process (step 10062), the likelihoods are computed under the condition that the part of the key code string corresponding to the number of non-conversion codes as reckoned from the head of the key code buffer 52 is excluded from the computations (steps 10072~10172). In a case where, as the result of the likelihood computations, the decided mode is not the current mode (step 6062 in FIG. 30), the alarm process shown at the step 6072 in FIG. 30 is performed. Incidentally, the details of the alarm process itself is as has already been explained with reference to FIG. 36.

In the alarm process, in a case where the control parameter #2 is set at "1", the already entered character string is translated into character codes under the condition that the part of the character string corresponding to the number of non-conversion codes as reckoned from the head of the key code buffer 52 is excluded from the translations (step 12032 in FIG. 36). In the aforementioned example, the part "tty" is excluded, and a number "3" is stored in the register 152 for storing the number of non-conversion codes. Therefore, only the part "kpzwe^yb4" has the likelihoods decided, and this part is translated into character codes in the kana-hiragana mode. The character codes becomes "のせっていへんこう" shown in FIG. 41(*b*) as intended by the user.

Here, the notification of the character mode conversion or the press of any character mode designation key is set as the timing of the learning information registration, but this is not restrictive. In case of updating a document, for example, the learning registration may well be done in such a way that a character string is translated into key codes in loading an already created document from the auxiliary memory device 2122 (FIG. 26) or the like into the character buffer 102 (FIG. 25). On this occasion, alphanumeric character codes are translated into the key codes in the alphanumeric mode by the use of the character mode likelihood table 72 shown in FIG. 33. Besides, kana character codes which have conformed to the romaji mode are subjected to a kana-romaji conversion, whereupon the resulting character codes in the respective modes are translated into the key codes by the use of the table 72. Thereafter, the key codes are registered in the learning information buffer 142.

Moreover, in this embodiment, the two kinds of the suppression and the non-conversion are provided in the learning information buffer 142, and the learning is performed for the respective kinds. However, the separation between the suppression and the non-conversion may well be done away with by performing the suppression learning entirely or by conversely performing the non-conversion learning entirely. In this regard, considering the user's operating procedure, the user does not always notify the character mode conversion at the boundary of character modes. In contrast, the user will press any character mode designation key at the substantially explicit boundary of character modes. In practical use, accordingly, the kinds and the learning processes conforming to the kinds should preferably be employed as in the embodiment.

Although the character mode for the learning registration is not restricted in the embodiment, it may well be restricted to, for example, only the alphanumeric mode in accordance with actual circumstances.

As stated above, according to this embodiment, the number of key operations for entering desired characters can be sharply decreased as compared with that in the prior art.

In this embodiment, the keyboard for entering the Japanese language is employed. However, the present invention is not restricted to such a keyboard, but it is also applicable to a character inputting device for entering other character species or languages, for example, English and Russian, English and Chinese, or Greek and Chinese. In case of a multilingual keyboard which can enter German, French and English by way of example, basic alphabetic characters are common. Characters with "umlaut", and "Eszett" (s+z) for use in the German language will be allotted to and carved on the same keys as those of characters with "accent aigu" for use in the French language. Special symbols for use in the English language might be carved on the same keys. With the multilingual keyboard, it will be reasonable to set a German mode, a French mode and an English mode and to press keys in the separate modes. In such a case, the likelihoods of the English character, German character and French character of each key are computed and set in the character mode likelihood table 72 beforehand. Then, the character inputting method of the present invention can prevent the character with "umlaut" from appearing in the spelling of the French language and the special symbol of the English language from appearing in the spelling of the German language. Of course, if kana characters can be carved on the keys of the multilingual keyboard, they can be further added and can be judged as described before.

Moreover, the method of outputting the message is not restricted to the display, but other output means such as voice or printing may well be employed. In this case, the effect of the present invention is not spoilt at all.

As set forth above, according to the second embodiment of the present invention, a character mode and an already entered character string are automatically altered in accordance with key inputs. Further, in a case where the results of the automatic alterations are not desired ones, the contents of resuming correction operations are learnt, and the entered character string is learnt through the user's explicit designation of a character mode. Thus, the errors of the automatic alterations decrease gradually, and the user can be relieved from the necessity of being conscious of the character mode, so that the efficiency of an input operation is sharply enhanced.

The third embodiment is an example in which the present invention is applied to an information processing equipment such as Japanese language word processor. This embodiment chiefly features an input method in the case of entering symbols and phonetic characters such as hiraganas (the cursive form of the Japanese syllabary), katakanas (the square form of the Japanese syllabary) and alphanumeric characters. In the ensuing description, the characters hiragana and katakana will be simply termed "hiragana", "kana (Japanese syllabary)", "kana character", etc. generically in some cases. Also in the drawings showing screen displays, they are sometimes indicated by "kana" in like fashion.

Figure 45:
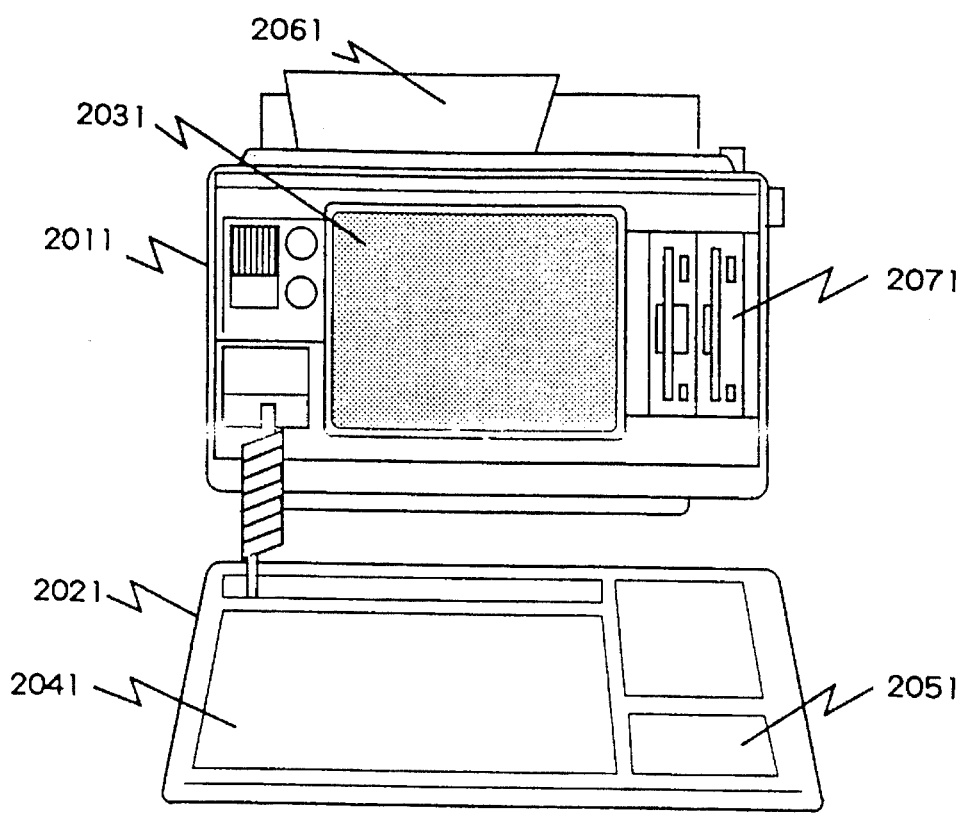

The external appearance of this embodiment is illustrated in FIG. 45. The illustrated embodiment is an equipment which is furnished with the fundamental functions of the Japanese language word processor. The equipment is broadly divided into an equipment proper or the body of the equipment, 2011 which includes a control device constructed of electronic circuitry etc., and an input device 2021 through which characters and editing instructions are entered or given. In more detail, a display unit 2031 displays an entered character string, a message to the user of the equipment, etc. Character keys 2041 serve to enter the characters. "Up", "down", "left" and "right" keys 2051 (herein below, sometimes called "cursor keys") are used for moving a cursor in editing the character string, and so forth. The equipment is also provided with a printer 2061 for printing out the entered and edited character strings on sheets of paper, and a floppy disk drive 2071 for storing the entered and edited character strings in an external memory medium such as floppy disk though these elements are not always indispensable to the present invention.

Figure 44:
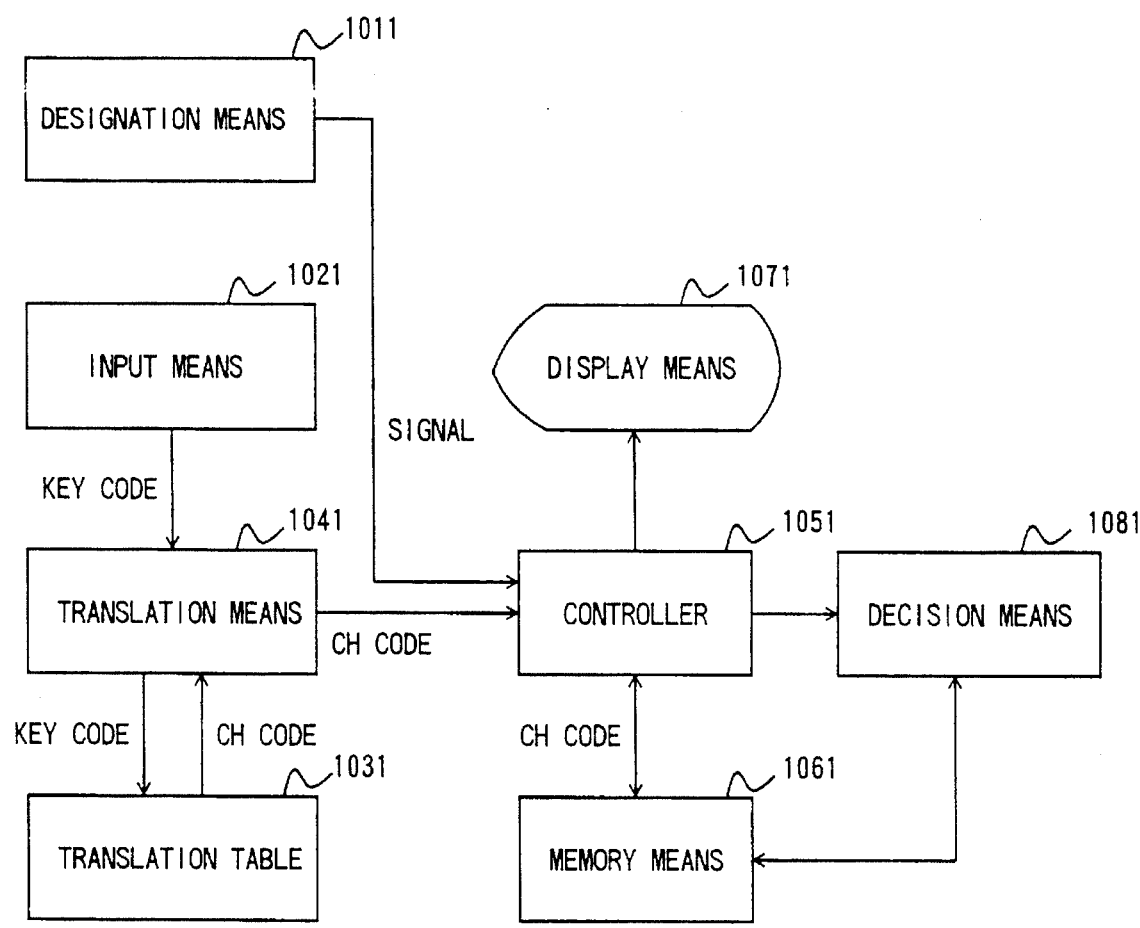

The internal construction of this embodiment will be outlined with reference to the fundamental block diagram of FIG. 44.

Designation means 1011 serves to designate a character species, an input system and a character string. It delivers signals which indicate the key codes of entered keys. By the way, the designation means 1011 corresponds to the cursor keys 2051 shown in the exterior view of FIG. 45.

Input means 1021 serves to enter characters. One or more characters are allocated to each of the constituent keys of the input means 1021. In addition, a specified key code is allocated to each of the constituent keys of the input means 1021. When a key input is given, the input means 1021 delivers the key code previously allocated to the pertinent key. The input means 1021 corresponds to the character keys 2041 shown in FIG. 45.

A translation table 1031 is a table in which the key codes allocated to the respective keys of the input means 1021 and the character codes of characters allocated to the pertinent keys are stored in correspondence.

Translation means 1041 has the function of translating the key code entered from the input means 1021, into the corresponding character code with reference to the translation table 1031, and then delivering the resulting character code. Incidentally, in a case where a plurality of characters are assigned in correspondence with one key code, the character codes of all the corresponding characters are delivered.

Memory means 1061 has the function of holding entered information and a display state.

Display means 1071 has the function of displaying the character string entered and edited by the input means 1021 and the designation means 1011. The display screen of the display means 1071 is broadly divided into two parts; a first display part 7011 and a second display part 7051 (refer to FIG. 50). The first display part 7011 is an area in which character strings delivered from the translation means 1041 and a controller 1051 are displayed separately in respective character species and input systems. The character strings displayed in the first display part 7011 have their character species and input systems designated appropriately by the aforementioned designation means 1011, etc. A character string part thus designated is translocated from the first display part 7011 into the second display part 7051. Such a display is realized by operations which are closely associated with the controller 1051. By the way, the display means 1071 corresponds to the display unit 2031 in the exterior view of FIG. 45.

The controller 1051 has the function of receiving the output character codes of the translation means 1041 and the output signals of the designation means 1011 so as to store them in the memory means 1061 and to display the corresponding characters of the character codes on the display means 1071. In addition, the controller 1051 performs a romaji (Roman character)-kana conversion in a case where the entered key codes are handled by a romaji input system. Besides, the controller 1051 operates in close relations with the respective components and contributes to realizing various functions.

Decision means 1081 has the function of estimating and automatically setting the character species and input system which are intended for the input operation by the user. More specifically, in the case where the plurality of characters are assigned to one key code, the translation means 1041 delivers the plurality of character codes in response to one key input as stated before. In this case, the characters can differ in the character species (for example, they can be hiraganas and alphabetic characters). Such a situation often occurs in the word processor of the Japanese language in which a large number of sorts of characters are used. On the other hand, although the input system is seldom altered in the course of the use of the equipment, it (kana input or romaji input system) can be erroneously altered in altering the character species. In such cases, the decision means 1081 evaluates likelihoods for the respective character species and the respective input systems on the basis of the contents of the character strings (key code strings) displayed on that occasion, thereby to automatically decide and set the character species and the input system of the maximum likelihoods.

The translation table 1031, translation means 1041, controller 1051, memory means 1061 and decision means 1081 correspond to the control device within the equipment proper 2011 in the exterior view of FIG. 45.

An expression "display means" in the appended claims is constructed including, not only the display means 1071, but also the controller 1051. Also, an expression "designation means" or "translocation means" in the appended claims signifies a concept which includes the designation means 1011, the controller 1051, etc.

The details of the respective components mentioned above will be explained.

Figure 46:
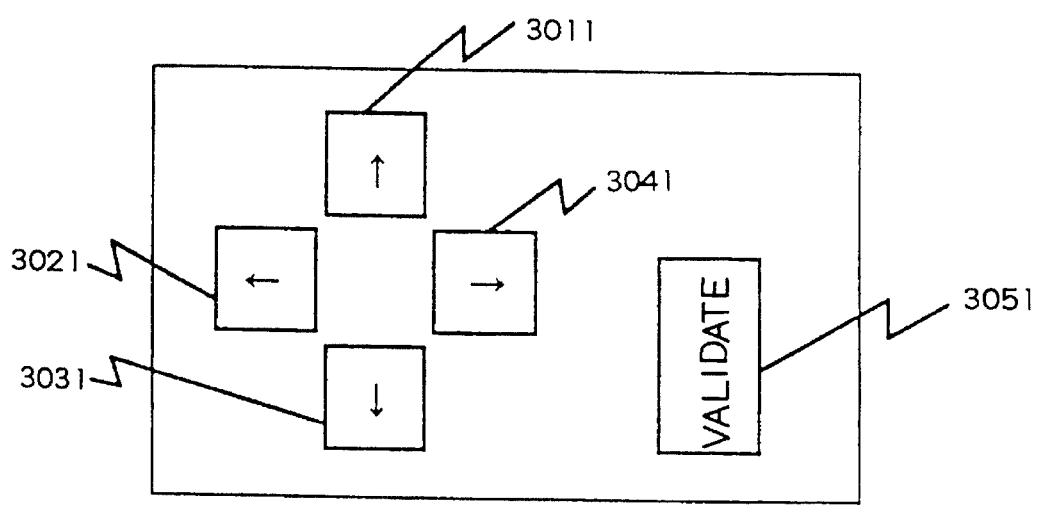

As illustrated in FIG. 46, the designation means 1011 is constructed including an "up" key 3011, a "left" key 3021, a "down" key 3031 and a "right" key 3041. These keys 3011~3041 are used for designating any of the character strings and for giving an instruction for selecting any of the character species or the input systems, and they correspond to the upper, lower, left and right positions of the screen of the display means 1071, respectively. A "validate" key 3051 is used for validating or settling an instruction for translocating the character string and the instruction for selecting the character species. The user gives the instruction for selecting the character string and the instruction for selecting the character species with any of the up, down, left and right keys 3011~3041 at need, and thereafter presses the validate key 3051, whereby he/she can instruct the equipment proper to execute the selections. Incidentally, the designation means 1011 need not always be independently provided in case of a construction in which the designation of a character string and the selection of a character species are directly effected on a screen by the use of an integrated display type tablet. By the way, the designation means 1011, etc. form parts of the designation means or the character string translocation means in the appended claims.

Figure 47:
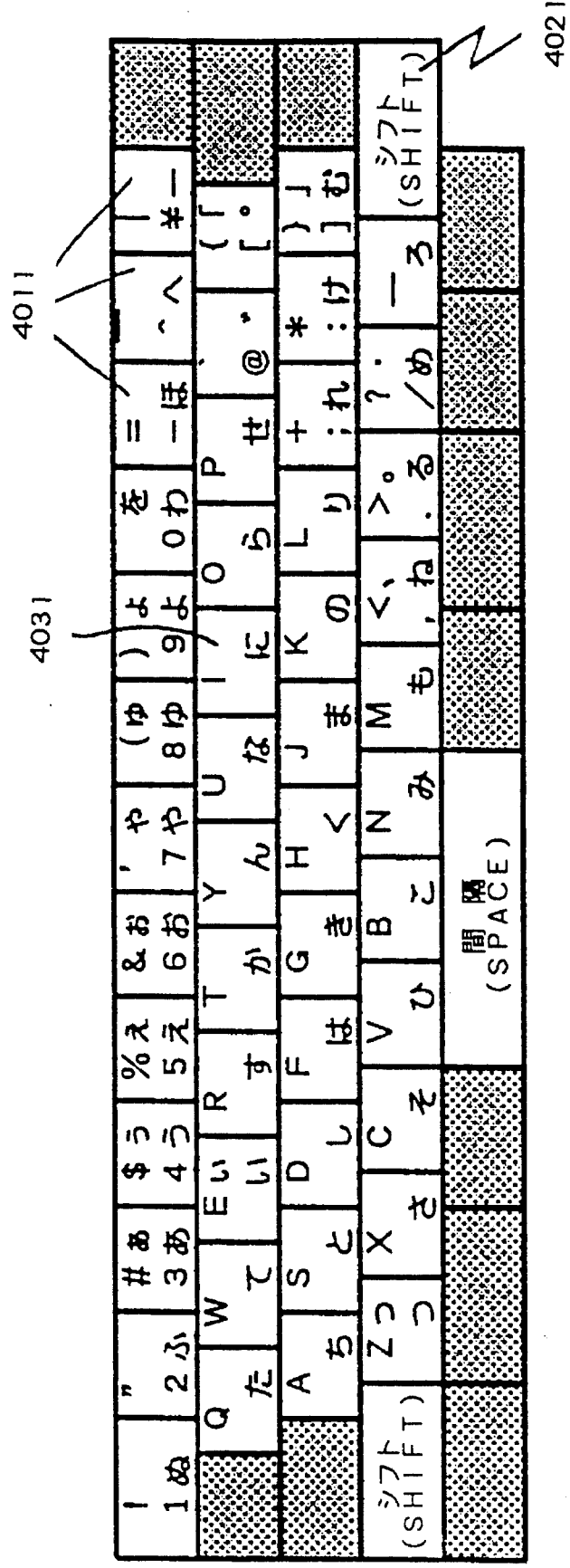

As illustrated in FIG. 47, the input means 1021 is such that a plurality of characters are allocated to one key. Character-keys 4011 serve to enter characters etc., and they include kana keys, alphabet keys and symbol keys. A shift key 4021 of the simultaneous press type is used in combination with the character key 4011. The simultaneous presses of both the shift key 4021 and the character key 4011 generate a key code which differs from one generated when only the character key 4011 is pressed alone.

Figure 48:
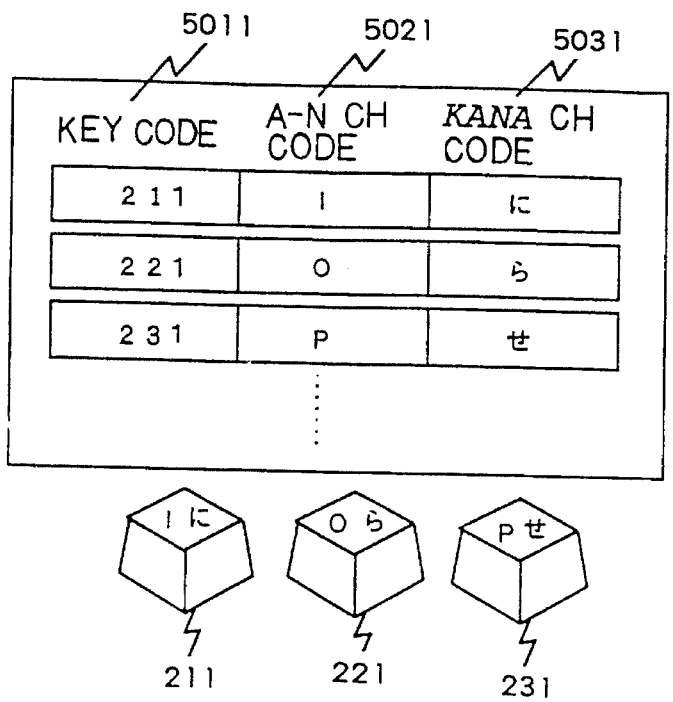

The format of the translation table 1031 will be explained with reference to FIG. 48.

The translation table 1031 is referred to in translating the key codes into the character codes. Regarding the character keys 4011, the plurality of characters are held in correspondence with one key in a duplex manner as stated above. In the translation table 1031, accordingly, a plurality of character codes which are an alphanumeric (A-N) character code 5021 and a kana character code 5031 are held in correspondence with one key code 5011.

The key codes 5011 are key Nos. which are afforded to the individual character keys 4011 (refer to FIG. 47) without duplexity.

The alphanumeric Character codes 5021 are used in translating the entered key codes into alphanumeric characters. They are used also in translating the key codes into kana characters in conformity with the romaji input system.

The kana character codes 5031 are used in translating the key codes into kana characters. However, it is only in case of translating the key codes into the kana characters in conformity with the kana input system that the kana character codes 5031 are used.

The translation means 1041 has the function of translating the key code into the character code by referring to the translation table 1031. By way of example, in case of pressing the character key 4031 on which the letter "I" of the alphabet and a kana character " に " are carved, a key code "211" is delivered from the input means 1021. Then, the translation means 1041 refers to the translation table 1031 and acquires the character codes of the characters corresponding to the key code "211", that is the alphanumeric character code 5021 of "I" and the kana character code 5031 of " に ". Subsequently, it delivers the acquired character codes 5021 and 5031 along with the key code "211".

The controller 1051 stores these character codes in the memory means 1061 in correspondence with the key code. In this case, the alphanumeric character code 5021 is directly used as representing the alphanumeric character, while the kana character code 5031 is directly used as representing the kana character entered by the kana input system. Incidentally, the conversion into a kana character based on the romaji input system is effected by the romaji-kana conversion which utilizes the alphanumeric character codes 5021. It is needless to say that a character code which is obtained through the romaji-kana conversion is the same as the kana character code 5031. By way of example, a character code which is obtained through the romaji-kana conversion of "KI" is the same as the kana character code 5031 which is defined for " き ".

The construction of the memory means 1061 will be explained with reference to FIG. 49. The memory means 1061 includes a character string storing portion 6001 and a control variable storing portion 6061.

The character string storing portion 6001 is an area in which the character (code) strings delivered from the translation means 1041 and the controller 1051 are stored separately in the individual character species (alphanumeric character and kana character species) and for the individual input systems (kana input and romaji input systems). This character string storing portion 6001 is configured of a key code storing part 6011, a romaji character string storing part 6021, a kana character string storing part 6031, an alphanumeric character string storing part 6041, and a display boundary code storing part 6051.

The key code storing part 6011 is an area in which the key codes delivered from the translation means 1041 and the controller 1051 are stored in the entered order thereof.

The romaji character string storing part 6021 is an area in which the kana character codes are stored in the entered order thereof, these kana character codes being obtained in such a way that the alphanumeric character codes 5021 delivered from the translation means 1041 have been subjected to the romaji-kana conversion by the controller 1051. That is, the character string stored in the romaji character string storing part 6021 corresponds to the character string of kana characters entered by the "romaji input" system. The significance of mark "∇" contained in the character code string of the romaji input system will be stated later. An expression "predetermined specific character" in the appended claims corresponds to the mark "∇" in this embodiment.

The kana character string storing part 6031 is an area in which the kana character codes 5031 delivered from the translation means 1041 and the controller 1051 are directly stored in the entered order thereof. That is, the character string stored in the kana character string storing part 6031 corresponds to the character string of kana characters entered by the "kana input" system.

The alphanumeric character string storing part 6041 which stores therein the alphanumeric character codes 5021 delivered from the translation means 1041 and the controller 1051.

Figure 50:
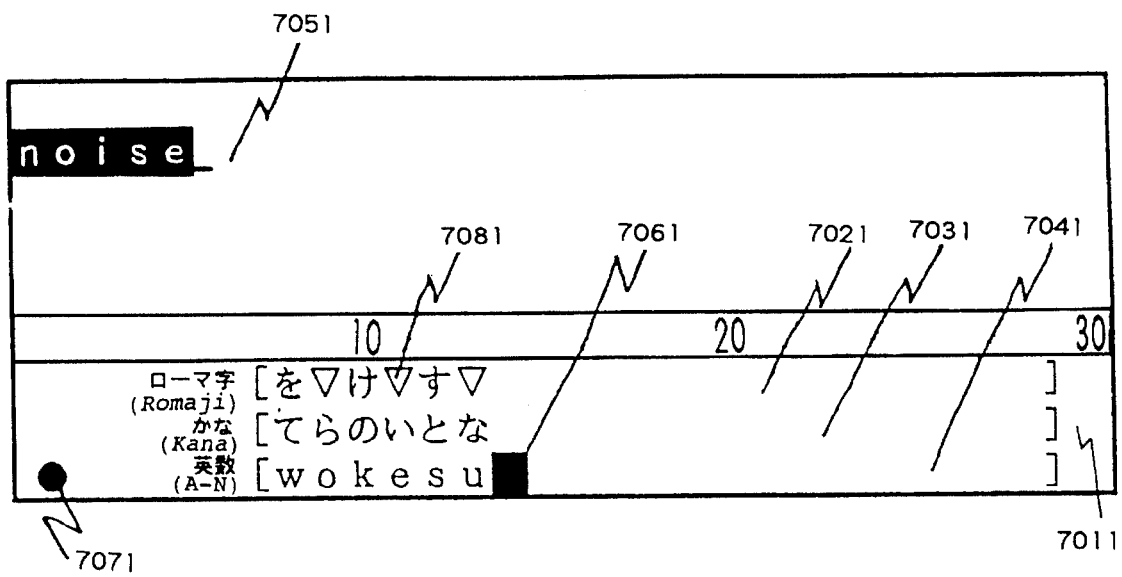

The display boundary code storing part 6051 stores therein codes which indicate whether or not the characters of the corresponding columns are actually displayed in the second display area 7051 (refer to FIG. 50). The code "1" stored in the display boundary code storing part 6051 signifies that the character of the pertinent column is displayed in the second display part 7051. In contrast, the code "0" stored in the part 6051 signifies that no display is actually presented in the second display part 7051 in spite of a character string part for which the character species etc. have been completely designated. The column as to which no code is stored signifies the state in which the character of this column is still displayed in the first display part 7011 because the character species etc. are not designated therefor.

By way of example, in a case where the character string of "HO" is displayed in the second display part 7051, the display boundary codes are set at "1's" at both the column of "H" and that of "O" in the part 6051 of the memory means 1061. On the other hand, in a case where the character string of " ほ " is displayed in the second display part 7051, the codes "1" and "0" are respectively stored in those columns of "H" and "O" which are the two columns of the display boundary code storing part 6051 of the memory means 1061 corresponding to the character " ほ ", on condition that the character " ほ " is based on the romaji input system.

The display boundary code is mainly used in a case where the character string displayed in the second display part 7051 is to be returned into the first display part 7011 (for example, in a case where the character species is to be designated again in the first display part 7011 because the operation of designating the character species has erred). The practicable usage of this code will be detailed in relation to a step 36101 in FIG. 79 later.

Figure 49:
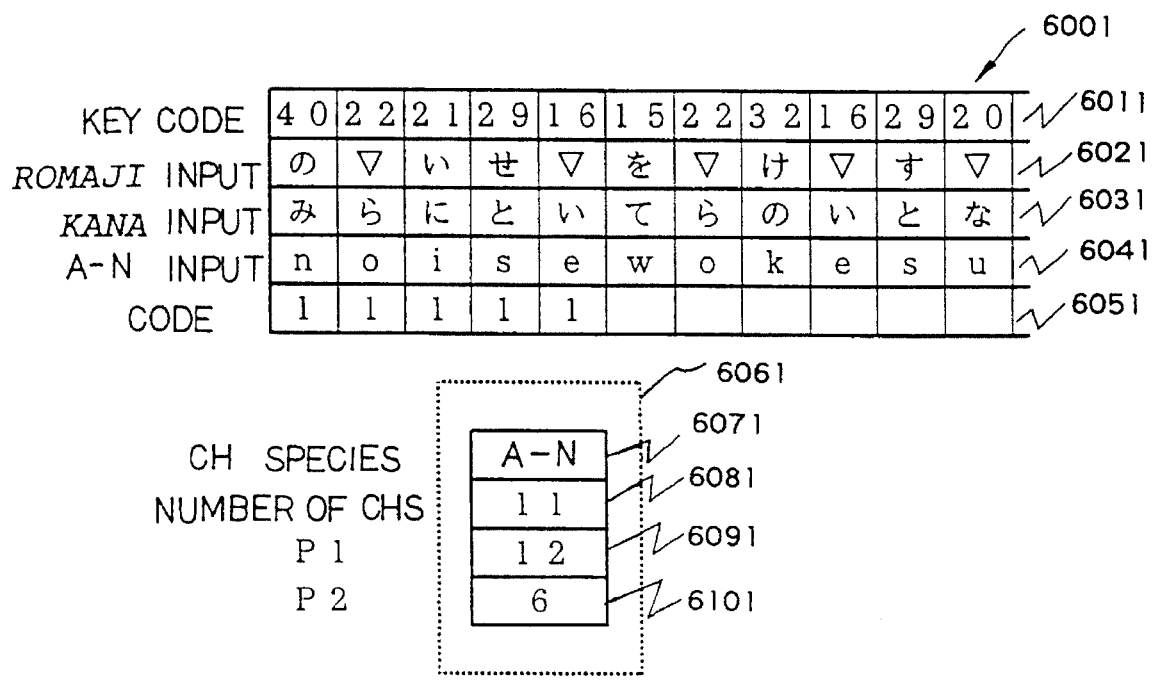

Although concrete characters such as " の " and " み " are indicated in FIG. 49, actually character codes corresponding to these characters are stored.

On the other hand, the control variable storing portion 6061 consists of parts for four variables for storing the current display state, that is, a character species storing variable 6071, a number-of-input-characters variable 6081, a cursor position variable 6091 and a display part boundary variable 6101.

The character species storing variable 6071 is data which indicates the input character species and the input system selected on that occasion. In the illustration, "A-N" is short for "alphanumeric".

The number-of-input-characters variable 6081 indicates the number of inputs, namely, the number of pressed keys.

The cursor position variable 6091 (also expressed by symbol "P1") indicates the position of the cursor within the entered character string (which is the character string stored in the character string storing portion 6001).

The display part boundary variable 6101 (also expressed by symbol "P2") is a value indicative of a position at which the head or foremost character (leftmost character) of the character string displayed in the first display part 7011 on the display screen lies within the character string stored in the character string storing portion 6011.

An example of the screen display of the display means 1071 is illustrated in FIG. 50.

The first display part 7011 is the area in which the character strings delivered from the translation means 1041 and the controller 1051 are displayed separately in the respective character species and for the respective input systems. It includes a romaji character string display line 7021, a kana character string display line 7031 and an alphanumeric (A-N) character string display line 7041.

The romaji character string display line 7021 is an area which displays the kana character string obtained in the case where the entered key codes have been handled by the romaji input system.

The kana character string display line 7031 is an area which displays the kana character string obtained in the case where the entered key codes have been handled by the kana input system.

The alphanumeric character string display line 7041 is an area which displays the character string of the alphanumeric character species retrieved on the basis of the entered key codes.

Among the character strings displayed in the first display part 7011, ones for which the character species and the input system have been designated are successively erased from the first display part 7011 and displayed anew in the second display part 7051. (It will sometimes be simply expressed by "translocation" to erase the character string and to display it at the different display position again.) In addition, the displays of the first display part 7011 are updated so that the remaining character strings, namely, the character strings for which the character species and the input systems have not been designated yet may move forwards or leftwards.

The cursor at numeral 7061 indicates that position on the screen at which a character to be entered is displayed. It is also used for translocating the character strings between the first display part 7011 and the second display part 7051.

A mode mark 7071 indicates the character species and the input system which are validated or settled when the user presses the "validate" key 3051.

The second display part 7051 is the area for displaying the character string for which the character species and the input system have been designated in the first display part 7011.

Meanwhile, one kana character is expressed by two key inputs or by pressing two keys in the romaji input system (except vowels each of which is expressed by one key input or by pressing one key), whereas one character is expressed by one key input or by pressing one key in the kana input system or the alphanumeric character mode. Accordingly, when the obtained character strings are merely displayed, the display column positions of the characters derived from the identical key code become discrepant. At the romaji character string display line 7021, therefore, the marks "▽" (indicated at numeral 7081 in FIG. 50) are displayed, thereby to make the character display columns uniform among all the input systems and the character species. By way of example, in a case where inputs "k" and "e" have been given, one hiragana character "け" is obtained from the two input key codes in the romaji input system. At the romaji character string display line 7021, accordingly, the mark "▽" is displayed behind the hiragana character "け" (refer to FIG. 50). By uniformalizing the display columns in this manner, the user is facilitated to grasp the correspondence among the respective character species and the respective input systems. Moreover, he/she gains increase in the versatility of the input order of the up, down, left and right keys 3011~3041 which are used in designating the character species and the input method. This will be explained again in a later concrete example.

Incidentally, the displayed screen state depicted in FIG. 50 corresponds to the stored content of the memory means 1061 as shown in FIG. 49. Accordingly, the number "11" is stored as the the number-of-input-characters variable 6081 in FIG. 49. Since the cursor 7061 lies at the alphanumeric character string display line 7041 in FIG. 50, data signifying this alphanumeric character string display line 7041 is stored as the character species storing variable 6071 (in FIG. 49, the abridged expression "A-N" itself is indicated for better understanding). Besides, since the cursor 7061 lies adjoining the tail or rearmost character (rightmost character) of the entered character string, the value "12" is stored as the cursor position variable 6091. The head characters of the character strings displayed in the first display part 7011 (namely, "w" at the alphanumeric character string display line 7041, "を" at the romaji character string display line 7021, and "て" at the kana character string display line 7031) lies at the sixth column as reckoned from the head characters of the character strings shown in FIG. 49, so that the value "6" is stored as the display part boundary variable 6101.

Next, there will be explained the method of operating this embodiment and the situation of the changes of screen displays attendant upon the operations.

Figure 51:
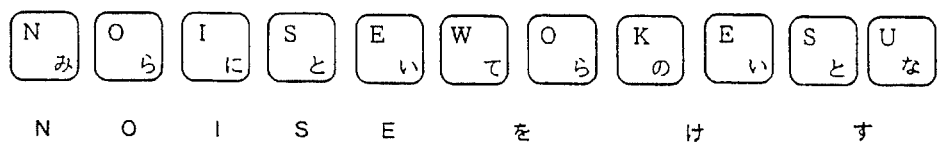

FIG. 51 illustrates an example of key inputs which the user has entered with the intention of entering a character string "noiseをけす" where alphanumeric characters and kana characters coexist. Here, it is premised that a kana character part "をけす" has been keyed by the romaji input system.

When the character string shown in FIG. 51 has been entered after the start of the system, the screen display of the display means 1071 becomes as shown in FIG. 52.

Under this state, the user designates a character species and an input method along with a character string part which is a subject for the character species and the input method. The designations of the character species and the input method are effected by positioning the cursor 7061 at any of the romaji character string display line 7021, the kana character string display line 7031 and the alphanumeric character string display line 7041. In addition, a character string part from the head (foremost or leftmost) character in the first display part 7011 to a character immediately before the cursor 7061 becomes the character string part to be designated as the subject.

Accordingly, the desired character string part can be designated at the desired character species, etc. by moving the cursor 7061 to the desired position of the desired display line and then pressing the "validate" key 3051.

Figure 53:
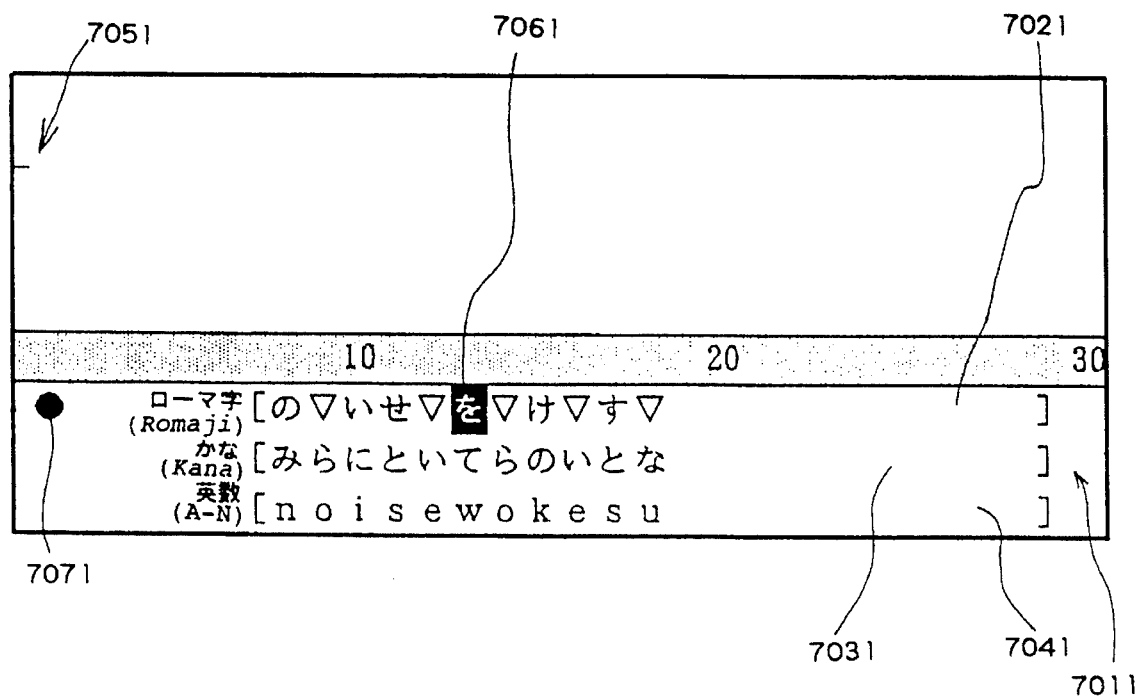

By way of example, when the left key 3021 is pressed six times in the state of FIG. 52, the cursor 7061 is moved leftwards to the amount of six characters, and the screen display becomes as shown in FIG. 53.

Figure 54:
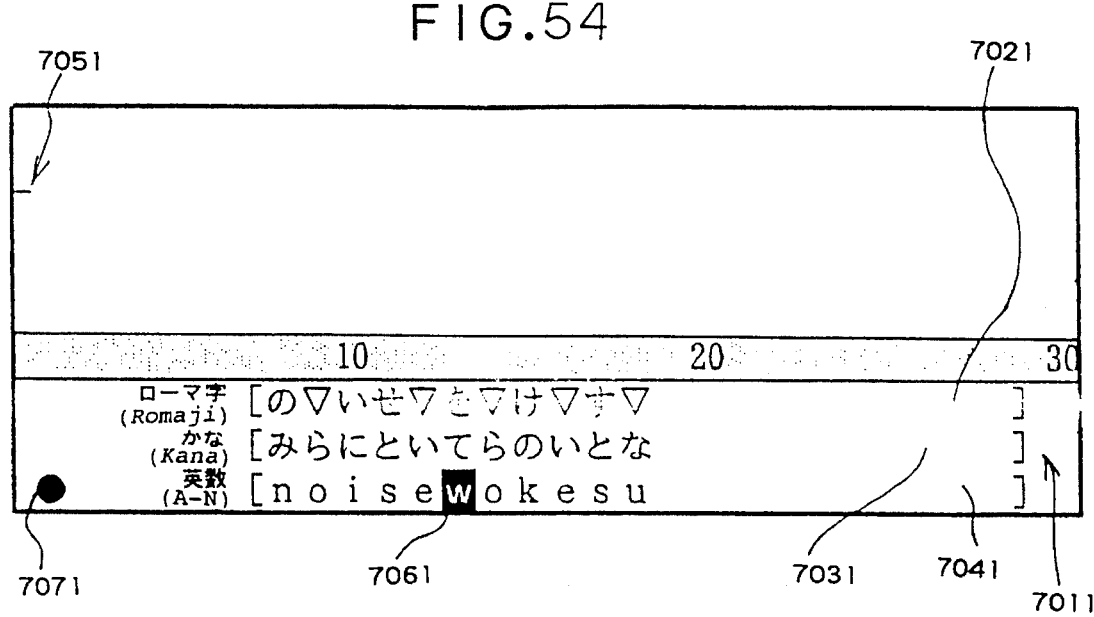

As indicated by the mode mark 7071, the designated input system is the romaji input system. In a case where the user wants to alter the character species and the input system, he/she may move the cursor 7061 to the desired character species display line (7021, 7031 or 7041) by the use of the up key 3011 and down key 3031. In this case, the user intends the alphanumeric character species. Therefore, when he/she presses the down key 3031 twice, the cursor 7061 is moved to the alphanumeric character string display line 7041, and the screen display becomes as shown in FIG. 54. In the above operating example, the left key 3021 is first pressed six times, and the down key 3031 is subsequently pressed twice. In this regard, according to this embodiment, the display column positions of the characters derived from the identical key code are uniformalized by the mark "▽" as stated before. Therefore, insofar as the total numbers of inputs in the respective directions based on the up, down, left and right keys 3011~3041 are equal, the same result is produced. Accordingly, the state of FIG. 54 is established even by the operations of first pressing the down key 3031 twice and subsequently pressing the left key 3021 six times. Besides, the same display state is established even by the operations of first pressing the down key 3031 once, subsequently pressing the left key 3021 three times, subsequently pressing the down key 3031 once and finally pressing the left key 3021 three times.

Figure 55:
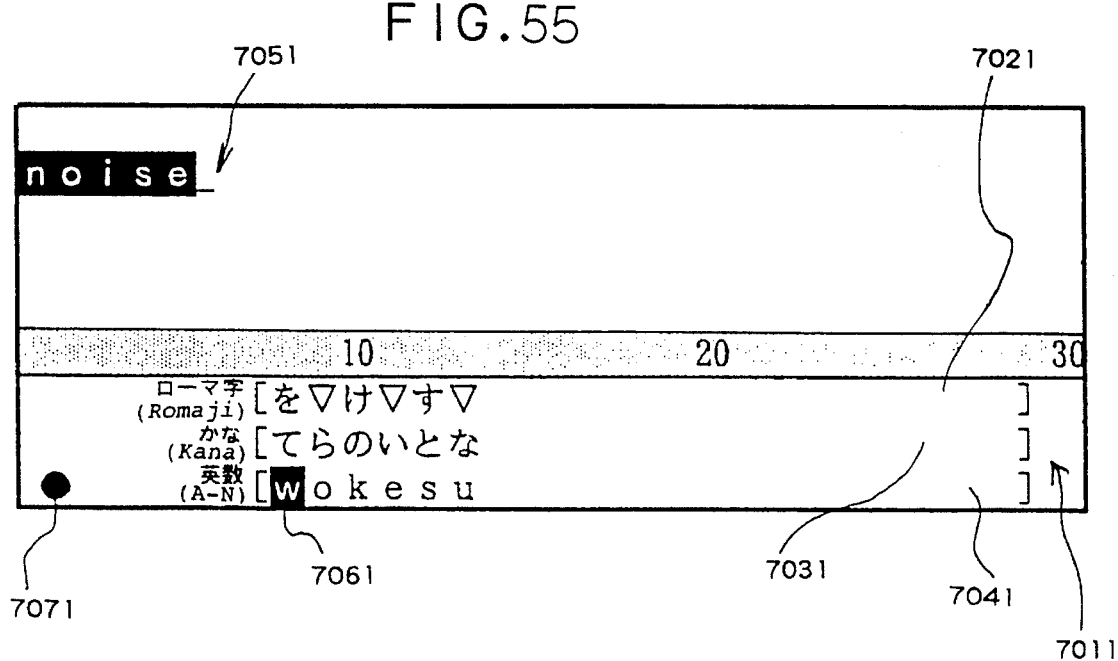

Thereafter, the user presses the "validate" key 3051 for notifying the end of the designations. Then, the character string part desired by the user is displayed in the desired character species, etc. in the second display part 7051. More specifically, when the "validate" key 3051 is pressed under the state of FIG. 54, the screen display becomes as shown in FIG. 55 in which the character string part "noise" is displayed in the second display part 7051, and in which only a part succeeding the part "noise" remains in the first display part 7011.

Further, operations for subsequently designating the character string part "をけす" proceeds as stated below.

Figure 56:
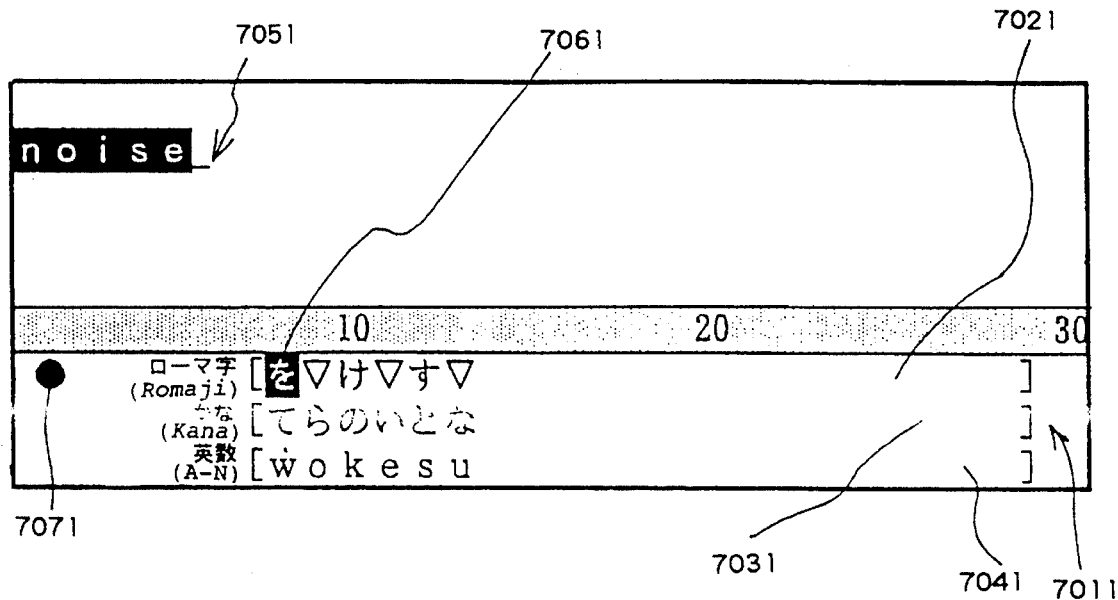

The alphanumeric mode can be changed-over to the kana character input mode based on the romaji input system in such a way that the cursor 7061 is moved to the romaji character string display line 7021 by pressing the up key 3011 twice. The screen display in the changed-over state is shown in FIG. 56.

Figure 57:
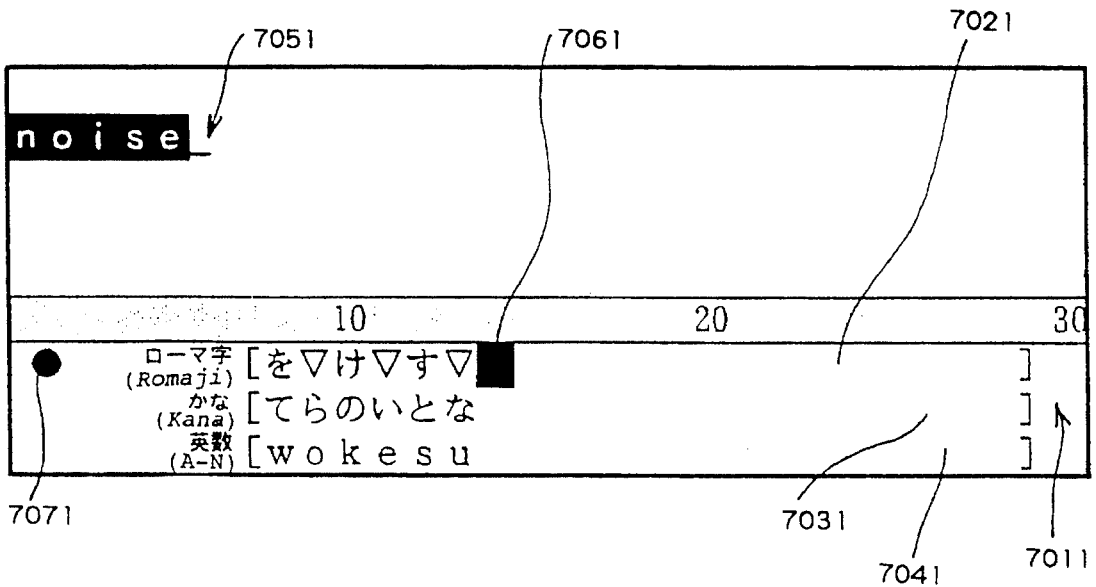

When the right key 3041 is thereafter pressed six times, the cursor 7061 is moved to succeed the tail or rightmost character of the character string as shown in FIG. 57. Thus, all the characters of the remaining character string can be set as a subject for the designation.

Figure 58:
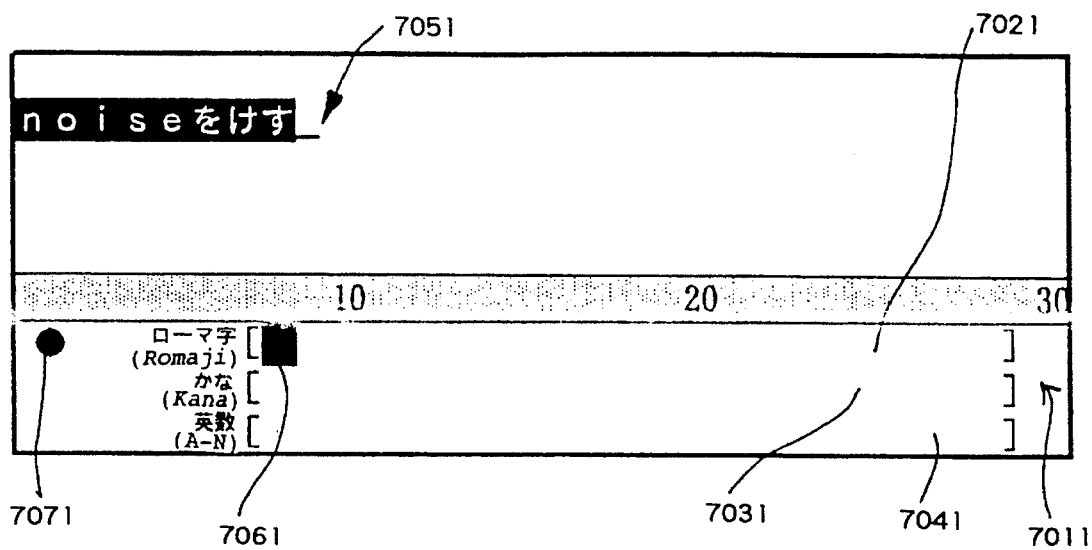

Subsequently, when the "validate" key 3051 is pressed, the character string desired by the user ("をけす" in this case) is displayed in the second display part 7051 as shown in FIG. 58. Herein, since the marks "∇" serve merely to uniformalize the display column positions, they are not displayed in the second display part 7051 of the screen.

In the above way, it is realized to translocate the character string from the first display part 7011 into the second display part 7051, in other words, to designate the character species and input systems of the character string.

Next, there will be explained restoring operations in the case where the character species and the input system have been erroneously designated. The erroneous designations of the character species, etc. are coped with by returning an improper character string part into the first display part 7011 and then designating the character species, etc. anew. The translocation into the first display part 7011 is effected by pressing the left key 3021 in the state in which the cursor 7061 lies at the leftmost column of the first display part 7011. With this operation, the character string displayed in the second display part 7051 is translocated into the head or leftmost position of the first display part 7011 successively from the tail or right side of this character string.

Figure 59:
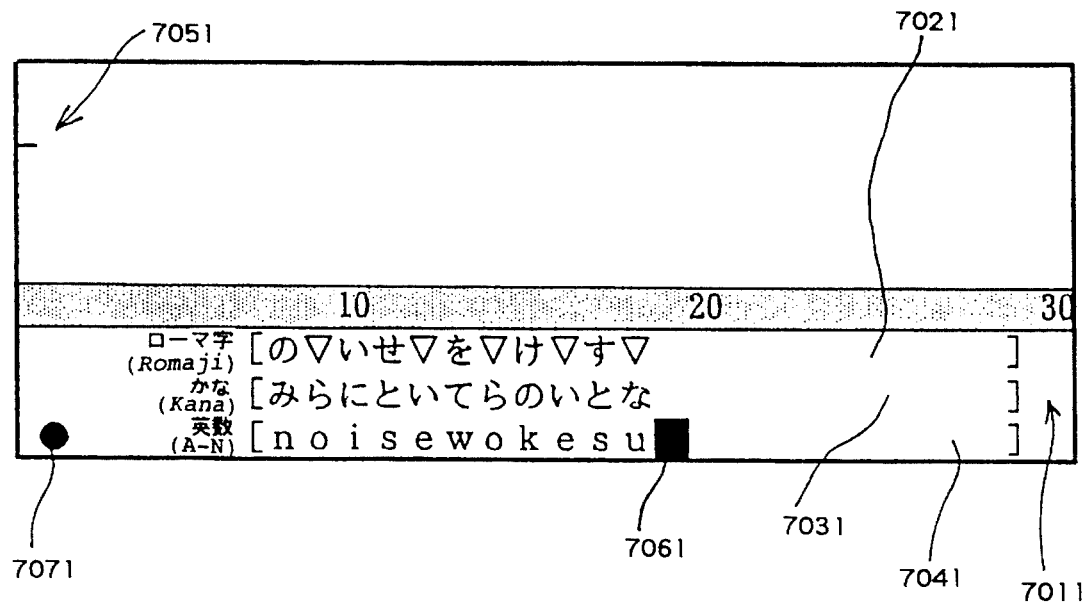
Figure 60:
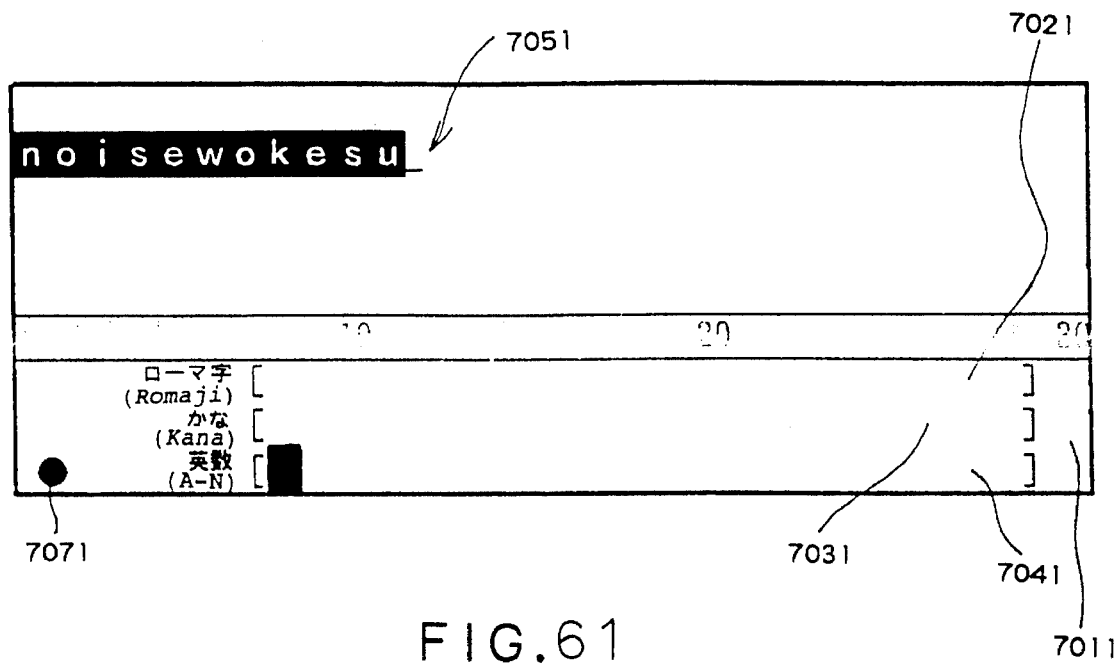

By way of example, in a case where the user has erroneously pressed the "validate" key 3051 in the very state of FIG. 59 in spite of his/her intention of entering "noiseをけす", a character string lying on the left side of the cursor 7061 (the entire character string in the illustrated example) is translocated into the second display part 7051 in the form of alphanumeric characters "noisewokesu" as they are (refer to FIG. 60).

When the left key 3021 is pressed once in the state of FIG. 60, the rearmost or rightmost character ("u" in this case) of the character string displayed in the second display part 7051 is translocated to the leftmost position of the first display part 7011. That is, when the left key 3021 is pressed in the state in which the cursor 7061 lies at the leftmost column of the first display part 7011, the rearmost character of the character string displayed in the second display part 7051 is translocated to the head or leftmost position of the alphanumeric character string display line 7041 of the first display part 7011 (refer to FIG. 61).

Figure 61:
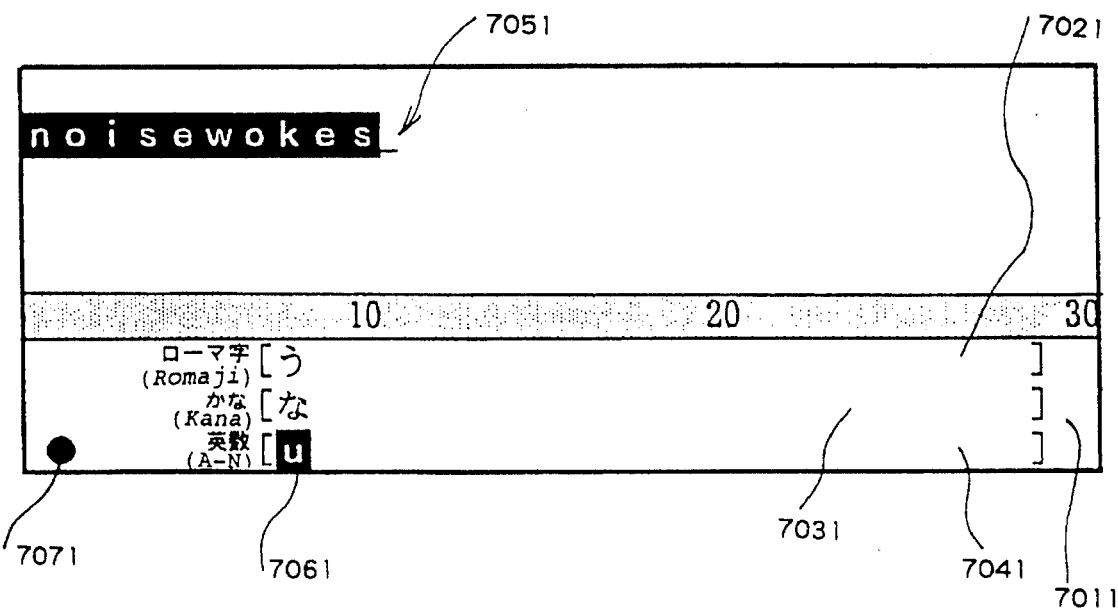
Figure 62:
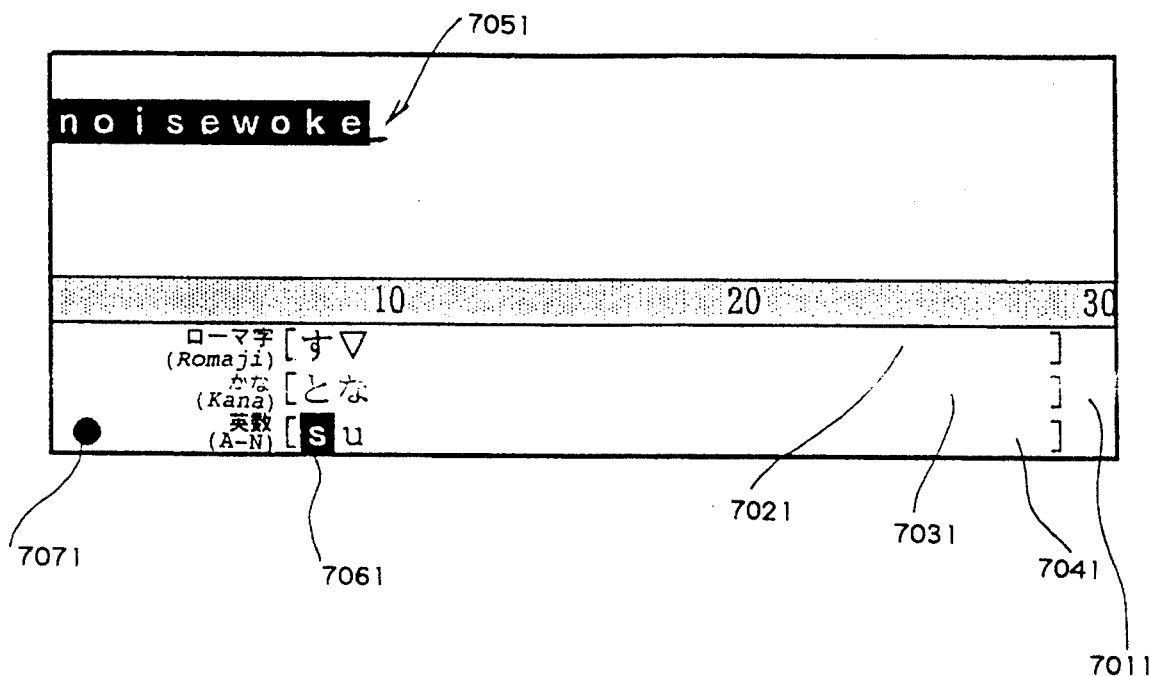
Figure 63:
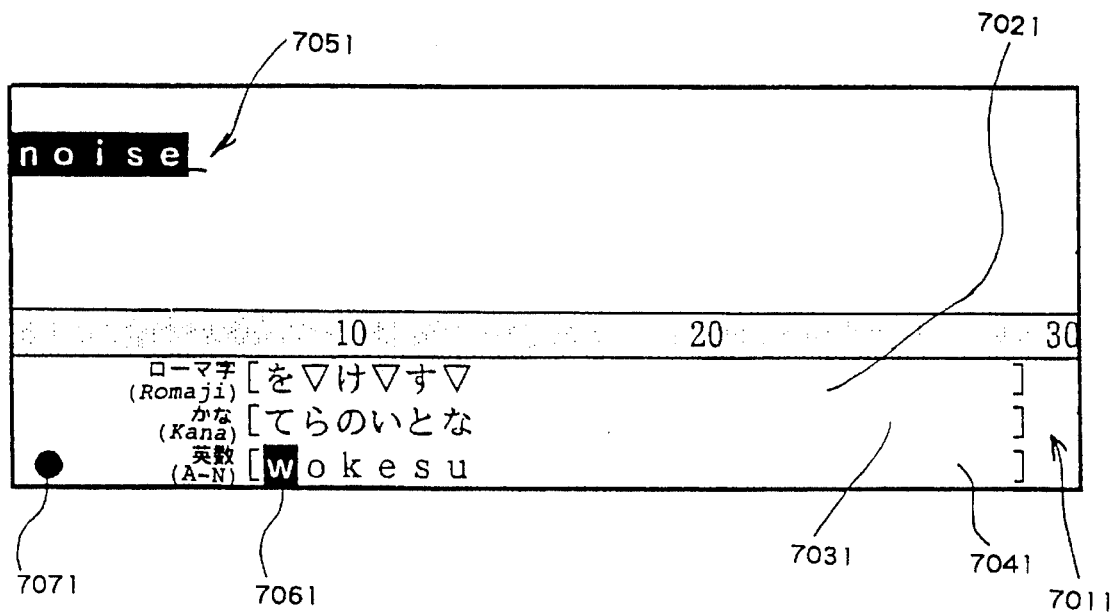

On this occasion, characters corresponding to the character "u" (namely, "な" at the kana character string display line 7031 and "う" at the romaji character string display line 7021) are simultaneously displayed at the respective character string display lines 7031 and 7021, besides at the alphanumeric character string display line 7041 (refer to FIG. 61). When the left key 3021 is thereafter pressed once more, a character "s" in the second display part 7051 is similarly translocated to the first display part 7011. Herein, the character "う" at the romaji character string display line 7021 is replaced with the mark "∇", and a display "す∇" is presented at the romaji character string display line 7021 as shown in FIG. 62. The left key 3021 is thereafter pressed repeatedly, whereby the character string displayed in the second display part 7051 can be translocated from the rear side thereof into the first display part 7011 to the desired number of characters. When the left key 3021 is successively pressed four times under the state of FIG. 63, the entire character string "wokesu" to be corrected can be translocated into the first display part 7011 (refer to FIG. 63).

Figure 65:
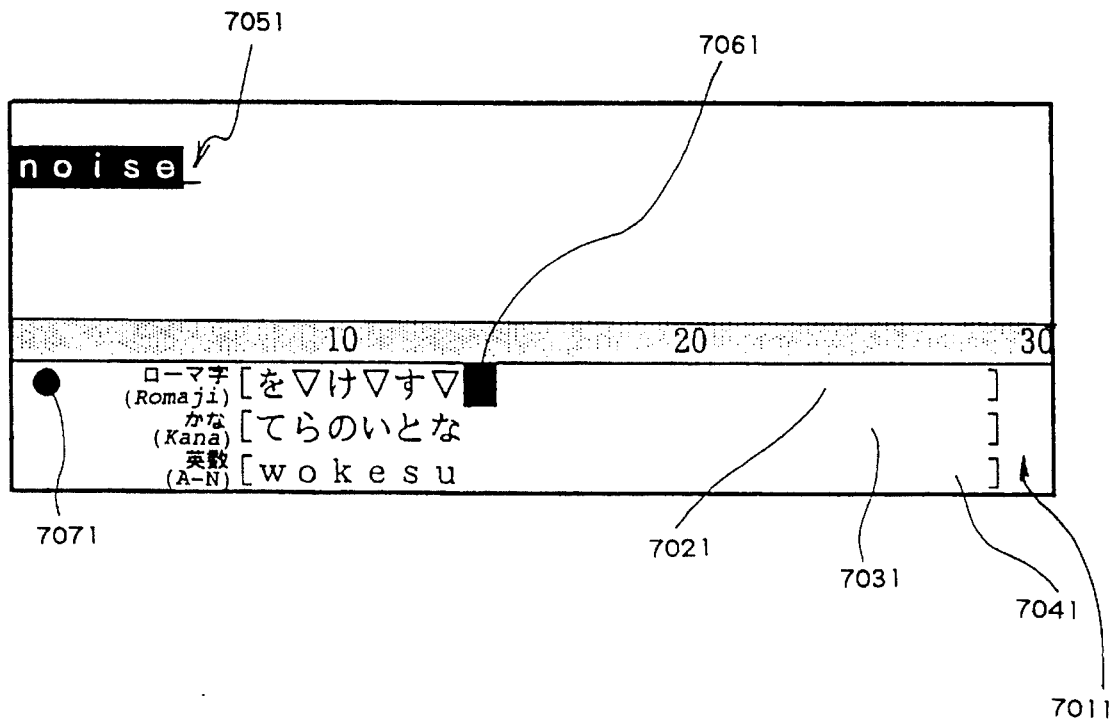

Thereafter, the error can be corrected by designating the character species etc. anew for the character string which has been translocated into the first display part 7011. Since, in this example, the user intends to enter the kana characters based on the romaji input system, he/she presses the up key 3011 twice so as to move the cursor 7061 to the romaji character string display line 7021 (refer to FIG. 64). Further, the user presses the right key 3041 six times, thereby to move the cursor 7061 to the position succeeding the rearmost or rightmost character of the character string (refer to FIG. 65), and he/she presses the "validate" key 3051 under the state of FIG. 65. Then, the screen display becomes the proper input state as shown in FIG. 66.

The information processing equipment of this embodiment also features that the decision means 1081 decides the likelihoods among the plurality of character species and input systems and automatically sets the character species etc. of the maximum likelihoods for the character string. The decision means 1081 can decide the likelihoods and then move the cursor 7061 to the character string display line of the most likely character species etc. each time one character is entered.

This function will be explained by taking a concrete example. Incidentally, it is assumed that the user intends to enter kana characters in conformity with the romaji input system.

Figures 66, 67:
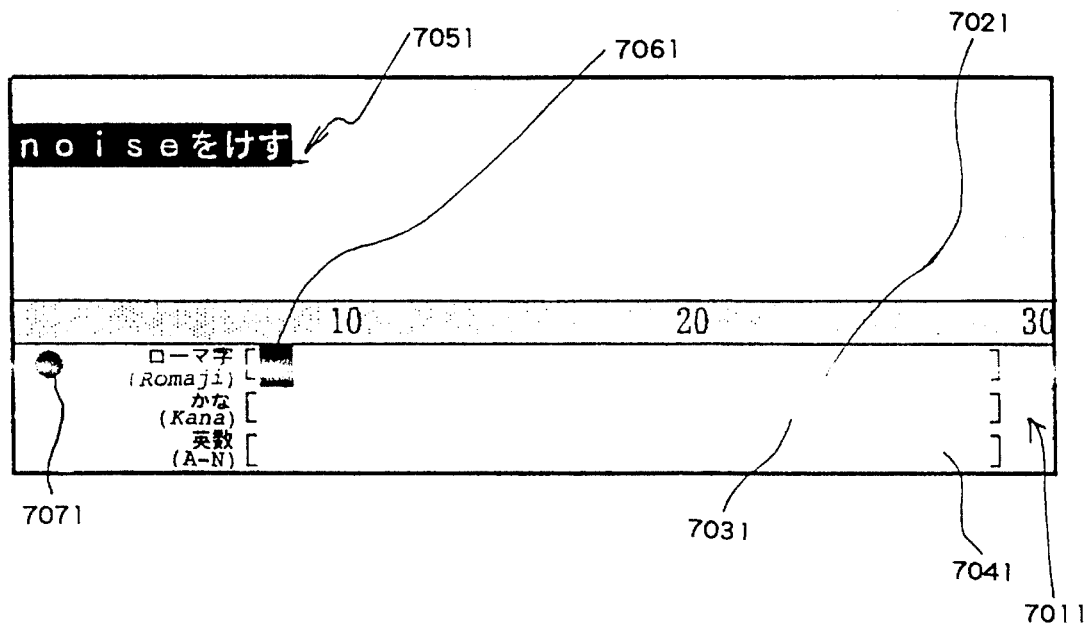
Figure 68:
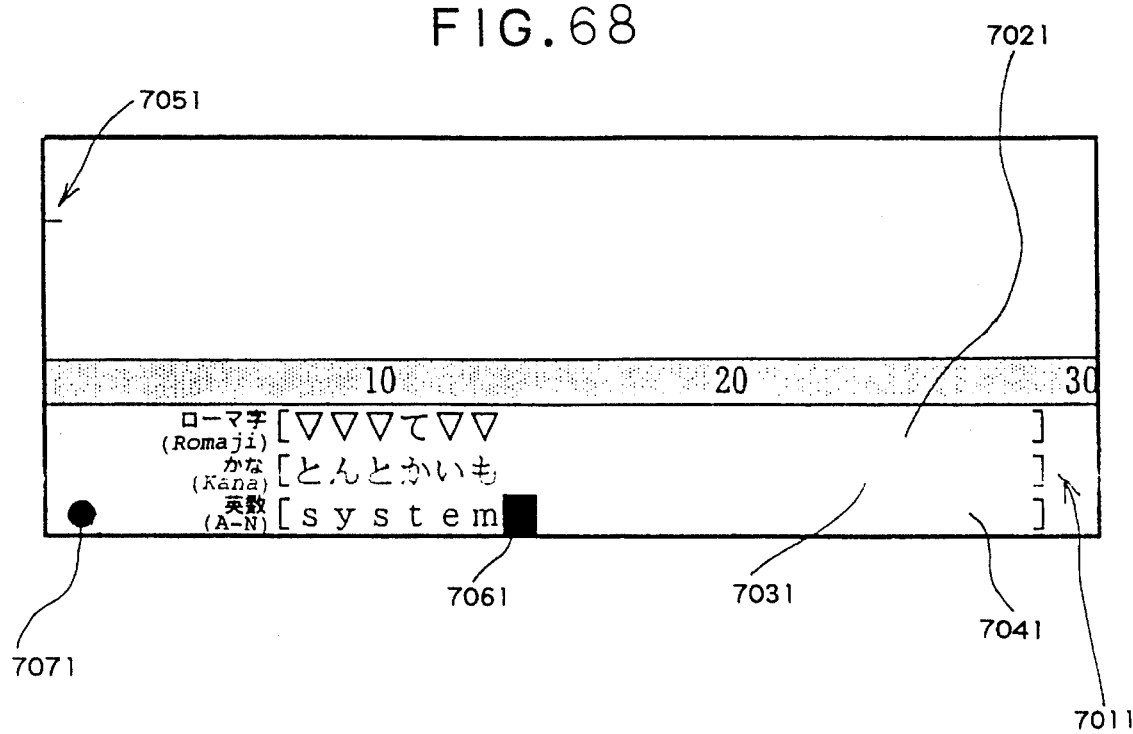
Figure 69:
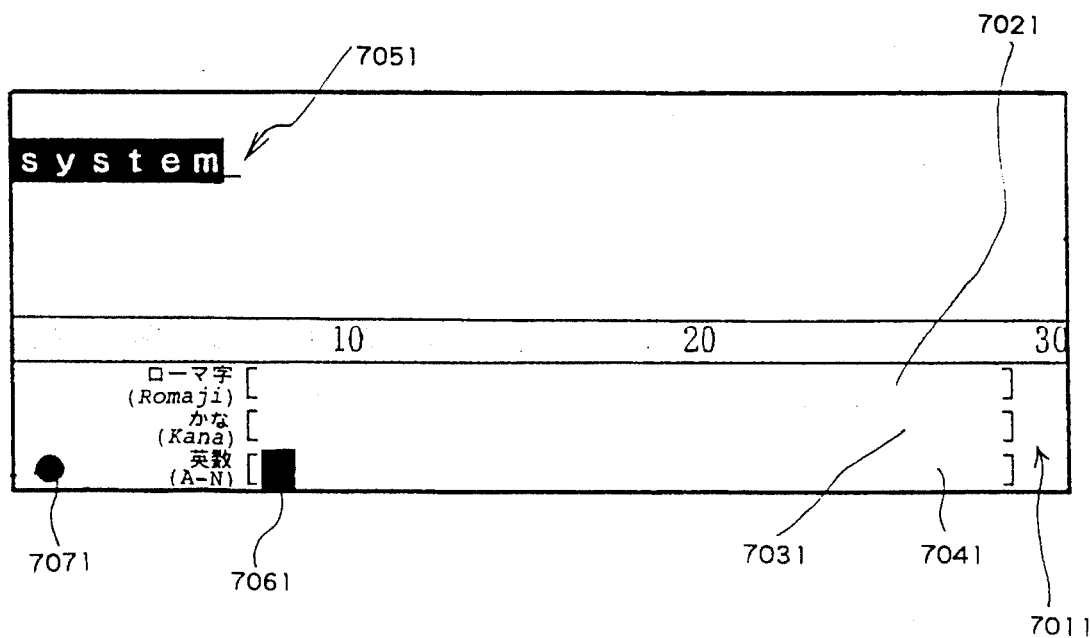

In a case where the user intends to enter a character string "SYSTEMのせっけい" as shown in FIG. 67, a part "SYSTEM" is decided an alphanumeric character string by the decision means 1081 when it has been entered in the course of entering the character string. As a result, the cursor 7061 is automatically set at the alphanumeric character string display line 7041 (refer to FIG. 68). Here, the user presses the "validate" key 3051, thereby to validate or settle the character species of the character string preceding the cursor 7061 (refer to FIG. 69).

Figure 70:
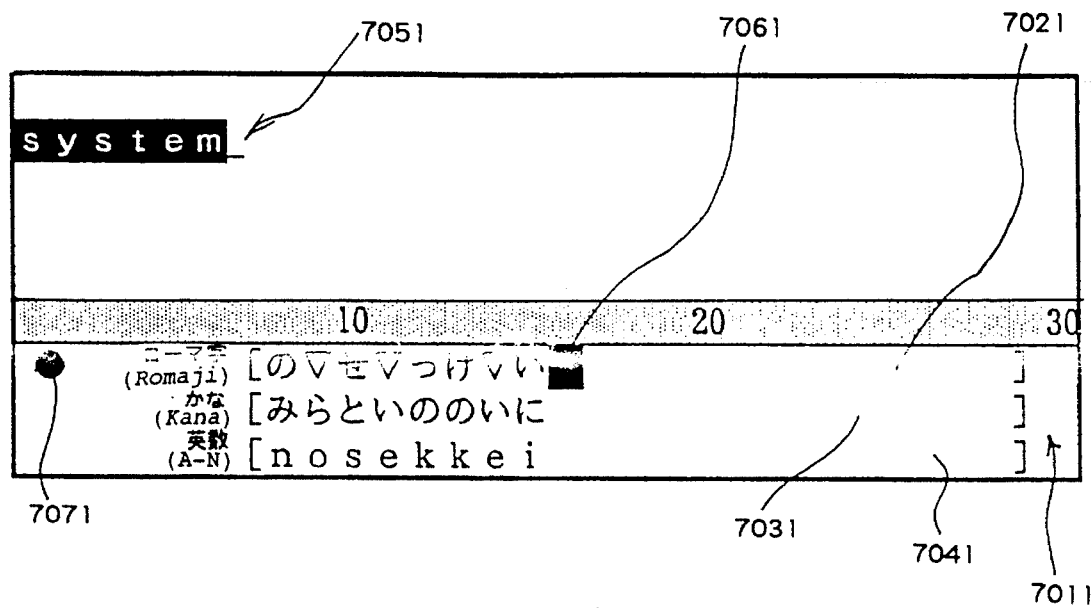
Figure 71:
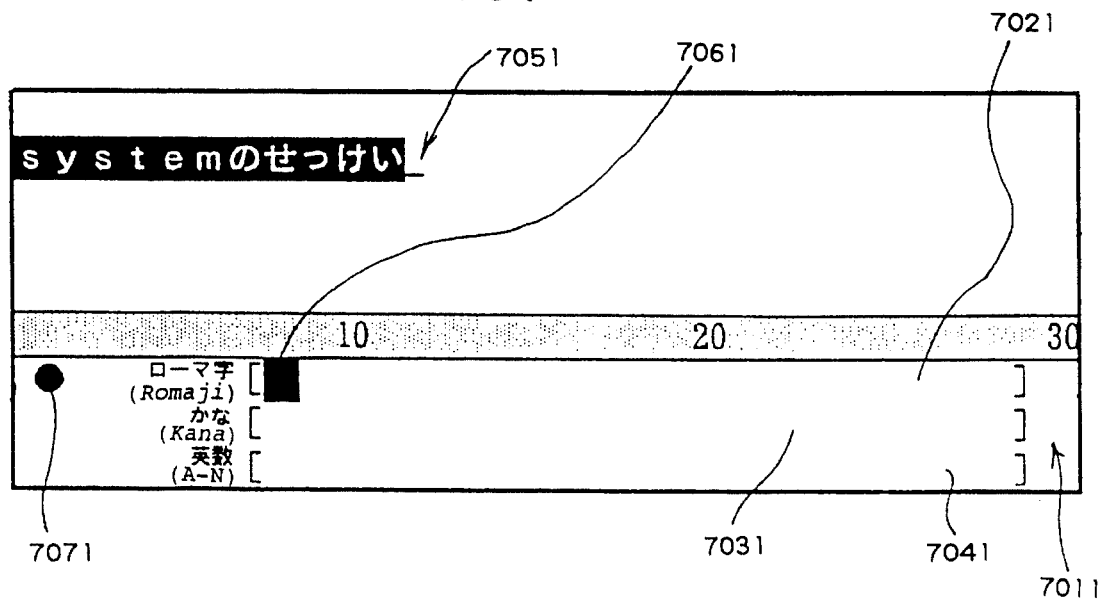

Subsequently, the user enters a part "のせっけい" in conformity with the romaji input system, that is, as "NOSEKKEI". Then, the entered character string is decided by the decision means 1081 to be the kana characters based on the romaji input system, and the cursor 7061 is automatically set at the romaji character string display line 7021 (refer to FIG. 70). Likewise to the above, the character species etc. of the character string preceding the cursor 7061 are validated or settled by the "validate" key 3051, and the display of the screen becomes as shown in FIG. 71.

In this manner, the most likely input system and character species are automatically set by the decision means 1081. Therefore, the user need not perform operations for altering the character species etc., and he/she can enter the plurality of character species with only the character keys and the "validate" key. By the way, in a case where the character species etc. set automatically are not correct, naturally the user himself/herself may designate the correct character species etc. by moving the cursor 7061. The designations by the user himself/herself are as already stated. The functions of deciding the character species etc. as required for the automatic setting will be explained in detail later.

In the above, the display positions of the respective character string display lines 7021, 7031 and 7041 have been explained as being fixed. As a modified example, when the display positions of the respective lines 7021, 7031 and 7041 are changed using the result of the decision means 1081, the user can be facilitated to recognize the character species etc. which are currently set automatically. Such an example will be explained below.

The information processing equipment has the function of replacing and displaying the character string display line of the character species etc. decided to be the most likely by the decision means 1081, at the uppermost line of the first display part 7011 of the display means 1071.

Figure 89:
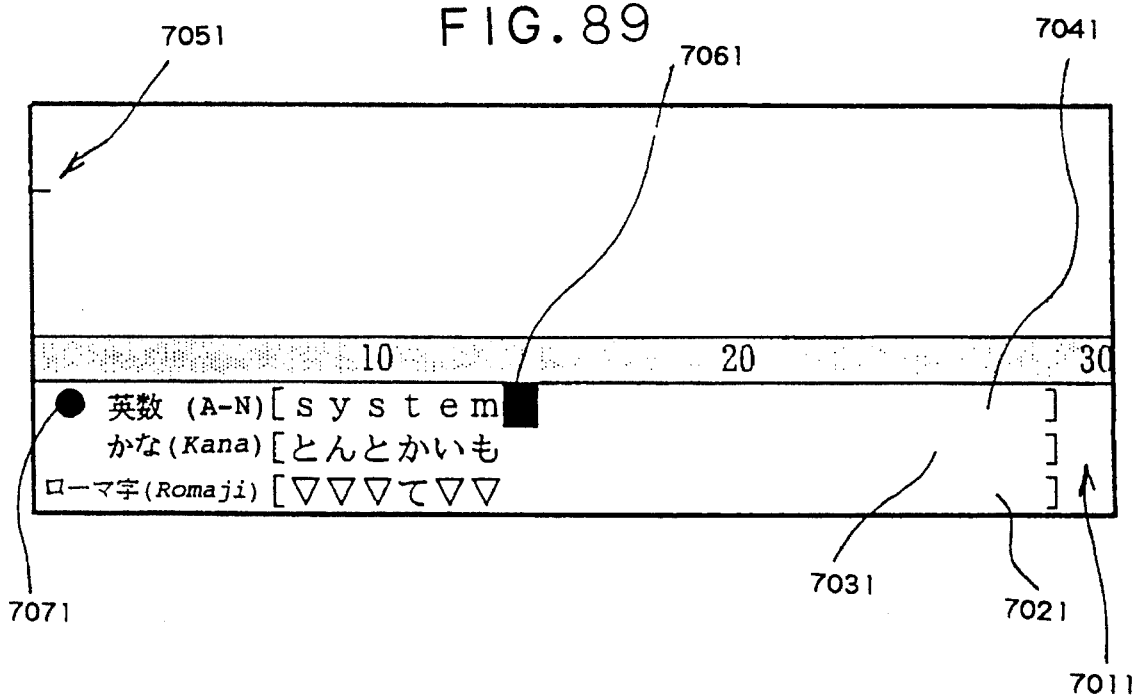

This function will be concretely explained by taking an example. In the case where the user intends to enter the character string "SYSTEM のせっけい" as shown in FIG. 67, the part "SYSTEM" is decided the alphanumeric character string by the decision means 1081. Then, the cursor 7061 is automatically moved to the alphanumeric character string display line 7041, and the alphanumeric character string display line 7041 itself is simultaneously moved to the uppermost line of the first display part 7011 (refer to FIG. 89).

Subsequently, the user enters the part "のせっけい" in conformity with the romaji input system. The entered character string is decided by the decision means 1081 to be the kana characters based on the romaji input system. As a result, the romaji character string display line 7021 becomes the uppermost line of the first display part 7011 this time (refer to FIG. 70).

The operability of the equipment by the user can be improved in the above way that the character species etc. automatically set by the decision means 1081 are displayed at the uppermost line of the first display part 7011. Alternatively, a display aspect may well be altered instead of altering the display position. By way of example, the character string of the set character species etc. may well be displayed by bold characters.

Next, there will be explained the function of the decision means 1081 in the case where the user corrects the character species etc. because of having entered a character string erroneously.

Figure 72:
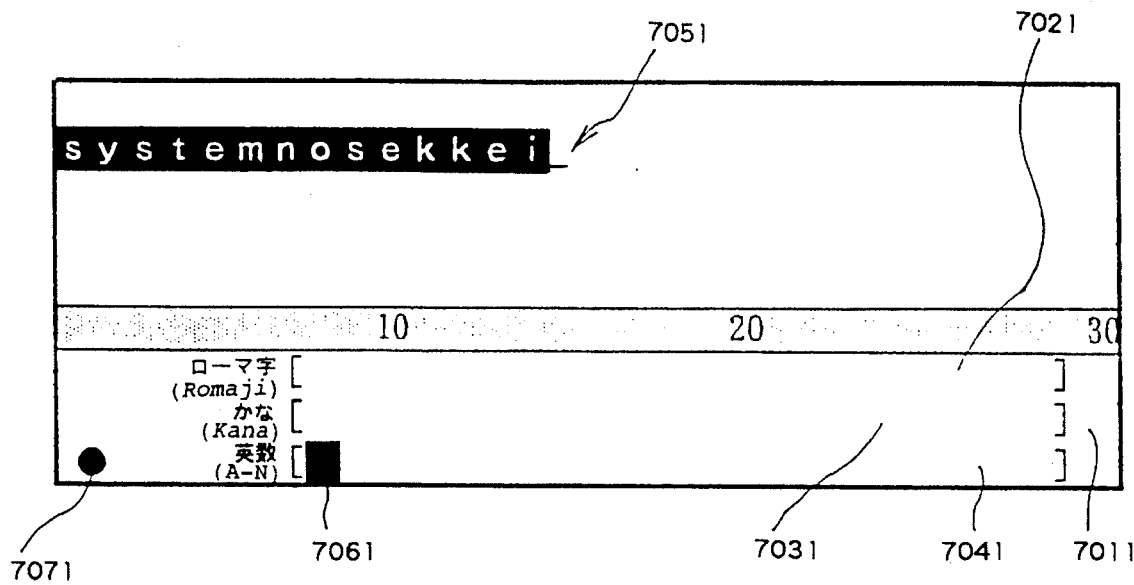
Figure 73:
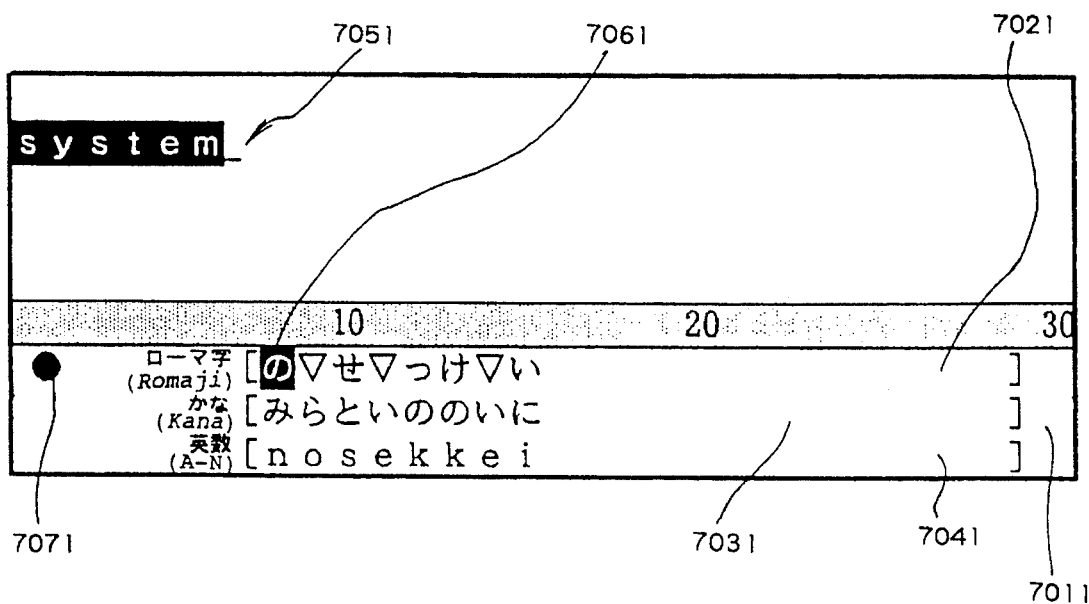

In a case where the user has entered the intended character string "SYSTEM のせっけい" shown in FIG. 67 and where he/she has pressed the "validate" key 3051 erroneously under this state, the display of the screen becomes a state shown in FIG. 72. In this case, the character string part erroneously designated is returned into the first display part 7011, and the error of the designation is corrected, by the same method as explained with reference to FIGS. 59 thru 63. Regarding the example of FIG. 67, a screen display shown in FIG. 73 is presented by pressing the left key 3021 eight times. On this occasion, when the character string "NOSEKKEI" is decided by the decision means 1081 to be based on the romaji input system, the mode mark 7071 is automatically moved from the alphanumeric character string display line 7041 to the romaji character string display line 7021. Thereafter, the user presses the right key 3041 eight times, whereby the display of the screen becomes as shown in FIG. 70. Under the state of FIG. 70, the user presses the "validate" key 3051 anew. Then, the display of the screen falls into the correct state as shown in FIG. 71.

Also in the above operations of entering the characters, the character string of the most likely character species etc. is automatically set owing to the decision means 1081, and hence, the user's operations for altering the character species etc. are dispensed with.

Now, processes which the various means constituting the information processing equipment of this embodiment perform in order to realize the operations thus far explained, the alterations of the displays corresponding to the operations, etc. will be described in conjunction with the fundamental block diagram of FIG. 44.

Figure 74:
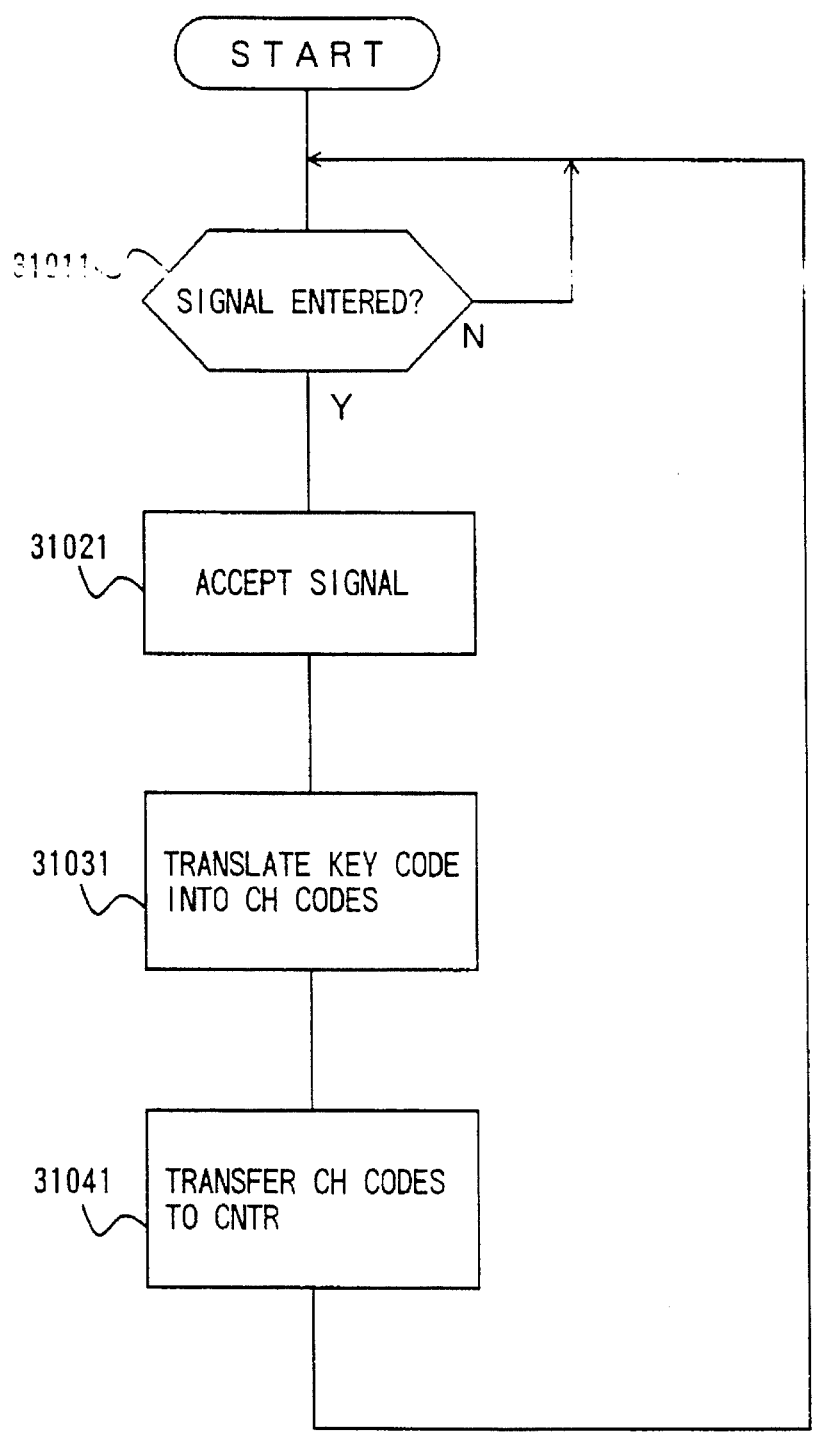

The process of the translation means 1041 (refer to FIG. 44) for delivering a character code corresponding to an entered key code is illustrated in FIG. 74.

The translation means 1041 monitors the input means 1021 at all times, and it continues to wait until the key input is received (step 31011). Upon sensing that the key code (signal) has been entered from the input means 1021, the translation means 1041 accepts the key code (step 31021), and it retrieves an agreement with any of the key codes 5011 of the translation table 1031 (refer to FIG. 48), using the accepted key code as a retrieval code (step 31031). After having found the agreeing data, the translation means 1041 supplies the controller 1051 with the character codes 5021 and 5031 which correspond to the key code 5011 (step 31041).

Figure 75:
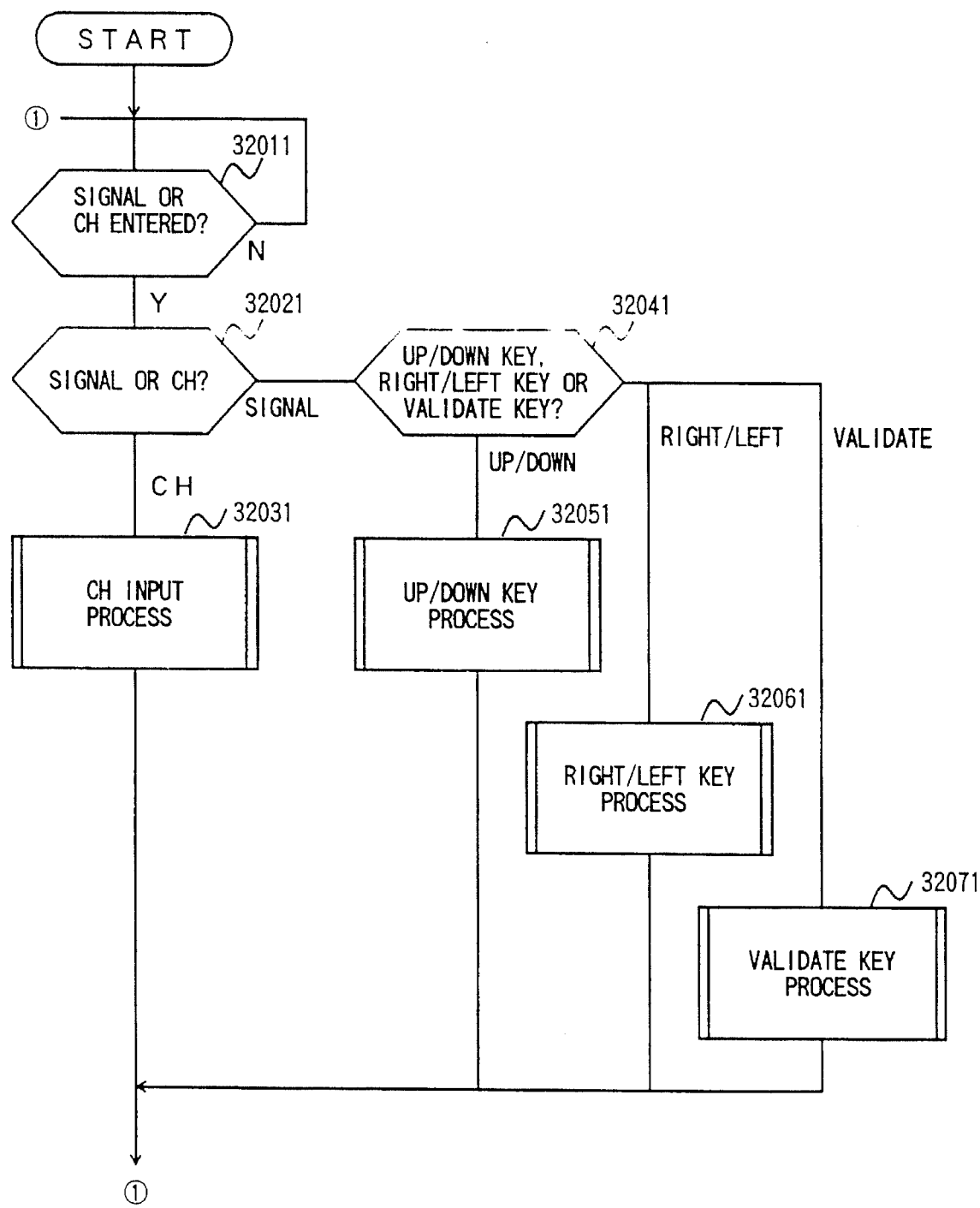

Next, FIG. 75 illustrates the process which the controller 1051 performs in order to store, e.g., the character codes 5021 and 5031 entered from the translation means 1041 and to deliver them to the display means 1071.

The controller 1051 monitors the designation means 1011 and the translation means 1041 at all times, and it continues to wait until an input is received (step 32011). Upon receiving the input from either of the means 1011 and 1041, the controller 1051 checks the content of the input, to decide whether the input is from the designation means 1011 (the up, down, left and right keys 3011, 3021, 3031 and 3041, and the "validate" key 3051) or from the input means 1021 (the character keys of the keyboard) (step 32021). Subject to the input from any of the character keys, the routine in FIG. 75 proceeds to the processing of a step 32031 (namely, a character input process). On the other hand, subject to the input from any of the up, down, left and right keys 3011~3041, etc., the routine proceeds to the corresponding process of the up or down key (step 32051), the left or right key (step 32061), or the "validate" key (step 32071) after a decision at a step 32041. Incidentally, the step 32031 will be detailed later with reference to FIG. 76, the step 32051 with reference to FIG. 77, the step 32061 with reference to FIGS. 78 and 79, and the step 32071 with reference to FIG. 80. After the processing of the corresponding step 32031, 32051, 32061 or 32071 has ended, the routine returns to the step 32011.

Figure 76:
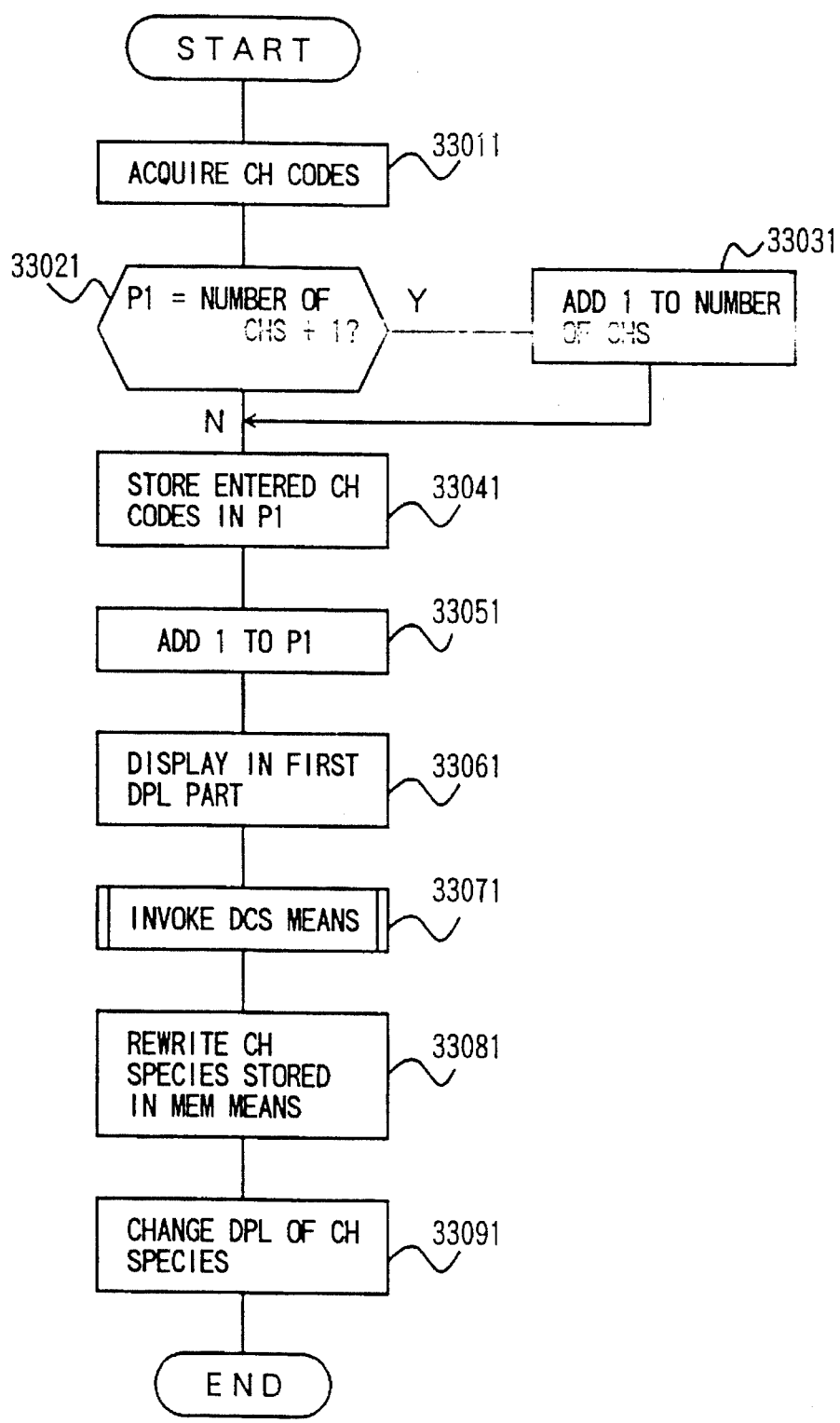

The step 32031 in FIG. 75, namely, the character input process will be explained with reference to FIG. 76.

This process is performed in the case where the input to the controller 1051 has been received from the translation means 1041. Therefore, the controller 1051 acquires the character codes entered on this occasion (step 33011).

Subsequently, the controller 1051 checks whether or not (P1=the number of characters+1) holds, that is, if the cursor

7061 lies at a position directly succeeding the rearmost or rightmost column of character strings displayed in the first display part 7011 (step 33021). As stated before, "P1" denotes the cursor position variable 6091 in the memory means 1061 (refer to FIG. 49). The "number of characters" indicates the number-of-input-characters variable 6081 in the memory means 1061.

As a result, in a case where the aforementioned relationship holds, that is, where the cursor 7061 directly succeeds the rearmost column, "1" is added to the number of characters (the value of the number-of-input-characters variable 6081) in correspondence with the addition of a new character to each input character string (step 33031). To the contrary, in a case where the aforementioned formula does not hold, that is, where the cursor 7061 does not directly succeed the rearmost column, it turns out that the cursor 7061 lies before or behind the directly succeeding position. In this embodiment, the cursor 7061 is made incapable of moving behind the directly succeeding position. At this time, therefore, the cursor 7061 lies within any of the character strings displayed in the first display part 7011.

Since this embodiment is adapted to overwrite data, the processing of a step 33041, et seq. traces the same flow irrespective of the results of the step 33021.

After the step 33021 or the step 33031, the controller 1051 stores the key code 5011 and the character codes 5021 and 5031 received at the step 33011, in the romaji character string storing part 6021, kana character string storing part 6031 and alphanumeric character string storing part 6041 of the memory means 1061, respectively (step 33041). More concretely, the character codes 5021 and 5031 entered from the translation means 1041 and left intact are respectively stored in the positions of the kana character string storing part 6031 and alphanumeric character string storing part 6041 as indicated by the control variable P1. In addition, the key code 5011 is subjected to the romaji-kana conversion in view of the preceding and succeeding contents of the alphanumeric character string storing part 6041, and the character code of the resulting kana character is stored in the romaji character string storing part 6021. By the way, in a case where the kana character obtained by the romaji-kana conversion is a consonant such as "か", the column positions for storing the character codes are uniformalized with the mark "▽" as already stated.

After the character codes have been stored in the corresponding storing parts 6021–6041, the number of stored characters has increased one, and hence, "1" is added to the value of the variable P1 (step 33051). Besides, the controller 1051 displays the characters corresponding to the character codes entered on this occasion, in the first display part 7011 with reference to these character codes. As a matter of course, the controller 1051 moves the column position of the cursor 7061 consequently (step 33061). Thereafter, the controller 1051 invokes the decision means 1081 so as to decide the character species and input system having the maximum likelihoods, as to the entered character string (step 33071). On the basis of the decided results, the controller 1051 rewrites the character species storing variable 6071 stored in the memory means 1061 (step 33081). Also, it alters those line positions of the first display part 7011 at which the mode mark 7071 and the cursor 7061 are displayed (step 33091).

Figure 77:
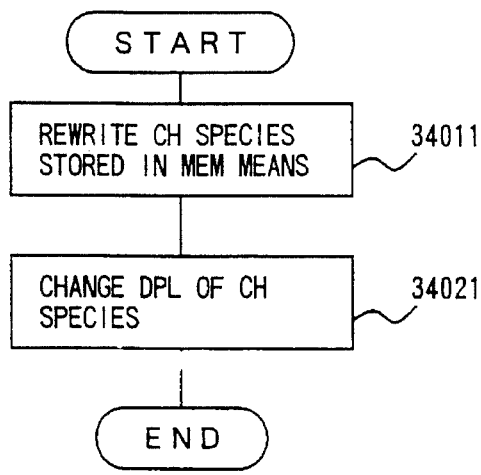

FIG. 77 illustrates the details of the step 32051 in FIG. 75, namely, the process which is executed when the up key 3011 or down key 3031 has been pressed.

As stated before, in this embodiment, the character species etc. are selected by moving the cursor 7061 with the up or down key 3011 or 3031. Accordingly, when the input of the up or down key 3011 or 3031 has been received, the controller 1051 rewrites the character species etc. stored in the character species storing part 6071 of the memory means 1061, into new ones (step 34011). Also, it changes the cursor 7061 and the mode mark 7071 in the first display part 7011, to new positions (step 34021).

Figure 78:
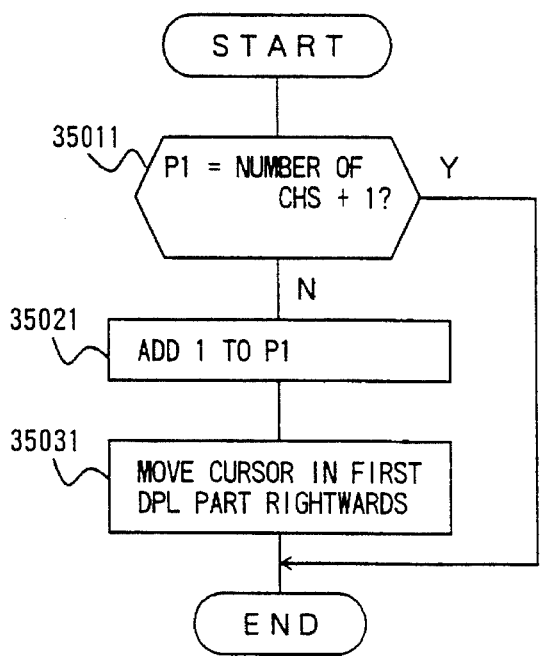

The step 32061 in FIG. 75, namely, the process which is executed when the input of the left key 3021 or right key 3041 has been received, will be explained in detail with reference to FIG. 78 or FIG. 79. FIG. 78 is a flow chart showing the process in the case the input of the right key 3041, while FIG. 79 is a flow chart showing the process in the case the input of the left key 3021.

Referring first to FIG. 78, the controller 1051 checks whether or not the cursor 7061 lies at the position directly succeeding the tail or rearmost column of the entered character string (step 35011). If the cursor 7061 lies at the directly succeeding position, it cannot be moved rightwards any longer in this embodiment. Therefore, the routine in FIG. 78 is ended without any processing. On the other hand, if the cursor 7061 does not lie at the directly succeeding position, the controller 1051 adds "1" to the value of the variable P1 (cursor position variable 6091) stored in the memory means 1061 (step 35021), and it changes the display of the cursor 7061 in the first display part 7011 so as to move rightwards (step 35031).

Figure 79:
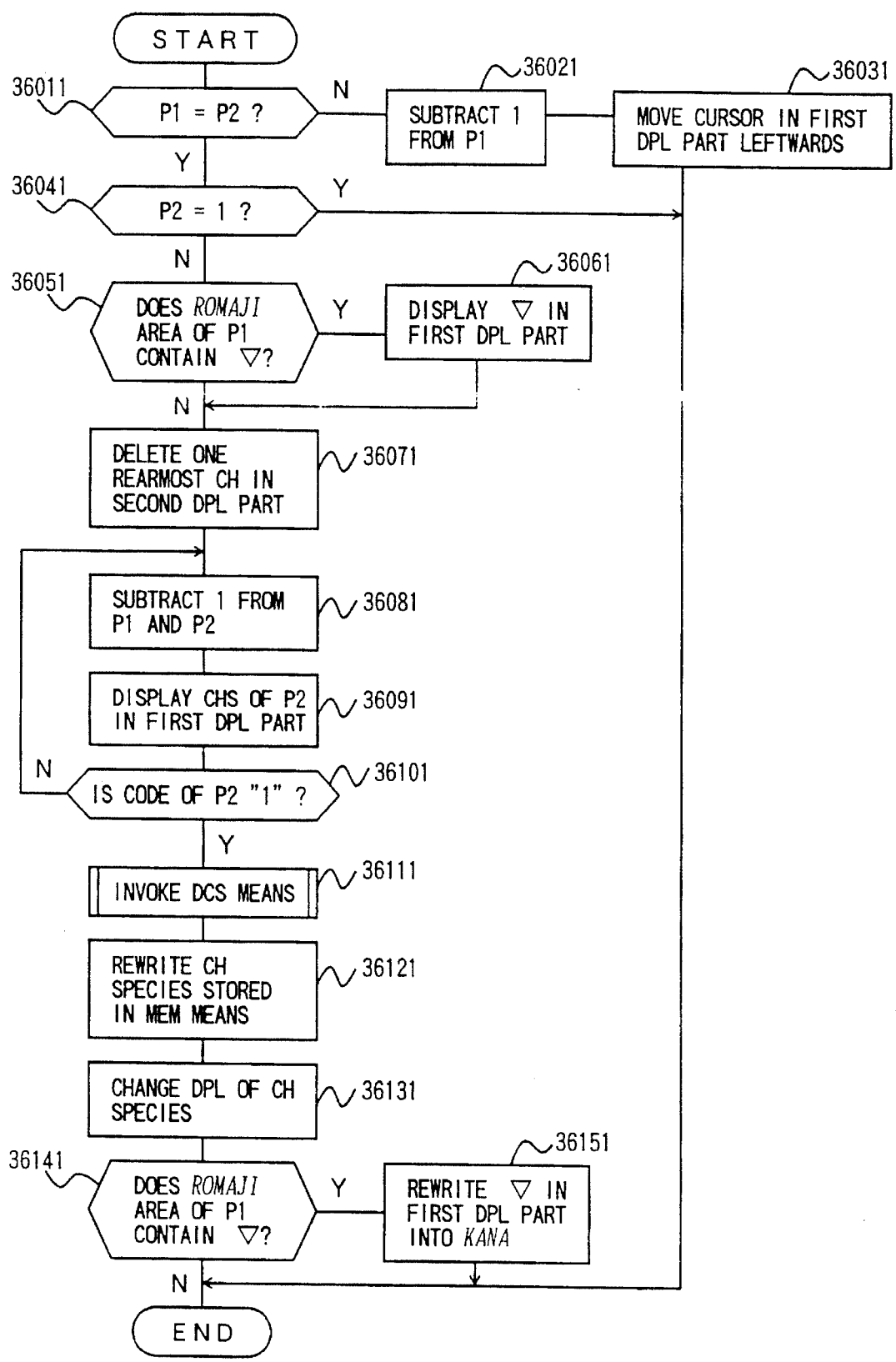

Referring secondly to FIG. 79, the controller 1051 compares the values of the variable P1 (cursor position variable 6091 for indicating the position of the cursor 7061 with respect to the entered character string and the variable P2 (display boundary variable 6101 indicating the head or leftmost character within the entered character string as displayed in the first display part 7011 (step 36011). In a case where the values of both the variables P1 and P2 are not equal as the compared result, the controller 1051 subtracts "1" from the variable P1 (step 36021) and moves the cursor 7061 in the first display part 7011 leftwards to the amount of one column (step 36031). Then, the process is ended.

On the other hand, in a case where P1=P2 holds at the step 36011, the controller 1051 further checks if the value of the variable P2 is "1" (step 36041). When P2=1 holds as the checked result, the cursor 7061 lies at the leftmost position of the first display part 7011, and the character string entered at this time is entirely displayed in the first display part 7011. That is, in this case, the left key 3021 has been pressed at the head of the entire input character string. Therefore, the routine in FIG. 79 is ended without any processing.

When P2=1 does not hold at the step 36041, the routine proceeds to a step 36051.

Figure 81:
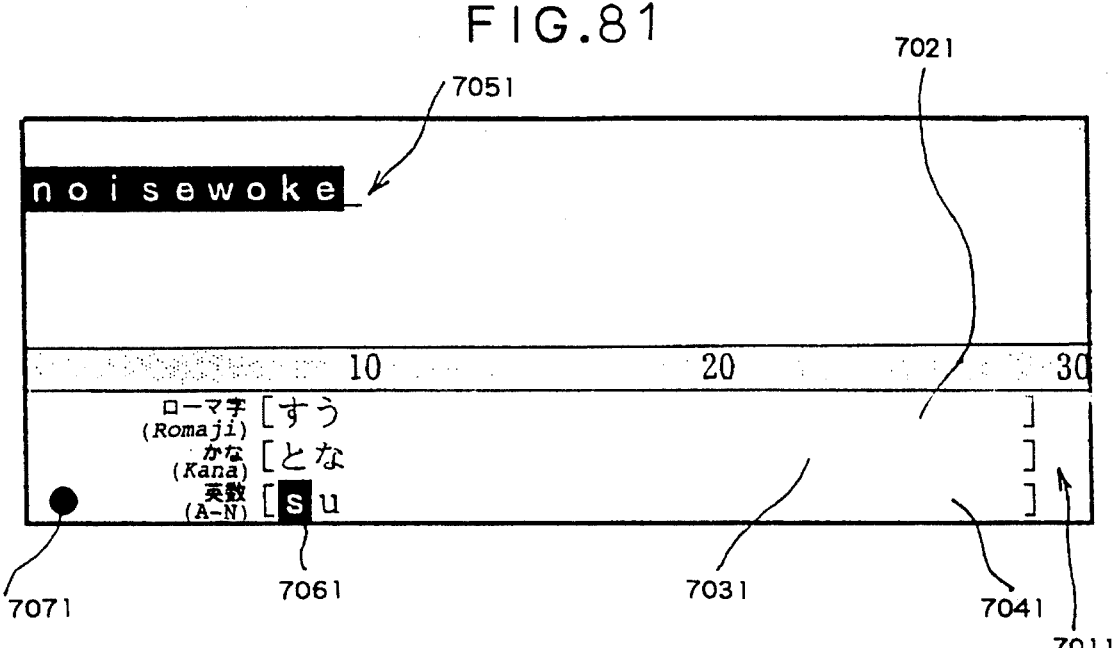

At the step 36051, the controller 1051 checks whether or not the content of the romaji storing part 6021 at the column at which the cursor 7061 lies currently is the mark "▽". Subject to the mark "▽", the controller 1051 displays this mark "▽" at the display position of the variable P1 at the romaji character string display line 7021 of the first display part 7011 (step 36061). Such processing is executed in order that a screen display as shown in FIG. 81 may be prevented from appearing. More specifically, since the routine has reached the step 36051 via the steps 36011 and 36041, it is known that the current cursor 7061 lies at the head or foremost position of the first display part 7011 and that the character string exists in the second display part 7051. Further, since the content of the romaji character storing part 6021 at the position P1 is the mark "▽", the display of the screen becomes as shown in FIG. 61. Unless the processing of the step 36061 is executed on such an occasion, characters "すう" will be displayed in response to key inputs "su" (refer to FIG. 81), and the user will be confused. Therefore, the correspondence among the character codes of the plurality of character species is held by displaying the mark "∇" instead of the character "う".

Thereafter, one character is translocated from the second display part 7051 into the first display part 7011. In consequence, the cursor 7061 is moved frontwards to the amount of one character within the input character string, and the position P2 adjoining the head or leftmost character in the first display part 7011 is also moved frontwards to the amount of one character. Therefore, the character string in the second display part 7051 has one character deleted from the tail or right side thereof (step 36071), and the value of each of the variables P1 and P2 has "1" subtracted therefrom (step 36081). Besides, the character codes of the respective character species stored in the column of the character string storing portion 6001 of the memory means 1061 as indicated by the variable P2 are displayed at the head positions of the first display part 7011 (step 36091).

Thereafter, the controller 1051 checks whether or not the content of the column of the display boundary code storing part 6051 of the character string storing portion 6001 of the memory means 1061 as indicated by the variable P2 is "1" (step 36101).

If the code of the column indicated by the variable P2 is "0" as the checked result, it is meant that the rearmost or rightmost character in the second display part 7051 corresponds to a plurality of key codes (in other words, that a column not displayed in the second display part 7051 is existent). In such a case, accordingly, the steps 36081 and 36091 are iterated until the column at which the code of the display boundary code storing part 6051 is "1" is reached. That is, the confirmation of the code of the display boundary code storing part 6051 makes it possible to discriminate whether the kana character displayed in the second display part 7051 is based on the romaji input system or on the kana input system. Thus, appropriate processing can be performed for the respective input systems.

By way of example, let's consider a case where a kana character "す" is displayed at the rearmost or rightmost position of the character string in the second display part 7051. When the character "す" is based on the kana input system, the display boundary code (6051) of the column corresponding to the character "す" is "1". Accordingly, in the case where the left key 3021 has been pressed, the character "す" based on the kana input system can be returned into the first display part 7011 by performing the processing of the steps 36081 and 36091 only once.

In contrast, when the character "す" displayed in the second display part 7051 is based on the romaji input system, the display boundary codes (6051) of the column corresponding to the character "す" are "1" and "0" (in the romaji input system, two key codes are required for expressing one consonant such as "す"). Accordingly, in the case where the left key 3021 has been pressed, the character "す" based on the romaji input system can be returned into the first display part 7011 for the first time by iteratively performing the processing of the steps 36081 and 36091 twice.

After the completion of the processing of the steps 36081 thru 36101, the controller 1051 invokes the decision means 1081 so as to decide the character species and input system which exhibit the maximum likelihoods (step 36111). The character species storing variable 6071 stored in the memory means 1061 is rewritten on the basis of the decided result (step 36121). In addition, the display position of the mode mark 7071 in the first display part 7011 is altered (step 36131).

Further, the controller 1051 checks whether or not the head character is the mark "∇" at the romaji character string display line 7021 (step 36141). If the head character is the mark "∇", the controller 1051 performs the romaji-kana conversion by the use of the content of the alphanumeric character string storing part 6041 of the character string storing portion 6001 of the memory means 1061, thereby to rewrite the display of the mark "∇" into the kana character (step 36151).

Figure 82:
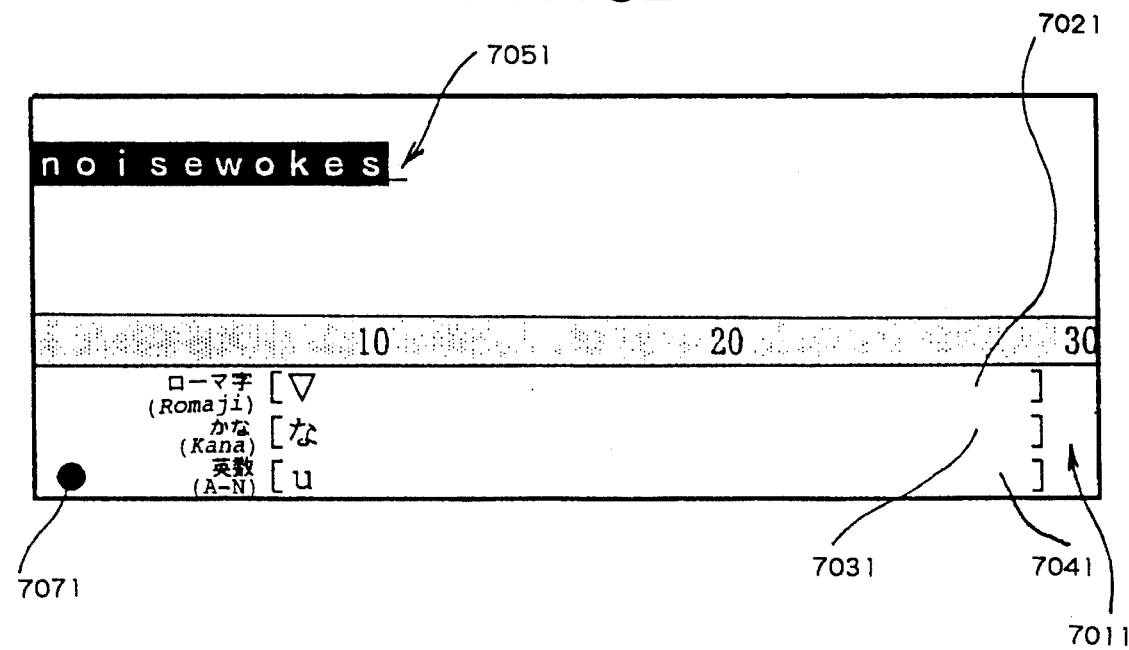

The reason why the processing of the steps 36141 and 36151 is performed, is as stated below. The case where the head character is the mark "∇" at the step 36141, signifies that the state of the screen display before starting the process shown in FIG. 79 (in other words, the state before pressing the left key 3021) was as shown in FIG. 60. Herein, unless the processing of the step 36151 is performed, the screen display becomes as shown in FIG. 82. Under these circumstances, in a case where a kana character based on the romaji input system is to be entered following an alphanumeric character string (for example, "sう"), the state of FIG. 62 must be established in such a way that a part extending to the alphanumeric character "s", up to which the character species is properly designated, is returned into the first display part 7011 by further pressing the left key 3021 under the state of FIG. 82. The above operations are troublesome. Accordingly, in the case where the step 36141 holds true, the mark "∇" is automatically rewritten into the kana character "う" (refer to FIG. 61). Thus, the kana character "う" based on the romaji input system can be designated under the state of FIG. 61, so that the number of times which the left key 3021 is pressed can be decreased.

Figure 80:
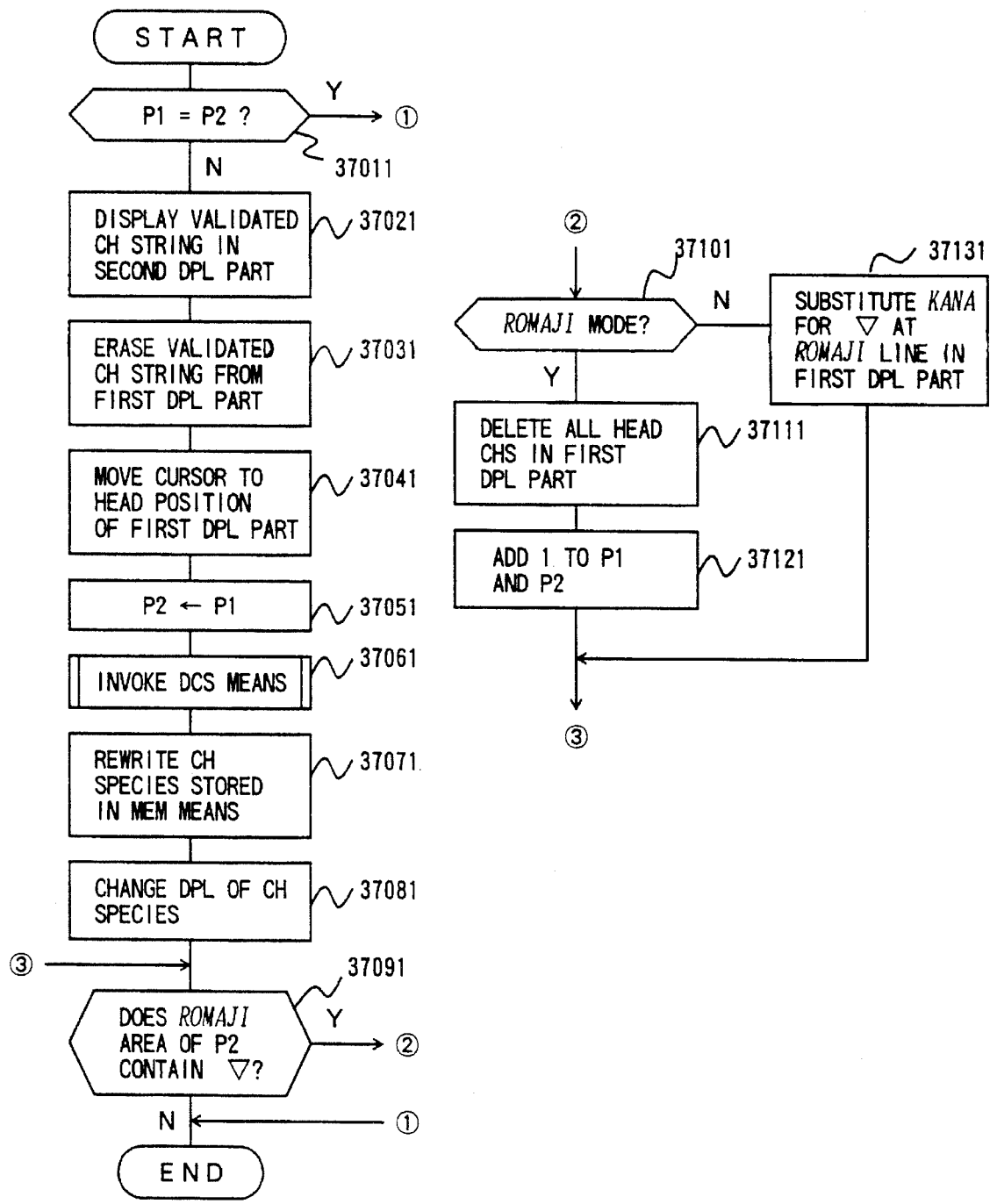

Next, the details of the step 32071, namely, the "validate" key process in FIG. 75 will be explained with reference to FIG. 80.

When the input of the "validate" key 3051 is received, that part of the character string displayed in the first display part 7011 which lies before the cursor 7061 is translocated into the second display part 7051. In a case where no part of the character string displayed in the first display part 7011 lies before the cursor 7061 (that is, where the cursor 7061 lies at the head or leftmost position of the first display part 7011), the routine in FIG. 80 is ended without any processing.

More specifically, the controller 1051 checks whether or not the cursor 7061 lies at the head or leftmost position of the first display part 7011 (step 37011). It ends the process directly subject to the head position. On condition that the cursor 7061 does not lie at the head position, the controller 1051 translocates the part of the character string lying before the cursor 7061 or on the left side thereof, into the second display part 7051 (step 37021). By the way, the "part of the character string" lying before the cursor 7061 is a character'string part which extends from the position P2 of the character string stored in the memory means 1061, up to a position preceding the position P1 one character. The character species etc. of the character string part are known by referring to the control variables stored in the memory means 1061.

In case of displaying the designated character string part in the second display part 7051, the characters thereof except the marks "∇" are displayed. The codes "0's" are stored in the display boundary code storing part 6051 of the character string storing portion 6001 of the memory means 1061 for the characters which are not displayed, whereas the codes "1's" are stored for the characters which are displayed. The use of the codes set here makes possible the translocation of the character string from the second display part 7051 into the first display part 7011 as stated before.

The character string part translocated into the second display part 7051 is deleted from the first display part 7011 (step 37031), and the cursor 7061 is moved to the head position of the first display part 7011 (step 37041). In correspondence with this operation, the value P1 is substituted into the value P2 (step 37051). Thereafter, the controller 1051 invokes the decision means 1081 so as to decide the most likely character species etc. for a character string which remains in the first display part 7011 (step 37061). On the basis of the results of the decision, the character species storing variable 6071 stored in the control variable storing portion 6061 of the memory means 1061 is rewritten (step 37071), and the display line of the mode mark 7071 and cursor 7061 is appropriately altered (step 37081).

The controller 1051 checks if the character of the column of the romaji character string storing part 6021 as indicated by the variable P2 (that is, the head character of the romaji character string display line 7021 of the first display part 7011) is the mark "▽" (step 37091).

Figure 83:
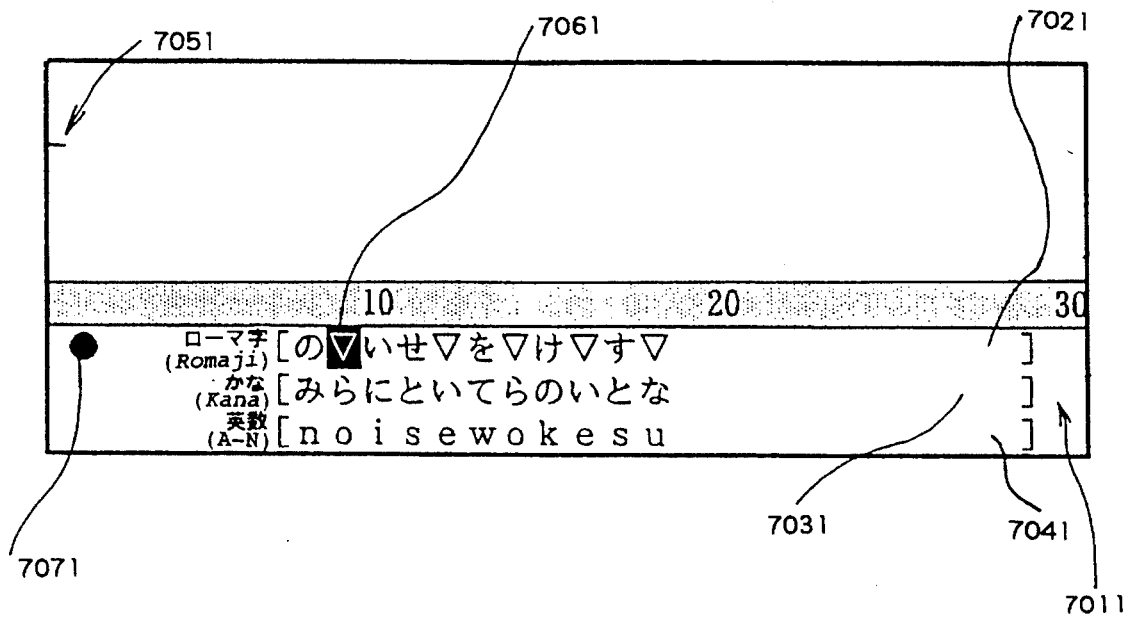
Figure 84:
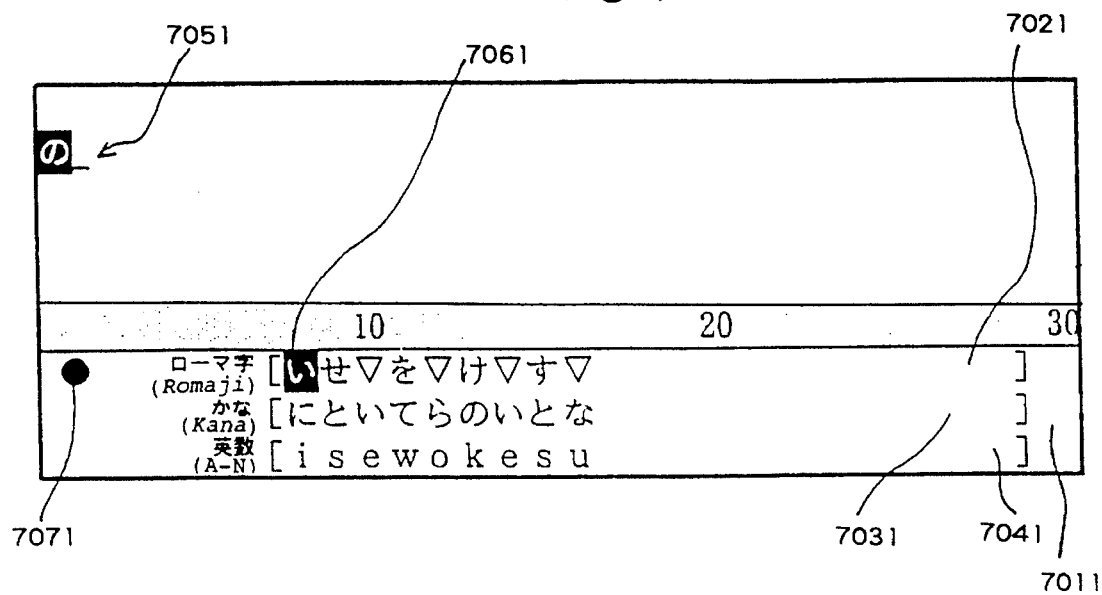

If the character is not the mark "▽", the routine is ended without further processing. However, in a case where the character is the mark "▽", whether or not a subject for the designation at that time is a kana character based on the romaji input system is further decided (step 37101). When the subject is the kana character based on the romaji input system as the decided result, it is meant that the state of the display of the screen before starting the process shown in FIG. 80, in other words, the state before pressing the "validate" key 3051 was as shown in FIG. 83. On this occasion, it is reasonable to judge that the user wanted to validate or settle the kana character "の" based on the romaji input system. Therefore, the mark "▽" at the romaji character string display line 7021, a character "ら" at the kana character string display line 7031 and a character "o" at the alphanumeric character string display line 7041 ought to be deleted. Accordingly, one head character of each of the character strings displayed in the first display part 7011 is deleted, and the codes "0's" are set in the columns of the display boundary storing part 6051 as indicated by the variables P1 and P2 (step 37111) Further, "1" is added to each of the variables P1 and P2 (step 37121). As a result, the display of the screen becomes as shown in FIG. 84.

Figure 85:
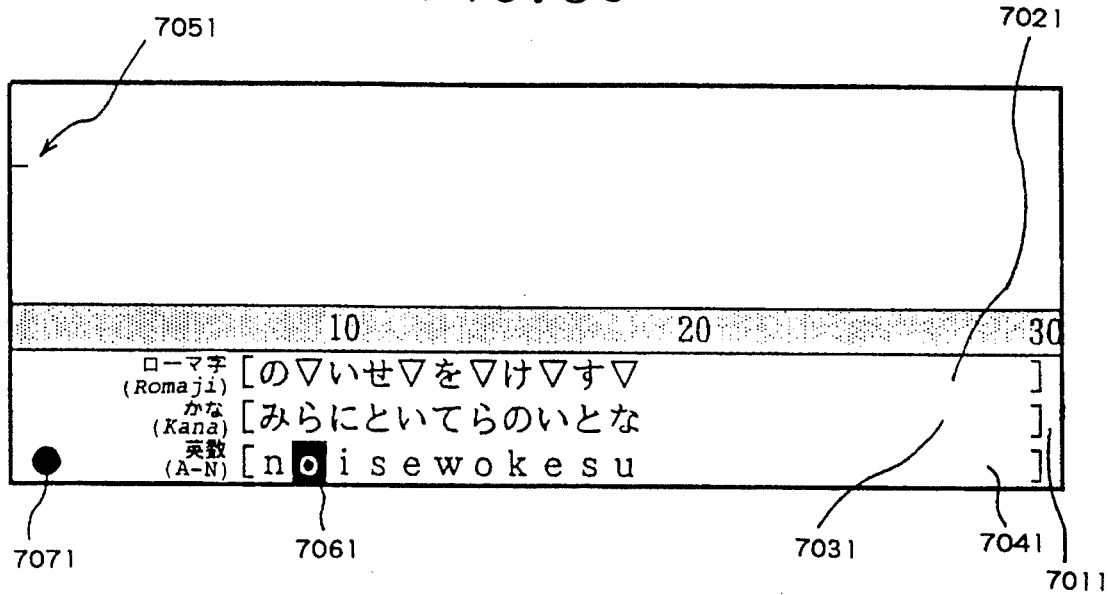
Figure 86:
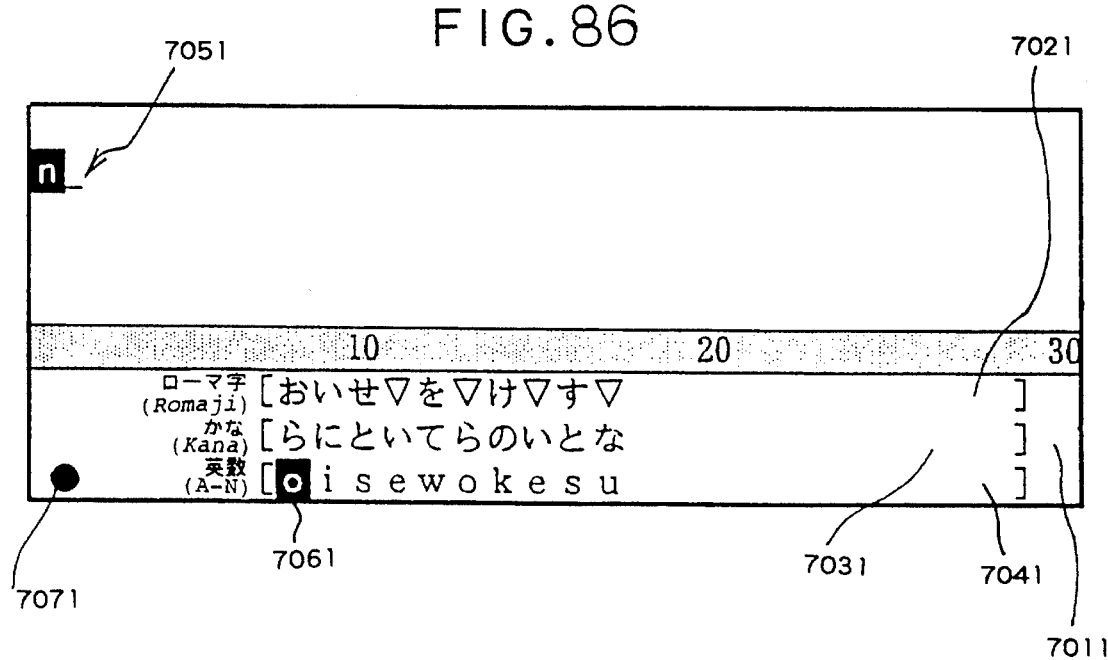

To the contrary, a case where the character species etc. to be designated are not decided a kana character based on the romaji input system at the step 37101, signifies that the state of the display of the screen before pressing the "validate" key 3051 was as shown in FIG. 85. On this occasion, for facilitating the entering of a character string "nお", it is reasonable to change the mark "▽" of the head character of the romaji character string display line 7021 into a kana character "お". Therefore, the kana character "お" is substituted for the head character of the romaji character string display line 7021 of the first display part 7011 at a step 37131. As a result, the display of the screen becomes as shown in FIG. 86.

Now, the decision means 1081 employed in the present invention will be described. Incidentally, the decision means 1081 in this embodiment adopts a method which is disclosed in the specification of Japanese Patent Application No. 147117 filed by the same Applicant as the assignee of the present application before.

The keyboard in this embodiment has the layout illustrated in FIG. 47. It is assumed here that keys have been pressed in an order shown in FIG. 87(*a*), for the purpose of entering a character string "きょうきょうかいで" with the keyboard shown in FIG. 47. Then, in a case where a set input character species is of the kana input system, the desired character string "きょうきょうかいで" is obtained. However, when key inputs have been afforded in the order shown in FIG. 87(*a*) with the set character species held at the alphanumeric mode on account of the erroneous designations of the character species etc., an obtained result becomes a character string "g)4g)4tew@". Contrariwise, when key inputs have been afforded in an order shown in FIG. 87(*b*) for the purpose of entering a character string "information", a result "にみはらすもちかにらみ" is obtained in a case where the character species etc. are designated to be kana characters based on the kana input system. Meanwhile, frequency in appearance of an alphabetic character in English writing or a kana character in Japanese writing exhibits a substantially constant value statistically though it somewhat differs depending upon sentences. The frequency in appearance can be evaluated by any of several methods such as a method utilizing the number of times of appearance of each character and a method utilizing the number of times of appearance of each combination of adjacent characters. In this embodiment, the likelihood of every character string (the degree at which the character string is probable) is obtained by fundamentally using a value based on the number of times of appearance of each character, as stated below.

First, the frequency of appearance Pa of a certain character a in every character species is evaluated beforehand. Subsequently, the likelihood V of every character string is obtained by computing the following formula (1) with the frequencies of appearance Pa of the individual characters contained in the pertinent character string:

$$V = R \sum_{a} \log Pa \qquad (1)$$

In Formula (1), letter R denotes a value which is peculiar to every character species and which is used in case of normalizing the values of the likelihoods V and making absolute comparisons. The frequencies of appearance of the individual character strings can be compared by comparing the likelihoods V. In other words, which of the character strings "きょうきょうかいで" and "g)4g)4tew@" is more likely or probable can be known by comparing the likelihoods V.

The likelihoods V of the character strings as stated above are evaluated for the respective character species and the respective input systems so as to decide whether or not the character species etc. currently set are correct. The likelihood decision process will be described in more detail below.

First, a character species likelihood table for use in the decision means 1081 will be explained.

TABLE 10: CHARACTER MODE LIKELIHOOD TABLE

| Mode | Romaji-Hiragana | | Kana-Hiragana | | Romaji-Katakana | | Kana-Katakana | | Alphanumeric | |
|---|---|---|---|---|---|---|---|---|---|---|
| Key code | Character code | Evaluative value | Character code | Evaluative value | Character code | Evaluative value | Character code | Evaluative value | Character code | Evaluative value |
| 01 | 1 | 0 | ぬ | 0 | 1 | 0 | ヌ | 3 | 1 | 0 |
| 02 | 2 | 0 | ふ | 30 | 2 | 0 | フ | 53 | 2 | 0 |
| 03 | 3 | 0 | あ | 49 | 3 | 0 | ア | 44 | 3 | 0 |
| 04 | 4 | 0 | う | 78 | 4 | 0 | ウ | 62 | 4 | 0 |
| 05 | 5 | 0 | え | 36 | 5 | 0 | エ | 45 | 5 | 0 |
| 06 | 6 | 0 | お | 46 | 6 | 0 | オ | 42 | 6 | 0 |
| 07 | 7 | 0 | や | 29 | 7 | 0 | ヤ | 34 | 7 | 0 |
| 08 | 8 | 0 | ゆ | 48 | 8 | 0 | ユ | 38 | 8 | 0 |
| 09 | 9 | 0 | よ | 59 | 9 | 0 | ヨ | 30 | 9 | 0 |
| 10 | 0 | 0 | わ | 32 | 0 | 0 | ワ | 41 | 0 | 0 |
| 11 | - | 0 | ほ | 33 | - | 0 | ホ | 64 | - | 0 |
| 12 | ^ | 0 | へ | 14 | ^ | 0 | ヘ | 45 | ^ | 0 |
| 13 | — | 0 | — | 0 | — | 89 | — | 89 | ¥ | 0 |
| 14 | q | 0 | た | 60 | q | 0 | タ | 37 | q | 0 |
| 15 | w | 47 | て | 58 | w | 25 | テ | 65 | w | 50 |
| 16 | e | 78 | い | 80 | e | 80 | イ | 67 | e | 90 |
| 17 | r | 69 | す | 54 | r | 66 | ス | 48 | r | 71 |
| 18 | t | 79 | か | 66 | t | 43 | カ | 73 | t | 91 |
| 19 | y | 65 | ん | 75 | y | 51 | ン | 85 | y | 12 |
| 20 | u | 88 | な | 54 | u | 81 | ナ | 36 | u | 61 |
| 21 | i | 89 | に | 60 | i | 86 | ニ | 38 | i | 82 |
| 22 | o | 90 | ら | 45 | o | 88 | ラ | 55 | o | 83 |
| 23 | p | 25 | せ | 48 | p | 42 | セ | 43 | p | 64 |
| 24 | @ | 0 | ゛ | 65 | @ | 0 | ゛ | 62 | @ | 0 |
| 25 | [ | 0 | ゜ | 25 | [ | 0 | ゜ | 56 | [ | 0 |
| ⋮ | ⋮ | ⋮ | ⋮ | ⋮ | ⋮ | ⋮ | ⋮ | ⋮ | ⋮ | ⋮ |
| 49 | ! | 0 | | 0 | ! | 0 | | 0 | ! | 0 |
| 50 | " | 0 | | 0 | " | 0 | | 0 | " | 0 |
| 51 | # | 0 | あ | 0 | # | 0 | ア | 8 | # | 0 |
| 52 | $ | 0 | う | 0 | $ | 0 | ウ | 0 | $ | 0 |
| ⋮ | ⋮ | ⋮ | ⋮ | ⋮ | ⋮ | ⋮ | ⋮ | ⋮ | ⋮ | ⋮ |
| 94 | > | 0 | 。 | 51 | > | 0 | 。 | 37 | > | 0 |
| 95 | ? | 0 | ・ | 0 | ? | 0 | ・ | 0 | ? | 0 |
| 96 | — | 0 | | 0 | — | 0 | | 0 | — | 0 |

Table 10 is a character species likelihood table, which is formed of the key codes of the various keys shown in FIG. 47 and the character codes and likelihoods thereof in the respective character species and input systems. The key codes are values which are given to the character keys in FIG. 47. More specifically, the key codes "01" thru "48" correspond respectively to 48 keys from the uppermost left-hand key toward the lowermost right-hand key of the keyboard layout, except the "space" key. In addition, the key codes in the case of pressing the "shift" key and character keys of the simultaneous press type are "49" thru "96", which correspond to the respective character keys similarly. When the crossing column of each key code and any of the character species is referred to, the likelihood of the corresponding character code in the pertinent character species can be found. By the way, in this embodiment, values which can be directly added as indicated by the following formula (2) are storied in the columns of the likelihoods:

$$R = \log Pa \qquad (2)$$

Besides, the "space" key has no shift code and has common likelihoods in all the character species. The key code of the "space" key is directly translated into the character code of "space", and is set at "00".

Figure 88:
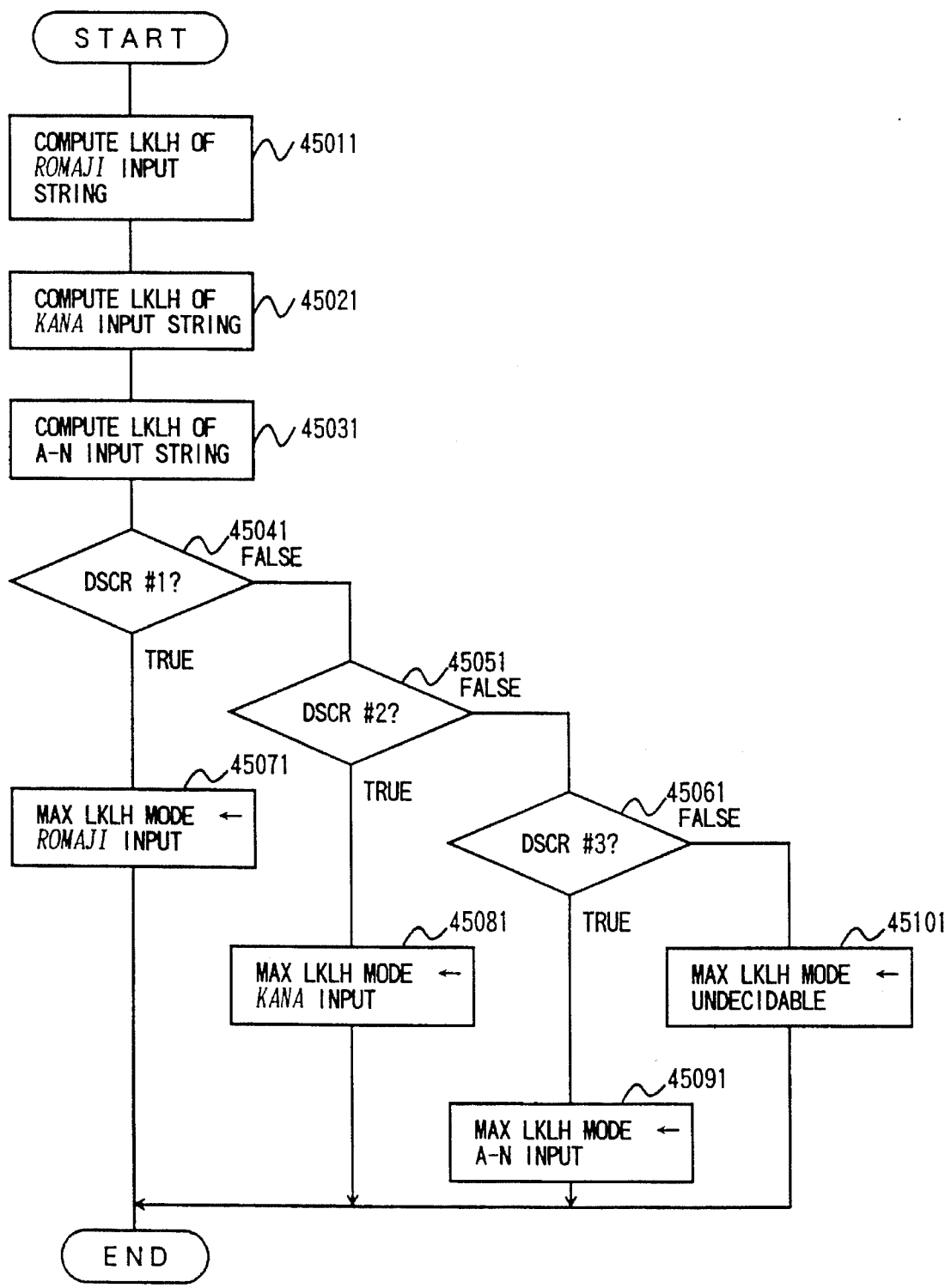

Next, the procedure of the likelihood decision process will be explained with reference to FIG. 88. A case where a key code string "14, 24, 19, 23" has been entered, will be taken as an example.

First, at a step 45011, the decision means 1081 computes the likelihood Vrh of a character string stored in the romaji character string storing part 6021 of the character string storing portion 6001 of the memory means 1061 (that is, a kana character string entered in conformity with the romaji input system). The computation is done by totaling the likelihoods of the individual characters of the character string as listed in the character species likelihood table (refer to Table 10). In a case where a key code "16" has been entered anew in the aforementioned example, the likelihood Vrh in the romaji character string storing part 6021 becomes 0+0+65+25+78=168. Likewise, the decision means 1081 computes the likelihood Vkh of a character string stored in the kana character string storing part 6031 (step 45021) and the likelihood Ve of a character string stored in the alphanumeric character string storing part 6041 (step 45031). In the aforementioned example, the likelihoods become Vkh=328 and Ve=166. Subsequently, the character species and input system of the maximum likelihoods are decided at steps 45041, 45051 and 45061.

The decision is rendered using discriminants #1~ #3 in formulae (3) given below.

Character mode likelihood discriminants [Formulae (3)]:

$$Vrh > max(Vrk, Vkh, Vkk, Ve) + T \qquad \text{DSCR \#1}$$

$$Vkh > max(Vrh, Vrk, Vkk, Ve) + T \qquad \text{DSCR \#2}$$

$$Ve > max(Vrh, Vrk, Vkh, Vrk) + T \qquad \text{DSCR \#3}$$

In each discriminant, letter T denotes a control parameter which indicates a predetermined threshold value, and as which a suitable value is set. In cases where the discriminants #1, #2 and #3 hold true, the routine proceeds respectively to steps 45071, 45081 and 45091, at which values indicative of the character species etc. decided to be the most likely or probable are set. In a case where all the discriminants #1~#3 become false, a value indicative of undecidability is set (step 45101). Assuming now that the control parameter is set at T=30, the discriminant #2 of Formulae (3) holds true, the routine proceeds to the step 45081, at which the value which indicates the kana character based on the kana input system is set as the character species and input system of the maximum likelihoods.

As thus far described, the character species etc. can be automatically decided by employing the decision means 1081 in this embodiment.

By the way, the mark "∇", which is displayed at the romaji character string display line 7021 of the display means 1071 and stored in the romaji character string storing part 6021 of the character string storing portion 6001 of the memory means 1061 in this embodiment, functions as the special character for bringing the character string the number of characters of which has decreased on account of the romaji-kana conversion, into agreement with the number of input keys of the pertinent character string. The function of the special character is not restricted to the case of conforming to the romaji input system, but the special character can be used as a character code for a pressed input key to which no character code corresponds. By way of example, in case of entering a kana character "を" in conformity with the kana input system, no character code of the alphanumeric character species exists in correspondence with the key of the kana character. On this occasion, the mark "∇" is delivered as the character code of the alphanumeric character species to the display means 1071 and the memory means 1061, whereby the number of input keys and the number of display characters can be equalized. Also, in case of entering a symbol "=" in the alphanumeric character species, no character code of the kana character species exists in correspondence with the key of the symbol. On this occasion, the mark "∇" is similarly delivered as the character code of the kana character species based on the kana input system, to the display means 1071 and the memory means 1061, whereby the number of input keys and the number of display characters can be equalized.

As described above, according to this embodiment, any key dedicated to the changes-over of input methods and character species can be removed from input means, so that the input means can be made smaller in size and lighter in weight.

Further, the user is permitted to enter a character string in which a plurality of character species coexist, without interrupting the operations of entering characters.

Moreover, since the most likely or probable character species of an input character string is automatically selected, the user can enter a character string in which a plurality of character species coexist, without designating the character species.

Incidentally, numerals and symbols used in the above explanation are effective in only the description of the third embodiment. Likewise, numerals and symbols in the ensuing explanations of the first, second and fourth embodiments shall be effective in only the explanations of the respective embodiments.

Now, the fourth embodiment of the present invention will be described with reference to the drawings.

Figure 101:
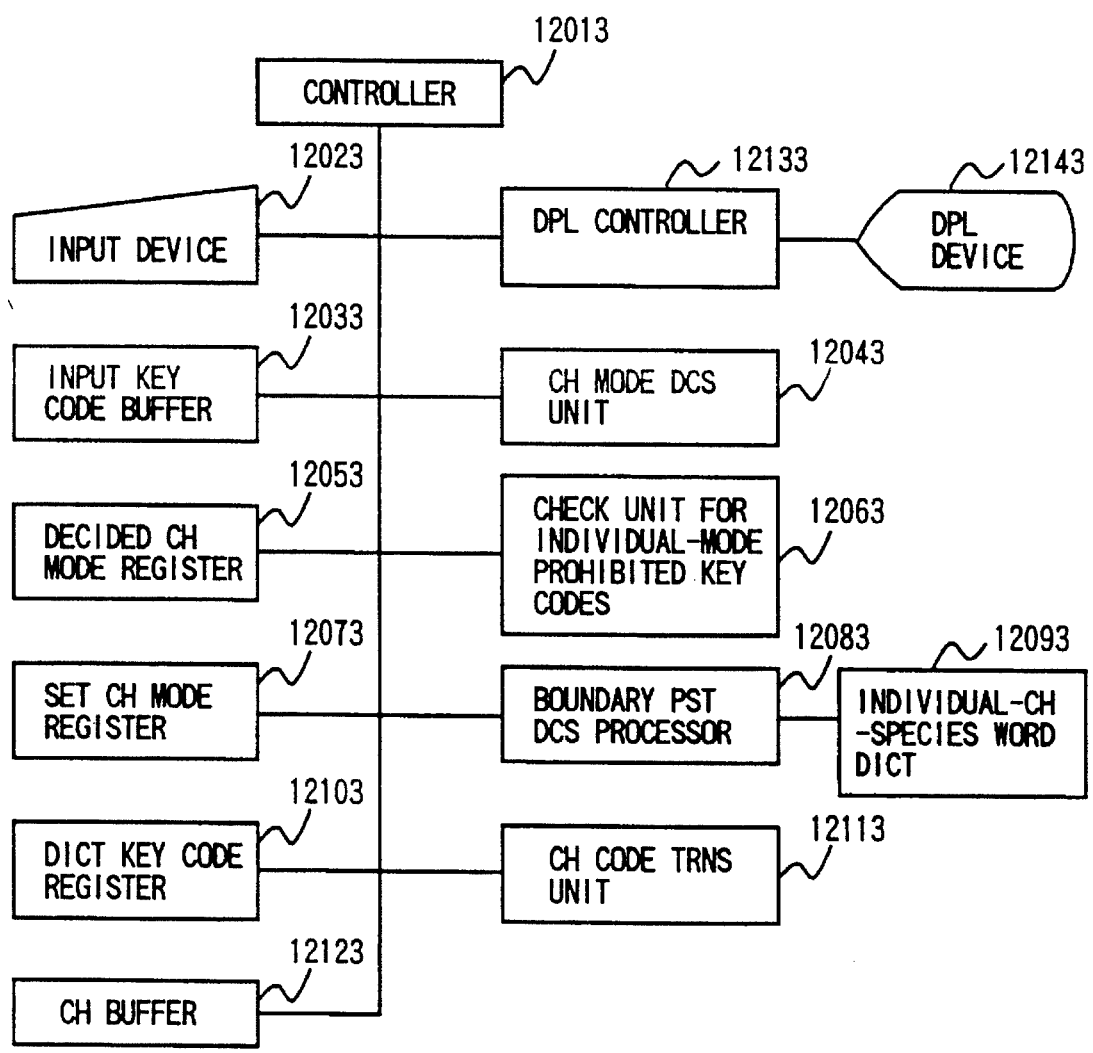

FIG. 101 is a block diagram showing the embodiment of a character inputting device according to the present invention. Referring to the figure, a controller 12013 controls the operations of the whole construction of the character inputting device. An input device 12023 which is input means such as a keyboard, generates a signal in correspondence with a pressed key. Signals representative of characters, and signals instructive of functions for document editing etc. are assigned to the individual keys of the input device 12023 beforehand. Especially, the signals representative of characters shall be called "key codes". As will be stated later, some of the key codes are such that the same key code is assigned to a plurality of different characters. An input key code buffer 12033 which is memory means, stores therein the key codes entered by the use of the input device 12023. The input key code buffer 12033 also has a buffer area in which the results of a check unit 12063 for individual-mode prohibited key codes to be explained later are stored in correspondence with the key codes. A character mode decision unit 12043 decides which of character species (character modes) an entered key code string will be in with a high possibility, and it will be explained in detail later. The character species decided by the character mode decision unit 12043 are stored in correspondence with the key code strings in a decided character mode storing register 12053. The check unit 12063 for individual-mode prohibited key codes checks the key codes which must not become the boundaries of the character species in the entered key codes, for the individual decided character modes, and it will be explained in detail later. Results decided by the check unit 12063 are stored in the input key code buffer 12033. A set character mode storing register 12073 stores therein the character mode set by the input device 12023. A boundary position decision processor 12083 decides the boundary positions of the character species as to the entered key codes by the use of an individual-character-species word dictionary 12093. The individual-character-species word dictionary 12093 is so constructed that words in the individual character species are stored in the form of the key codes in memory means such as a ROM (read only memory), RAM (random access memory) or FD (flexible disk). The details of the dictionary 12093 will be explained later. A dictionary key code storing register 12103 stores therein each character species which is the decided result of the boundary position decision processor 12083, and the key codes which lie up to the boundary position of the pertinent character species. A character code translation unit 12113 translates the entered key codes into character codes with reference to the contents of the dictionary key code storing register 12103. A character buffer 12123 stores a translated character code string therein. A display controller 12133 performs a display control in order to display the content of the character buffer 12123 on the screen of a display unit 12143. The display unit 12143 also displays the result of an input entered by the user of the character inputting device, messages for the document editing, etc.

Next, the relationships between the keys and the character modes will be described.

FIG. 91 illustrates an example of the keyboard which is a kind of input device (12023 in FIG. 101) for generating input or entered characters as signals. In the keyboard shown in FIG. 91, the key codes are values which are afforded to the individual character keys of this keyboard without regard to the character species. In this embodiment, the key codes are set as indicated in FIGS. 92(*a*) and 92(*b*). More specifically, FIG. 92(*a*) indicates the key codes which are assigned to the respective keys in the state in which a "shift" key (shown at numeral 2053 or 2063 in FIG. 91) is not pressed, while FIG. 92(*b*) indicates the key codes which are assigned to the respective keys in the state in which the "shift" key is pressed. Referring to FIG. 91, characters carved on the key top of one character key 2073, for example, are "3", "#", "あ" and "ぁ" of four sorts, which are respectively called "alphanumeric", "English symbol", "kana (Japanese syllabary)" and "kana symbol" species. Character mode designation keys 2023, 2033 and 2043 being function keys are used in order to designate the character modes specifying which of the characters of such species the key input is caused to correspond to. According to the character inputting device of this embodiment, the hiragana (cursive form of "kana") mode designation key 2033, the katakana (square form of "kana") mode designation key 2043 and the alphanumeric mode designation key 2023 operate mutually exclusively. Once any of the designation keys 2033, 2043 and 2023 has been pressed, character codes conforming to the same designated mode are generated until another of these designation keys is subsequently pressed. The "shift" keys 2053 and 2063 are operation keys of the simultaneous press type. When either of these shift keys is pressed simultaneously with the character key, the character code of the English symbol species is generated for the alphanumeric mode designated, and that of the kana symbol species is generated for the hiragana or katakana mode designated. By way of example, after the <hiragana> key 2033 has been pressed, the character code of hiragana "あ" is displayed by pressing the character key 2073, and that of kana symbol "ぁ" is displayed by pressing the character key 2073 simultaneously with the shift key 2053 or 2063. This state continues until the <katakana> key 2043 or the <alphanumeric> key 2023 is subsequently pressed.

Next, a romaji (Roman character) mode designation key 2013 will be explained.

The romaji key 2013 is a key for designating the input system of hiragana or katakana characters. Each time this key 2013 is pressed, it changes-over the romaji input system and the kana input system alternately. A known method is employed for the romaji conversion system or input system, by which romaji spelling entered with the character key layout regarded as the alphanumeric one is converted into a kana character. Assuming by way of example that romaji spelling "kyo" has been entered with the character keys, it is converted into "きょ" within the inputting device. On the other hand, the kana input system is a system by which a hiragana or katakana character is entered in conformity with the kana key layout. The conversion from the romaji spelling into the kana character is effected by the character code translation unit 12113 shown in FIG. 101. In the ensuing description of this embodiment, the hiragana character mode of the romaji input system shall be termed the "romaji-hiragana mode", the katakana character mode of the romaji input system the "romaji-katakana mode", the hiragana character mode of the kana input system the "kana-hiragana mode", and the katakana character mode of the kana input system the "kana-katakana mode".

FIG. 106 illustrates character codes which are displayed when the character key 2073 is pressed in the respective character modes.

By way of example, in a case where the character key 2073 is pressed in the hiragana character mode of the romaji input system, the character code "3" is generated as seen from FIG. 106.

Although the keyboard layout of a key block shown in FIG. 91 conforms to JIS (Japanese Industrial Standard) "X6002", the present invention can be performed without any problem even with any other keyboard layout.

Next, the character mode decision unit 12043 will be explained.

In the character mode decision unit 12043, the frequency of appearance of each character, the impossible combination of characters, etc. are detected, and which of the character modes a key code string currently entered will be in with a high possibility is decided using the detected information. The result of the decision is stored in the decided character mode storing register 12053.

A method for the decision is such that the general frequencies of appearance of those character codes in the respective modes which correspond to each key are previously determined, and that, when the key has been pressed, one character code of higher frequency in appearance is decided as a more likely or probable character code on the basis of the frequencies of appearance of all the character codes corresponding to the key. It is also allowed that, when a plurality of keys have been pressed, the frequencies of appearance of the character codes are totaled, whereupon a character code of higher frequency in appearance is decided as being more likely or probable.

Another method for the decision is such that the inputs of a plurality of keys are translated into all character strings corresponding thereto, and that the resulting character strings are collated with a dictionary in order to construe the significances thereof, whereby any of the character strings is decided as being correct when it contains a significant word.

Alternatively, the use of the character mode decision unit 12043 may be replaced with the user's instruction of altering the character species as given by pressing a "character species alteration" key 2083 shown in FIG. 91. According to the inputting device of this embodiment, in a case where the character species of an entered character string differs from one intended by the user, the user can alter the already entered character string partially or entirely into the character string of the intended character species by giving the instruction of the character species alteration. Further, the user can alter the already entered character string into the character strings of the different character species sequentially and cyclically by successively giving the instructions of the character species alterations. In this case, when the instruction of the character species alteration has been given, the character mode corresponding to the new altered character species is stored in the decided character mode storing register 12053.

Next, the unit 12063 for checking the individual-mode prohibited key codes will be explained. The "prohibited key code check" checks whether or not the position of a certain key code is suitable for the array or string of a certain character species. In general, a character string in which a plurality of character species coexist contains a character which ought not to exist at the boundary position of the character species. By way of example, a kana small character "あ", "い", "う", "え", "お", "ゃ", "ゅ" or "ょ" or a kana character "ん" needs to be immediately preceded by a kana character at all times, and it cannot become the head or first character of a kana character string. The prohibited character which cannot become the head of a character string in this manner, shall be called the "front prohibition" character below. Besides, in the kana-hiragana mode, a voiced-sound symbol "゛", a p-sound symbol "゜", a long-sound symbol "ー" and a double-consonant symbol "っ" are prohibited characters. That is, "abcゅ", "ttん" or "LS ゛" is decided to be incorrect as a sentence. Also, in the romaji input system, the intermediate position of successive consonants does not usually become a boundary. By way of example, a position behind "k" in "kyo" does not become the boundary. The prohibited character which cannot become the tail or last of a character string in this manner, shall be called the "rear prohibition" character below.

The prohibitions exist, not only for the individual characters themselves, but also for the combinations of characters. By way of example, in a kana character string, the combination of kana characters such as "ああ" or "くえ" cannot exist. In this case, accordingly, "あ" or "く" becomes the prohibited character of the boundary. In a romaji character string, letter "k" in the combination of successive consonants, such as "km" or "kn" cannot exist as the head character of the romaji character string. In this case, the letter "k" becomes the prohibited character of the boundary. The check unit 12063 for the prohibited key codes in the individual decided modes checks the input key codes beforehand lest such prohibited characters should become the boundaries of the character species. Further, it is sometimes impossible to translate the entered key code as the character of the designated character species. By way of example, the key code "49" in FIG. 92(*b*) is translated into "!" in the alphanumeric character species, but it corresponds to no kana character and cannot be translated in the kana character species. Accordingly, this key code "49" cannot be contained in a kana character string. The check unit 12063 for the prohibited key codes in the individual decided modes functions to prevent such prohibited characters from being contained in the character strings.

Although the above processing can be realized by any of various algorithms, a method which utilizes a prohibited pattern table illustrated in FIG. 103 is employed in this embodiment. Such prohibited pattern tables are prepared for the respective character species, and the corresponding one of the prohibited pattern tables is referred to in accordance with the content of the decided character mode storing register 12053.

Referring to FIG. 103, numeral 14013 denotes the array or string of key codes to be checked. Numeral 14033 denotes items which list kana characters corresponding to the key codes for the sake of convenience, and which are unnecessary in the actual performance of the present invention. Numeral 14023 denotes prohibition types which correspond to the key codes. In an example of the prohibition types, "1" indicates that the pertinent key code corresponds to the front prohibition, "2" indicates that the pertinent key code is prohibited from being contained, and "0" indicates that the pertinent key code is not prohibited. By way of example, the prohibition type "1" is defined for the small character "あ" corresponding to the key code "51" because this character cannot exist at the boundary position of any character species as stated before. In addition, the prohibition type "2" is defined for the key code "49" because this key code cannot be contained in any kana character string. In this manner, the prohibition types corresponding to the individual key codes are respectively defined beforehand. Further, a plurality of key codes such as "ああ" (key codes 3, 51) cannot exist at the boundary position of any character species, so that "1, 1" is defined as the prohibition type of the key code string. Also, the rear prohibitions and prohibited key code strings each consisting of three or more key codes can be defined beforehand though not shown in FIG. 103.

The check unit 12063 for the prohibited key codes of the individual decided modes collates the first key code thru the last key code of the entered key code string, with the prohibited pattern table in succession. In cases of agreements, the respective prohibition type values are set in the input key code buffer 12033 in correspondence with the character key code of "1" which cannot exist at the boundary position of any character species and the character key code of "2" which cannot be contained. On the other hand, regarding the key code whose prohibition type is of "0", nothing is set in the input key code buffer 12033. Incidentally, an initial value "0" is set in the input key code buffer 12033. While the example of the prohibited pattern table concerning the kana-hiragana mode is illustrated in FIG. 103, another example thereof concerning the romaji-hiragana mode is illustrated in FIG. 104.

Next, the individual-character-species word dictionary 12093 will be explained.

The individual-character-species dictionary 12093 is the collection of records each having a format as illustrated in FIG. 95, which is composed of the number of key codes (6013) serving as a header, the key codes (6023), and an attribute No. (6033), an auxiliary attribute (6043) and a space (6053) which correspond to the key codes (6023). The "number of key codes" 6013 denotes the number of the key codes which represent one word. In addition, the "key codes" 6023 construct a key code string which corresponds to the character codes of the word. The "attribute No." 6033 is a classification No. for each individual property possessed by the word, for example, the property that the word assumed to signify a unit is often entered together with a numeral or numerals. The "auxiliary attribute" 6043 serves to supplement the classification of the attributes. The "space" 6053 merely indicates the end of one item of data. FIG. 96 illustrates examples of the above dictionary records. More specifically, the upper part of FIG. 96 exemplifies the records of a kana-hiragana mode word dictionary, the middle part exemplifies those of a romaji-hiragana mode word dictionary, and the lower part exemplifies those of an alphanumeric mode word dictionary.

Here, the attributes and the auxiliary attributes will be explained with reference to FIG. 107.

Shown in FIG. 107 are examples of the sorts of the attributes of words. Attribute #1 is the attribute used for a word which is succeeded by a numeral or numerals, such as "M" (magnitude) in "M7.5". Attribute #2 is used for a word which signifies a unit and which is preceded by a numeral or numerals, such as "mm" (millimeters) in "2mm". The reason why numerals are specially handled is that, since the number of the combinations between the numerals and words is limitless, it is more efficient to handle the numerals as the attributes of the words than to register the words containing the numerals, in the word dictionary. Accordingly, in a case where a key code representative of a numeral is contained in entered key codes, the part of the entered key code string with the numeral part removed is retrieved from the word dictionary. In a case where the record having agreed with the key code string part as the result of the retrieval contains the attribute #1 or #2, the consistency of this key code string part with the succeeding or preceding key code is checked.

In FIG. 107, attributes #3 thru #14 are the attributes in the case where each word possesses a plurality of character species in itself. More specifically, the attribute #4 is used for a word, such as "T シャツ" (T shirt), which is composed of the alphanumeric mode+the kana-katakana mode. In addition, the attributes #3, #4, #5 and #6 indicate that words having any of these attributes are contained in the alphanumeric mode dictionary. Besides, words having either of the attributes #7 and #8 are contained in the kana-hiragana mode dictionary, words having either of the attributes #9 and #10 are contained in the kana-katakana mode dictionary, words having either of the attributes #11 and #12 are contained in the romaji-hiragana mode dictionary, and words having either of the attributes #13 and #14 are contained in the romaji-katakana mode dictionary. Further, regarding each of the attributes #3–#14, the auxiliary attribute is used for storing a position up to which the pertinent word is in the mode of the corresponding dictionary. The number of key codes in the mode of the dictionary is registered as the auxiliary attribute (refer to FIG. 96).

In the individual-character-species word dictionary 12093 thus far explained, one word can also be endowed with a plurality of attributes which are not exclusive. Herein, the word may well possess two or more auxiliary attributes. In this manner, the individual-character-species word dictionary 12093 is so constructed that the key codes, attributes and auxiliary attributes of the respective words are registered in the dictionaries of the individual character species beforehand.

Next, the function of the boundary position decision processor 12083 will be explained. In this decision processor 12083, entered key codes are collated with that dictionary of the individual-character-species word dictionary 12093 which conforms to a character mode set before, and the boundary position of the character species of the entered key codes is decided. On the occasion of the decision, in a case where the record of the word dictionary contains the attribute #1 or #2, the consistency of the entered key codes with the preceding or succeeding key code thereof is checked. By way of example, an alphanumeric character string "mm", "kg" or "km" is a word expressive of a unit which needs to be preceded by a numeral or numerals, so that the attribute #2 stated before is affixed thereto in the word dictionary. In a case where such a word has matched or agreed with the entered key codes, the usage of the word is improper without the preceding key code of the numeral entered in conformity with the alphanumeric mode. Accordingly, the entered key codes are judged to be inconsistent. On the other hand, an alphanumeric character "M (magnitude)" or "R (route No.)" is a word which is usually succeeded by a numeral or numerals. In a case where such a word has matched with the entered key code, the word fails to be consistent without the succeeding key code of the numeral entered in conformity with the alphanumeric mode. According to the boundary position decision processor 12083, the entered key code/codes is/are subjected to the matching process with the individual-character-species word dictionary 12093. Further, the consistency of the entered key code/codes with the preceding or succeeding key code is checked in accordance with the attribute of the word having matched. On condition that the consistency fails to hold, a process for invalidating the word having matched is executed. Finally, the character species boundary position of the entered key code string is delivered as an output.

Now, the operation of an example of the character inputting method for the character inputting device of the present invention will be described. The keyboard of the input means as shown in FIG. 91 accepts the inputs of a character string which is composed of a plurality of character species (character modes). On that occasion, with the prior art, the user of the character inputting device sets a desired one of the character species, whereby the codes of the keys of the keyboard are translated into character codes of the set character species. In a case where the user is to successively enter key codes of another of the character species, he/she must alter the setting of the character species before entering the key codes. In contrast, according to this embodiment, the inputs of key codes are successively accepted without the alteration of the setting of the character species, and the optimum character species is decided.

The flow of the processing will be explained as to the above example with reference to FIG. 90 below. In this embodiment, an input mode is decided for an entered character string, and prohibited key codes in the decided input mode are checked. More specifically, every record of the individual-character-species word dictionary 12093 is retrieved to decide whether or not it agrees or matches with the entered character string. Such records having agreed with the entered character string are checked as to if they are the prohibited key codes and if their attributes hold true. When all the records of the individual-character-species word dictionary 12093 have been retrieved, the longest one of the key code strings of the records having agreed is used for the boundary of a word.

Figure 90:
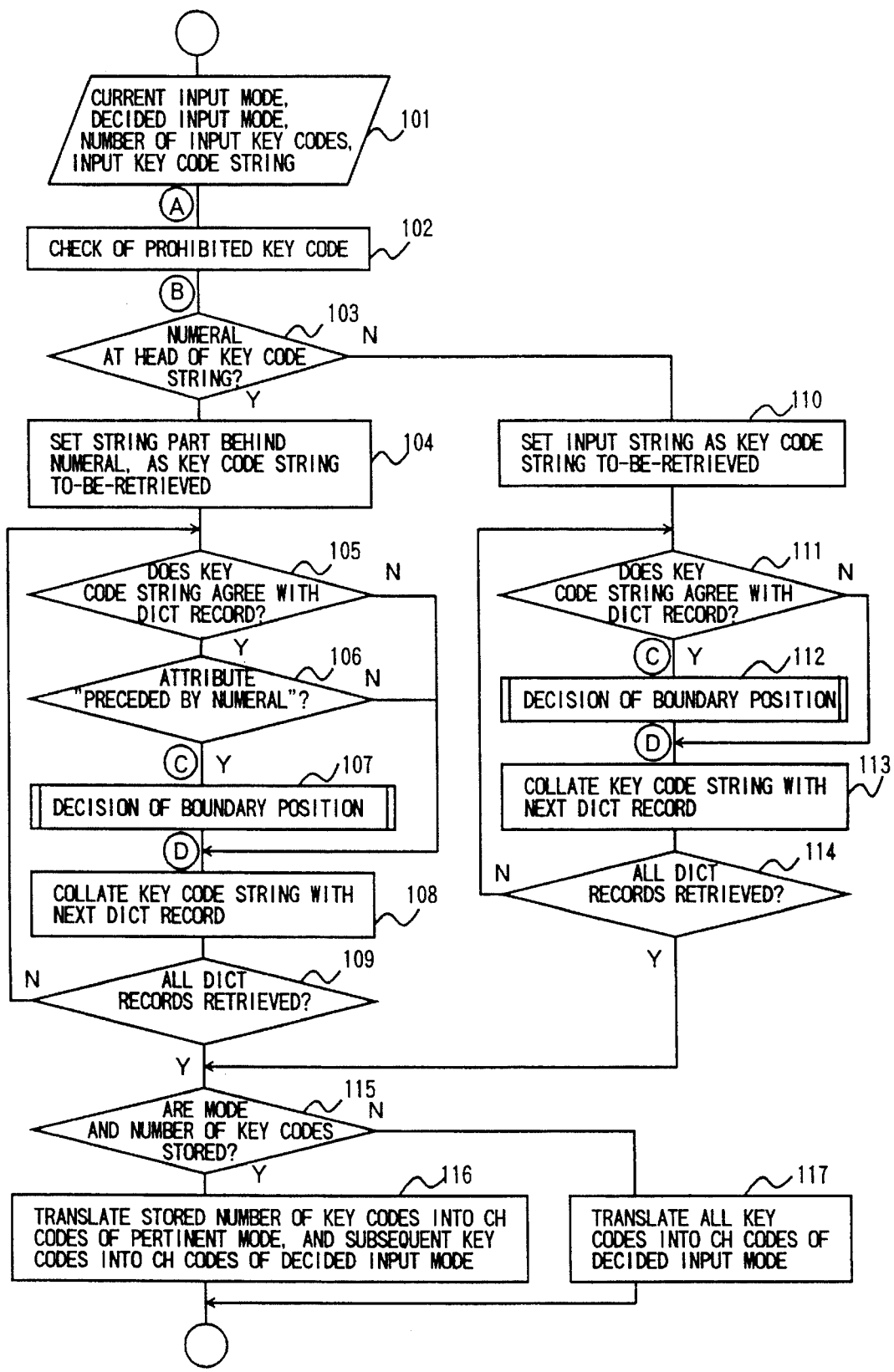

In more detail, as illustrated in FIG. 90, the input device 12023 accepts a current input mode (a character mode set before by the user), a decided input mode (a character mode set in the character mode decision unit 12043), the number of input or entered key codes (the number of keys pressed by the user) and an input or entered key code string (the string of the key codes entered by the user) as input information (step 101). In the aforementioned example, the input information items are the alphanumeric mode as the current input mode, the kana-hiragana mode as the decided input mode, "9" as the number of entered key codes, and "02, 44, 44, 33, 20, 18, 24, 39 and 21" (refer to FIG. 97) as the entered key code string.

In a case where the decided input mode differs from the current input mode on the basis of the input information, there is the possibility that a plurality of character species will coexist. Therefore, the respective character species and the boundary position thereof are decided, and character codes are determined. In the above example, the current input mode (alphanumeric mode) and the decided input mode (kana-hiragana mode) are not in agreement, so that the character inputting method of the present invention is applied.

Figure 93:
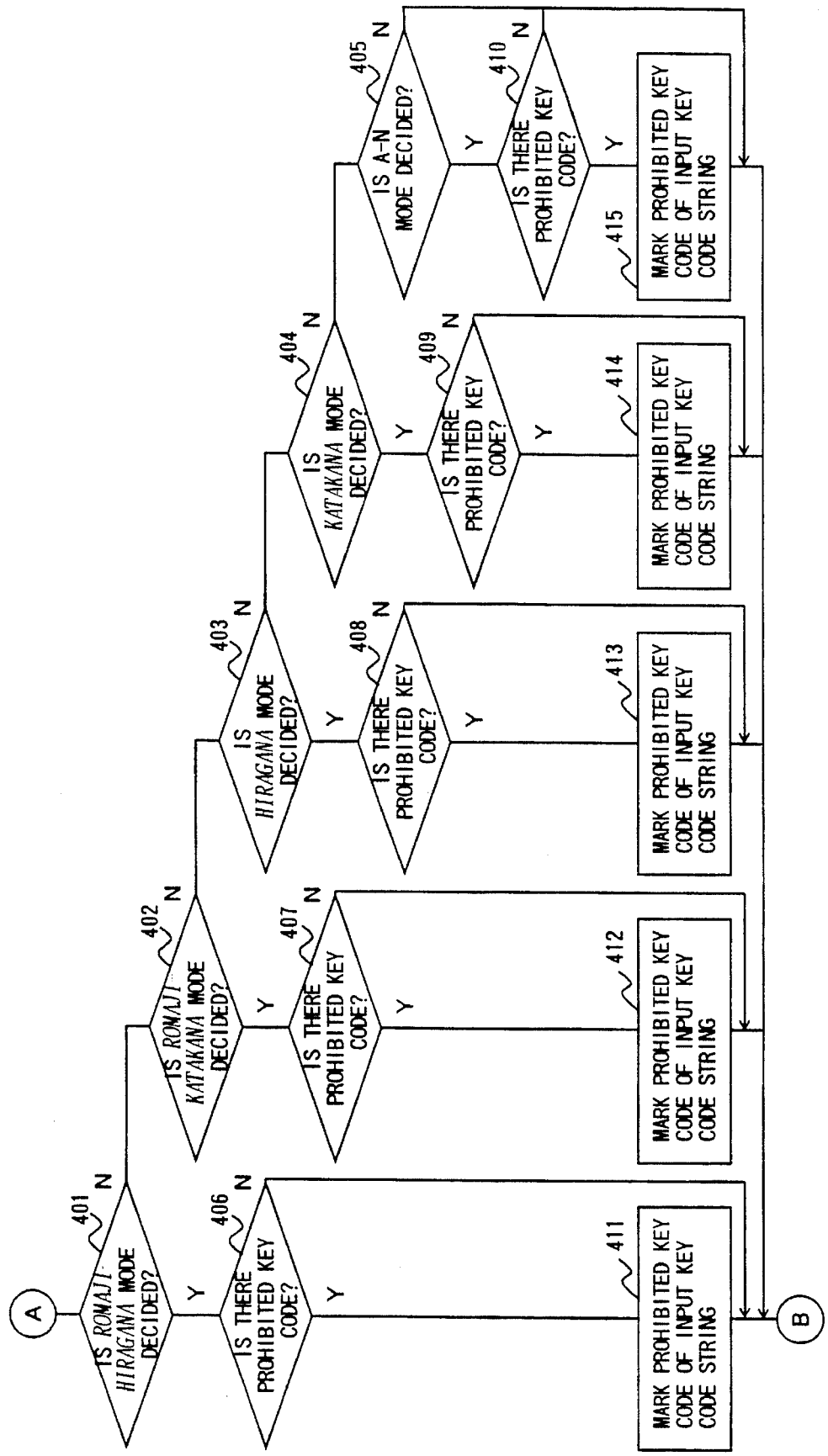

Whether or not a prohibited key code is existent is checked in accordance with the sort of the decided input mode (step 102). Here, the processing flow of the check unit 12063 for the individual-mode prohibited key codes will be explained with reference to FIG. 93. First, the check unit 12063 checks what the decided input mode is (steps 401–405). Subsequently, in the decided mode, the prohibited key code of the changes-over of the respective modes is checked by collating the entered key code string with the prohibited pattern table (steps 406–410). Further, the specified value stated before is stored in the input key code buffer 12033 as to a position which cannot form a mode boundary (steps 411–415). In the aforementioned example, the decided input mode is the kana-hiragana mode, and hence, the prohibited key codes of the kana-hiragana mode are checked. Since the voiced-sound symbol """ is prohibited as the boundary in the example, "1" is set for the key code "24" of this symbol in the input key code buffer 12033 as indicated at numeral 8013 in FIG. 97.

Referring back to FIG. 90, the boundary position decision processor 12083 collates the entered key code string with the individual-character-species 12093 which consists of the dictionaries of the individual current input modes (steps 103–114). First, the decision processor 12083 checks whether or not a numeral exists at the head or foremost part of the entered key code string (step 103). Here, a decimal point, a comma, etc. are considered for numerals as in "1.5", "3.000" and "6:00".

In the presence of the numeral key code, this numeral key code is removed from the entered key code string to obtain a key code string for the dictionary retrieval, and the resulting key code string is retrieved (step 104). In the aforementioned example, the key code "02" is the numeral key code. At the step 104, therefore, the numeral part at the head of the entered key code string is removed, and the key code string for the retrieval becomes "44, 44, 33, 20, 18, 24, 39, 21". Subsequently, whether or not the key code string agrees or matches with any record of the word dictionary is decided (step 105). Subject to the agreement, the attribute #2 (FIG. 107) of the key code string is checked (step 106).

In a case where the attribute #2 in FIG. 107 does not exist, the boundary position decision process (step 107) is not executed because the context of the retrieval character string is improper (regarding any word other than a unit, the array of directly preceding numerals as in "2FAX" or "5NHK" is improper). Subsequently, the retrieval is shifted to the next record of the individual-character-species word dictionary 12093 (step 108). Whether or not all the records of the word dictionary 12093 have been retrieved, is checked (step 109). If all the dictionary records have not been retrieved, the steps 105~109 are iterated. On the other hand, if all the dictionary records have been retrieved, the routine proceeds to a step 115.

Figure 94:
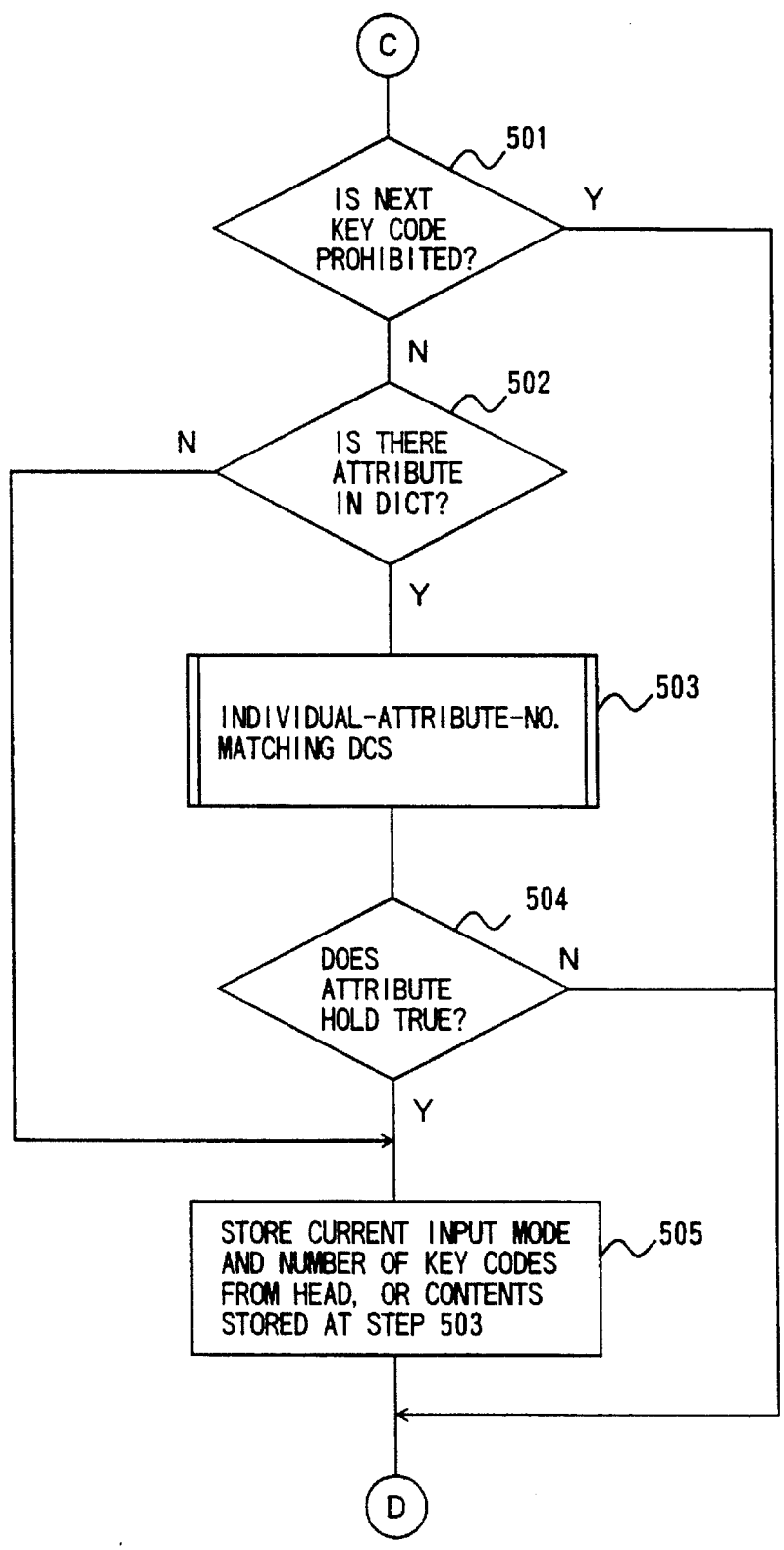

In a case where the attribute #2, "Word is preceded by numeral" exists, the routine shifts to a boundary position decision processing flow shown in FIG. 94, and the boundary position decision processor 12083 executes the boundary position decision process (step 107). In a dictionary shown in FIG. 98, the retrieval key code string first agrees or matches with a record having a key code 9013 ("44"). The attribute 9023 of the agreeing key code is the attribute #2, "Word is preceded by numeral". Since this attribute holds true as the result of the decision at the step 106, the boundary position decision process at the step 107 is executed.

Figure 108:
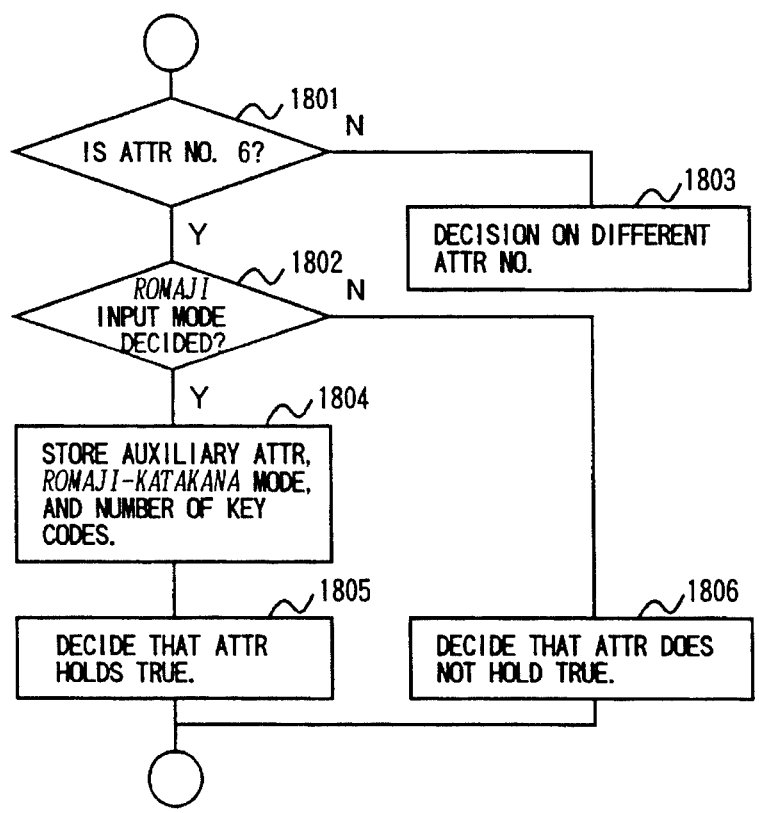

Here, the process of the step 107 by the boundary position decision processor 12083 will be explained with reference to FIG. 94. First, the decision processor 12083 checks whether or not the boundary position of the key code string having agreed with the word dictionary 12093 falls under the prohibition of the result of the prohibited key code check 102 in FIG. 90 (step 501). If the boundary position is the prohibited key code, it is improper as such, and the routine shifts to the process for checking the next dictionary record (step 108). On the other hand, if the boundary position is not the prohibited key code, whether or not the dictionary record contains an attribute is checked (step 502). In the presence of the attribute, the decision processor 12083 decides the consistency as to if the key code satisfies the attribute, for each attribute No. (step 503), and in the absence of the attribute, the decision processor 12083 decides the boundary position as being proper and stores the current input mode as well as the number of key codes from the head of the key code string (step 505). By way of example, FIG. 108 illustrates the process for deciding the consistency for each attribute No., in the case of the attribute #6. The consistency deciding process as shown in FIG. 108 shall be provided every attribute No.

Referring to FIG. 108, whether or not the attribute No. is 6 is decided (step 1801). If the attribute No. is not 6, the routine shifts to the process of another attribute No. (step 1803). On the other hand, if the attribute No. is 6, whether or not the decided input mode is the romaji input system is checked because the attribute #6 signifies that part of the word is in the romaji-katakana mode (step 1802). Subject to the romaji input system, the decision processor 12083 records an auxiliary attribute, the romaji-katakana mode and the number of key codes indicated in the word dictionary (step 1804), and it decides that the attribute holds true (step 1805). In contrast, when the decided input mode is not the romaji input system, the decision processor 12083 decides that the attribute does not hold true (step 1806).

In this way, the consistency is decided for each attribute No., and whether or not the attribute holds true is consequently decided. If the attribute holds true at a step 504 in FIG. 94, the decision processor 12083 stores the current input mode and the number of key codes reckoned from the head, or the contents recorded in the consistency decision for each attribute No. (the auxiliary attribute, the mode for each attribute No. and the number of key codes in the mode) (step 505). On the other hand, if the attribute does not hold true at the step 504, the boundary position is not proper. Therefore, the result of the collation with the word dictionary is decided invalid, and the routine in FIG. 90 proceeds to the next step 108.

Regarding the aforementioned example, the key code having agreed with the word dictionary does not fall under the prohibition of the prohibited key code check of the step 102, and hence, an attribute is checked. The agreeing key code is consistent with the attribute 9023 (#2) of the pertinent record shown in FIG. 98, because the attribute that "the key code is preceded by a numeral" is set as checked at the step 106. Thus, the alphanumeric mode as the character species and "2" as the number of key codes reckoned from the head of the entered key code string are stored in the dictionary key code storing register 12103.

Next, there will be explained a case where no numeral key code exists at the step 103 in FIG. 90. If no numeral key code exists, the entered key code string from the head key code thereof is set as a key code string for the dictionary retrieval (step 110). Then, whether or not the key code string agrees or matches with any record of the word dictionary is decided (step 111). Subject to the agreement, the foregoing boundary position decision process shown in FIG. 94 is executed (step 112). Subsequently, the retrieval is shifted to the next record of the word dictionary 12093 (step 113). Whether or not all the records of the word dictionary 12093 have been retrieved, is checked (step 114). If all the dictionary records have not been retrieved, the steps 111~114 are iterated. On the other hand, if all the dictionary records have been retrieved, the routine proceeds to the step 115.

At the step 108, the next dictionary record is checked. In the aforementioned example, the key code string agrees or matches with the key codes 9033 of the next record ("44, 44" which correspond to "mm" in the alphanumeric mode) as illustrated in FIG. 98, and hence, the same processing steps 105~108 are executed. Thus, as illustrated in FIG. 99, the alphanumeric mode as the character species and "3" as the number of key codes are stored in the dictionary key code storing register 12103 instead of the contents stored before.

When all the records of the word dictionary are decided to have been retrieved at the step 109, the dictionary retrieval of the entered key code string ends. Then, the controller 12013 checks whether or not the character species and the number of key codes from the head of the entered key code string are stored in the dictionary key code storing register 12103 (step 115). If the character species and the number of key codes are stored, the stored number of key codes are translated into the character codes of the current input mode, and the key codes succeeding the stored key codes are translated into the character codes of the decided input mode (step 116). On the other hand, if the character species and the number of key codes are not stored, all the key codes are translated into the character codes of the decided input mode (step 117).

In the aforementioned example, assuming that the entered key code string has not agreed or matched with any other dictionary record, the alphanumeric mode as the character species and "3" as the number of key codes are stored. As illustrated in FIG. 100, therefore, the 3 key codes of the entered key code string as reckoned from the head key code thereof are left intact in the alphanumeric character mode, and the key codes succeeding the 3 ones are translated into the character codes of the character species of the kana-hiragana mode.

The situation of the screen display of the display unit 12143 at this time is shown in FIG. 102(*b*). Owing to the performance of the present invention, the entered key code string is translated into a character string 13073 as intended by the user, and the setting of the character species is altered as indicated at numeral 13083.

That is, owing to the processing thus far explained, in the case where the character string having matched with the record of the word dictionary satisfies the attribute properly and where it does not fall under the prohibition, it has the boundary of the pertinent word decided appropriate and can have its input mode converted at the boundary.

Although, in the processing flow shown in FIG. 90, the prohibited key code is checked after the decision of the input mode, the entered key code string may well be collated with all the kinds of word dictionaries without rendering the decision of the input mode. In this case, the decision may well be rendered after the boundary position has been detected.

In addition, although the presence of the numeral at the head of the key code string is decided at the step 103 in the processing flow shown in FIG. 90, the processing of the steps 110~114 may well be executed without rendering the decision.

Further, although the processing stated above includes both the process for checking the prohibited key code and the process for checking whether or not the attribute holds true, only one of the processes may well be performed.

Figure 110:
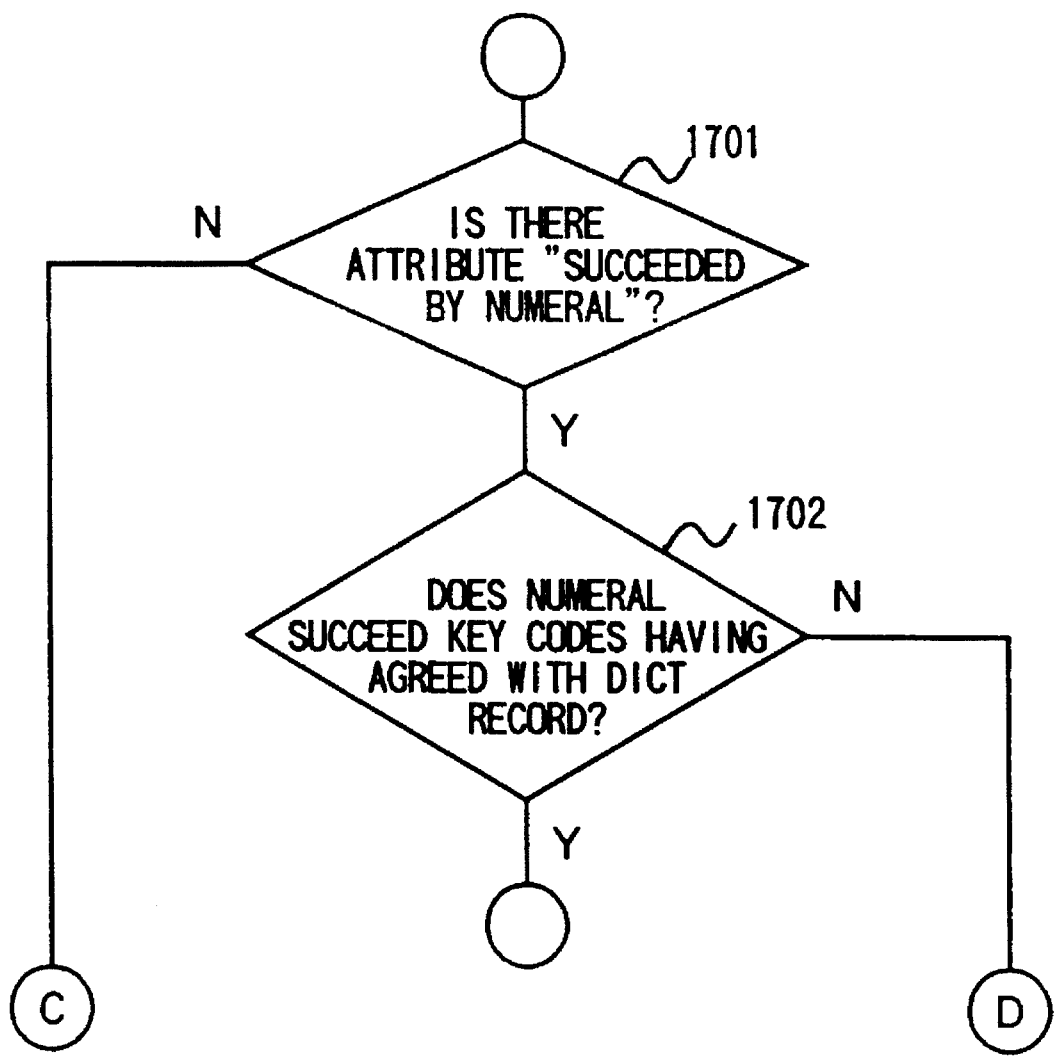

Still further, although the numeral preceding the word is handled in the processing flow shown in FIG. 90, processing in which a numeral succeeding the word is also considered may well be executed in such a way that a process illustrated in FIG. 110 is added after each of the steps 106 and 111 in FIG. 90.

Yet further, not only the word which is preceded or succeeded by the numeral, but also a word to which a bracket or the like is affixed can be subjected to the word dictionary retrieval by the same processing as stated above.

Besides, the attribute #1 that "the word is succeeded by a numeral" or the attribute #2 that "the word is preceded by a numeral" has been defined for the word to which the numeral is affixed. It is also allowed, however, to define the attribute that "the word may well be succeeded by a numeral" or that "the word may well be preceded by a numeral", whereby key codes having agreed with the record of the word dictionary are regarded as the word of the dictionary irrespective of whether or not the word is accompanied by the numeral.

Although the decided input mode is one item of input information at the step 101 in the processing flow shown in FIG. 90, a decision for the decided input mode may well be rendered after the retrieval of the word dictionary. In this case, the dictionary retrieval is performed every single character input or every several character inputs. By way of example, in the foregoing case where the user wants to enter "2mmのながさに", the entered key codes "02, 44, 44" (2 mm) afford the boundary position in the alphanumeric mode owing to the retrieval of the word dictionary, and the input mode is decided as the "kana-hiragana mode" from the remaining entered key codes "33, 20, 18, 24, 39, 21" (kut@xi). Thus, the decided input mode can be derived more quickly and more reliably by obtaining the "kana-hiragana mode" from the entered key codes "33, 20, 18, 24, 39, 21" (kut@xi), than by obtaining the "kana-hiragana mode" from all the entered key codes "02, 44, 44, 33, 20, 18, 24, 39, 21" (2mmkut@xi). In this case, the boundary position decision processor 12083 detects boundary positions successively by the decisions as stated above, in relation to the key code string which succeeds the detected boundary position mentioned above. Decision means is further comprised for successively deciding the character species of key code strings which extend up to the boundary positions successively detected by the boundary position decision processor 12083. The translation unit 12113 executes processing so that the key code strings extending up to the boundary positions successively detected by the boundary position decision processor 12083 may be translated into character code strings in the character species decided by the decision means.

In the boundary position decision process shown in FIG. 94, whether or not the key code falls under the front prohibition is checked at the step 501. Alternatively, the boundary position may well be decided in such a way that rear prohibitions are defined in a prohibited pattern table, and that whether or not the key code of the boundary position falls under the prohibition is checked.

Unlike the input mode conversion of the key code string based on the word dictionary, the key codes having matched with the word dictionary may well be translated into small letters or capital letters. By way of example, in a case where key codes corresponding to "fax" have been entered, these entered key codes may well be translated into a character string "FAX" of capital letters or into a character string "Fax" of coexistent capital and small letters on condition that the word dictionary contains "20, 26, 30" (fax). In this case, attributes or auxiliary attributes may well be held for the translations into capital letters, small letters, or coexistent capital and small letters. It is also allowed to display all such candidates and to accept a selection instruction by the input means 12023.

It is also possible to take a measure in which a space is inserted behind a key code or key codes having matched with the word dictionary, whereby the space is automatically entered at the boundary position between words in an European writing mode. By way of example, in a case where entered key codes are "69, 31, 26, 41, 16, 26, 23, 16, 43, 46" (Ihaveapen), the spaces may well be inserted at the boundaries of the entered key codes having matched with the word dictionary, herein, the breaks of individual words "I", "have", "a" and "pen", thereby to translate the entered key code string into "I have a pen.".

Further, the start timing of the processing flow shown in FIG. 90 corresponds to the occasion where the current input mode differs from the decided input mode. However, the start timing may well correspond to any of occasions where a space has been entered, where the input mode has been changed-over, where the power supply of the character inputting device has been turned "on", and so forth. Alternatively, the entered key codes which succeed the position detected by the boundary position decision processor 12083 may well be successively subjected to the decisions as stated before.

Still further, although the boundary position decision processor 12083 uses the individual-character-species word dictionary 12093 in the individual current input mode in the foregoing processing, it may well use the individual-character-species word dictionary 12093 on the basis of the decided mode given by the character mode decision unit 12043. In this case, the stored number of key codes are translated into the character codes of the decided mode, and the key codes succeeding the stored key-codes are translated into the character codes of the current input mode. When no key code is stored, all the key codes are translated into the character codes of the current input mode.

Yet further, the input device 12023 may well be adapted to designate either of the word dictionary of the sort conforming to the decided result of the decision unit 12043 and the word dictionary of the sort designated beforehand, as the word dictionary which is to be referred to by the boundary position decision processor 12083.

Moreover, even when the present invention is applied to a case where one word in a character string contains a plurality of character species, the character string as intended can be obtained.

Figure 109:
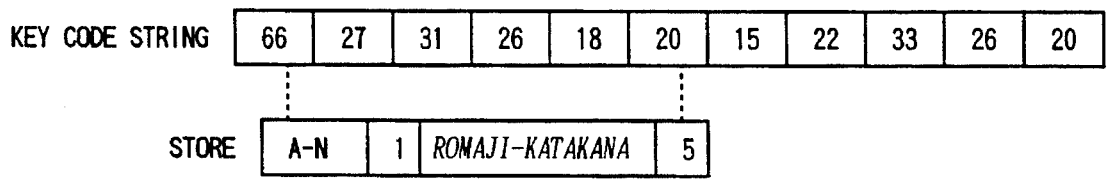

By way of example, when the input device 12023 has accepted entered character inputs "Tshatuwokau (Tシャツを買う)" in the alphanumeric mode as illustrated in FIG. 105(*a*), a key code string "66, 27, 31, 26, 18, 20, 15, 22, 33, 26, 20" is held in the dictionary key code register 12103 as illustrated in FIG. 109, and the entered character inputs are displayed on the screen of the display unit 12143 as indicated at numeral 16013 in FIG. 105(*a*). In the case of performing the present invention as to the character inputs, the entered key code string is first collated with the word dictionary. On condition that the alphanumeric-mode word dictionary as shown in FIG. 96 has a word record 703 including a plurality of character species, a key code string "66, 27, 31, 26, 18, 20" matches with the dictionary record 703. In addition, the number of key codes in the alphanumeric mode: 1 (T) and the number of key codes in the romaji-katakana mode (=the number of key codes—the number of key codes in the alphanumeric mode): 5 (shatu) can be decided from the "attribute", "auxiliary attribute" and "number of key codes" which are borne in the dictionary record 703. Thus, the input "T" is translated in the alphanumeric mode, and those of the inputs which succeed the key code having matched with the dictionary are translated in the decided mode or in the character species designated anew by the user. Here, the hiragana-romaji mode is decided as indicated at numeral 16043 in FIG. 105(*b*), and the entered character string. (16013 in FIG. 105(*a*)) is translated into that character string intended by the user which is displayed as indicated at numeral 16033 in FIG. 105(*b*).

By the way, in this embodiment, the prohibition sorts "1" and "2" are similarly handled in the boundary position decision process, but they may well be subjected to processes which are separated from each other. By way of example, regarding the prohibition sort "1" which does not form any boundary position, it is also considered that the user will have entered a key code intentionally in a prohibitive mode in which the key code is prohibited, and the entered key code might be one in the prohibitive mode. Therefore, the key code may well be set as a boundary position. Regarding the prohibition sort "2" which cannot be contained, the key code cannot be entered in the prohibitive mode, and hence, the input mode must be converted into a mode in which the key code is not prohibited. Therefore, the key code cannot be set as the boundary position of the prohibitive mode.

Alternatively, in the presence of the prohibition sort "2", the word dictionary of another character species may well be retrieved upon the judgement that the current input mode or the decided input mode will be erroneous.

This embodiment has referred to the case of matching the head or fore part of the key code string with the word dictionary. It is also allowed, however, to conversely match the tail or rear part of the key code string with the word dictionary conforming to the decided input mode, and to alter a character string matched with the dictionary, into the character species of the decided input mode. In general, characters are not entered from the intermediate position of a word, and it is therefore better to match the head part with the word dictionary. The timings at which the display of characters is altered, include the occasion where the character mode is automatically decided in accordance with the inputs of key codes as stated before, and an occasion where the user gives the instruction of the alteration.

Incidentally, the present invention is not restricted to the inputting device of this embodiment as stated above, but it is applicable to general devices which generate signals in a plurality of character species. In, for example, a speech recognition device, two sorts of interpretations "にみりのながさに" and "2mmのながさに" are possible. Even in such a case, the correct expression "2mmのながさに" can be delivered according to the present invention. Likewise, in handwritten character recognition, the present invention can be utilized for discriminating characters prone to be misrecognized, such as "7" and "ク".

Moreover, the prohibited key code check and the boundary position decision based on the attribute, which are employed in the present invention, are also applicable to kana-kanji conversion. In the kana-kanji conversion, a dictionary retrieval is performed on the basis of the reading of a Chinese character (used in Japanese writing) by kana characters, and words with which the kana characters for the reading have partially matched are registered in succession. By way of example, when the reading kana characters "せんきょう" have been entered, the five candidates of "戦況" (せんきょう), "選挙" (せんきよ), "先期" (せんき), "線" (せん) and "背" (せ) are registered. Subsequently, a retrieval is performed for a candidate which connects with each of the above candidates, for example, for the remaining reading kana character "う" in the case of "選挙". Herein, in the cases of the candidates "先期" and "背", the reading kana characters which remain are respectively "ょう" and "んきょう", and "ょ" and "ん" in these remaining characters fall under the front prohibitions. Therefore, whether or not the remaining reading kana character(s) falls under the prohibition is checked immediately after the retrieval, and the candidate falling under the prohibition is decided improper and is not registered. Alternatively, information items indicative of prohibitions are affixed to the entered reading kana characters beforehand, whereby the reading kana characters of improper boundaries can be known before the dictionary retrieval, and they can be omitted from the dictionary retrieval. In the exemplified reading kana character inputs "せんきょう", the character inputs "ょ" and "ん" are endowed with the information items indicative of the front prohibitions. Thus, the reading kana characters "せんき" are not subjected to the dictionary retrieval because the head character "ょ" of the remaining reading kana characters is prohibited. The reading kana character "せ" is not subjected to the dictionary retrieval, either, because the succeeding character "ん" is endowed with the prohibition information. Further, when the last character of reading kana characters for the dictionary retrieval falls under the rear prohibition, the dictionary retrieval of the reading kana characters is not performed. In this way, the dictionary retrieval and the registration can be done for only appropriate kana characters for reading Chinese characters.

The present invention can be applied to the kana-kanji conversion as stated above, and it can curtail a memory capacity and a processing time period.

As thus far described, according to the fourth embodiment of the present invention, the user can give inputs without converting the character species on the basis of the input modes, which brings forth the effect that desired character strings can be collectively entered. Moreover, the number of keys to be pressed by the user decreases, which brings forth the effect that the operability of the input device is enhanced.

According to this embodiment, an entered signal string in which a plurality of character species coexist can be sensed and then translated into the optimum character strings.

What is claimed is:

1. An information processing equipment wherein character codes of a plurality of character species are held in correspondence with one key code; comprising:

an input means for entering key codes;

a translation means for translating each of said key codes entered from said input means, into character codes of said plurality of character species corresponding to said each of said key codes, and for delivering the translated character codes;

a display means including a first display area in which characters are displayed separately in the respective character species, for displaying in said first display area character strings corresponding to said translated character codes delivered from said translation means; and a designation means for designating a desired character string part within a desired one of said character strings displayed in said first display area;

said display means including a second display area into which said character string part designated by said designation means is moved from said first display area.

2. An information processing equipment as defined in claim 1, further comprising:

a decision means for computing likelihoods of said respective character species in accordance with predetermined conditions as to said character strings displayed in said first display area, and for deciding one of said character species in accordance with said likelihoods;

said display means having a function of altering at least one of a display position and a display aspect in said first display area as to the characters strings of the characters species decided by said decision means.

3. An information processing equipment as defined in claim 1, further comprising:

a memory means for storing said key codes entered from said input means and said character codes delivered for said key codes by said translation means, in correspondence with said respective character species therein; and a character string translocation means for designating a desired character string within the character string displayed in said second display area, and for giving an instruction of translocating said desired character string part in said second display area, back into said first display area;

said display means, responsive to said instruction of translocating, translocating said character string part designated by said character string translocation means, back into said first display area, and displaying character strings of the other character species corresponding to the translocated character string part, in said first display area with reference to said memory means.

4. An information processing equipment as defined in claim 3, further comprising:

a decision means for computing likelihoods of said respective character species in accordance with predetermined conditions as to said character strings displayed in said first display area, and for deciding one of said character species in accordance with said likelihoods, each time the translocation is performed;

said display means having a function of altering at least one of a display position and a display aspect in said first display area as to the character species decided by said decision means.

5. An information processing equipment as claimed in claim 1, further comprising a word dictionary memory means for use with said translation means in performing said translating, said word dictionary memory means for storing therein key code strings which correspond to a plurality of words, respectively.

6. An information processing equipment wherein character codes of a plurality of character species are held in correspondence with one key code; comprising:

an input means for entering key codes;

a translation means for translating each of said key codes entered from said input means, into character codes of said plurality of character species corresponding to said each of said key codes, and for delivering the translated character codes; and a display means including a first display area in which characters are displayed separately in the respective character species, for displaying in said first display area character strings corresponding to said character codes delivered from said translation means;

said translation means having a function of delivering a specific character code of a predetermined specific character along with one character code in a case where said one character code is obtained using a plurality of key codes in the translation.

7. An information processing equipment as defined in claim 6, wherein a sum between the number of said specific character codes delivered from said translation means and that of said one character codes delivered from said translation means is equal to the number of the key codes translated by said translation means.

8. An information processing equipment as defined in claim 6, wherein said case where said one character code is obtained using said plurality of key codes is a case where said translation means handles the entered key codes in conformity with a romaji (Roman character) input method.

9. An information processing equipment as defined in claim 6, wherein said display means includes a second display area into which a character string part designated from within a desired one of said character strings displayed in said first display, is moved from said first display area, and displays said specific character in only said first display area.

10. An information processing equipment as defined in claim 6, wherein said display means inhibits displaying said specific character at a first position of said first display area.

11. An information processing equipment as defined in claim 6, wherein said display means includes a second display area into which a character string part designated from within a desired one of said character strings displayed in said first display, is moved from said first display area, and further comprising:

a memory means for storing said key codes entered from said input means and said character codes delivered for said key code by said translation means, in correspondence with said respective character species therein; and a character string translocation means for giving an instruction of translocating a desired character string part within the character string displayed in said second display area, back into said first display area;

said display means having:

a function of translocating, responsive to said instruction, said character string part designated by said character string translocation means, back into said first display area; and a function of displaying a character which corresponds to a key code stored for said specific character in said memory means, instead of said specific character in a case where said specific character exists at a first position of the character string displayed in said first display area, after the translocation thereof.

12. An information processing equipment as defined in claim 6, further comprising:

a designation means for designating a desired character string part within a desired one of said character strings displayed in said first display area;

said display means including a second display area, and having:

a function of moving said character string part designated by said designation means, into said second display area;

a function of translocating said character string part designated within said second display area back into said first display area; and a function of deleting said specific character and the characters of the other character species displayed in correspondence with said specific character in said first display area, in a case where said specific character is brought to a first position of the character string displayed in said first display area, by the translocation of designated character string part from said second display area to said first display area.

13. A character inputting computer method, implemented using computer means, wherein characters are entered by input means and employing key codes each of which corresponds to character codes of a plurality of character species, and by selecting any of the plurality of character species; comprising:

a first step of generating key codes, and holding a string of the generated key codes (herein below, termed "input key code string");

a second step of allowing a user of said method to designate any of said plurality of character species;

a third step of calculating likelihoods of the respective character species in accordance with predetermined conditions as to said input key code string, and selecting any of said character species in accordance with the calculated likelihoods;

a fourth step of translating said input key code string into character codes of the character species designated by said user unless the designated character species is the same as the character species selected at said third step, and into character codes of the character species selected at said third step if the designated character species is different from the character species selected at said third step; and a fifth step of invalidating the selection of said character species done at said third step, and simultaneously restoring the input key codes to character codes of the character species designated at said second step, said fifth step being executed at need;

wherein at least one combination of the input key code string and the character species is stored, said combination being selected from the group which consists of a combination of said input key code string having been subject to the execution of said fifth step (herein below, termed "suppression learning key code string") and said character species restored at said fifth step (herein below, termed "suppression learning character species"), and a combination of said input key code string at a time when said second step has been executed (herein below, termed "non-conversion learning key code string") and said character species at the time (herein below termed "non-conversion learning character species"); and wherein thenceforth, said third step is inhibited to be executed for said input key code string newly generated at said first step, in either of a case where the newly generated input key code string agrees with said suppression learning key code string and where the character species selected then agrees with said suppression learning character species, and a case where said newly generated input key code string agrees with said non-conversion learning key code string and where the character species selected then agrees with said non-conversion learning character species.

14. A character inputting device wherein character codes of a plurality of character species are held in correspondence with one key code; comprising:

a key code generation means for generating key codes;

a character code translation means for translating a string of said key codes into character codes of one of said character species as designated beforehand (herein below, termed "designated character species");

a likelihood computation means for calculating likelihoods of the respective character species in accordance with predetermined conditions as to said string of said key codes generated by said key code generation means (herein below, termed "input key code string");

a character mode alteration means for selecting any of said character species with respect to said input key code string in accordance with said likelihoods calculated by said likelihood computation means, and for altering the designation of the character species so as to use the selected character species as said designated character species;

a learning information memory means for previously storing key code strings (herein below, termed "learning key code strings") in correspondence with the character species thereof (herein below, termed "learning character species") therein;

a comparison means for comparing said input key code string with said learning key code strings, and said designated character species with said learning character species; and a means for inhibiting said likelihood computation means so as not to calculate said likelihoods in a case where the comparisons by said comparison means have shown that said designated character species agrees with any of said learning character species and that said input key code string agrees with any of the learning key code strings of said designated character species.

15. A character inputting device defined in claim 14, further comprising:

a correction means for accepting a correction instruction given by a user of said device, and for executing a correction process in which the alteration of said designated character species based on said likelihoods as has been done by said character mode alteration means is invalidated to restore said designated character species to the original character species before having been altered; and a registration means for storing said original character species and said input key code string which has been subject to the likelihood calculations as has formed a cause of the invalidated character species alteration, as the learning character species and the learning key code string in said learning information memory means, respectively, in a case where the correction by said correction means has been made.

16. A character inputting device as defined in claim 14, further comprising:

a character species designation means for accepting a character species designation given by a user of said device, and for altering said designated character species to the character species of the given designation; and a registration means for storing said designated character species before the alteration and said input key code string having been generated under said designated character species before said alteration, as the learning character species and the learning key code string in said learning information memory means, respectively, in a case where said alteration of said designated character species by said character species designation means has been made.

17. A character inputting device as defined in claim 14, further comprising:

a load means for loading document data from external memory means storing therein documents which have been already created; and a registration means for translating into corresponding key codes some of character codes which are contained in said document data loaded by said load means, for storing the resulting key code string as said learning key code string in said learning information memory means, and for also storing alphanumeric character species for said learning key code string translated from alphanumeric character codes and the set character species at a time of the load for said learning key code string translated from kana (Japanese syllabary) character codes, as the respective learning character species of said learning key code string in said learning information memory means.

18. A character inputting device as defined in claim 14, wherein, in a case where said comparisons by said comparison means have shown that said designated character species and any of said learning character species are in agreement and that said input key code string and any of the learning key code strings of said designated character species are partially in agreement, said likelihood computation means calculates said likelihoods in relation to only a key code string part which is other than the agreeing key code string part.

19. A character inputting device wherein character codes in a plurality of character species are allocated to one key input; comprising:

an input means for allocating one key code in response to one key input;

a word dictionary memory means for storing therein key code strings which correspond to a plurality of words, respectively, said word dictionary memory means being provided for each of said plurality of character species;

a boundary position decision process means for deciding if a key code string entered from said input means agrees with said key code strings stored in said word dictionary memory means, as to all the stored key code strings, and for detecting as a boundary position that position of the entered key code string which corresponds to a length of a longest one of the key code strings decided to agree;

a translation means for translating said entered key code string into character codes with a unit of translation being a key code string which extends up to said boundary position detected by said boundary position decision process means; and a display means for displaying characters which correspond to said character codes translated by said translation means.

20. A character inputting device as defined in claim 19, wherein:

said boundary position decision process means detects boundary positions successively by decisions as to a key code string which succeeds the detected boundary position;

a decision means is further comprised for successively deciding the respective character species of key code strings which extend up to said boundary positions successively detected by said boundary position decision process means; and said translation means translates said key code strings which extend up to said boundary positions detected by said boundary position decision process means, into character code strings of said character species decided by said decision means.

21. A character inputting device as defined in claim 19, further comprising:

a decision means for deciding the character species of the key input entered from said input means;

said input means accepting also an instruction for selecting one of said character species for said key input;

said word dictionary memory means including word dictionary memories of the respective character species;

said boundary position decision process means detecting said boundary position with reference to the key code strings stored in the word dictionary memory of the character species of the selection instruction in said input means;

said translation means translating said key code string which extends up to said boundary position detected by said boundary position decision process means, into a character code string of said character species of said selection instruction in said input means, and translating a key code string which succeeds said boundary position, into a character code string of said character species decided by said decision means.

22. A character inputting device as defined in claim 19, further comprising:

a decision means for deciding the character species of the key input entered from said input means;

said input means accepting also an instruction for selecting one of said character species for said key input;

said word dictionary memory means including word dictionary memories of the respective character species;

said boundary position decision process means detecting said boundary position with reference to the key code strings stored in the word dictionary memory of said character species decided by said decision means;

said translation means translating said key code string which extends up to said boundary position detected by said boundary position decision process means, into a character code string of said character species decided by said decision means, and translating a key code string which succeeds said boundary position, into a character code string of said character species of said selection instruction in said input means.

23. A character inputting device as defined in claim 19, further comprising:

a decision means for deciding the character species of said input accepted by said input means;

said decision means rendering the decision on that part of said key code string accepted by said input means which succeeds said boundary position detected by said boundary position decision process means.

24. A character inputting device as defined in claim 21, further comprising:

a means for accepting an instruction for appointing either of said word dictionary memory of said character species decided by said decision means and default word dictionary memory of said character species, as said word dictionary memory which is referred to by said boundary position decision process means.

25. A character inputting device as defined in claim 19, further comprising:

a prohibited key code detection means for detecting a key code which cannot become either of initial and final boundary positions, as to said key code string;

said boundary position decision process means refraining from deciding said boundary position even when said key code string entered from said input means has agreed with the key code string stored in said word dictionary memory means, in a case where said prohibited key code detection means has detected said key code which does not become said boundary position.

26. A character inputting device as defined in claim 25, wherein said prohibited key code detection means includes a prohibited pattern table in which key code strings not forming the boundary positions are stored beforehand, and detects said key code not becoming said boundary position, with reference to said prohibited pattern table.

27. A character inputting device as defined in claim 19, wherein:

said word dictionary memory means further stores therein attributes indicating the character species of key code strings which ought to exist before and behind the respective stored key code strings; and said boundary position decision process means refers to the attribute to decide if said attribute is met, in a case where said key code string entered from said input means and any of said key code strings stored in said word dictionary memory means have agreed in the detection of said boundary position, and it refrains from deciding said boundary position even when said key code string entered from said input means has agreed with the key code string stored in said word dictionary memory means, in a case where said attribute is not met.

28. A character inputting device as defined in claim 27, wherein:

said word dictionary memory means further stores therein key code strings of words in which the plurality of character species coexist, and to which auxiliary attributes indicating said character species are affixed; and said translation means refers to the auxiliary attribute, and translates said key code string into said character codes of said character species conforming to said auxiliary attribute.

29. A character inputting device as defined in claim 25, wherein:

said translation means further includes a function of translating said key code string into a kanji (Chinese character used in Japanese writing);

said boundary position decision process means refrains from deciding said boundary position even when said key code string has agreed with the key code string stored in said word dictionary memory means, in said case where said prohibited key code detection means has detected said key code which does not become said initial boundary position; and said translation means translates said key code string into said kanji at said boundary position detected by said boundary position decision process means.

30. A character translation computing method, implemented using computer means, for a character inputting device wherein character codes in a plurality of character species are allocated to one key input; comprising:

storing key code strings which correspond to a plurality of words, respectively, in a word dictionary memory means beforehand, said word dictionary memory means provided for each of said plurality of character species;

allocating one key code in response to one key input;

deciding if an entered key code string agrees with said key code strings stored in said word dictionary memory means, as to all the stored key code strings, and detecting as a boundary position that position of said entered key code string which corresponds to a length of a longest one of the key code strings decided to agree; and translating said entered key code string into character codes with a unit of the translation being a key code string which extends up to said boundary position.

* * * * *